United States Patent
Dye et al.

(10) Patent No.: US 6,523,102 B1
(45) Date of Patent: Feb. 18, 2003

(54) PARALLEL COMPRESSION/ DECOMPRESSION SYSTEM AND METHOD FOR IMPLEMENTATION OF IN-MEMORY COMPRESSED CACHE IMPROVING STORAGE DENSITY AND ACCESS SPEED FOR INDUSTRY STANDARD MEMORY SUBSYSTEMS AND IN-LINE MEMORY MODULES

(75) Inventors: Thomas A. Dye, Austin, TX (US); Manuel J. Alvarez, II, Austin, TX (US); Peter Geiger, Austin, TX (US)

(73) Assignee: Interactive Silicon, Inc., Austin, TX (US)

( * ) Notice: Subject to any disclaimer, the term of this patent is extended or adjusted under 35 U.S.C. 154(b) by 0 days.

(21) Appl. No.: 09/550,380

(22) Filed: Apr. 14, 2000

(51) Int. Cl.[7] .................................................. G06F 12/02
(52) U.S. Cl. ........................................ 711/170; 709/247
(58) Field of Search ................................ 711/104, 105, 711/154, 165, 170; 709/247

(56) References Cited

U.S. PATENT DOCUMENTS

| | | |
|---|---|---|
| 4,008,460 A | 2/1977 | Bryant et al. |
| 4,688,108 A | 8/1987 | Cotton et al. |
| 4,881,075 A | 11/1989 | Weng |
| 5,150,430 A | 9/1992 | Chu |
| 5,237,460 A | 8/1993 | Miller et al. |
| 5,247,638 A | 9/1993 | O'Brien et al. |
| 5,247,646 A | 9/1993 | Osterlund et al. |
| 5,353,425 A | 10/1994 | Malamy et al. |

(List continued on next page.)

FOREIGN PATENT DOCUMENTS

| | | |
|---|---|---|
| EP | 0 702 457 | 3/1996 |
| WO | 95/19662 | 7/1995 |

OTHER PUBLICATIONS

Brenza, "Synonym Avoidance Cache," IBM Technical Disclosure Bulletin, vol. 34, No. 1, Jun. 1991, pp. 377–381.

International Search Report, Application No. PCT/US/01/12408, mailed Apr. 29, 2002.

*Primary Examiner*—Kevin L. Ellis
(74) *Attorney, Agent, or Firm*—Jeffrey C. Hood

(57) ABSTRACT

An ASIC device embedded into the memory subsystem of a computing device used to accelerate the transfer of active memory pages for usage by the system CPU from either compressed memory cache buffer or the addition of a compressed disk subsystem for improved system cost and performance. The Compression Enhanced Dual In-line Memory Module of the present invention uses parallel lossless compression and decompression engines embedded into the ASIC device for improved system memory page density and I/O subsystem data bandwidth. In addition, the operating system software optimizes page transfers between compressed disk partitions, compressed cache memory and inactive/active page memory within the computer system. The disclosure also indicates preferred methods for initialization, recognition and operation of the ASIC device transparently within industry standard memory interfaces and subsystems. The system can interface to present operating system software and applications, which enable optimal usage for the compressed paging system memory environment. The integrated parallel data compression and decompression capabilities of the compactor ASIC mounted on industry standard memory modules, along with the software drivers and filters of the present invention keep recently used pages compressed in the system memory. Additional performance is gained by the transfer of compressed pages between the system memory and the disk and network subsystems. In addition, the present invention may reduce the amount of data transferred between distributed computers across the LAN or WAN by the transmission of compressed page data between remote systems or distributed databases.

143 Claims, 73 Drawing Sheets

U.S. PATENT DOCUMENTS

| | | |
|---|---|---|
| 5,357,614 A | 10/1994 | Pattisam et al. |
| 5,394,534 A | 2/1995 | Kulakowski |
| 5,396,343 A | 3/1995 | Hanselman |
| 5,420,639 A | 5/1995 | Wegeng et al. |
| 5,440,718 A * | 8/1995 | Kumagai et al. ............ 395/481 |
| 5,455,577 A | 10/1995 | Slivka et al. |
| 5,467,087 A | 11/1995 | Chu |
| 5,510,840 A | 4/1996 | Yonemitsu et al. |
| 5,548,742 A | 8/1996 | Wang et al. |
| 5,584,008 A | 12/1996 | Shimada et al. |
| 5,606,428 A | 2/1997 | Hanselman |
| 5,627,995 A | 5/1997 | Miller et al. |
| 5,696,912 A | 12/1997 | Bicevskis et al. |
| 5,729,228 A | 3/1998 | Franaszek et al. |
| 5,828,877 A | 10/1998 | Pearce et al. |
| 5,836,003 A | 11/1998 | Sadeh |
| 5,838,334 A | 11/1998 | Dye |
| 5,974,471 A * | 10/1999 | Belt .............................. 710/1 |
| 6,002,411 A | 12/1999 | Dye |
| 6,170,047 B1 | 1/2001 | Dye |
| 6,173,381 B1 | 1/2001 | Dye |
| 6,263,413 B1 * | 7/2001 | Motomura et al. ......... 711/173 |

* cited by examiner

Figure #1

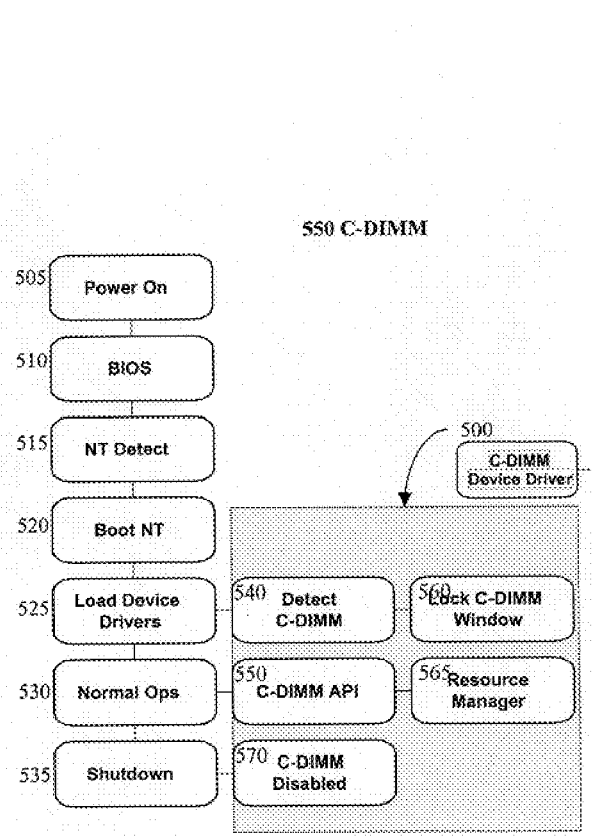
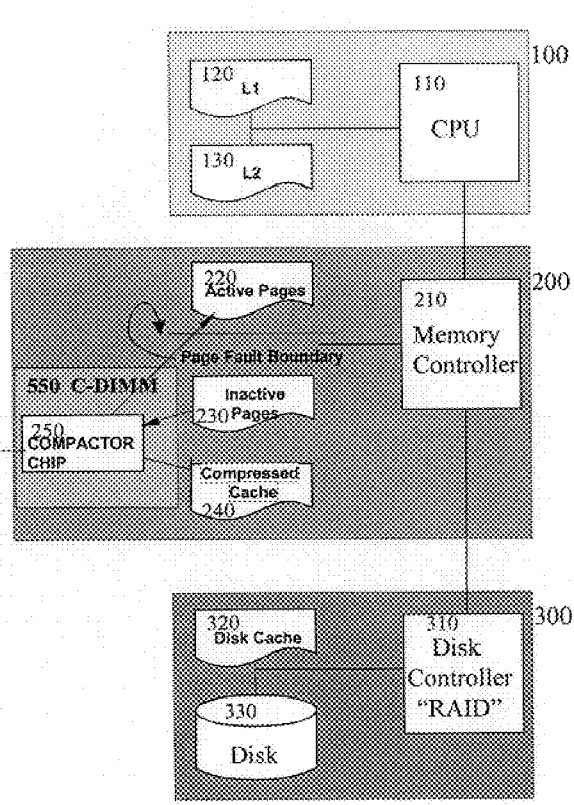
Figure 4a
Figure 4b

Compress and store in
CC in system memory

Compress and store to disk

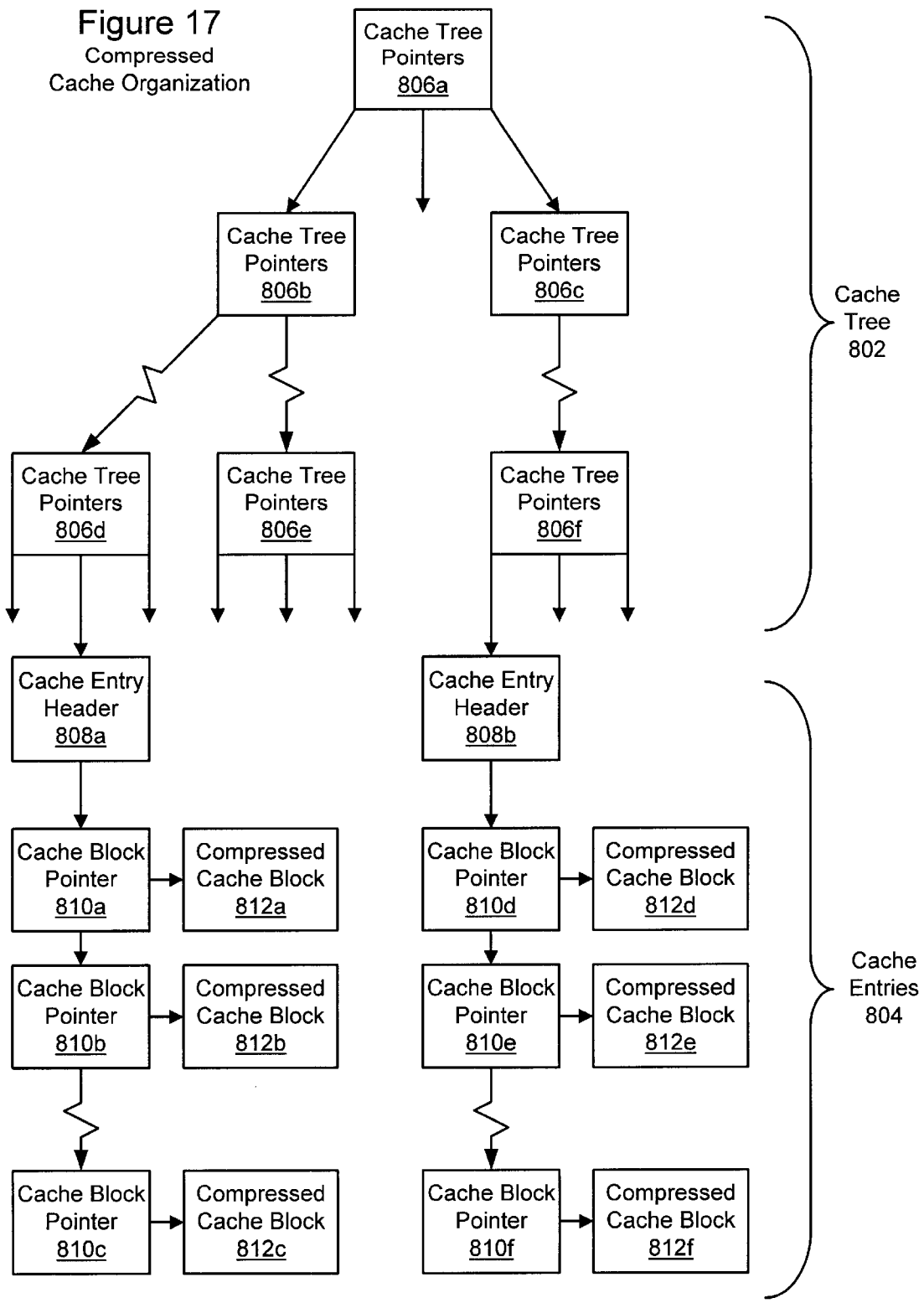

| Current State | Next State | Comments |
|---|---|---|
| Green | Yellow | Updated by background routine |
| Yellow | Red | Updated by background routine |
| Red and Dirty | Writing | Updated and writeback initiated by background routine |
| Red, Dirty and Writing | Clean | Updated by completion routine |
| Red and Clean | (N/A) | Cache entry deallocated by background routine |

Figure 18

Background Cache Entry State Transitions

| Request Type | Lookup Results | Action |
|---|---|---|
| Read | Miss | Pass-through |
| Read | Hit | Decompress |
| Write | Miss | Compress and allocate |
| Write | Hit | Compress and replace |

Figure 19

Cacheable I/O Request Actions

Basic flow of I/O request read dispatch routine

Basic flow of I/O request write dispatch routine

Basic flow of background routine when
it finds a cache entry to writeback

Basic flow of I/O request completion routine

| I/O Request | Disk | CCM | VMM | Transfers | Description |
|---|---|---|---|---|---|
| Read | -- | Cmp | Unc | CC-dec-VM | VM read. CC hit. |
| Read | Unc | -- | Unc | Disk-to-VM | VM read. Not cacheable or CC miss. |
| Read | Unc | Cmp | -- | Disk-to-CCM, CCM-cmp-CC | CC prefetch. CC allocation. |
| Write | -- | Cmp | Unc | VM-cmp-CC | VM write. Writeback mode. CC allocation or update. |
| Write | Unc | -- | Unc | VM-to-Disk | VM write. Not cacheable. |
| Write | Unc | Cmp | Unc | VM-cmp-CC, VM-to-disk | VM write. Write-through mode. CC allocation or hit. |
| Write | Unc | Cmp | -- | CC-dec-CCM, CCM-to-disk | CC writeback. |

CC = Compressed cache
VM = Virtual memory
CCM = Compressed Cache Manager buffer
Unc = Uncompressed
Cmp = Compressed
Dec = decomress

Figure 24

Examples of data transfers that may be performedthrough the CCM

| Basic Operation | I/O request Handling |
|---|---|
| Read not cacheable | Pass I/O request through. |
| Read miss | Pass I/O request through. |
| Read hit | Complete I/O request. |
| Write not cacheable | Pass I/O request through. |
| Write miss | Pass I/O request through. |
| Write allocate (write-through mode) | Pass I/O request through. |
| Write allocate (writeback mode) | Complete I/O request. |
| Write hit (write-through mode) | Pass I/O request through. |
| Write hit (writeback mode) | Complete I/O request. |
| Writeback | Create I/O request with completion routine. |

Figure 25

Examples of ways the CCM may handle I/O requests based on the type of operation being performed Actions performed when an I/O request is completed Actions performed when an I/O reqeust is created

| I/O request Type | Operation | Source Data | Destination Data |
|---|---|---|---|
| Read | Decompress | Cache blocks | UML buffers |
| Write | Compress | UML buffers | Cache blocks |
| Writeback | Decompress | Cache blocks | UML buffers |

Figure 28

Examples of types of data transfers that may be supported

CPAT
Cache Organization

| Current State | Next State | Comments |
|---|---|---|
| Green | Yellow | Updated by background thread |
| Yellow | Red | Updated by background thread |
| Red and Dirty | Writing | Updated and writeback initiated by background thread |
| Red, Dirty and Writing | Clean | Updated by completion routine |
| Red, Clean and not Busy | (N/A) | Cache entry deallocated by background thread |

Figure 30

Background CPAT Cache Entry State Transitions

| Request Type | CPAT Cache Results | Request Sequence |
|---|---|---|
| Read | Hit | VM read |
| Read | Miss allocate<br>Miss replace clean | CPAT read<br>VM read |
| Read | Miss replace dirty | CPAT write old<br>CPAT read new<br>VM read |
| Write | Hit clean | VM write |
| Write | Hit dirty | CPAT write *<br>VM write * |
| Write | Miss allocate, new clean<br>Miss replace clean, new clean | CPAT read<br>VM write |
| Write | Miss replace dirty, new clean | CPAT write old<br>CPAT read new<br>VM write |
| Write | Miss allocate, new dirty<br>Miss replace clean, new dirty | CPAT read<br>CPAT write *<br>VM write * |
| Write | Miss replace dirty, new dirty | CPAT write old<br>CPAT read new<br>CPAT write new *<br>VM write * |
| Writeback | Deallocate dirty | CPAT write |

Figure 31

Request Sequences

* CPAT write and VM write may be dispatched in any order.

Basic flow of a data read request through the dispatch routine

Basic flow of a data read request through the completion routine

Basic flow of a data write request
through the dispatch routine

Basic flow of a data write request through the completion routine

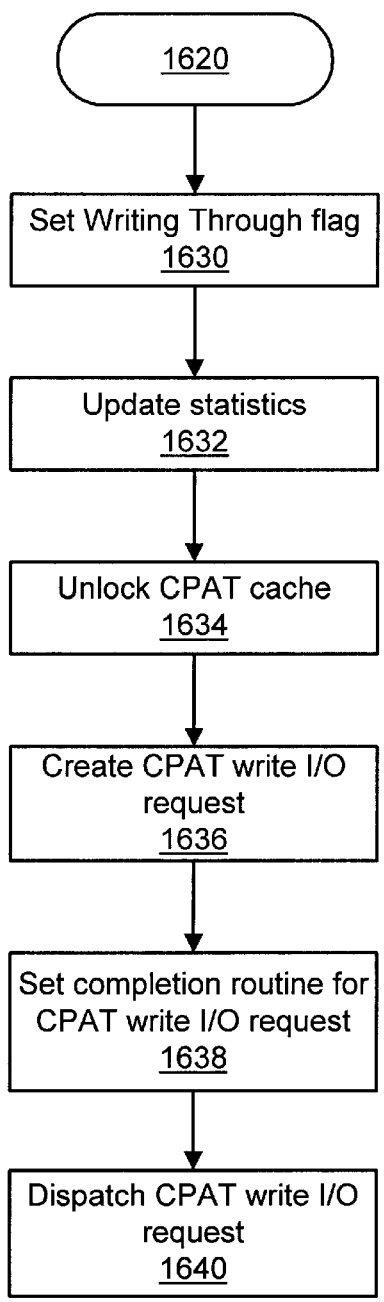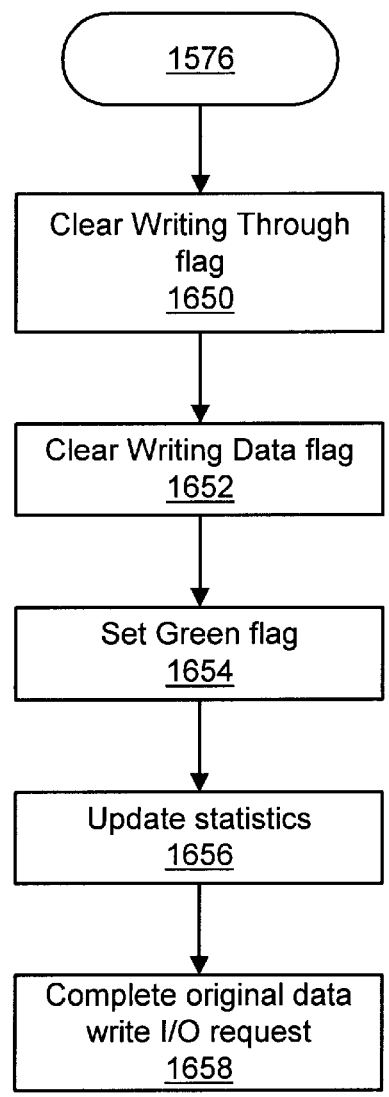
Figure 35d                    Figure 35e

| Incoming Requests | Conditions | Outgoing Requests |
|---|---|---|
| RdData1, RdData2 | | RdData2 should not have to wait |
| RdData1, WrData2 | Both access same data page, and compressed size of WrData2 is different | WrData2 waits until RdData1 completes |
| WrData1, RdData2 | Both access same data page, and compressed size of WrData1 is different | RdData2 waits until WrData1 completes |
| WrData1, WrData2 | Both access same data page, and compressed size of either is different | WrData2 waits until WrData1 completes |
| WrData1, WrData2 | Both access same CPAT page, and compressed sizes of both are different. | WrData2 waits until WrData1 completes |

Figure 36

Conditions when outstanding data requests to
the same data page or CPAT page may be serialized Basic flow of a completion routine from Figure 36

Basic flow of I/O request background routine resulting from Figure 37

| Background Thread Processing | Processing Flow |
|---|---|
| Memory Allocation Manager | If memory allocation fails, then skip to next manager. |
| Memory Deallocation Manager | Always succeeds. |
| CPAT Cache Deallocation Manager | Always succeeds. |
| CPAT Cache Writeback Manager | If the resources needed to perform the next writeback are not available, then wait until resources are available. |
| CPAT Cache Transition Manager | Always succeeds. |

Figure 39

| Incoming Request | I/O Request Handling |
| --- | --- |
| Read, non-Compressed Disk space | Dispatch I/O request. |
| Read, CPAT cache miss, not compressed | Queue I/O request. CDM-initiated I/O request sequence. Dispatch I/O request later. |
| Read, CPAT cache miss, compressed | Queue I/O request. CDM-initiated I/O request sequence. Complete I/O request later. |
| Read, CPAT cache hit, not compressed | Dispatch I/O request. |
| Read, CPAT cache hit, compressed | Queue I/O request. CDM-initiated I/O request sequence. Complete I/O request later. |
| Write, non-Compressed Disk space | Dispatch I/O request. |
| Write, Compressed Disk space | Queue I/O request. CDM-initiated I/O request sequence. Complete I/O request later. |

Figure 40

Various ways the CDM handles incoming I/O requests
based on the type of operation being performed

| I/O Request Type | Operation | Source Data | Destination Data |
|---|---|---|---|
| Read | Decompress | Intermediate buffers | UML buffers |
| Write | Compress | UML buffers | Intermediate buffers |

Figure 41

C-DIMM Device Driver Interface

Data write requests with CCM and CDM present

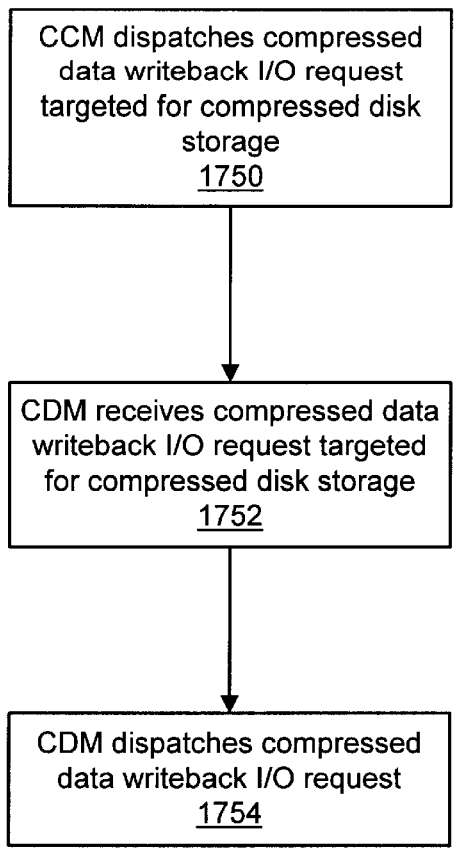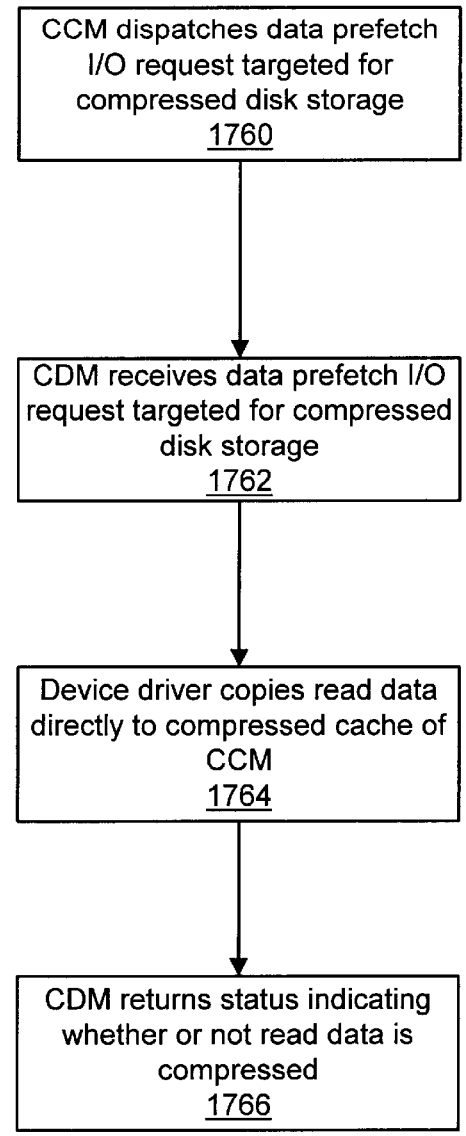
Figure 42b
Figure 42c

Validating an I/O request

Passing an I/O request to the next driver in an I/O stack

Completing an I/O request

Queuing an I/O request when the current driver can't process the I/O request

Setting up data transfers

Creating and dispatching an I/O request and UML

PARALLEL COMPRESSION/ DECOMPRESSION SYSTEM AND METHOD FOR IMPLEMENTATION OF IN-MEMORY COMPRESSED CACHE IMPROVING STORAGE DENSITY AND ACCESS SPEED FOR INDUSTRY STANDARD MEMORY SUBSYSTEMS AND IN-LINE MEMORY MODULES

FIELD OF THE INVENTION

The present invention relates to memory systems, and more particularly to an integrated compression/ decompression circuit embedded on industry standard memory modules where such modules operate to improve performance of a computing system by the storage of compressed data in the system memory and/or on the nonvolatile memory subsystem.

DESCRIPTION OF THE RELATED ART

System memory modules and architectures have remained relatively unchanged for many years. While memory density has increased and the cost per storage bit has decreased over time, there has not been a significant improvement to the effective operation of the memory subsystem using non-memory devices located within such memory subsystems. The majority of computing systems presently use industry standard in-line modules. These modules house multiple DRAM memory devices for easy upgrade, configuration, and improved density per area.

Software-implemented compression and decompression technologies have also been used to reduce the size of data stored on the disk subsystem or in the system memory data. Current compressed data storage implementations use the system's CPU executing a software program to compress information for storage on disk. However, a software solution typically uses too many CPU compute cycles to operate both compression and decompression in the present application(s). This compute cycle problem increases as applications increase in size and complexity. In addition, there has been no general-purpose use of compression and decompression for in-memory system data. Prior art systems have been specific to certain data types. Thus, software compression has been used, but this technique limits CPU performance and has restricted use to certain data types.

Similar problems exist for programs that require multiple applications of software threads to operate in parallel. Software compression does not address heavy loaded or multi-threaded applications, which require high CPU throughput. Other hardware compression solutions have not focused on "in-memory" data (data which reside in the active portion of the memory and software hierarchy). These solutions have typically been I/O data compression devices located away from the system memory or memory subsystem. In addition, the usage of hardware compression has been restricted to slow, serial input and output devices usually located at the I/O subsystem.

Mainframe computers have used data compression for acceleration and reduction of storage space for years. These systems require high dollar compression modules located away from the system memory and do not compress in-memory data in the same memory subsystem for improved performance. Such high dollar compression subsystems use multiple separate engines running in parallel to achieve compression speeds at super computer rates. Multiple separate, serial compression and decompression engines running in parallel are cost prohibitive for general use servers, workstations, desktops, or mobile units. Lower cost semiconductor devices have been developed that use compression hardware as well. The main difference is that these devices do not operate fast enough to run at memory speed and thus lack the necessary performance for in-memory data. Such compression hardware devices are limited to serial operation at compression rates that work for slow I/O devices such as tape backup units. The problem with such I/O compression devices, other than tape backup units, is that portions of the data to compress are often too small of a block size to effectively see the benefits of compression. This is especially true in disk and network subsystems. To operate hardware compression on in-memory data at memory bus speeds requires over an order of magnitude more speed than present day state-of-the-art compression hardware.

Prior Art Computer System Architecture

FIG. 1 illustrates a block diagram example of a prior art computer hardware and software operating system hierarchy of present day computing systems. The prior art memory and data storage hierarchy comprises the CPU Subsystem 100, the main memory subsystem 200, and the disk subsystem 300. The CPU subsystem 100 comprises the L1 cache memory 120 and L2 cache memory 130 coupled to the CPU 110 and the CPU's local bus 135. The CPU subsystem 100 is coupled to the main memory subsystem 200 through the CPU local bus 135. The main memory subsystem 200 is also coupled to the disk subsystem 300. The main memory subsystem 200 comprises the memory controller 210, for controlling the main system memory banks, active pages of memory 220, inactive pages of memory 230, and a dynamically defined page fault boundary 232. The page fault boundary 232 is dynamically controlled by the virtual memory manager software 620 to optimize the balance between active and inactive pages in the system memory and "stale" pages stored on disk. The memory subsystem 200 is coupled to the I/O, or disk subsystem 300, by the I/O peripheral bus interface 235, which may be one of multiple bus standards or server/workstation proprietary I/O bus interfaces, e.g., the PCI bus. For purpose of illustration, the I/O disk subsystem 300 comprises the disk controller 310, the optional disk cache memory 320, and the actual physical hard disk or disk array 330 which is used to store nonvolatile /non-active pages. In alternate embodiments, multiple sub-sections of CPU 100, memory 200, and disk 300 subsystems may be used for larger capacity and/or faster operation.

The prior art drawing of FIG. 1 also illustrates the software operating system 600. The typical operating system (OS) comprises multiple blocks. FIG. 1 shows a few of the relevant OS blocks, including the virtual memory manager (VMM) 620, file system 640, and disk drivers 660.

The operation of prior art systems for storage and retrieval of active and non-active pages from either the system memory or the disk is now described for reference. Again referring to the prior art system of FIG. 1, the VMM 620 is responsible for allocation of active pages and reallocation of inactive pages. The VMM 620 defines page fault boundaries 232 separating the active pages 220 and the inactive pages 230 located in both the system memory subsystem 200 and disk subsystem 300. An active page may be defined as an area or page of memory, typically 4096 bytes, which is actively used by the CPU during application execution. Active pages reside between or within system memory or CPU cache memory. An inactive page may be defined as an area or page of memory, typically 4096 bytes, which is not directly accessed by the CPU for application execution.

Inactive pages may reside in the system memory, or may be stored locally or on networks on storage media such as disks. The page fault boundary 232 is dynamically allocated during run time operation to provide the best performance and operation as defined by many industry standard algorithms such as the LRU/LFU lazy replacement algorithm for page swapping to disk. As applications grow, consuming more system memory than the actual available memory space, the page fault boundaries 232 are redefined to store more inactive pages 230 in the disk subsystem 300 or across networks. Thus, the VMM 620 is responsible for the placement of the page fault boundary 232 and the determination of active pages 220 and inactive pages 230, which reside in memory and on the disk subsystem 300.

The file system software 640, among other tasks, and along with the disk drivers 660, are responsible for the effective movement of inactive pages between the memory subsystem 200 and the disk subsystem 300. The file system software 640 may have an interface which is called by the VMM 620 software for the task of data movement to and from the computer disk and network subsystems. The file system 640 software maintains file allocation tables and bookkeeping to locate inactive pages that have been written to disk. In order for the file system to operate, the file system calls the software disk drivers 660 for DMA control of data movement and physical disk control. Instructions are programmed into the disk controller 310 of the disk subsystem 300 by the file system 640 software. Thus, when application data exceeds the available system memory space, the VMM 620 allocates and reallocates active and inactive pages for best operation of application data and instructs the file system 640 to instruct the disk driver 660 to carry out the DMA operation and page movement tasks.

For the purpose of this disclosure, it is helpful to understand the relative read and write time requirements for CPU read and write operation to or from each of the subsystems 100, 200, and 300. For example, for the CPU subsystem 100, a read and write operation to or from the L1 120 or L2 130 cache memory is on the order of tens of nanoseconds. A CPU 110 read/write from/to the memory subsystem 200 is on the order of hundreds of nanoseconds. A CPU read or write and/or a memory controller DMA read or write to the disk subsystem 300 is on the order of milliseconds. To move a page (typically 4096 bytes) from the inactive page 230 area to the active page 220 by the CPU 110 typically requires 3 $\mu$s for the page fault software plus 7 $\mu$s for the data move, or 10 $\mu$s of overhead. For the DMA controller, typically located in the memory controller 210, to read or DMA a page from disk cache 320 requires about 1 ms, while movement of a page to physical disk requires about 10 ms. Thus, the data transfer time from disk subsystem 300 to memory subsystem 200 is about three orders of magnitude longer than from memory subsystem 200 to CPU subsystem 100 L1/L2 cache 120/130 memory. This represents an area of desired improvement. In addition, the speed of CPU reads/writes to and from the memory subsystem 200 is also an area of desired improvement.

Certain prior art systems utilize multiple compression and decompression devices to achieve faster compression rates for I/O data sent and stored on disk. No prior art currently exists which uses in-line memory compression technology at the memory interface or on memory modules to achieve improved system performance. Therefore, a new system and method is desired to improve overall memory performance, including a reduction in the effective page swap time overhead as seen in present day computing systems. The present invention addresses these problems in a unique and novel hardware and software architecture.

SUMMARY OF THE INVENTION

One embodiment of the present invention discloses a system and process to initialize, operate, and shutdown, through a combination of hardware and software procedures, an integrated circuit embedded on industry standard memory modules where such modules operate to improve performance of a computing system by the storage of compressed data in the system memory instead of data storage on the disk subsystem. The preferred embodiment of the present invention relates to computer system architectures, and more particularly to Compression Enabled Dual In-line Memory Modules (C-DIMM), which include an integrated chip mounted on DIMM, SODIMM, and SIMM or RIMM memory modules. It may include multiple DRAM memory types including SDRAM, DR-DRAM, and DDR-DRAM. It may also include memory subsystems that do not use industry standard in-line modules, but alternatively couple memory in a plurality of means to other system components. In addition, alternate embodiments of the present invention may be embedded into memory controllers and CPUs or into I/O subsystems and use the process of the present invention to improve system performance. The present invention increases effective memory density for all of the memory located within the memory subsystem. In addition, the invention increases performance without additional cost for in-line memory modules, disk-cache memory, disk storage devices, and network communications operations.

One embodiment of the present invention comprises a compression/decompression integrated circuit or chip, mounted on an industry-standard memory interface module such as a DIMM, SODIMM, SIMM, or RIMM modules, or embedded into the memory subsystem with other discrete components. The embodiment may also comprise the software methods and procedures required for enabling the operation of the integrated circuit within standard operating system environments. In addition, the embodiment includes the method of transparent memory module operation prior to the activation of the integrated circuit. The integrated circuit may contain novel high rate parallel compression and decompression technology. The compression and decompression technology may provide lossless and/or lossy compression and decompression of data. In alternate embodiments, the integrated circuit may contain other algorithms such as encryption and decryption or other co-processing circuits. The system of the preferred embodiment mounts the compression/decompression chip, which may be referred to as the Compactor chip, onto an industry-standard or de facto standard memory module (for example, DIMM, RIMM, SODIMM, or SHIM). In alternate embodiments, the Compactor chip may be located in multiple areas of the computing device, including the core logic memory controller, CPU, Peripheral Component Interconnect (PCI) bus, or any other input/output bus coupled either directly or indirectly via additional control integrated circuits to the system memory subsystem. For purpose of this disclosure, the system of the preferred embodiment is referred to as the C-DIMM or Compression enabled Dual-Inline Memory Module.

As seen in prior art, the operation of the operating system's Virtual Memory Manager (VMM) continuously tags pages for future storage (typically 4096 bytes per page) from the system memory to the nonvolatile memory in order to open up additional memory space for higher priority tasks based on the software application's or driver's request. As used herein, nonvolatile memory may include, but is not limited to: hard disks, removable storage such as diskettes, and solid state memory such as flash memory. In addition, "swap-space" is used in both the system memory and on nonvolatile memory to make the memory allocation and de-allocation operation run smoothly. Stale page swap-space operation between system memory and disk controlled by the Virtual Memory Manager (VMM) typically follow the industry standard LRU/LZU operation as documented in multiple technology papers.

The present system includes the novel introduction of a compressed cache (CC) located within the system memory subsystem, or alternatively located elsewhere in the computer system. The CC may be allocated as a portion of the memory subsystem or alternatively may be separate memory used exclusively for the CC. In the preferred present embodiment, allocation of the system memory for the CC is initiated by the C-DIIM driver software requesting the system's operating system software to allocate the CC. The CC is memory mapped into the main system memory. Thus, the CC holds compressed pages of data in memory under the direction of the C-DIMM installable file system filters and the Compactor chip software driver.

In the preferred present embodiment, a compressed cache may be allocated for use with one or more cacheable objects such as devices, partitions, sector ranges, file systems, files, request types, process IDs, etc. Thus, one compressed cache may be used for one or more cacheable objects. Alternatively, two or more compressed caches may be allocated for use with one or more cacheable objects. Each compressed cache may be managed separately. A method may be provided to allow users of a system implementing the Compressed Cache architecture to configure the compressed caches associated with one or more objects on the system. Preferably, a computer program with a Graphical User Interface (GUI) is provided to allow the users of the system to assign and configure compressed caches for one or more cacheable objects.

In one embodiment, operation may proceed as follows:

First, the VMM software, working within the operating system software, may tag pages in pageable system memory that are stale as "inactive pages" which get scheduled for later placement onto the nonvolatile memory (for example, hard disk) and network storage. The stale pages may be program data, and thus destined to be written to a swap space area on the nonvolatile memory, or file data, and thus destined to be written to one or more files on the nonvolatile memory.

Second, Compressed Cache Manager (CCM) software operating on the computer system's CPU may receive a stale page transfer I/O request, and may then instruct C-DIMM device driver (CDD) software operating on the CPU to compress and store the stale page to the CC, typically located in system memory. In one embodiment, the CCM may pass a structure to the CDD comprising the location of the stale page in system memory and the destination location in the pre-allocated compressed cache for the page after compression. The structure may also comprise the original I/O request. In one embodiment, the Compactor Chip may have input buffer memory to receive the uncompressed page and output buffer memory to store the compressed page. In one embodiment, the input and output buffer memory may be comprised on the Compactor Chip. In another embodiment, the input and output buffer memory may be allocated in system memory. The CDD may write the stale page to the input buffer of the Compactor Chip. The Compactor Chip may then compress the stale page, preferably using a parallel compression algorithm, and store the compressed page in the output buffer. The CDD may then read the compressed page from the output buffer and write it to the destination location in the compressed cache. In an alternate embodiment, the CDD may pass the location of the stale page in system memory and the destination location for the compressed pages in the compressed cache to the Compactor Chip, the Compactor Chip may read the uncompressed page directly from system memory, compress the page, and store the compressed page directly to the compressed cache. After the compressed page is stored in the compressed cache, the operating system VMM and file system software think the stale page is stored on disk. However, no disk transfer has occurred, as would occur in prior art operating system operation.

Alternatively to being implemented as software executed on a CPU as stated above, the CCM may be implemented in hardware. In one embodiment, the CCM may be implemented as embedded hardware logic on the Compactor Chip.

Third, the C-DIMM file filter software, termed the Compressed Cache Manager (CCM), in order to make additional space within the CC, may either ask the file system to allocate more pages to the CC, or alternatively may move compressed pages from the CC to the disk. In the preferred embodiment, the monitoring of the CC to determine if additional space is needed, or if space is underutilized in the CC and thus may be freed, may be performed by a background task. The background task may also generate requests to the operating system to allocate or free memory for the CC, and may also initiate the transfer of compressed pages to the disk.

The transfer of compressed pages from the CC to disk may utilize novel Compressed Disk Manager (CDM) software executing on the CPU. The CDM may manage one or more Compressed Page Allocation Tables (CPATs) on partitions of nonvolatile memory pre-allocated as compressed partitions. A compressed partition of nonvolatile memory may be referred to as a CPAT cache. A CPAT and compressed partition may work similarly to a standard File Allocation Table (FAT) or file system (e.g., NTFS) used in present computer systems for the locating of pages that have been previously retired to disk. The CPAT represents a secondary File Allocation Table or FAT2. The CDM is responsible for managing the CPAT and for the translation of addresses between the compressed pages of the CC and the actual "physical" sectors on compressed partitions of nonvolatile memory, as well as translating addresses from non-compressed system memory and the compressed partition of nonvolatile memory when required. In one embodiment, the CDM may receive an I/O request to transfer one or more compressed pages from the CC to nonvolatile memory. In one embodiment, the I/O request may be generated by a background task that monitors compressed pages in the CC and generates write to disk I/O requests for compressed pages when the compressed pages need to be removed from the CC. In another embodiment, the CCM may generate the I/O request. The CDM may then read the compressed pages from the CC and write the compressed pages to a compressed partition on the nonvolatile memory. In one embodiment, the CDM may also receive page transfer I/O requests from the VMM and, if the pages were not compressed by the CCM, may interface with the CDD to compress and store the pages in the compressed partition using a method substantially similar to that described in step two for the CCM compressing and storing pages to the CC.

Fourth, the VMM may generate read I/O requests to read from the disk subsystem one or more pages previously paged out of system memory. Compressed Cache Manager (CCM) software operating on the computer system's CPU may receive a read I/O request for a page, and may then examine the compressed cache to see if the requested page is in the compressed cache.

Fifth, if the CCM determines that the compressed page is in the compressed cache, the CCM may instruct C-DIMM device driver (CDD) software operating on the CPU to decompress the page from the CC and move the decompressed page to the system memory. In one embodiment, the CCM may pass a structure to the CDD comprising the location of the compressed page in the CC and the destination location in the system memory for the page after decompression. The structure may also comprise the original I/O request. In one embodiment, the Compactor Chip may have input buffer memory to receive the compressed page and output buffer memory to store the decompressed page. In one embodiment, the input and output buffer memory may be comprised on the Compactor Chip. In another embodiment, the input and output buffer memory may be allocated in system memory. The CDD may write the compressed page to the input buffer of the Compactor Chip. The Compactor Chip may then decompress the page, preferably using a parallel decompression algorithm, and store the decompressed page in the output buffer. The CDD may then read the decompressed page from the output buffer and write it to the destination location in the system memory. In an alternate embodiment, the CDD may pass the location of the compressed page in the CC and the destination location for the compressed page in the system memory to the Compactor Chip, the Compactor Chip may read the compressed page directly from the CC, decompress the page, and store the decompressed page directly to the system memory. Once decompression is complete, the C-DIMM device driver may indicate to the VMM that the requested page is now in system memory and ready for use by application software.

Sixth, if the CCM determines that the requested page is not in the compressed cache, then the CCM may generate a read I/O request to read the page from nonvolatile storage. The read I/O request may include the source location of the requested page on nonvolatile storage and the destination compressed cache location for the requested page. The CDM may receive the read I/O request and examine the CPATs of one or more compressed partitions on nonvolatile memory to see if the requested page is stored in a compressed partition. If the page is stored in a compressed partition, the CDM may translate (via the CPAT) the source location from the I/O request, retrieve the compressed page from the compressed partition on nonvolatile storage, and write the compressed page to the destination location in the compressed cache. The CCM may then proceed with the decompression of the requested page as described in the fifth step. In one embodiment, the CDM may also receive a read I/O request directly from the VMM, search for the requested page in the compressed partitions as described above, and, if the page is located in a compressed partition, may interface with the CDD to decompress and store the requested page to the destination location in system memory using a method substantially similar to that described in step four for the CCM decompressing and storing pages to the system memory.

In an alternate embodiment, in order to retrieve a compressed page from the disk subsystem, the CCM may directly call the CDM for FAT2 address translation in order to obtain the disk partition and sector address and to read the compressed page from the disk subsystem into the CC. The decompression process into an active page may then be performed as described in step four.

These six process steps represent over three orders of magnitude improvement in allocation and transmission of VMM requested pages to the active area of the system memory. For example, page transfers between the CC and "active" portions of the system memory are in the order of 15 $\mu$s per page, while pages requested in a convention system from the disk subsystem to the active area of system memory require around 10 ms per page. Transferring compressed data rather than uncompressed data to and from nonvolatile storage such as a disk subsystem also represents a significant improvement in performance due to the decrease in transfer times between system memory and the nonvolatile storage.

Thus, reduction of the time required to activate pages results in improved efficiency and reduced cost. In addition, secondary benefits result in more effective disk space, peripheral bus bandwidth, and reduced transmission time across LANs and WANs when the remote server also has C-DIMM or equivalent technology installed.

In summary, the capabilities of the present invention remove system bottlenecks, allowing more effective data transfer and data storage density. By keeping compressed pages in memory and moving fewer pages to the disk subsystem for temporary storage, the system can fit more application data in the memory subsystem and reduce execution and data movement time significantly. In addition, multiple compactor chips of multiple variety and function can be installed for additional performance enhancements or processing of tasks. A single C-DIMM can effectively achieve performance similar to doubling of the memory resident in the memory subsystem. This represents a significant improvement in the cost and operation of present day workstations, data servers and other computing devices that are memory intensive. Thus the compression enabled memory module (C-DIM) or alternate embodiment of the compactor chip technology, along with the process of moving data through software control filters, is a significant advance over the operation of current software based compression technology running from a specific CPU application program.

Inventions

This application "In-memory" compression is best applied to any system where the addition of memory improves performance when operating standard or non-standard applications. By application of the present invention for in-memory compression, system disk request rates are decreased, increasing effective application speed and thus establishing a new price per number of operations which a computing system can achieve.

The present invention includes parallel data compression and decompression logic, designed for the reduction of data bandwidth and storage requirements and for compressing and decompressing data at a high rate. The compression/decompression logic may be referred to as a "Compactor Chip." The Compactor Chip may be included in any of various devices, including, but not limited to: a memory controller; memory modules such as a DIMM; a processor or CPU; peripheral devices, such as a network interface card, modem, IDSN terminal adapter, ATM adapter, etc.; and network devices, such as routers, hubs, switches, bridges, etc., among others.

In the present invention, the parallel data compression engine and method, preferably implemented on the Compactor Chip, operates to perform parallel compression of data. In one embodiment, the method first involves receiving uncompressed data, wherein the uncompressed data comprises a plurality of symbols. The method also may maintain a history table comprising entries, wherein each entry comprises at least one symbol. The method may operate to compare a plurality of symbols with entries in the history table in a parallel fashion, wherein this comparison produces compare results. The method may then determine match information for each of the plurality of symbols based on the compare results. The step of determining match information may involve determining zero or more matches of the plurality of symbols with each entry in the history table. The method then outputs compressed data in response to the match information.

In the present invention, the parallel decompression engine and method, preferably implemented on the Compactor Chip, may decompress input compressed data in one or more decompression cycles, with a plurality of codes (tokens) typically being decompressed in each cycle in parallel. The parallel decompression engine may include an input for receiving compressed data, a history table (also referred to as a history window), and a plurality of decoders for examing and decoding a plurality of codes (tokens) from the compressed data in parallel in a series of decompression cycles. A code or token may represent one or more compressed symbols or one uncompressed symbol. The parallel decompression engine may also include preliminary select generation logic for generating a plurality of preliminary selects in parallel. A preliminary select may point to an uncompressed symbol in the history window, an uncompressed symbol from a token in the current decompression cycle, or a symbol being decompressed in the current decompression cycle. The parallel decompression engine may also include final select generation logic for resolving preliminary selects and generating a plurality of final selects in parallel. Each of the plurality of final selects points either to an uncompressed symbol in the history window or to an uncompressed symbol from a token in the current decompression cycle. The parallel decompression engine may also include uncompressed data output logic for generating the uncompressed data from the uncompressed symbols pointed to by the plurality of final selects, and for storing the symbols decompressed in this cycle in the history window. The decompression engine may also include an output for outputting the uncompressed data produced in the decompression cycles.

BRIEF DESCRIPTION OF THE DRAWINGS

A better understanding of the present invention can be obtained when the following detailed description of the preferred embodiment is considered in conjunction with the following drawings, in which:

FIG. 4a illustrates process and operation of the C-DIMM driver including the initialization of the C-DIMM device within the system software normal mode of operation;

FIG. 4b indicates the memory and disk hierarchy and the C-DIMM driver interface to such hierarchy;

FIG. 17 illustrates a Compressed Cache organization according to one embodiment of the invention;

FIG. 18 illustrates Background Cache Entry State Transitions according to one embodiment of the invention;

FIG. 19 illustrates Cacheable I/O Request Actions according to one embodiment of the invention;

FIG. 24 illustrates various data transfers that are possible through the CCM according to one embodiment of the invention;

FIG. 25 illustrates examples of ways the CCM may handle I/O requests based on the type of operation being performed according to one embodiment of the invention;

FIG. 28 illustrates various types of data transfers that are supported according to one embodiment of the invention;

FIG. 30 illustrates background CPAT Cache Entry state transitions according to one embodiment of the invention;

FIG. 31 illustrates Request Sequences according to one embodiment of the invention;

FIG. 35d is a flowchart expanding on step 1620 of FIG. 35c and illustrating the processing of a write-through according to one embodiment of the invention;

FIG. 35e is a flowchart expanding on step 1576 of FIG. 35a and illustrating the processing of a data write I/O request sequence complete according to one embodiment of the invention;

FIG. 36 illustrates conditions when outstanding data requests to the same data page or CPAT page may be serialized according to one embodiment of the invention;

FIG. 39 illustrates the processing flow of background thread processing according to one embodiment of the invention;

FIG. 40 illustrates various ways the CDM may handle incoming I/O requests based on the type of operation being performed according to one embodiment of the invention;

FIG. 41 illustrates C-DIMM Device Driver Interfaces according to one embodiment of the invention;

FIGS. 42a–42d are flowcharts illustrating CDM and CCM interactions according to one embodiment of the invention;

FIG. 42a is a flowchart illustrating data write request processing with CCM and CDM present according to one embodiment of the invention;

FIG. 42b is a flowchart illustrating compressed cache writeback request processing with CCM and CDM present according to one embodiment of the invention;

FIG. 42c is a flowchart illustrating compressed cache prefetch request processing with CCM and CDM present according to one embodiment of the invention;

FIG. 42d is a flowchart illustrating data read request processing with CCM and CDM present according to one embodiment of the invention;

FIG. 43 is a flowchart illustrating a process for validating an I/O request according to one embodiment of the invention;

FIG. 44 is a flowchart illustrating a process for passing an I/O request to the next driver in an I/O stack according to one embodiment of the invention;

FIG. 45 is a flowchart illustrating a process for completing an I/O request according to one embodiment of the invention;

FIG. 46 is a flowchart illustrating a process for queuing an I/O request when the current driver can't process the I/O request according to one embodiment of the invention;

FIG. 47 is a flowchart illustrating a process for setting up data transfers according to one embodiment of the invention;

FIG. 48 is a flowchart illustrating a process for creating and dispatching an I/O request and UML according to one embodiment of the invention.

DETAILED DESCRIPTION OF THE PREFERRED EMBODIMENT

Incorporation by Reference

U.S. patent application Ser. No. 09/239,659 titled "Bandwidth Reducing Memory Controller Including Scalable Embedded Parallel Data Compression and Decompression Engines" whose inventors are Thomas A. Dye, Manuel J. Alvarez II and Peter Geiger and was filed on Jan. 29, 1999, is hereby incorporated by reference in its entirety as though fully and completely set forth herein.

U.S. patent application Ser. No. 09/421,968, now U.S. Pat. No. 6,208,273, titled "System and Method for Performing Scalable Embedded Parallel Data Compression" whose inventors are Thomas A. Dye, Manuel J. Alvarez II and Peter Geiger and was filed on Oct. 20, 1999, is hereby incorporated by reference in its entirety as though fully and completely set forth herein.

U.S. patent application Ser. No. 09/491,343 titled "System and Method for Performing Scalable Embedded Parallel Data Decompression" whose inventors are Thomas A. Dye, Manuel J. Alvarez II and Peter Geiger and was filed on Jan. 26, 2000, is hereby incorporated by reference in its entirety as though fully and completely set forth herein.

U.S. Pat. No. 6,002,411 titled "Integrated Video and Memory Controller with Data Processing and Graphical Processing Capabilities" whose inventor is Thomas A. Dye and which was issued Dec. 14, 1999, is hereby incorporated by reference in its entirety as though fully and completely set forth herein.

U.S. patent application Ser. No. 08/916,464, now U.S. Pat. No. 6,173,381, titled "Memory Controller Including Embedded Data Compression and Decompression Engines" whose inventor is Thomas A. Dye and which was filed Aug. 8, 1997, is hereby incorporated by reference in its entirety as though fully and completely set forth herein.

Computer Architecture of the Preferred Embodiment

Figure 1:
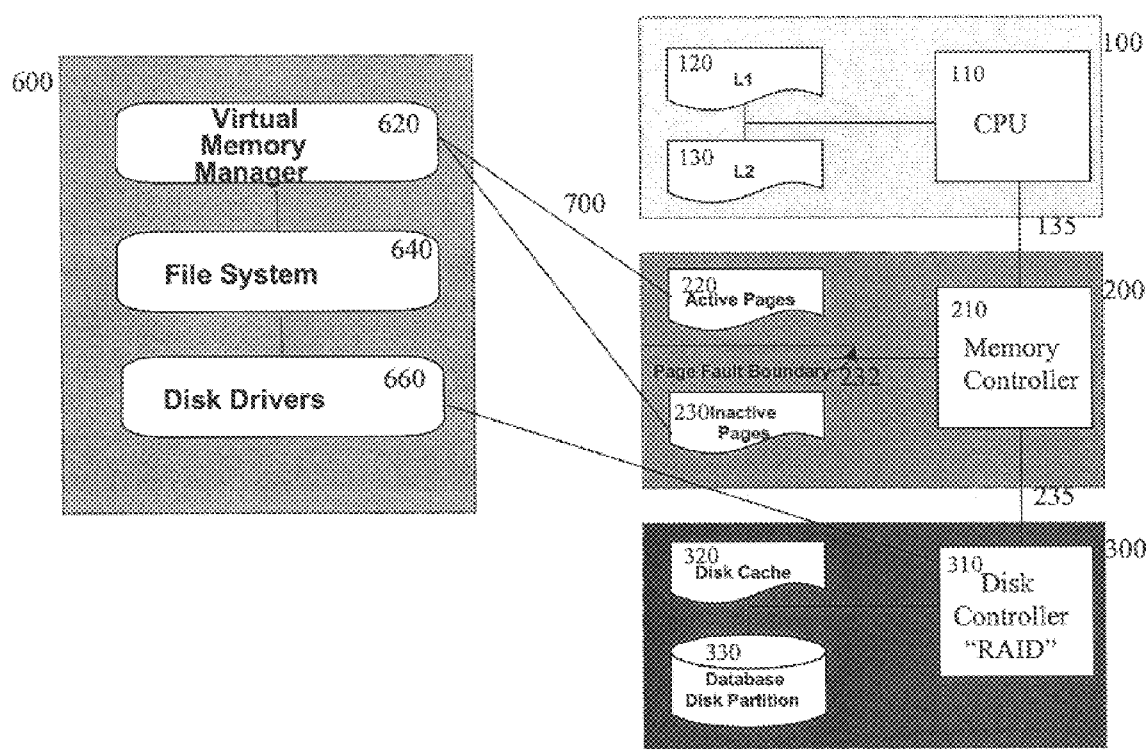
FIG. 1 illustrates the prior art computer data memory and storage hierarchy from the CPU cache, to the main system memory to the disk subsystem.
Figure 2:
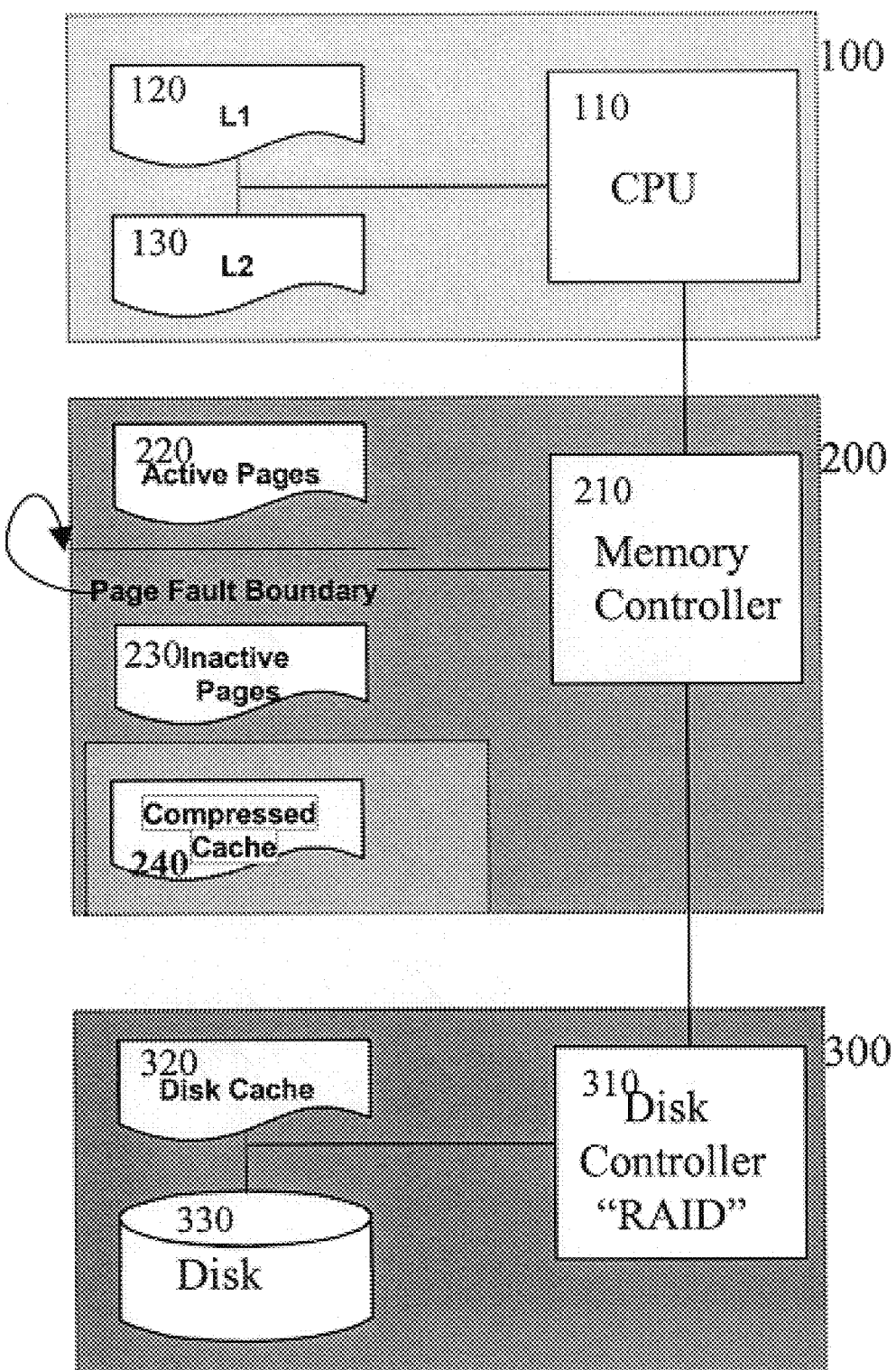
FIG. 2 illustrates the addition of compressed cache in the main system memory as indicated by the present invention.

FIG. 2—A Computer System with Compressed Cache

Figure 9B:
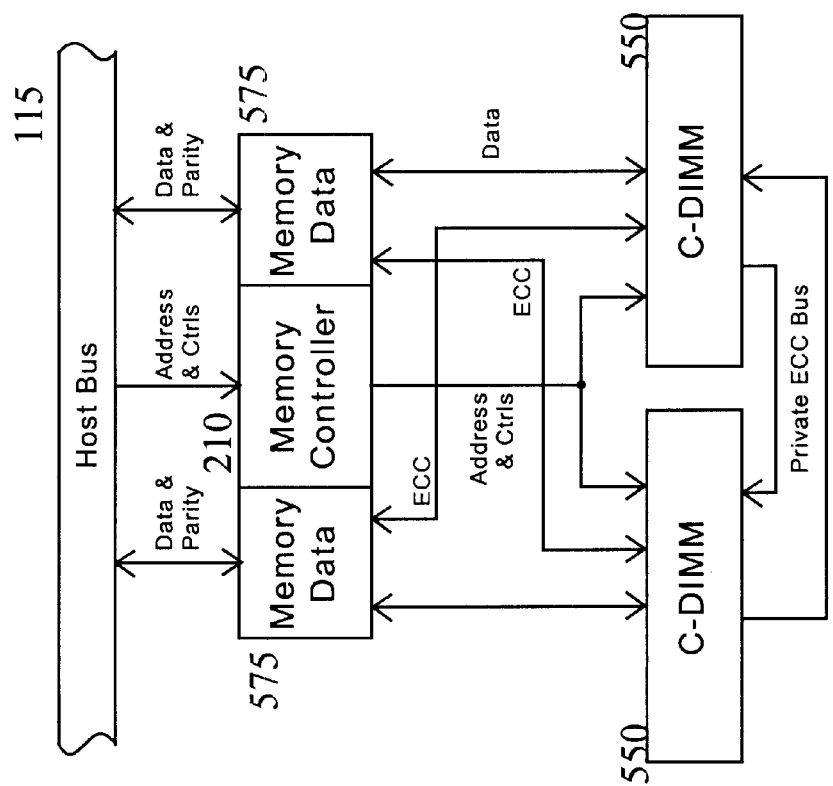
FIG. 9b illustrates the integration of additional C-DIMMs in order to increase performance and/or operate on larger bus widths not capable with a single C-DIMM.
Figure 9A:
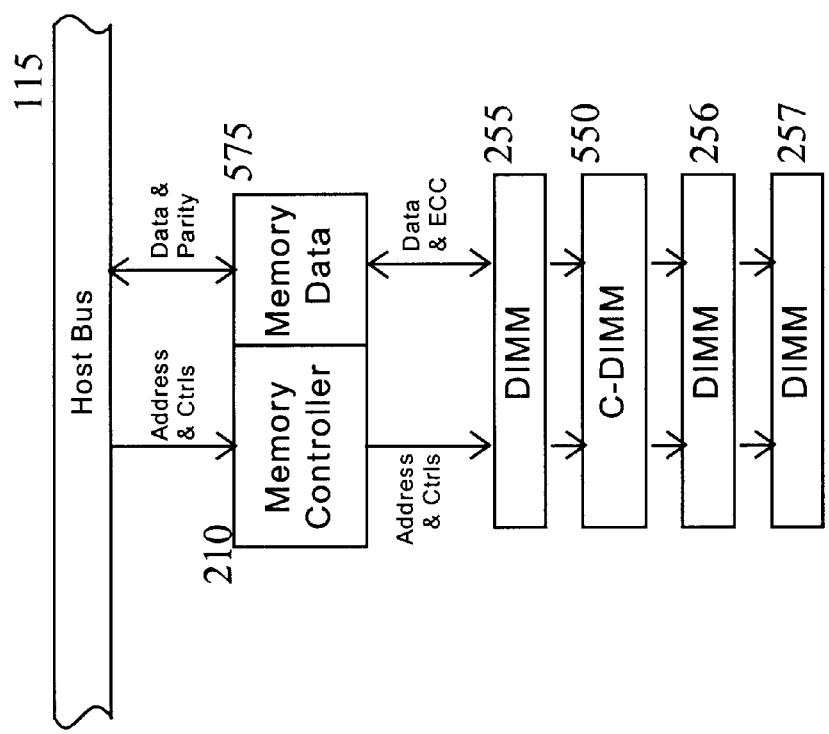
FIG. 9a illustrates the integration of one C-DIMM with other standard DIMMs within the main system memory according to one embodiment.

FIG. 2 illustrates one embodiment of the invention. The present invention may be implemented in any of various systems, such as a computer system, Internet appliance, PDA, or any device that includes a memory. For example, as shown in FIG. 2, the present invention may be implemented in a computer system having a CPU subsystem 100, a memory subsystem 200, and a nonvolatile memory subsystem 300. As indicated in FIG. 2, the CPU subsystem 100 is coupled to the memory subsystem 200, which is coupled to the disk subsystem 300. The CPU subsystem 100 includes a CPU 110 and may include an L1 cache 120 and an L2 cache 130. The memory subsystem includes a memory controller 210 and system memory. Compressed cache 240 is located in the memory subsystem 200 of the computer. Within the memory subsystem of the preferred embodiment, the memory controller 210 may be coupled to one or more C-DIMM (Compression Enabled Dual In-line Memory Module) devices 550 (FIG. 3) and may couple to other memory devices, e.g., DIMM modules, (FIG. 9a, 9b). As used herein, the term "compression enabled memory device" comprises a memory device or memory module that includes compression logic and decompression logic comprised on the memory device. The compression enabled memory device is preferably implemented in a dual in-line memory module (DIMM) and is referred to herein as a C-DIMM. The compression enabled memory device may be implemented in any of various types of memory devices, such as DIMMs, SIMMs, SDDIMMs or RIMMs.

The C-DIMM devices 550 and the DIMM modules may be partitioned by the system software into active pages 220, inactive pages 230, and compressed pages 240, each of which make up components of the total system memory.

The software of the present invention may allocate a compressed cache (CC) 240. The CC 240 may be allocated within the normal memory map of the computer system. Compressed pages may be stored in the CC 240. The CC 240 may be allocated within system memory (also referred to as main memory or RAM) comprised of one or more volatile memory devices such as C-DIMMs, DIMMs, SIMMs, SDDIMMs or RIMMs. Pages are generally 4096 bytes. In alternate embodiments, page sizes can be any size as desired by the operating system software. Instead of swapping inactive pages to the nonvolatile memory, the system and method of the present invention may operate to store inactive pages in a compressed format in the CC 240. In addition, pages from the CC 240, which are maintained in compressed format, can be moved to disk or network in such format for future data storage, retrieval, or transmission over LANs or WANs. Thus, a second order benefit is achieved by storage of compressed pages in the I/O subsystem 300 instead of non-compressed pages. In the preferred embodiment, three software modules may be used in the system: the compressed cache manager (CCM), the compressed disk manager (CDM) and the C-DIMM device driver (CDD). In addition, these modules may be used individually or in combination as required by operating system software or application software.

In one embodiment of the present invention, the CCM, CDM and CDD may be stand-alone software programs that operate independently of the Virtual Memory Manager (VMM). In this embodiment, the CCM and CDM may operate to compress pages being managed by the VMM, cache or store the compressed pages in a compressed cache and/or CPAT cache, and decompress and write pages to system memory being managed by the VMM in response to read requests from the VMM. These various operations may be performed substantially invisibly to the VMM. In other words, the VMM has no knowledge of or control over the compression, storing, and decompression of pages. The CCM and CDM may receive I/O requests from the VMM, examine the I/O requests, and perform various operations in response to the I/O requests. To the VMM, it appears that invalidated pages are written to nonvolatile storage and requested pages are read from nonvolatile storage and returned to system memory as in prior art systems. In other contemplated embodiments, one or more of the operations of the CCM and CDM software programs may be integrated into a virtual memory manager (VMM). In these embodiments, an enhanced VMM may directly initiate the compression and caching or storing of pages to a compressed cache and/or CPAT cache, and may also directly initiate the decompression and reading back into system memory of previously cached or stored pages. In one contemplated embodiment, the CCM and CDM modules may not be necessary, as all of their operations are fully incorporated in an enhanced VMM.

Figure 3:
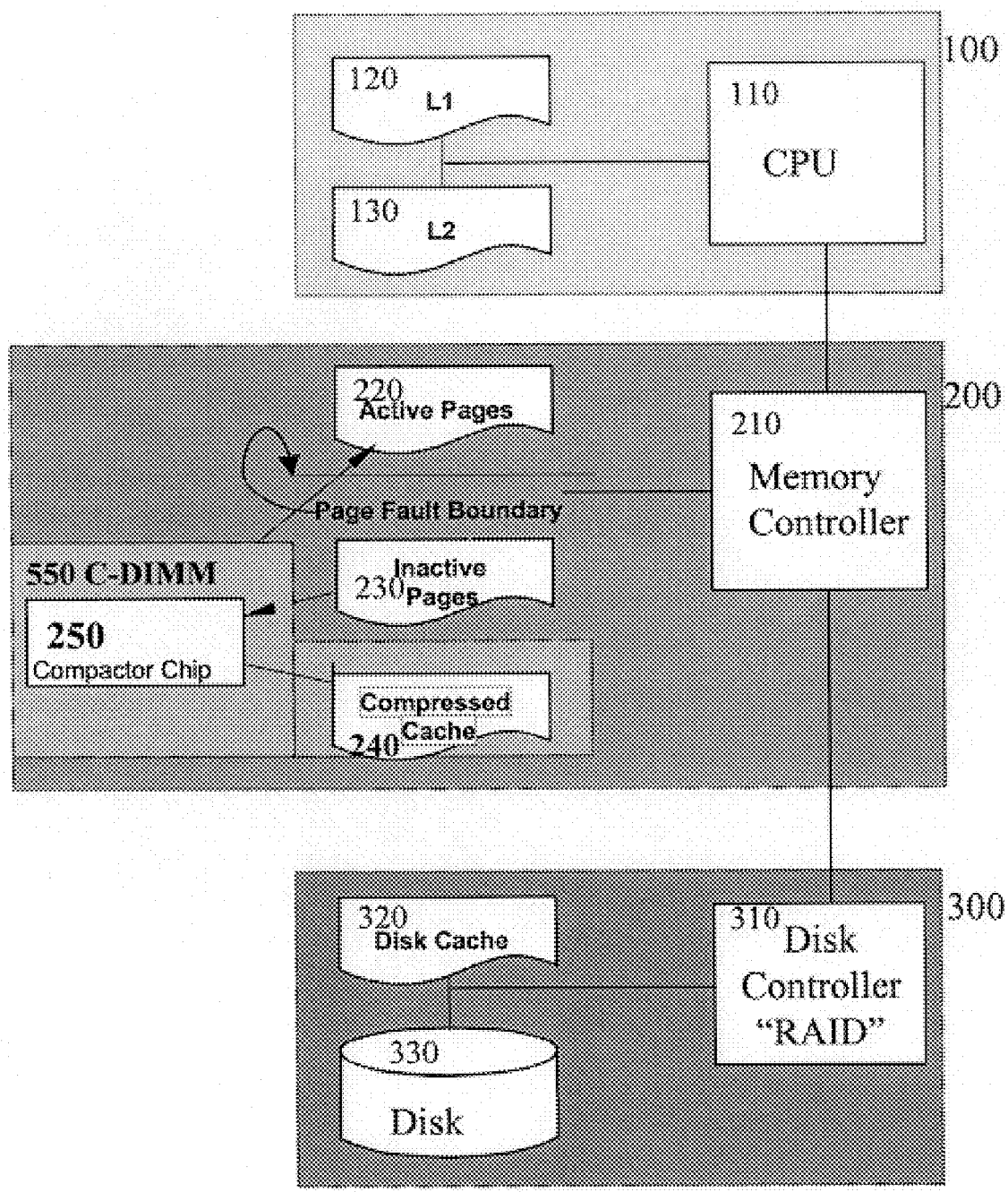
FIG. 3 illustrates the addition of the C-DIMM to the system for control and operation of the compressed cache memory.

FIG. 3—A Computer System with C-DIMM

FIG. 3 illustrates the system of FIG. 2 including a C-DIMM device 550 comprised as part of the system memory. The Compression enabled Dual-Inline-Memory Module (C-DIMM 550) includes parallel compression and decompression technology which operates to increase the performance or reduce the cost of computers, including servers and workstations, by increasing the effective size and/or speed of memory. In the preferred embodiment of the present invention, the compactor chip 250 utilizes a method of using fast parallel compression and decompression technology as outlined in patent application Ser. Nos. 09/239,658, 09/421,968 and 09/491,343 as referenced above. The fast parallel compression and decompression operations are accomplished by mounting the compactor chip 250, as seen in FIG. 3, preferably into a memory device or module, such as an industry standard DIMM, SIMM or SODIMM or RIMM module. The C-DIMM 550 thus may comprise an industry standard memory module including the compression/decompression chip of the present invention. The memory module is then compression/decompression enabled and may be plugged into the system memory subsystem 200 of the computing system.

In the preferred embodiment, the compactor chip 250 acts as a compression and decompression co-processor under the direction of the application or C-DIMM driver and other software modules. In alternate embodiments, the compactor chip may be "in-line" with the data transfer such that data is compressed or decompressed as it traverses between the CPU subsystem 100 and the memory subsystem 200. The fast parallel compression and decompression operations described above make the "in-line" embodiments feasible, as the compression and decompression of data are performed in "real-time." In one embodiment with an in-line compactor chip, substantially all data transfers from the CPU subsystem 100 to the memory subsystem 200 are compressed by the compactor chip, and substantially all data transfers from the memory subsystem 200 to the CPU subsystem 100 are decompressed.

As indicated in FIG. 3, under direction of the C-DIMM software modules, inactive pages 230 are preferably compressed and may be stored in memory in a compressed format. This may be accomplished by a CPU read of the non-compressed inactive page 230 followed by a CPU write to the C-DIMM memory aperture by the CPU. In alternate embodiments, other circuits such as a DMA controller may perform the read and write operations. The C-DIMM memory aperture refers to a memory space, preferably on a C-DIMM memory module, wherein data in the C-DIMM memory aperture may be operated on by the compactor chip 250. The compactor chip 250 may operate to compress and/or decompress data in the C-DIMM memory operation. In response to the page write into the C-DIMM aperture, data is preferably compressed by the compactor chip 250 and stored in a C-DIMM read aperture. Then, the system CPU 110, or a DMA controller, may read the compressed data from the C-DIMM read aperture and write the compressed page to the compressed cache 240 memory area. In this case, the VMM 620 may believe that the data was transferred to disk whereas in reality the data was compressed and stored in the CC 240 in system memory.

When the virtual memory manager (VMM) 620 requests a page from disk, the C-DIMM software modules may first examine the CC 240 for resident compressed pages. If the compressed page is resident within the CC 240, the C-DIMM software driver 500 may instruct the CPU (or DMA controller) to read the inactive compressed page from the CC 240 and instruct the compactor chip 250 to decompress the data during the read transfer. The CPU (or DMA controller) then writes the new active page into the area designated by the VMM 620. To the VMM 620 and file system 640, this process looks like a standard disk transfer of a page that had previously been swapped to disk and is read back to the active area of system memory. However, this was actually a fast decompression and read from the CC to the designated active page 220 memory area. Thus, the use of compactor chip 250 and the allocation of the compressed cache 240 enables orders of magnitude faster response time when reading inactive, cached pages into the main memory 200 active page 220 memory area.

FIGS. 4*a* and 4*b*—A Computer System with a C-DIMM and C-DIMM Driver

FIG. 4*b* illustrates one embodiment of the system with the C-DIMM driver 500 controlling the compactor chip 250 operations. FIG. 4*a* depicts a software architecture or software module environment of the present invention. The software modules may be called or invoked by one another and may pass information necessary to program or control the C-DIMM 550 device. The flow of FIG. 4*a* represents one possible programming flow of the system and the additional software that may be used to operate the present invention. These steps, in FIG. 4*a* include install, enable and disable of the C-DIMM device 550. FIG. 4*a* indicates one of multiple initialization sequences to enable and disable the compactor chip 250 located on the C-DIMM 550. Software sequences 505 through 535 are the normal boot, initialization, and shutdown procedures for a prior art computer system without installation of the present invention. Additional software as indicated in blocks 540 through 570 of FIG. 4*a* may be added to control the C-DIMM 550 initialization (power-on 505 through load drivers 525), operation (normal ops 530) and exit (shutdown 535) operation.

FIG. 4*a* shows the preferred embodiment for the Microsoft Windows NT 5.0 operating system. Alternatively, other operating systems such as Unix, Linux, Novel, BeOS and Mac may have similar procedures of operation.

At power-on 505 of the system, the compactor chip 250 may be disabled such that any writes or reads to the C-DIMM 550 will be handled by the SDRAM on the C-DIMM module. In alternate embodiments, such as where Rambus Inline Memory Modules (RIMMs) are used and the system is used on a RIMM module, the system BIOS may enable the compactor chip such that the compactor chip uses the aperture window equivalent to the address range of a single memory device instead of a smaller aperture such as the C-DIMM module. Thus, the C-DIMM, prior to initialization by the C-DIMM driver 500, may operate the same as a normal industry standard DIMM. This transparent action allows any boot memory testing or alternate device driver installation to proceed without any interference from the C-DIMM 550.

The BIOS 510 is executed by the CPU or, if multiple CPU's are present, by the master CPU of the SMP system. Then the systems manufacturer's software, e.g., "NT detect" 515, detects the components of the system and builds a system configuration log. The operating system then boots as indicated by the Boot NT 520 block of FIG. 4*a*.

The device drivers are then installed. According to one embodiment, when the device driver for the C-DIMM 500 is installed, the driver may detect the C-DIMM 550 by generating a novel "wakeup sequence" which allows the compactor chip 250 to begin responding to the driver. The compactor chip 250 may not respond to normal memory read and write operations to the memory subsystem 200 prior to proper initialization of the C-DIMM 550. The wake-up sequence is thus important to operation of the C-DIMM 550. In one embodiment, the wake-up sequence comprises a series of stores to a 16K-byte non-cacheable area of memory. When this sequence is played to a normal DIMM, without the compactor chip 250, the same data stored will be returned during a read. When the wake-up sequence is played to a C-DIMM 550, the data may be returned in a different order, or other data may be returned, to indicate the compactor chip 250 is present and operational, and the C-DIMM is awake and ready for programming. For example, using 8 byte writes, the driver could send "C-DIMM", "Compactor", "con, Inc.", "ive Sili", "Interact", but when the data is read back from the C-DIMM 550 it may return "Interactive Silicon, Inc. Compactor C-DIMM", indicating the address location of the compactor chip is in the memory subsystem; i.e., a compactor chip is present.

The ECC data for the writes and the reads at this point are identical because the compactor chip 250 may not have properly configured the compactor chip's ECC generation logic at this point. Thus, the wake up and identification of the C-DIMM may use the same ECC codes echoed back into the system memory controller 210 to avoid error correction or detection, which may interrupt the CPU causing system errors. Up to the point where the C-DIMM driver 500 detects and enables the C-DIMM aperture, the C-DIMM 550 may look exactly like a normal DIMM device. According to one embodiment, when the proper wake-up response has been received, the driver configures the ECC in the compactor chip 250. The driver configures the ECC in the compactor chip by playing an ECC learning sequence. The ECC learning sequence may comprise a series of writes followed by a series of check writes to ensure the ECC learning circuit in the compactor chip 250 has matched the ECC that is currently used in the memory controller device 210. This novel approach allows compressed data that has altered ECC to match the expected ECC of the system memory controller 210. This is an important step, considering that compressed data read from the compactor chip buffers would immediately error due to ECC located in the system memory subsystem 200.

Once the ECC on the compactor chip 250 is properly configured, the driver may choose to read the hardware version number and/or chip part number of the particular C-DIMM device.

The present configuration may use a dynamic aperture or window for reading and writing of data and control register loads and stores. The driver may set a dynamic aperture address of the dynamic aperture once the compactor chip 250, or plurality of compactor chips 250, are located within the system memory map. Preferably, the compactor chip 250 uses a dynamic aperture in the system memory map so that the aperture address can be set to an alternate address. This may be desirable to provide software and other devices lockdown memory areas where the device previously was not located. Thus, the aperture or window of operation for control and data that is transferred between the system memory controller 210 and the compactor chip 250 can be re-located to anywhere within the memory map during the boot and initialization process.

During additional configuration, the driver 500 preferably activates or deactivates the chip by a write to an internal control register and may set sleep-mode and error value timer registers. Thus, the compactor chip 250 can go inactive and power itself down if not used or if the system sees a soft boot or system reset. Thus, the device driver 500 can choose to move the aperture window or disable the compression engine at any time. A wake-up password may be set by the device driver 500 to wake up the compactor chip 250 if it has timed out without a soft boot during normal operation. The final configuration may be an end of initialization or exit instruction that activates the C-DIMM 550 for normal operation of the compactor chip 250. The driver may repeat this procedure for all C-DIMMs present within the system memory subsystem 200 or alternate memory subsystem.

Once the C-DIMM aperture window is locked down and assigned, the C-DIMM can now be used to support industry standard applications and operating system compression APIs. Any access by other drivers or software to the locked down compactor chip aperture window may receive a general protection fault and would fail the system as in normal prior art system protection mechanisms. Once configured, the C-DIMM is active in the system and is considered to be in the "normal" mode of operation, because the C-DIMM driver 500 application interface is called by installed filter software or application software under control of the C-DIMM driver 500 resource management 565 software. In alternate embodiments, when additional compression throughput is required, multiple C-DIMMs can be installed in the system. In this case the software drivers support and manage serialization of compression requests.

Figure 5:
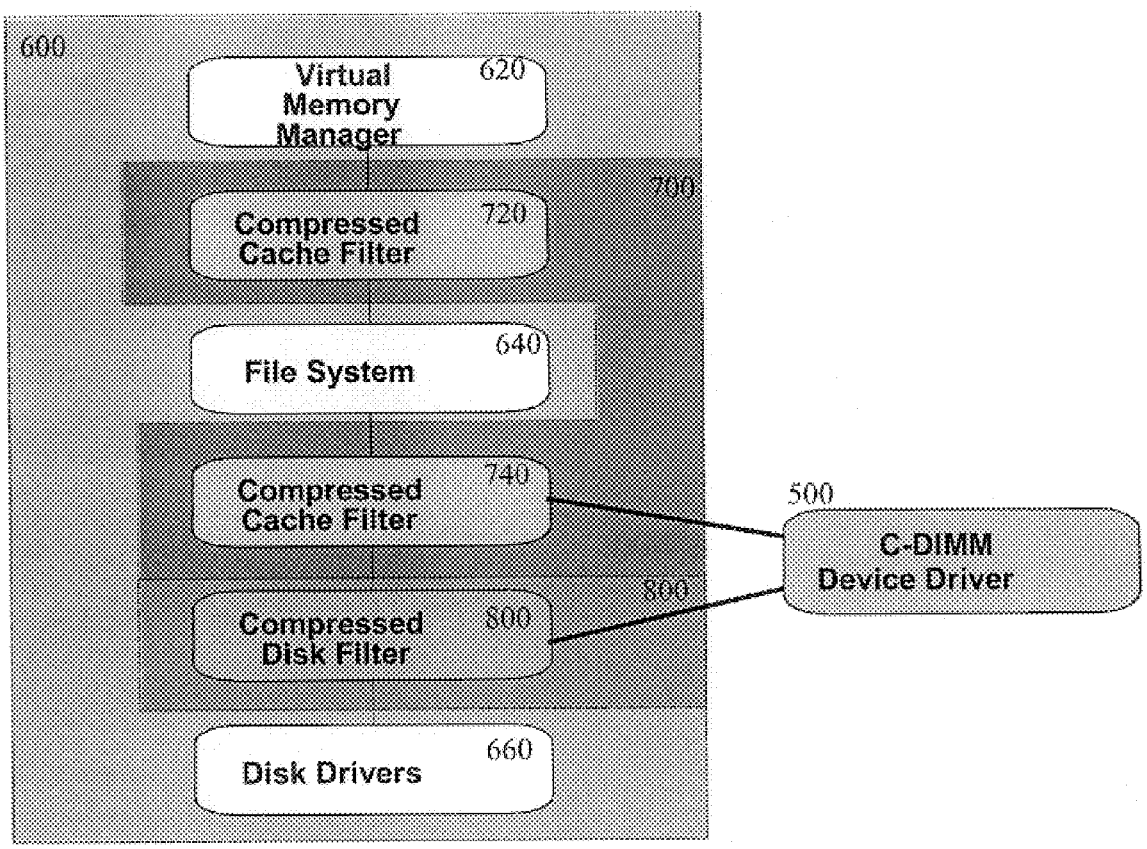
FIG. 5 illustrates the preferred software modules and drivers and where they reside into the Operating System software stack.

FIG. 5—A Software Stack with Compressed Cache and Compressed Disk Drivers

FIG. 5 illustrates a typical operating system software stack 600. The virtual memory manager (VMM) 620, the file system (FS) 640, and the disk drivers (DD) 660 make up the conventional prior art operating system stack 600 for control of the memory subsystem 200 and the disk subsystem 300. To enable the C-DIMM 550 for maximum system performance, three blocks are added to the operating system software stack: the compressed cache managers (CCM) 720/740, the compressed disk manager (CDM) 800 and the C-DIMM device driver (CDD) 500. The CCM 720/740 and the CDM 800 may work together to control data moved by C-DIMM device driver 500. Together these software modules introduce a second level of abstraction to the file system for manipulation of compressed pages in memory and on disk. In addition, alternate embodiments may include modules for compressed page transfers across networks and other communication mediums, or may include other algorithms such as data encryption and decryption or other types of in-memory system acceleration.

Figure 6:
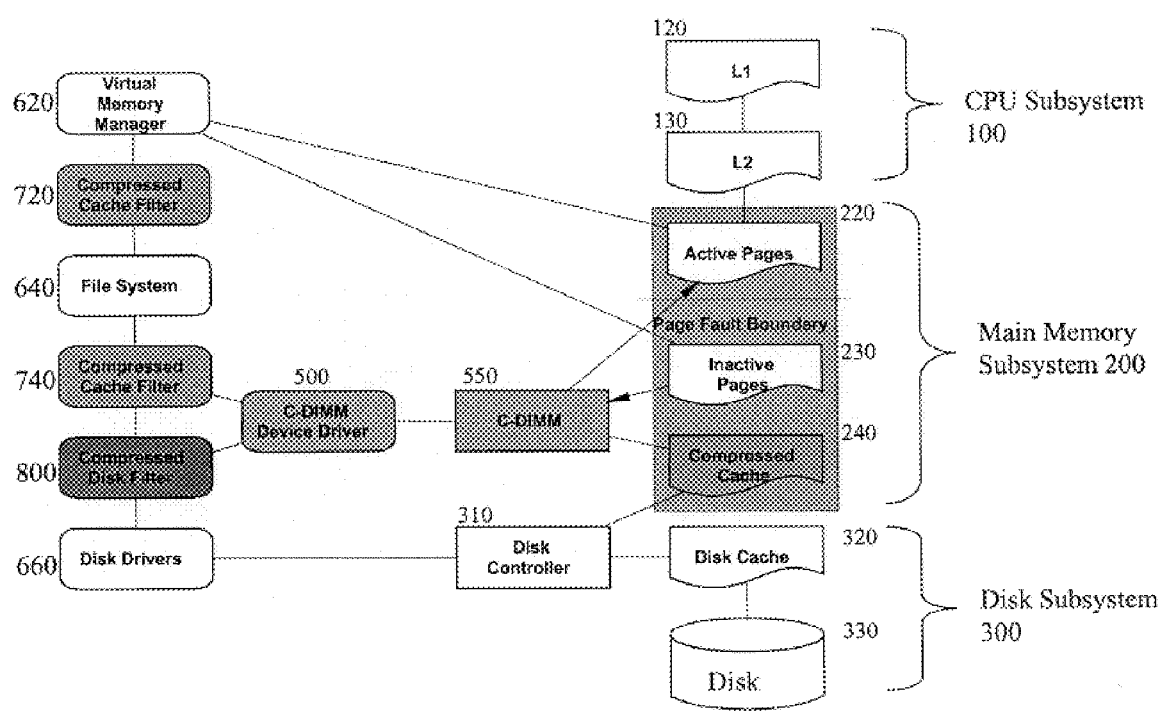
FIG. 6 is a detailed block diagram illustrating the software and hardware interfaces for the C-DIMM component modules pertaining to the present invention.

FIG. 6—Software and Hardware Interfaces for the C-DIMM Component Modules

FIG. 6 indicates one embodiment of flow of operation between the CPU, memory and disk subsystems 100, 200, and 300, and the operating system software including the software stack 600 of FIG. 5. As indicated in the diagram of FIG. 6, the VMM 620 is responsible for allocation of active pages 220 and reallocation of inactive pages 230 in the main memory subsystem 200. The VMM 620 may determine when pages are to be tagged as inactive, when pages are to be moved to the disk subsystem 300, and when pages are to be restored from the disk subsystem 300 to inactive or active memory 220/230. According to one embodiment, the compressed cache manager 720 may receive information from the VMM 620 to determine when and how the compressed cache 240 memory partition is manipulated and allocated.

The system may dynamically determine the amount of compressed cache 240 memory that is needed and may dynamically adjust the allocation size of the compressed cache 240. This dynamic adjustment algorithm may use a history of the page swapping operation over a short period under direction of the file system 640 software. The system may use a novel page snooping algorithm, performed by the compressed cache manager 720 block, which looks at the number of I/O store and restore requests as a function of time. Thus, when the compressed cache manager (CCM) 720 sees that pages are not being stored as inactive pages 230 (less I/O subsystem activity), or onto the disk subsystem 300, then the CCM 720 software may not allocate system memory to compressed cache pages 240. In the above dynamic allocation algorithm, the compactor chip 250 may not be needed as it is assumed that the application fits into the memory subsystem 200 without the need for virtual storage onto disk. As more applications are instantiated, or current applications grow, requiring more memory than available from the memory subsystem 200, the CCM 720/740 may dynamically require the file system to allocate additional memory for the compressed cache 240. Thus, pages are moved under direction of the file system 640 and the compressed cache manager 740 between the inactive uncompressed page 230 memory area and the inactive compressed page 240 memory area. This procedure may be used during the reallocation of active pages 220 to inactive pages 230 where such pages are targeted for disk storage within the disk subsystem 300. Thus, for active pages that are targeted by the VMM 620 for storage to the disk subsystem 300 by the file system software 640, the system uses the compressed cache manager 720/740, the C-DIMM device driver 500 and the C-DIMM 550 hardware to compress and store such pages into the local compressed cache 240 instead of into the disk subsystem 300. In addition, the compressed cache allocation may use a set of novel cache algorithms to optimize compressed storage for the most active of the stale pages normally swapped to disk. In other words, based on the algorithm of the present invention, pages that show a history of reuse may be compressed and stored in the compressed cache 240 while pages that show little history of reuse may be compressed and swapped to the compressed page partition in the disk subsystem 300. Thus, as the compressed cache 240 memory becomes full, the dynamic algorithm of the compressed cache manager 720 tags compressed pages according to a novel least recently used, lazy replacement LRU/LZU algorithm and retires low utilization compressed pages into the disk subsystem 300. In an alternate embodiment, the compressed pages that are stored onto the disk subsystem 300 may not be stored in a compressed partition but may be compressed for faster file transfer and bus I/O bandwidth improvements.

In order to accomplish storage of compressed pages to disk, the system uses another unique filter, the compressed disk manager 800. The compressed disk manager 800 is a software module used like a secondary File Allocation Table (FAT) specifically designed for compressed pages. Thus, the system may retire compressed pages located in the compressed cache 240 buffer to the disk subsystem 300 for storage. In addition, if the compressed disk manager 800 is not installed, the compressed cache manager 740 may call the C-DIMM driver 500 to decompress a stale page prior to storage in the disk subsystem 300. Thus, the performance enhancement when using the compressed disk manager 800 has clear advantages over prior art disk compression technologies.

One embodiment of the present invention also may decompress pages into the system memory subsystem 200 active page region 220 from either the compressed cache 240 memory area or directly from the disk subsystem 300. This process also requires the requests from the operating system software's virtual memory manager 620 for a page of data that the VMM 620 thinks resides in the disk subsystem 300. When a retired page is requested to be reissued to the active page 220 area of the memory subsystem 200, the compressed cache manager 720/740 searches its compressed cache 240 buffer allocation tables in order to see if the requested page is resident in the system memory 200 subsystem, or if the requested page may need to be restored from the disk subsystem 300. These two cases are discussed in separate process flows below.

When the compressed page is identified by the CCM 720/720 as being local to the system memory subsystem 200, the process of decompression and page write to the active page area 220 of memory begins. This may be accomplished in a number of steps. First, the compressed cache manager 740 may translate the page address from the file system 640 into an address pointer into the compressed cache 240 memory area. Second, the C-DIMM driver 500 is invoked by the CCM 740 to read the compressed page from the compressed cache 240 memory area and begin the decompression process. Third, once the decompression of the compressed page is complete, the C-DIMM driver may also move the decompressed page to the active page 220 region of the memory subsystem 200. The CCM 740 is then notified that the page decompression and move process has completed by the C-DIMM driver 500. The CCM 740/720 then finishes the operation by notification to the file system 640 and finally the VMM 620 is notified that the page is in active page 220 region and is ready for process by the resident application software. Additionally, multiple pages can be strung together such that the above steps are concatenated to streamline the process steps.

In one embodiment, when a compressed page is identified as requiring decompression to the active page area, the system identifies or anticipates other pages that may require decompression in the future, using a type of pre-fetch mechanism. When the compressed page is not identified by the CCM 720/740 as being resident to the local compressed cache 240 region, then the compressed page may be read and restored to the active page 220 region of the system memory subsystem 200 from the disk subsystem 300. This process may require a call to the compressed disk manager 800 if the page was stored in compressed format on the disk subsystem 300. If the compressed disk manager 800 is installed in the system and the page is located in the compressed disk partition, the compressed disk manager software 800 may translate the disk sector address to the compressed disk partition sector address. Once the compressed disk sector address is determined by a FAT2 (Compressed File Allocation Table) lookup, compressed data is read from the disk subsystem 300 into compressed cache 240 memory region. This data move may be done with a system DMA from the disk subsystem 300 into the system memory subsystem 200. To accomplish the initial move, the compressed disk manager 800 module may request from the disk drivers 660 a disk controller 310 operation to retrieve the proper page or pages from the disk subsystem 300. When disk access of compressed pages has finished by indication from the disk drivers 660 to the compressed disk manager 800, the decompression operation of the compressed page may be invoked by a call from the compressed disk manager 800 to the C-DIMM device driver 500. The C-DIMM device driver may initiate the decompression process by prompting the CPU or DMA device to move the compressed page through the compactor chip 250 located on the C-DIMM 550 device. The CPU or DMA device reads the coherent decompressed page and then writes that page into the active page 220 area of the memory subsystem 200. Typically, the CPU cache is updated by the read, and application execution can begin immediately. In an alternate embodiment, the write of the decompressed page back to system memory 200 may happen later, restoring the coherent data into the active page 220 region of the system memory subsystem 200. Once the active page is restored to the area allocated by the file system 640 software, the VMM 620 is notified that the active page is now ready for application operation.

If the compressed disk manager 800 is not installed in the system and the page is located in a normal non-compressed disk partition, the system need not invoke the C-DIMM driver 500 or the C-DIMM device 550 and may restore the non-compressed page(s) directly into the active page 220 region of the memory subsystem 200. The operation of the VMM 620 and the file system 640 are similar to that described previously when the compressed disk manager 800 was invoked, except that the compressed cache manager 740/720 is preferably not invoked to restore the non-compressed page from disk to the active page 220 region of the memory subsystem 200.

In addition, the same process can be used for network systems where compressed pages are transferred between servers connected on a local area or wide area network. In this alternate embodiment, pages are compressed by the compactor chip under direction of a network driver filter that is similar to the Compressed Disk Partition Manager 800, except that these pages are targeted for sending to remote client or application servers. Compressed data pages can also be sent to other client computers where data can be decompressed by either the compactor chip 250 or a similar derivative, or alternatively by software plug-in modules previously installed in the client end computers.

In addition, the system is not limited to the use of file filters as indicated in the preferred software embodiment, but may have specific operations defined and embedded into the operating system software kernel. Thus, operation of the present invention may be enabled by specific instructions and routines embedded directly into the kernel of the operating system. Also, the C-DIMM driver 500 may have a proprietary callable application specific interface which can be used directly by applications such as database software, CAD tools, and any other application programs when specific compression and decompress tasks are required.

In one embodiment, an Application Programming Interface (API) may be provided with the compressed cache that allows applications running on a system utilizing virtual memory, a compressed cache and CCM to request and be notified of an effective size of memory, thus allowing the application to make memory tuning decisions. Effective space may include uncompressed virtual memory plus the effective space provided by the compressed cache. The compressed cache, for example, may be allocated 1000 pages of physical memory. If the compressed cache provides a 2:1 compression ratio, then the compressed cache provides 2000 pages of effective space. If there are 1000 pages of uncompressed virtual memory available, then the API may notify the application that there are 3000 pages of memory available. In one embodiment, if an application request the amount of physical memory available (as opposed to a virtual memory amount), then the API preferably notifies the requesting application of the true amount of physical memory available. For example, in a system with 64 MB of physical memory, if VM and the CC were allocated a total of 54 MB of physical memory, then the API would return 10 MB as the amount of physical memory available.

Figures 7A, 7B:
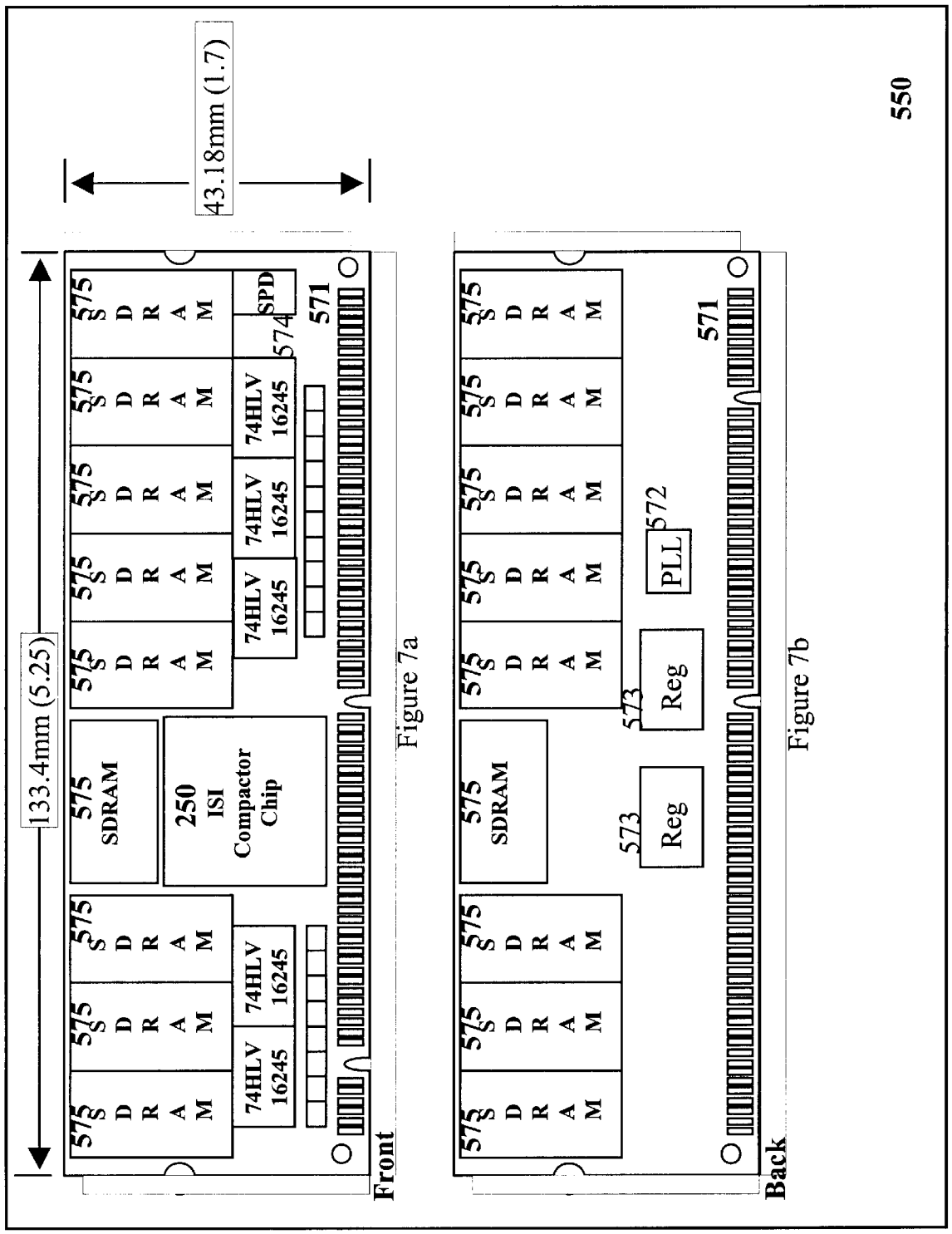
FIG. 7a shows an embodiment of the ASIC compression chip mounted on the front side of an industry standard DIMM.
FIG. 7b shows an embodiment of the backside layout of an industry standard DIMM, which houses the ASIC compression chip.

FIGS. 7a and 7b—Physical Layout of a C-DIMM

FIGS. 7a and 7b show a board assembly drawing of the preferred embodiment of the C-DIMM 550 where FIG. 7a illustrates the front side of the module and FIG. 7b illustrates the back side. FIGS. 7a and 7b illustrate the preferred embodiment of the C-DIMM design that is preferably a 256 MB registered DIMM, which is compliant with the Intel PC100 or PC133 specification. Alternatively, other embodiments may be designed for larger and/or smaller registered DIMMs or different form factors or specifications. FIG. 7d illustrates another possible embodiment for an unregistered C-DIMM design. Additionally, the compactor chip 250 or variations of the preferred invention may be used with Rambus or Double Data Rate DRAM devices. Other alternate embodiments may include different DRAM population options, memory types such as those proposed in the JDEC standard. Also, alternate embodiments may include a mix of these memory types on multiple different memory module standards.

Figure 10:
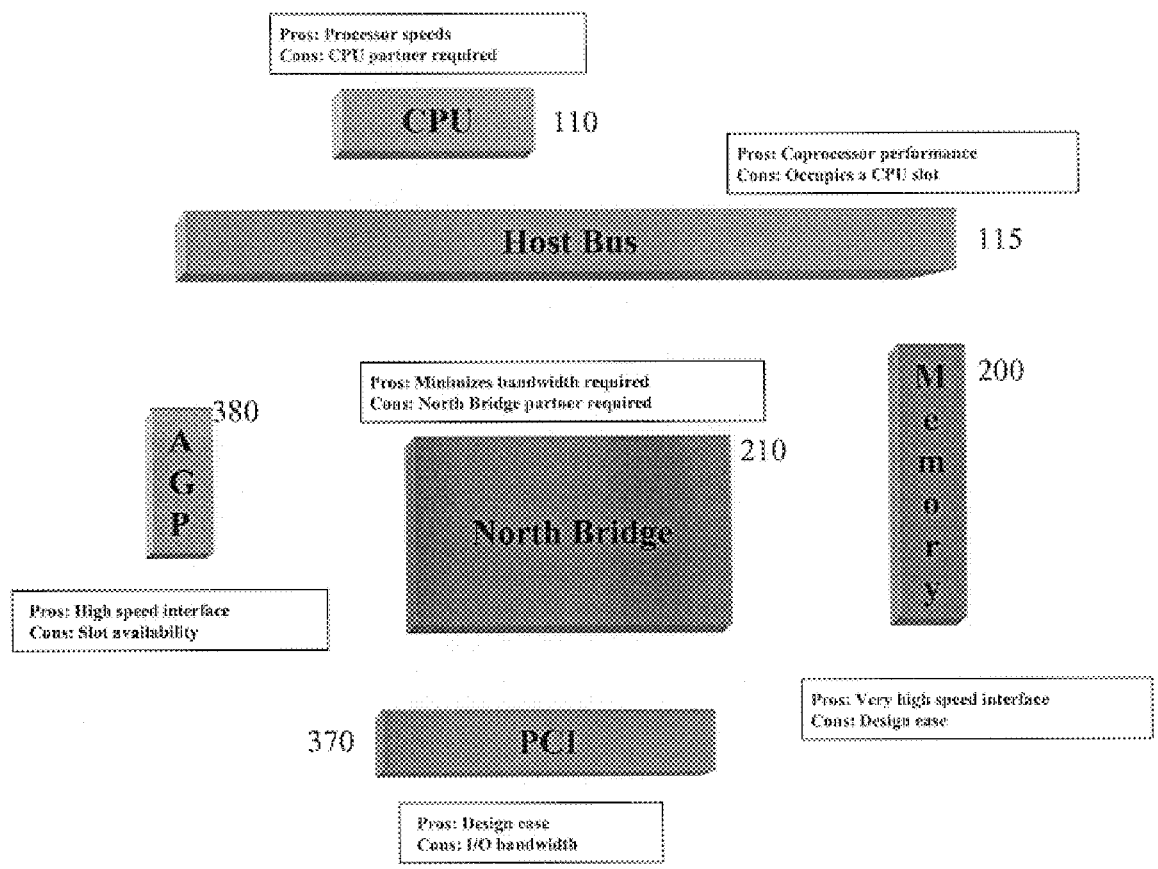
FIG. 10 illustrates additional locations in the computer system where the parallel compression chip can reside.

Additionally as indicated in FIG. 10, other alternate embodiments may include custom configurations where high-speed compression is used to store compressed pages or other application data directly into a dynamically allocated compressed page area or alternate allocated regions of the system memory. Such alternate embodiments may be integrated into CORE logic (North Bridge), CPU devices, PCI or AGP boards or discrete components which use high-speed compression and decompression which are mounted onto the system board planner or subsystem boards.

Figure 7C:
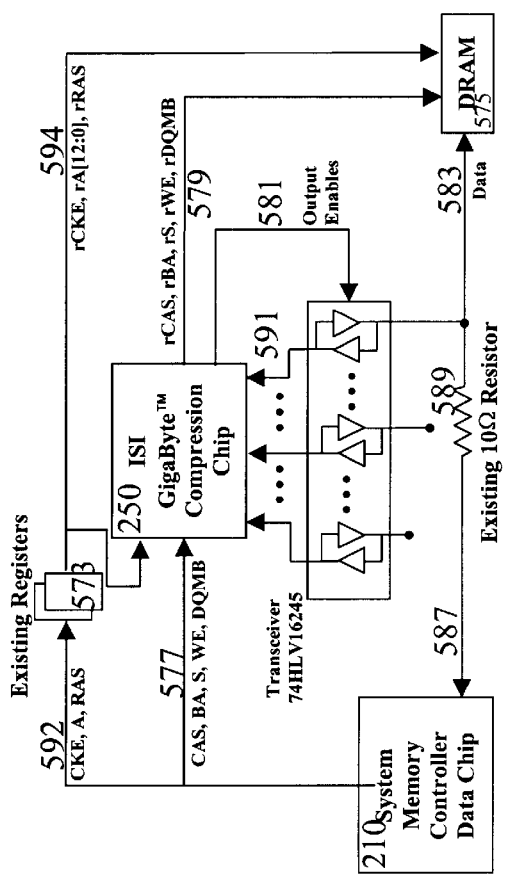
FIG. 7c shows the electrical connection of the C-DIMM invention for registered DIMMs.
Figure 7D:
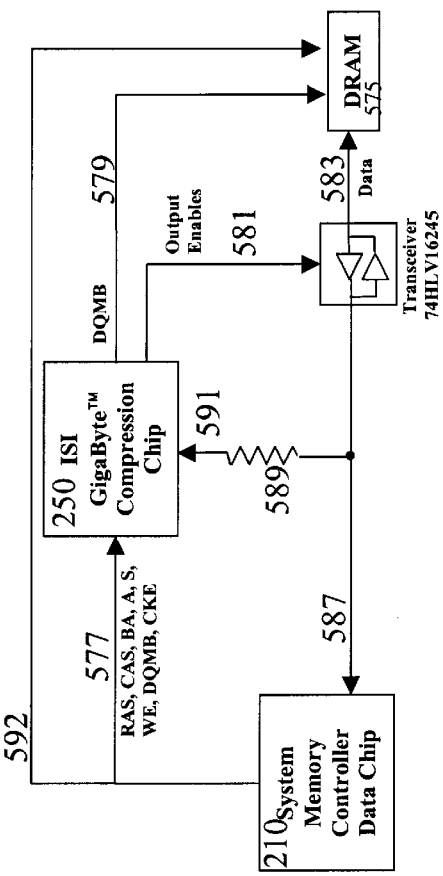
FIG. 7d shows the electrical connection of the C-DIMM invention for unregistered DIMMs.

FIG. 7c—The Electrical Connection of the C-DIMM

FIGS. 7c and 7d illustrate the preferred (7c) and alternate (7d) wiring of components on the C-DIMM device 550, such that the C-DIMM device 550 operates within the industry standard PC-100 or PC-133 mode of operation. Alternate embodiments also behave with similar operation using different memory types, interface buses, or memory module de facto and industry standards. In the preferred embodiment illustrated in wiring diagram 7c, the system memory controller 210 is coupled to the C-DIMM 550 across a system memory or expansion bus 587. This system bus 587 comprises a data bus where data are coupled to the damping resistor 589, and the other side of the damping resistor 589 is coupled to one or more 16245 Transceivers and one or more SDRAM 575 devices. The other sides of the 16245 transceivers are connected in a plurality of connections 591 as required to connect data from bus 583 to the compactor chip 250. In addition, the memory controller 210 couples the control and address signals CAS, BA, S, WE, DQMB 577 to the compactor chip 250 and couples signals CKE, Address and RAS 592 to the DIMM registers 573 for buffering. The output bus 594 of the buffer registers 573 couple to the compactor chip 250 and the SDRAM 575 memory. The compactor chip 250 buffers output signals rCAS, rBA, rS, rWE and rDQMB 579 to the SDRAM 575 as well.

Two methods for adding the compactor chip 250 to a DIMM are discussed below. The first method as illustrated in FIG. 7c is the preferred embodiment and method because it is expected to be more effective for registered DIMM designs. Additionally, in an alternate embodiment, the second method illustrated in FIG. 7d may be used for design of unregistered C-DIMM versions. Thus, multiple memory module boards can be used for the embodiment of the compactor chip 250 based on design criteria, form fit and function. In the alternate embodiment of FIG. 7d, the compactor chip 250 is used to register the signals 579 needed to make the final determination on the supplier of the data. These include the CAS and Chip Selects (S) along with the Bank Addresses (BA) and the Write Enable (WE) line. The Data Byte Masks (DQMB), preferably are also registered on the Compactor chip so they may be controlled as needed to tri-state the data outputs from the SDRAMs 575 when the compactor chip 250 is driving the data bus. The remaining control signals may be registered 573 as they normally are, and the registered version of FIG. 7c may be snooped by the compactor chip 250 to allow it to properly track the opening and closing of SDRAM 575 pages.

Operation of the preferred embodiment illustrated in FIG. 7c for the registered DIMM is as follows. When the system memory controller 210 writes data to DRAM memory 575, the data is written into the DRAM memory 575 through the damping resistor 589. During this write process the address and control bus 577 from the system memory controller 210 is snooped by the compactor chip 250 and a determination is made (based on the snooped address) if the data is intended for the compactor chip 250 or the DRAM 575. If the address is in the active aperture window of the compactor chip 250 the data is written to both the DRAM memory 575 and the compactor chip 250. The transceiver 16245 may be used to electrically de-couple the signals from the DRAM memory data bus 583. In alternate embodiments, the 16245 Transceivers may not be used, as data and addresses may be routed directly between the compactor chip 250 and the DRAM memory 575. During a read of data by the system memory controller 210 from the C-DIMM 550, data is read from the DRAM memory 575 when the address is outside the compactor chip 250 address comparison window, and from the compactor chip 250 when the address is within the address comparison window. In the preferred embodiment, the compactor chip 250 registers some of the DRAM control signals 579. Other registered control and address signals 594 sent by the registers 573 also control the operation of the DRAM 575. The control and address buses 594 and 579 control which device, compactor chip 250 or DRAM 575 outputs data to the system memory controller 210 through the damping resistor 589 onto the memory bus 587. Thus, with the configuration of FIG. 7c, the industry standard timing specifications for registered DIMMs are met such that the C-DIMM 550 can operate under the same operating conditions as industry standard DIMM devices. In alternate embodiments, the same operation can be used to enable a compactor chip with a different I/O, and internal functions.

Operation of FIG. 7d for unregistered DIMMs is noted here because method 1 may be ineffective for an unregistered DIMM using a CAS latency of 2. This DIMM design would require the compactor chip 250 to make a decision on the data source the same time that the CAS, Write Enable, Selects, and Bank Addresses are being driven to the DIMM. However, these signals are required to make that decision, so it would be unlikely that the compactor chip 250 could achieve this. Instead, this alternate method adds additional controls to the data bus 583 to allow selection of the source for reads. FIG. 7d illustrates that the control and address buses from the system memory controller 210 are coupled to both the compactor chip 250 and the DRAM 575. Data is switched under control of the compactor chip 250 by the output enables 581 to the 16245 transceivers. Thus, the timing specifications are met for unregistered DIMMs and only the DRAM 575 data-out specifications are effected.

Figure 8A:
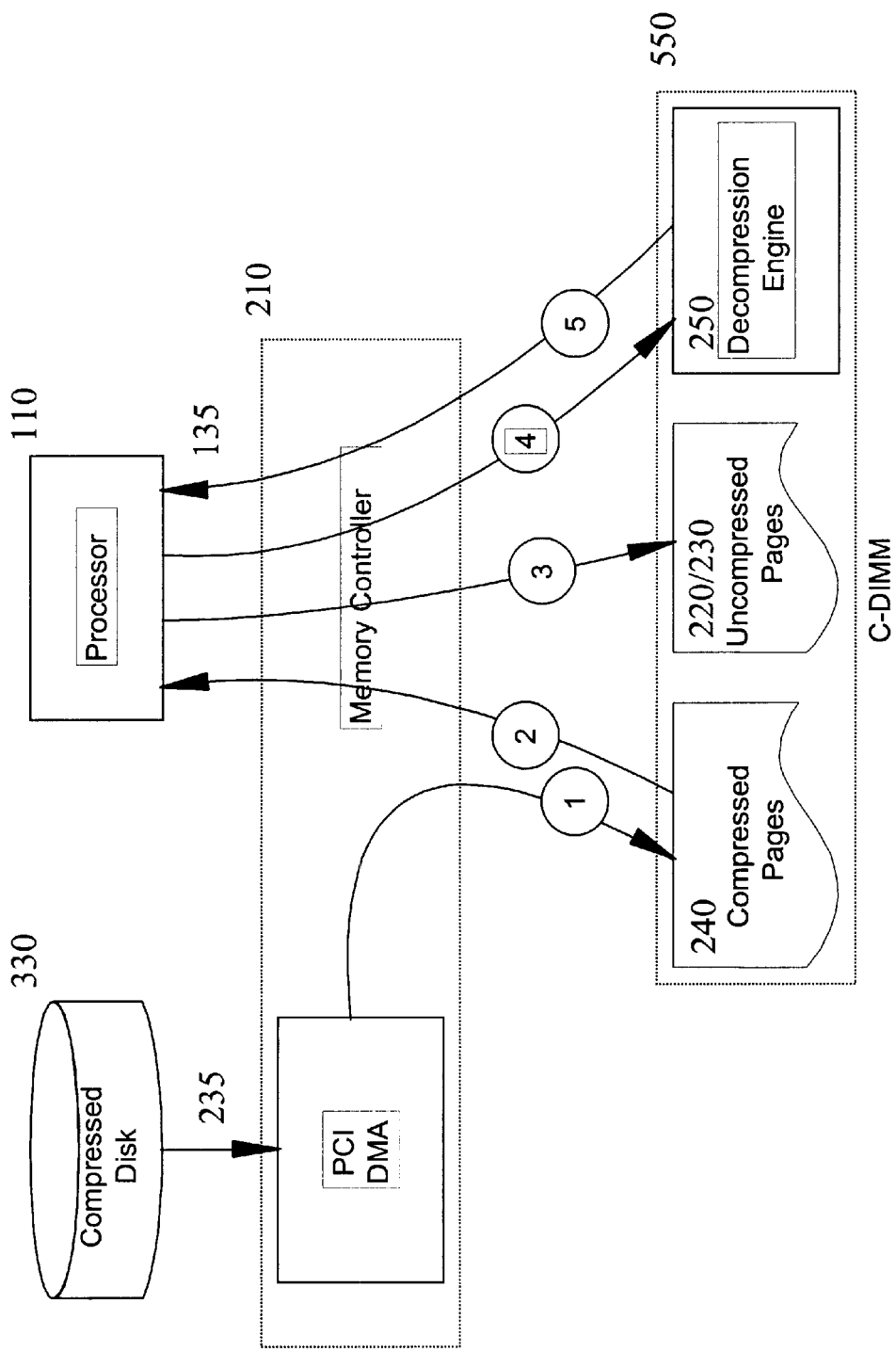
FIG. 8a illustrates the process used to compress and decompress pages between the active and inactive regions of the system's main memory.

FIG. 8a—Data Movement in one Embodiment of the Present Invention

FIG. 8a illustrates the data movement between the main memory subsystem 200 and the CPU subsystem 100 for one embodiment of the present invention. FIG. 3 illustrates the compressed disk 330 coupled to the system I/O bus, preferably the PCI bus 235. The PCI bus 235 is coupled to the memory controller 210 through a DMA unit embedded in the memory controller 210. The system CPU 110 is coupled to the memory controller 210 through the CPU local bus 135. The C-DIMM 550 is coupled to the memory controller 210 by the main system memory buses, which may comprise the address and control buses 592/577 and data bus 587 shown in FIGS. 7a and 7b. Finally, the main system memory bus is connected to the memory areas of the C-DIMM and other DIMMs. The allocated compressed cache page storage (CC) 240, the allocated uncompressed or active page storage 220/230 and the compactor chip 250 are used for compression and decompression of pages within the system. The circled numbers 1, 2, 3, 4, and 5 in FIG. 8a indicated data movement. Read and write operations and are defined as follows. The circled number 1 indicates the movement of compressed pages by the DMA unit located within the memory controller 210 to the CC 240 located in the main system memory 200. These pages may have been stored during a previous dirty write phase when moving inactive compressed pages to the disk subsystem 300. The circled numbers 2 and 4 indicate the coherent read (circle 2) of the compressed cache 240 page and subsequent write (circle 4) to the compactor chip 250 for decompression of the compressed page. The circled 5 and 3 indicate the read (circle 5) of the decompressed page from the compactor chip 250 and write (circle 3) to the uncompressed inactive page buffer 230 or to active page buffer 230 (circle 3) storage area in the main system memory. The procedure for decompression of a compressed page and subsequent activation of the page for use by the CPUs application software show in FIG. 8a is as follows. First, and assuming the compressed page is located in the compressed cache (CC) 240, is for the CPU 110 to read the compressed page indicated by the circled number 2 and then write the compressed page, circled number 4, into the compactor chip 250. When the final word of the compressed page has been transferred to the compactor chip 250 the CPU begins an immediate read, circled 5, from the compactor chip 250 reading the uncompressed page data into the uncompressed page area indicated by circled number 3. Note that the data transfers are not "full" 4096 byte page transfers. This is because during compressed page reads and writes less data is moved due to compressed state of the page during movement. Thus, as the compression ratio of the page increases, the time it takes to move the compressed page for decompression and the decompressed page for active page operation is less than a full page transfer in conventional operation. For example, steps 1, 2, and 4 may complete in one-fourth the time if the compression ratio of the page is 4:1 due to the movement of compressed data.

Figure 8B:
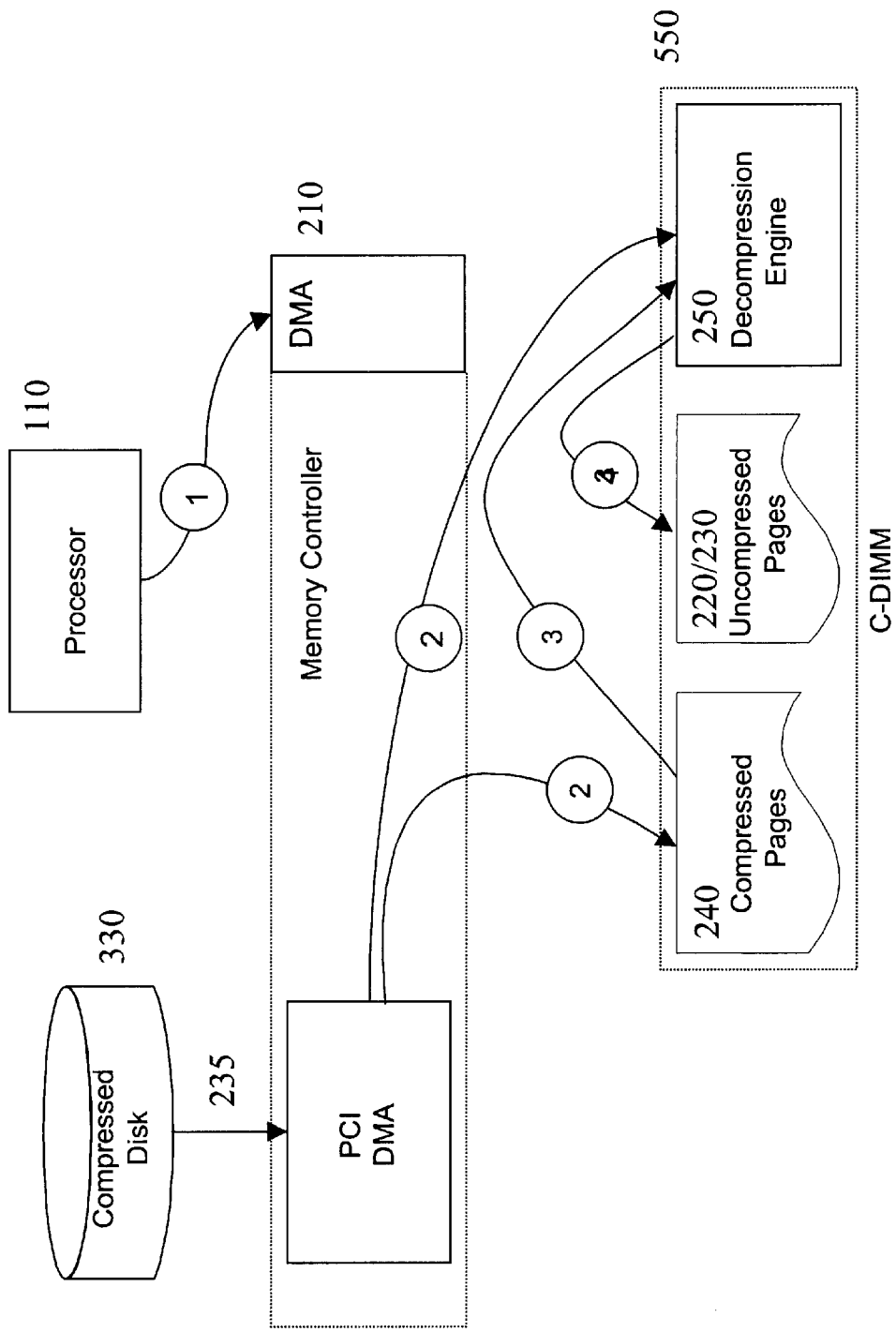
FIG. 8b illustrates data movement in a system with DMA according to one embodiment of the invention.

FIG. 8b—Data Movement with DMA

FIG. 8b illustrates data movement on a system where a DMA unit is set up to control the data movements. The circled numbers 1, 2, 3, and 4 in FIG. 8b indicated data movement. Read and write operations and are defined as follows. Processor 110 software sets up DMA controller in memory control block 210 as indicated by circle 1. Data (compressed) is DMA'd to either CC 240 or directly to decompression engine 250 as indicated by circle 2. As indicated by circle 3, if the data is to the CC 240, then the data is DMA'd to decompression engine 250 for decompression. As indicated by circle 4, the DMA unit moves data from decompression engine 250 to active uncompressed memory area 220/230. This method eliminates the CPU "memory" as shown in FIG. 8a, thus making the system more effective during the process of decompression of "in-memory" pages.

FIGS. 9a and 9b—The Integration of C-DIMMs with Other DIMMs

FIG. 9a illustrates that for the preferred embodiment only a single C-DIMM is required for the entire memory system. Alternate embodiments may assume a plurality of C-DIMM or alternate memory modules to match the bus and performance requirements. For example, FIG. 9b illustrates the use of two C-DIMM devices and the proper ECC for controlling two parallel data buses. The C-DIMM driver 500 during the installation detects the number and location of the C-DIMM(s) in the system, and then initializes the memory subsystem for multiple C-DIMM operation.

FIG. 10—Examples of Locations for C-DIMMs within a Computer System

FIG. 10 illustrates some of the many possible locations for the present invention within the computer system. Some locations have better operation than others but in general from slowest to fastest operation is as follows: PCI bus 370, AGP bus 380, memory subsystem 200, north bridge 210 and CPU 110. Some of these possible locations have drawbacks that limit the performance gained while others enhance the performance and the cost of implementation. Thus, the embodiment of the present invention allows for a plurality of locations for the hardware compactor chip 250 location. For each location, the software drivers may be changed, and the hardware embodiment may also change for proper operation of the present invention.

In an alternate embodiment a compressed disk manager similar to the Compressed Disk Partition Manager 800 could be developed to improve the performance of the disk and I/O subsystem without concern to disk partitions and dynamic space allocation requirements. In this case, a T-Disk module (turbo disk) would replace the compressed disk manager 800 module. The T-Disk module would assume that disk space is abundant and very cost effective such that additional storage space on disk is given up for speed and I/O data transfer from the disk subsystem 300 or on the peripheral bus 235. The T-Disk module and the compressed disk manager 800 module may both be referred to as the Compressed Disk Manager (CDM). In such an alternate embodiment of the present invention, the performance advantages of compression for the disk and I/O subsystem are achieved without having to deal with disks that vary in size due to compressed data storage. For example, assume that all data is managed by the system on a 4K-byte basis, and that data is stored in 512 byte sectors. An uncompressed page takes up 8 sectors. Data may be compressed into fewer sectors leaving the other sectors unused. According to the present invention of the Compressed Disk Partition Manager 800, a Compressed Page Allocation Table (CPAT) is maintained to track the number of sectors each page occupies. The CPAT, under the present invention, would only require 384 Kbytes maximum space assuming 3-bits per page for a 4-Gigabyte disk. For example, when the system requests a page that has been compressed, the CPAT is assessed to determine the actual number of sectors to read from disk. Once the request is complete, the data is decompressed and transferred to its destination. Since I/O request rates are relatively low, software compression may be used, although higher performance hardware such as that found within the gigabyte compression technology will yield faster products. Thus, by using the T-Disk filter instead of the Compressed Disk Partition Manager 800, the present invention can eliminate the need for a secondary file allocation table (FAT2), and improved bus bandwidth and disk cache effectiveness will yield faster computer operation.

FIGS. 11a–11d—Performance

Now referring to the increased performance aspects of the present invention, the advantages of using in-memory compression and decompression hardware with the appropriate software operating system changes or filter interfaces within the computer system are shown. A good example of the performance and cost advantages can be illustrated in FIGS. 11a, 11b, 11c, 11d, using real applications running under the preferred embodiment of the present invention. The performance curves shown are taken from the Rscheme interpreter application, which represents an average application response when subjected to the present invention.

Figure 11A:
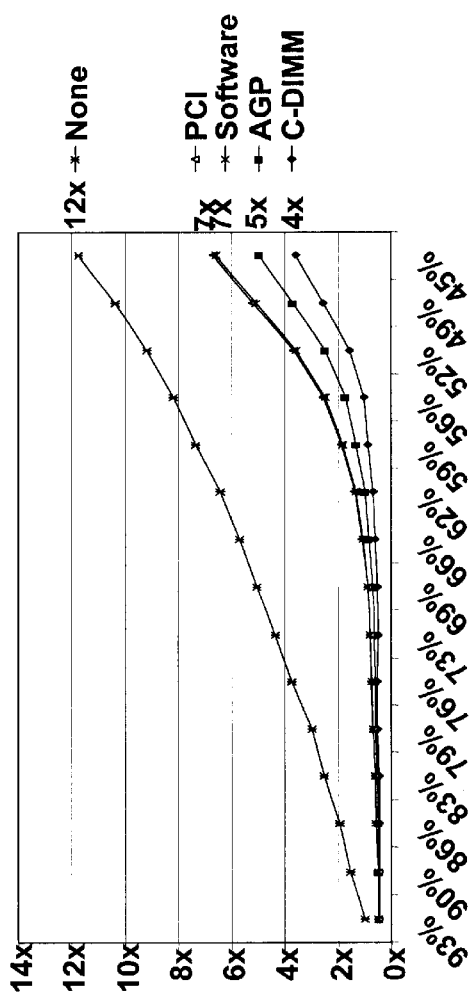
FIG. 11a illustrates the application performance difference between prior art and the present invention.

Shown in FIG. 11a is the performance degradation as the application grows out of available system memory and begins to page to disk. The positive direction of the y-axis represents the slow down in relative application execution time and the x-axis represents the percent of application that currently resides in the system memory. To the left of the illustration it can be assumed that all the application fits into the system memory and as the application grows the right side of the illustration of FIG. 11a shows that disk is used to store pages that cannot fit into system memory space. For the case of no compressed pages the Rscheme application shows a 12× execution slowdown when 45% of the application is resident in system memory. This is compared to software compression done by the CPU at 7× and hardware compression running on the PCI bus running full bus speeds at 7× slowdown. The illustration of FIG. 11a also shows that hardware compression on the AGP bus running at full AGP bandwidth may have a 5× degradation, and in the preferred embodiment of the C-DIMM only a 4× degradation in performance is seen, when only 45% of the application is resident in the system memory. Thus, the preferred embodiment represents a 3× performance improvement over no page compression and a 2× performance improvement over PCI or software compression done by the CPU.

Figure 11B:
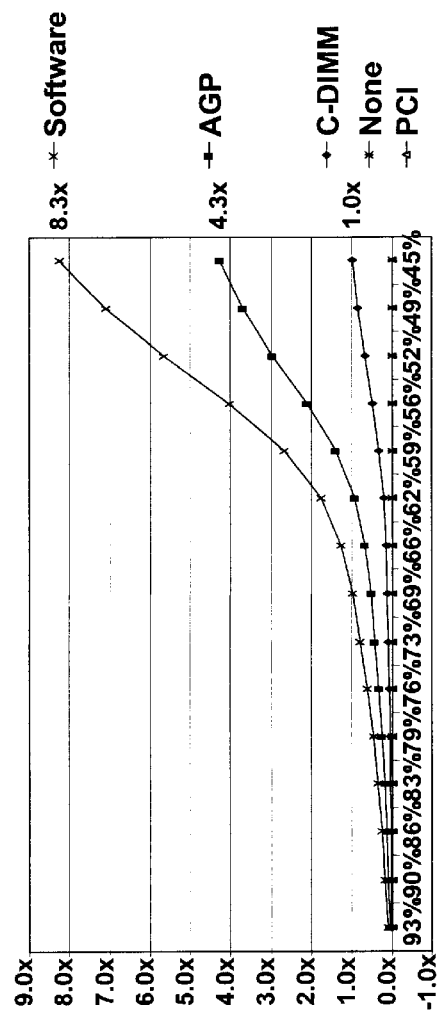
FIG. 11b illustrates the application CPU overhead when a software algorithm is used as compared to the compactor chip of the present invention.

FIG. 11b represents a compression and decompression comparison of the present invention when performed in software and by the CPU subsystem, on the AGP bus, in the C-DIMM, and on the PCI bus with DMA control. In this embodiment, the CPU overhead during this operation would degrade the performance by 7.3× that of the preferred embodiment under the same conditions. Thus, use of the present invention with software compression and decompression performed by the CPU 110 would limit the application execution time significantly. An implementation using the AGP bus is shown to be 4.3 times slower than the preferred embodiment, and thus limiting the required performance.

Figure 11C:
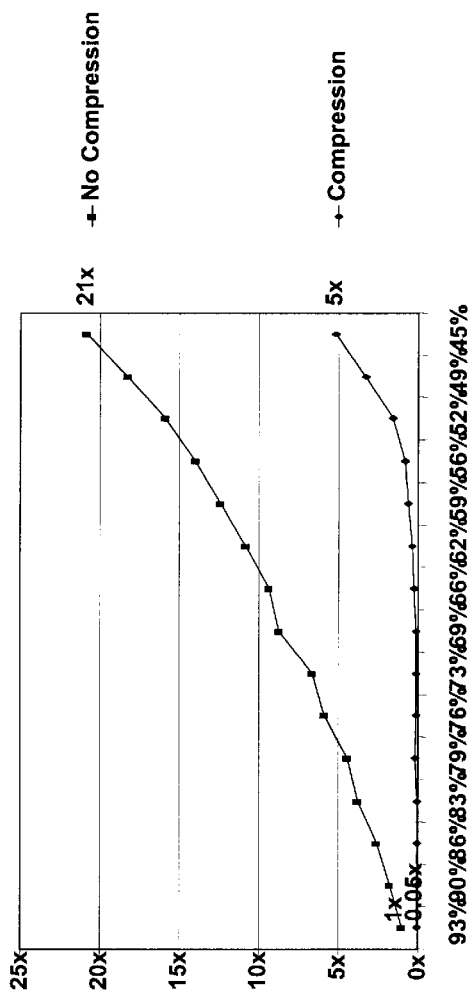
FIG. 11c illustrates the relative disk activity during page swapping operations with and without the use of the present invention.
Figure 11D:
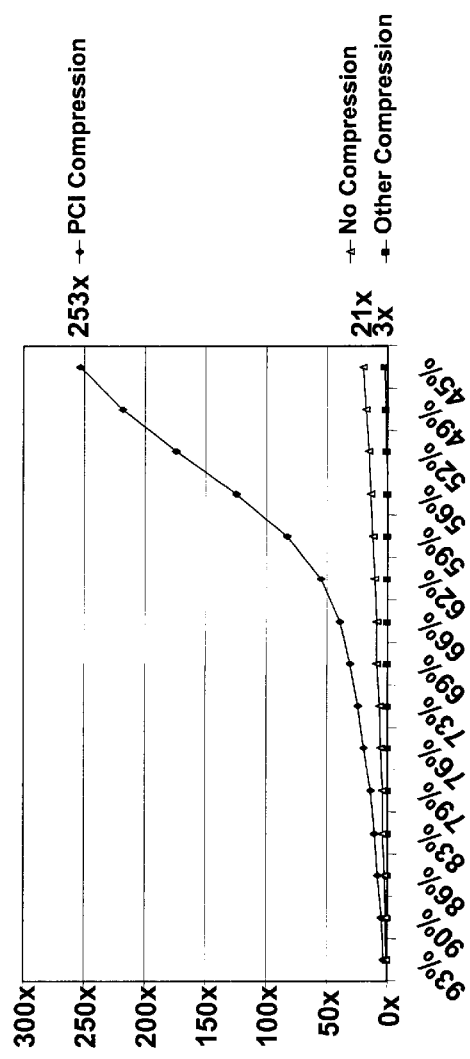
FIG. 11d illustrates that the present invention on the PCI bus would not benefit the system performance due to the limited PCI bandwidth.

FIG. 11c shows that the relative disk activity for the Rscheme application drops by over 15× when the present invention is used in the memory subsystem that reduces disk and I/O bottlenecks associated with heavy I/O loading conditions. FIG. 11d illustrates that the use of the present invention located on the system PCI or peripheral I/O bus would not yield performance benefits due to the increased bus activity required during the page compression and decompression process.

As shown in FIG. 11d, if the present invention was used on the PCI bus the relative I/O requests for compression and decompression would be over 250× the present usage and would actually degrade performance beyond normal use without page compression. Thus, the present invention has superior performance due to reduced page swapping required by the disk subsystem when applications expand beyond the scope of the allocated system memory space, and the use of the present invention can greatly increase the system performance while decreasing the cost of additional memory typically used to run the applications effectively.

Figure 12:
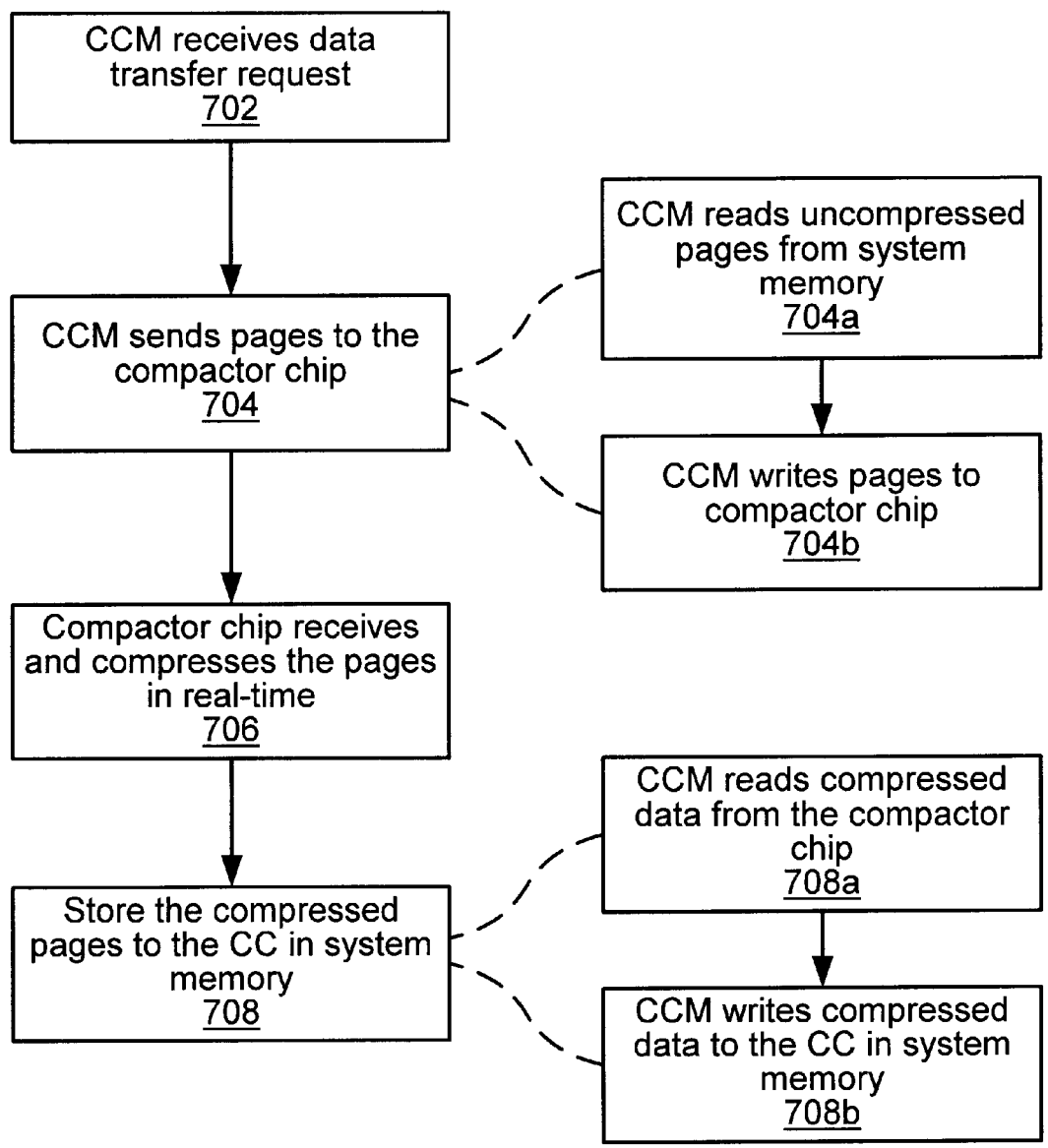
FIG. 12 is a flowchart illustrating compressing and storing data in a compressed cache according to one embodiment of the invention.

FIG. 12—Compressing and Storing Data in a Compressed Cache

FIG. 12 is a flowchart illustrating a method of compressing data and storing the compressed data in system memory according to one embodiment of the invention. Steps in the flowchart may occur concurrently or in different orders.

A process, executing on a computer system including a Compactor Chip, a device driver for controlling the Compactor Chip, and a Compressed Cache Manager (CCM), may generate a request to transfer data resident in system memory to nonvolatile memory, such as a disk drive. In one embodiment, the Compactor Chip may reside on a C-DIMM installed as system memory, and the device driver may be a C-DIMM device driver. Alternatively, the Compactor Chip may reside on a memory controller in the system. In one embodiment, the process generating the request to transfer data may be a Virtual Memory Manager (VMM) or I/O manager, and the request to transfer may be generated as the result of one of several VMM functions. Examples of VMM functions in a system that may produce a request to transfer data may include, but are not limited to: invalidation of "clean" data that is selected for invalidation using an LRU or other selection scheme, and: writeback of "dirty" data from system memory to nonvolatile memory. Clean data is data that is resident in system memory that has not been touched and/or modified by a process since being originally loaded into system memory or since last being synchronized with the original data on the nonvolatile memory. Dirty data is data that has been touched and/or modified by a process since being originally loaded into system memory or since last being synchronized with the original data on the nonvolatile memory. In a system with virtual memory and a VMM, the data may reside in pages (typically 4096 bytes). Pages may be divided into sectors (typically 256 or 512 bytes). Thus, the VMM may generate a request that one or more pages resident in system memory and being managed by the VMM be moved to nonvolatile memory.

In step 702, the request to move one or more pages of data from system memory to nonvolatile memory may be received by the CCM. In step 704, the CCM may send the one or more pages to the compactor chip to be compressed. Step 104 is expanded into steps 704a and 704b. In step 704a, the CCM may read the one or more pages from system memory, and may write the one or more pages to the compactor chip in step 704b. The compactor chip receives the one or more pages and compresses the pages in step 706. The compressed pages are stored in a compressed cache (CC) in system memory in step 708. The storing of the compressed pages in step 708 is expanded into steps 708a and 708b. In step 708a, the CCM may read the compressed pages from the compactor chip. In step 708b, the CCM may write the compressed pages to the compressed cache in system memory.

Figure 13:
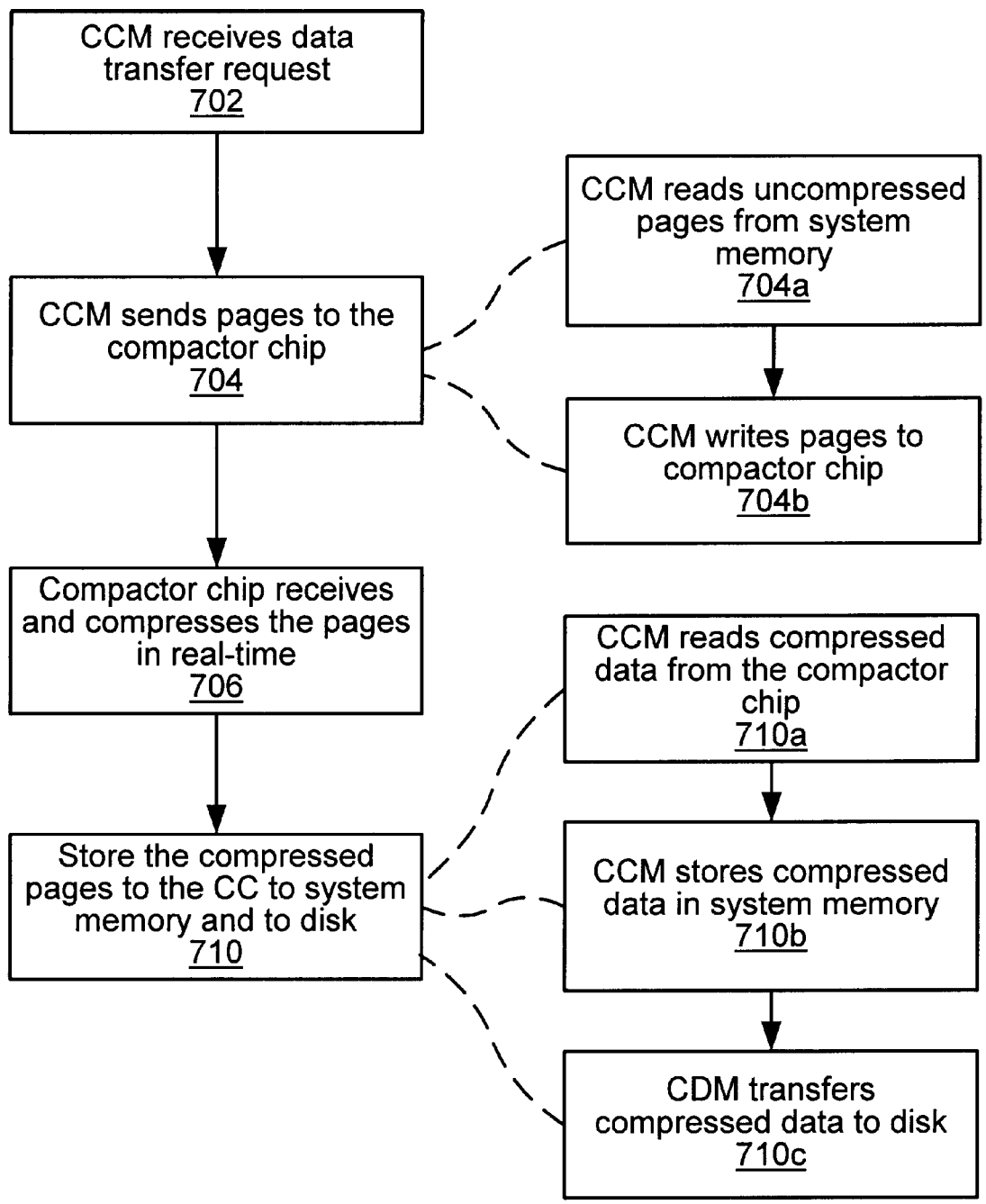
FIG. 13 is a flowchart illustrating compressing and storing data to disk according to one embodiment of the invention.

FIG. 13—Compressing and Storing Data to Disk

FIG. 13 is a flowchart illustrating a method of compressing data and storing the compressed data to nonvolatile memory according to one embodiment of the invention. The method may be implemented in a system such as that described for FIG. 12. Steps in the flowchart may occur concurrently or in different orders.

In step 702, the request to move one or more pages of data from system memory to nonvolatile memory may be received by the CCM. In step 704, the CCM may send the one or more pages to the compactor chip to be compressed. Step 704 is expanded into steps 704a and 704b. In step 704a, the CCM may read the one or more pages from system memory, and may write the one or more pages to the compactor chip in step 704b. The compactor chip receives the one or more pages and compresses the pages in step 706. The compressed pages may be stored in a compressed cache (CC) in system memory and to nonvolatile memory such as a disk drive in step 710. The storing of the compressed pages in step 710 is expanded into steps 710a through 710c. In step 710a, the CCM may read the compressed pages from the compactor chip. In step 710b, the CCM may write the compressed pages to the compressed cache in system memory. In step 710c, the CCM may also write the compressed pages to the nonvolatile memory such as a disk drive.

Alternatively to being implemented as software executed on a CPU, the CCM may be implemented in hardware. In one embodiment, the CCM may be implemented as embedded hardware logic on the Compactor Chip.

Figure 14:
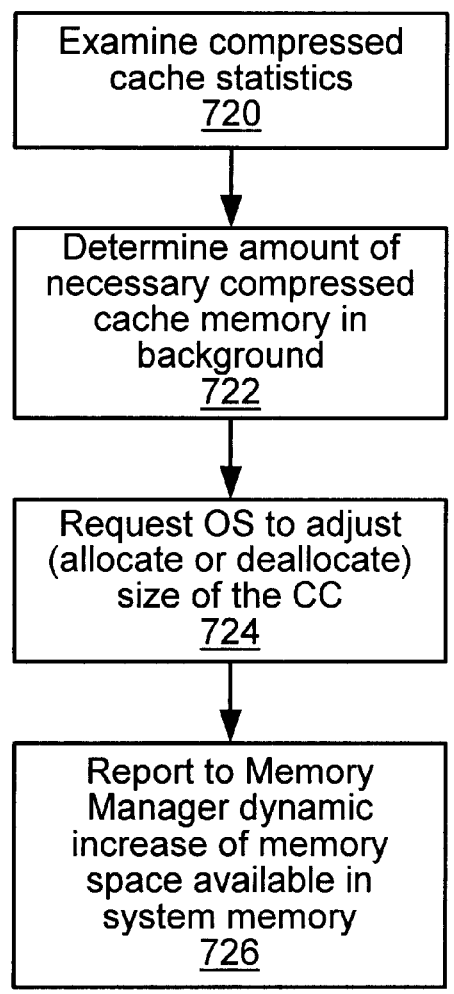
FIG. 14 is a flowchart illustrating adjusting the size of a compressed cache according to one embodiment of the invention.

FIG. 14—Adjusting the Size of a Compressed Cache

FIG. 14 is a flowchart illustrating a process of adjusting the size of a compressed cache according to one embodiment of the invention. Steps in the flowchart may occur concurrently or in different orders. In step 720, statistics being maintained for the compressed cache may be examined. The statistics may include information including, but not limited to: disk request rates and compressed cache hit rates. Preferably, a periodically executing background process monitors the statistics. In one embodiment, the background process may run at a low priority. In step 722, an optimal amount of memory required for the compressed cache may be determined from the examined statistics. Preferably, the background process monitoring the compressed cache statistics makes the determination. In step 724, the operating system may be requested to allocate or deallocate memory for the compressed cache based upon the results of step 722. In one embodiment, the background process may make the request to the operating system. In another embodiment, the background process may pass information determined in step 722 to the CCM, and the CCM may request the operating system to allocate or deallocate memory for the compressed cache. Preferably, adjusting the compressed cache size is done incrementally. For example, if it is determined that the compressed cache needs to be larger, a relatively small increase in compressed cache size may be made. The small increase may be repeated for a number of cycles of the background process until the background process determines that the compressed cache does not need to grow any more. This heuristic method of increasing and decreasing the compressed cache in relatively small increments may allow the cache to be more easily balanced at an optimal size. In step 726, the requester of step 724 (background process or CCM) may report to the memory manager the dynamic increase or decrease of memory space made by the operating system in response to the request. In the case of a deallocation, this may allow the memory manager or operating system to allocate the deallocated space upon future requests for memory. In one embodiment, a background routine may report to the operating system that memory is available based upon statistics of compression results over time. FIG. 17 illustrates an embodiment of a compressed cache organization and further describes allocation and deallocation of memory in the compressed cache.

As an example of downsizing a compressed cache, a background process may examine statistics related to compressed cache usage. If the background process determines that the compressed cache is underutilized (for example, the disk request rate for the disk associated with the background cache is low), the compressed cache may be decreased in size over one or more cycles of the background process. In one embodiment, the compressed cache may eventually be totally deallocated. As an example of increasing the size of the compressed cache, the background process may determine that the disk request rate is high and the compressed cache hit rate is low. The compressed cache may be increased in size until the request and hit rate are balanced at an optimal level, or until a maximum size for the compressed cache has been reached. Preferably, the parameters used for balancing compressed caches, such as hit rate and request rate levels and minimum and maximum compressed cache sizes, are configurable. Preferably a user interface is provided to allow the parameters to be configured by a user.

Figure 15:
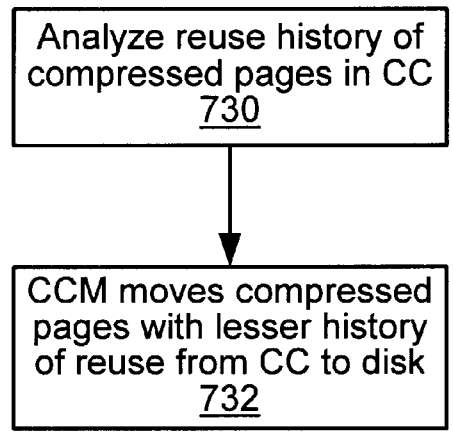
FIG. 15 is a flowchart illustrating moving pages from compressed cache to disk according to one embodiment of the invention.

FIG. 15—Moving Pages from Compressed Cache to Disk

FIG. 15 is a flowchart illustrating a process of moving lesser-used compressed pages from the compressed cache to nonvolatile memory, such as a disk drive, according to one embodiment of the invention. Steps in the flowchart may occur concurrently or in different orders.

Statistics may be kept on compressed pages in the compressed cache. As shown in step 730, the statistics may be periodically examined by the CCM to find compressed pages with low hit rates, and thus a lesser history of reuse, for freeing up space in the compressed cache. In step 732, the CCM may move one or more of the compressed pages identified in step 730 to nonvolatile memory, such as a disk drive. In one embodiment, a Compactor Chip may decompress compressed pages before the pages are stored to nonvolatile memory. In another embodiment including a compressed disk and compressed disk manager (CDM) as described herein, the compressed pages may be passed to the CDM for storage in compressed format on nonvolatile memory that may be connected directly to the system including the Compactor Chip or may be connected remotely via a network connection. In yet another embodiment, the compressed pages may be passed to a network interface for transmission and storage on one or more storage devices connected to the network. The one or more storage devices connected to the network may also comprise compressed disks and CDMs as described herein. Preferably, the parameters used for determining page usage rates, such as hit rates, are configurable. Preferably, a user interface is provided to allow the parameters to be configured by a user.

Figure 16:
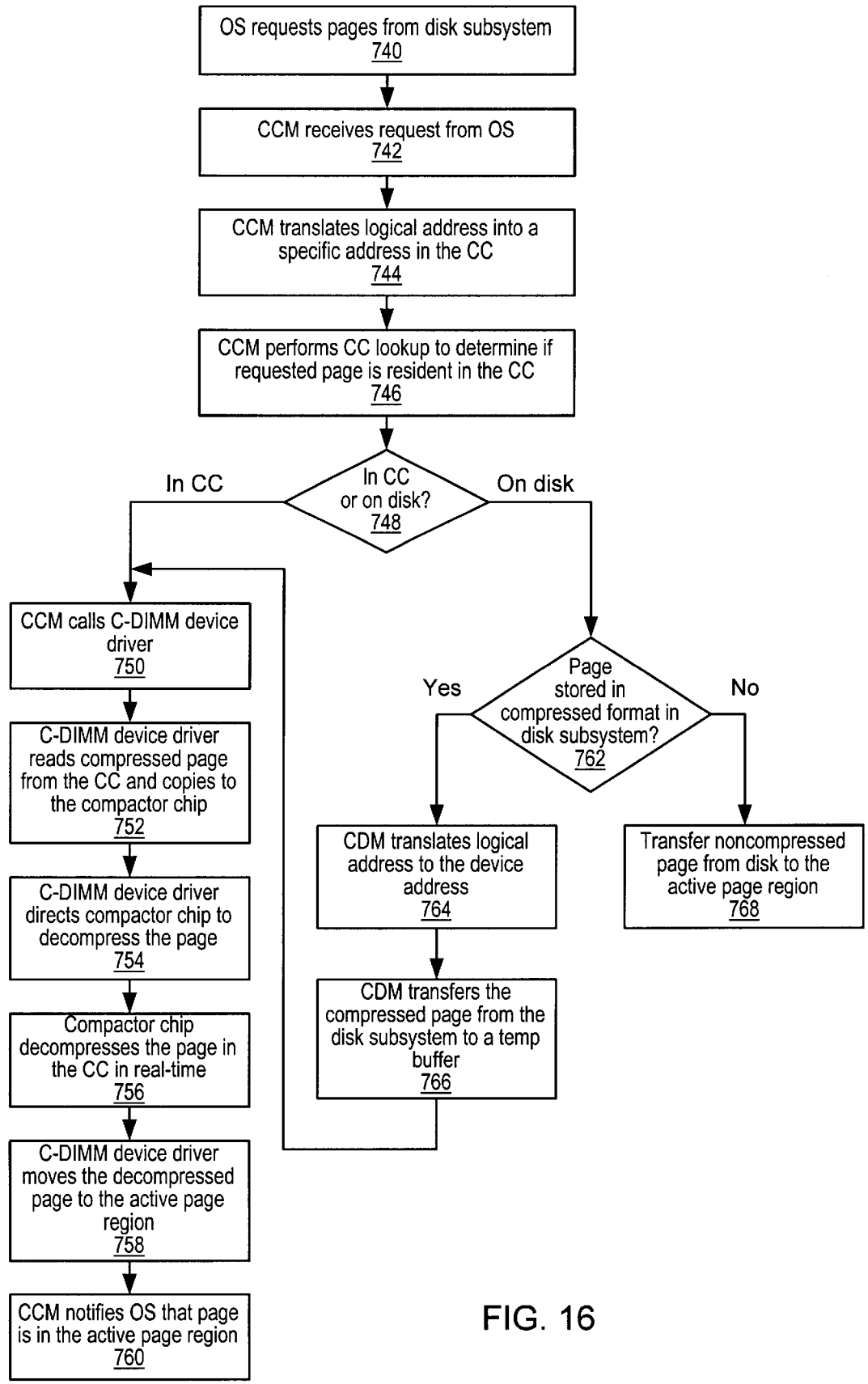
FIG. 16 is a flowchart illustrating the processing of a swap read request according to one embodiment of the invention.

FIG. 16—The Processing of a Swap Read Request

FIG. 16 is a flowchart illustrating a method of processing a read request according to one embodiment of the invention comprising a compressed cache and compressed disk. Steps in the flowchart may occur concurrently or in different orders.

In step 740, the operating system (OS) may generate a read request for one or more pages from the disk subsystem. In step 742, the Compressed Cache Manager (CCM) may receive the request generated by the OS in step 740. In one embodiment, the CCM may be installed in a stack of I/O drivers, and the read request may be passed to the CCM from a higher-level driver as part of the processing of the read request. In step 744, the CCM may translate the logical address from the read request into a specific address for the Compressed Cache (CC). The CCM may then perform a CC lookup to determine if the requested pages are resident in the CC. In step 748, if the requested pages are resident in the CC, then the method proceeds to step 750. In step 748, if the requested pages are not resident in the CC, then the pages are on disk, and processing may proceed to step 762.

In step 762, if the requested pages are not stored compressed in the compressed disk, then the pages may be read from the disk and transferred to the active page region of system memory in step 768. If the requested pages are stored in the compressed disk, then the Compressed Disk Manager (CDM) may translate the logical address from the read request into the device address for the compressed disk in step 764. The CDM may then transfer the located compressed pages from the compressed disk on the disk subsystem into a temporary buffer. Preferably, the temporary buffer is in system memory. Processing then may proceed to step 750. Note that, in embodiments without a compressed disk and compressed disk manager, processing may proceed directly from step 748 to step 768, and steps 762–766 may be absent.

In step 750, the CCM may request the C-DIMM device driver to decompress the compressed pages. In step 752, the C-DIMN device driver reads the compressed pages and writes them to memory on the Compactor Chip. The C-DIMM device driver may read the compressed pages from the compressed cache if the pages are there, or from the temporary buffer, if the compressed pages were on the compressed disk. The C-DIMM device driver may then instruct the Compactor Chip to decompress the compressed pages in step 754 using a parallel decompression method. The Compactor Chip may then decompress the compressed pages in step 756. In step 758, the C-DIMM device driver may then move the decompressed pages from the Compactor Chip to the active page region of system memory. In step 760, the CCM may notify the OS that the requested pages are in the active page region. Note that the parallel decompression of the compressed data described in 756 occurs in real-time (i.e., processing does not proceed until the decompression is completed), but due to the speed at which the parallel decompression is performed by the Compactor Chip, very little latency in data transfer for the read request is introduced by the decompression. Because the compressed cache allows for more data to be cached in system memory rather than being swapped or written back to disk, and because the data transfer time from disk to memory is about three orders of magnitude longer than from memory to CPU cache memory, any latency introduced by the decompression of the data is greatly outweighed by the performance benefits of reading the data from the compressed cache rather than from the disk subsystem.

FIGS. 17 Through 28—Description of the Compressed Cache and the Compressed Cache Manager FIGS. 17 through 28 illustrate the organization of a Compressed Cache (CC) and the I/O request processing by the Compressed Cache Manager (CCM) according to one embodiment of the invention.

FIG. 17—Compressed Cache Organization

FIG. 17 illustrates one embodiment of a structure for managing a compressed cache. Preferably, the Compressed Cache Manager (CCM) driver may manage one or more compressed caches. Each compressed cache may include a cache tree 802 and one or more cache entries 804. The cache tree 802 may be constructed of linked cache tree nodes 806. A cache entry 804 may include a cache entry header 808, cache block pointers 810, and compressed cache blocks 812. In one embodiment, a cache block pointer 810 and a compressed cache block 812 may be grouped together as a single object. In another embodiment, a cache block pointer 810 and a compressed cache block 812 maybe included in separate objects.

In one embodiment, each cache entry 804 may be stored and retrieved from the compressed cache based on a unique cache address. In one embodiment, a unique cache address may be extracted from a 64-bit starting offset and 64-bit length stored in an incoming read or write (I/O) request. In some embodiments, the I/O request may be created from an I/O request structure (IRS), for example, an Interrupt Request Packet (IRP) in the Windows NT operating system. The cache address may be extracted in a similar way that other device drivers (e.g. floppy disk device driver) extract cylinder, track and sector numbers. One or more lower address bits may be ignored based on the current size of the page being cached. In some embodiments, the size of the page may be fixed, for example, 4 KB. In other embodiments, the cache directory may cache pages of arbitrary size.

In one embodiment, a compressed cache may be attached to one or more Device Objects as specified by the user based on input from a configuration utility. Each compressed cache may be managed separately and may have its own cache tree 802. The configuration utility may allow the user to break down a compressed cache into smaller compressed caches, allowing each smaller compressed cache to be managed separately. Each smaller compressed cache has its own cache tree 802. These smaller compressed caches may be based on one or more cacheable objects. Cacheable objects may include, but are not limited to: devices, partitions, sector ranges, file systems, files, request types, process IDs, etc.

If more than one compressed cache is used to cache requests to a device, it may not be necessary to decode all 64 address bits for a compressed cache. Instead, only a range of address bits may be decoded. For example, if the cache page size is configured to be 4 KB, and the cache tree 802 is configured to decode 24 address bits, then the maximum size of the compressed cache is 64 GB.

In one embodiment, swap space requests may be cached separately from other types of requests. In one embodiment, swap space requests may be cached in writeback mode.

Cache Trees

In one embodiment, each compressed cache is fully associative. A fully associative cache is one in which an address (block) may be located anywhere in the cache. In another embodiment, each compressed cache is direct-mapped. A direct-mapped cache is one in which a block may be located in only one place in the cache. In yet another embodiment, each compressed cache is set-associative. A set-associative cache is one in which a block may be in one of a few (usually 2 to 8) places in the cache. Other embodiments may include combinations of fully associative, direct-mapped, and set-associative compressed caches.

In one embodiment, each cache entry 804 may include additional linked-lists of pointers that allow a Least Recently Used (LRU) linked-list of cache entries to be maintained. In one embodiment, each cache entry 804 may include space to store state information (e.g. clean or dirty, pending writeback in progress, etc).

The cache tree 802 is preferably organized so that it may be searched quickly. As a guide, a compressed cache lookup preferably takes less than 10% of the time it takes to compress or decompress a page. This may leave only enough time to perform approximately 10 $\mu$s of main memory access. In addition, the cache tree 802 and cache entry overhead for each cache entry 804 preferably takes up less than 10% of an uncompressed cache page. As a reference, assuming a 2:1 compression ratio, the cache structure shown in FIG. 17 preferably takes up about 2% of the compressed cache.

Using arrays of cache tree nodes 806 (based on grouping address bits) at each level in the cache tree 802 may reduce the search time and main memory used for the cache tree 802. Address bits may be grouped together and decoded at each level in the tree in the cache tree nodes 806. For a given level, the corresponding address bits may be used to index into cache tree nodes 806 at the next level. In one embodiment, the array size may be 16 cache tree nodes 806 based on grouping four address bits per cache tree level. The number of address bits evaluated at each level in the cache tree 802 may be configurable. As an example, if four address bits are grouped together per cache tree level, then the data structure of each cache tree node 806 in the cache tree 804 may look something like this:

struct SCacTreePtr {pNxtCacTreePtr} CacTreePtrs[16]

In this structure, if a pNxtCacTreePtr is NULL in a cache entry header 808, then the cache entry 804 is not currently being used.

In one embodiment, a cache tree node free-list, a linked-list of all unused cache tree nodes 806, may be maintained.

Preferably, a compressed cache may be able to dynamically grow and shrink in size without requiring significant reorganization of the compressed cache. Only sparse portions of the directory may exist as necessary. The cache tree 802 and cache entries 804 may grow and shrink together. In one embodiment, although a nominal amount of non-paged user-space may be pre-allocated during driver initialization, the compressed cache is initially empty. In other words, no cache tree nodes 806, cache entry headers 808, cache block pointers 810, or compressed cache blocks 812 may have been allocated from the free-list. The compressed cache may then be built dynamically based on disk request patterns.

Cache Entries

One embodiment may include a cache entry header free-list, a linked-list of all unused cache entry headers 808. A cache entry header 808 may look something like this:

struct SCacEntry {bState, bNumCacBlks, pCacBLkPtr}

The cache entry header 808 may include a field that indicates the number of compressed cache blocks 812 that are attached to the cache entry (bNumCacBlks), and a pointer to the first compressed cache block (pCacBlkPtr). In addition, each cache entry header 808 may store information that may be required to create an I/O request when it is time to writeback the cache page to disk. Preferably, only a small amount of information is required. Since each compressed cache may be associated with a particular Device Object, it may not be necessary to store the information in each cache entry header 808. Instead, it may only be necessary to store the information in the corresponding CCM-specific Device Object. The uncompressed size of the compressed cache entry 804 may be inferred when indexing into the cache tree 802. Thus, it may not be necessary to store the uncompressed size in the cache entry header 808.

Cache Block Pointers

One embodiment may include a cache block free-list, a linked-list of pointers to all the unused cache blocks 812. A cache block pointer 810 may look something like this:

struct SCacBlkPtr {pCacBlk, pCacBlkPtr}

Preferably, most of the non-paged user-space memory allocated for the compressed cache is dedicated to compressed cache block 812 use. Preferably, a relatively small amount of memory is used to manage the compressed cache blocks 812. When a cache entry 804 is created, and the page to be cached is compressed, one or more cache blocks 812 are needed to store the compressed data. In one embodiment, cache block pointers 810 may be removed from the top of the free-list and attached to the cache entry header 808. When a cache entry 804 is deallocated, the associated cache block pointers 810 may be attached to the end of the cache block free-list.

Cache Blocks

Preferably, the size of a cache block 812 is configurable. Examples of cache block sizes include, but are not limited to: 256 bytes, and 512 bytes.

Synchronizing Cache Accesses

A synchronization method may be needed when accessing and updating a compressed cache. A spin-lock may be used to synchronize the accesses and updates. In one embodiment, at least one spin-lock is used per compressed cache. In one embodiment, a pool of spin-locks may be maintained, and the spin-locks may be dynamically assigned to a cache entry 804 as needed, since only a small number of cache entries are likely to be busy at any given time.

In multiprocessor systems using compressed caches, whenever a particular thread can't gain access to a compressed cache, the thread stalls until the spin-lock can be acquired. Once the spin-lock is acquired, the routine resumes execution at a higher priority level until the thread releases the spin-lock.

Preferably, spin-locks are only retained for a up to a maximum time, for example, approximately 25 $\mu$s. If an operation needs to acquire the same spin-lock more than once within the time, for example, 25 $\mu$s, then the spin-lock is preferably acquired once and retained throughout the operation. If an operation needs to acquire more than one spin-lock over the duration of the operation, then preferably all spin-locks are acquired before proceeding and retained throughout the operation. The operation acquiring the spin locks before proceeding may be necessary to avoid deadlocks.

In one embodiment, the compressed cache and C-DIMM device driver are shared resources that need to be synchronized. When an operation wants to use one of these resources, it may acquire a spin-lock associated with the resource. Preferably, if an operation may potentially use both resources, the operation acquires spin-locks associated with both resources before proceeding. To prevent deadlocks, the spin-locks are preferably always acquired in the same order. Once finished, the spin-locks may be released in any order. Alternatively, an operation may acquire a compressed cache spin-lock, use the compressed cache, acquire a C-DIMM device driver spin-lock, use both resources, release the C-DIMM device driver spin-lock, use the compressed cache, and finally release the compressed cache spin-lock. All system objects, resources, memory, etc. that may be needed to perform an operation while one or more spin-locks are owned are preferably allocated prior to acquiring the spin-locks to minimize the duration of the operation owning the spin-locks.

Cache Entry Lookups

Since the contents of a compressed cache may change at any time, cache lookups are preferably synchronized with other accesses to the same compressed cache. Therefore, a spin-lock is preferably acquired before performing a cache lookup.

The cache address may be extracted from the starting address in the I/O request. The cache address may be used to index into the cache tree 802. In one embodiment, if a NULL pointer is reached before reaching a cache entry 804, then the result is a cache miss. If a cache entry 804 is reached, then the result is a cache hit. If the cache entry 804 is Stale, then it is not valid. Eventually, the background routine may deallocate a Stale cache entry.

Preferably, each time a cache lookup is performed, the appropriate statistics are updated.

Allocating Cache Entries

Since the contents of a compressed cache partition may change at any time, compressed cache allocations are preferably synchronized with other accesses to the same compressed cache partition. Therefore, a spin-lock is preferably acquired before allocating a cache entry 804.

The following describes one embodiment of a process for allocating cache entries 804. Preferably, a check is performed before attempting to allocate a cache entry 804 to verify that enough memory is available to cache the compressed page. Since the page has not been compressed yet, worst case compression may be assumed. In one embodiment, worst case compression is 1:1, because, if the compressed data is larger than the original, uncompressed data, then the original data may be written to the compressed cache as the "compressed" data. The appropriate spin-lock is acquired. One or more cache tree branches may be added to the cache tree 802 based on the cache address. A cache entry 804 may be attached to the last tree branch. The page is compressed. Based on the size of the compressed page, one or more cache block pointers 810 are attached to the cache entry header 808. The compressed page is copied into the cache block(s) 812. The cache entry header 808 is updated, and the spin-lock is released.

Preferably, a cache entry 804 can be created quickly enough so that the page may be compressed early in the cache entry creation process, thus minimizing the amount of cleanup needed (e.g. returning unused cache block pointers 810 to the free-list).

Preferably, cache entries 804 are allocated and deallocated using circular linked-lists. Cache entries 804 are preferably allocated from one end of the circular linked-list, and deallocated from the other end. Consequently, cache entries 804 may be allocated using least recently used memory, thus minimizing the amount of memory fragmentation and making it easier to deallocate memory, such as when the compressed cache needs to shrink.

Updating Cache Entries

Since the contents of a compressed cache partition may change at any time, cache updates are preferably synchronized with other accesses to the same compressed cache partition. Therefore, a spin-lock is preferably acquired before updating a cache entry 804.

Several circumstances may require the compressed cache to be updated. For these circumstances, the cache tree 802, cache entry header 808, cache block pointers 810, and cache blocks 812 are available for updating. Examples of circumstances requiring compressed cache updating may include, but are not limited to:

When a cache writeback is started and completed

When a cache read is started and completed

When a write request hits the compressed cache and the old compressed page is replaced with a new compressed page When a background routine updates state information in a cache entry header 808

Flushing the Cache

In one embodiment, a cache flush operation is provided that may cause the compressed cache to writeback every compressed page that is dirty. In one embodiment, the entire compressed cache may be invalidated as well. One or more software routines may be provided for use by the file system filter drivers to flush the compressed cache. These software routines may perform tasks such as flushing the cache and purging a cache section. The software routines for flushing the compressed cache may be called from an I/O completion routine.

Background Processing

A configurable custom timer is preferably used to schedule the execution of one or more background tasks for performing operations on the compressed cache. In some embodiments, the granularity of the custom timer may be less than one second. For each compressed cache partition, examples of operations that are the responsibility of the background tasks may include, but are not limited to:

Determining whether additional memory needs to be pre-allocated for compressed cache use.

Pre-allocating non-paged user-space for future compressed cache use.

Initializing and updating the appropriate compressed cache structures based on new memory being allocated.

Determining whether any compressed cache entries 804 need to be written back to disk.

Determining whether any compressed cache entries 804 need to be invalidated.

Determining whether any memory previously allocated for compressed cache use should be deallocated.

Deallocating unused compressed cache space.

Updating the appropriate compressed cache structures based on memory being deallocated.

The background tasks may base their decisions on statistics, compressed cache state, replacement linked-lists, etc. Although the above operations are specified separately, all of the operations are preferably performed in a single pass. In one embodiment, one or more of the operations listed above may be performed during completion routines, since the cache is already locked.

Memory Allocation

Preferably, non-paged user-space memory may be dynamically allocated in the background for compressed cache use. A background process may be responsible for allocating and deallocating non-paged memory, since attempts to allocate non-paged memory may fail. Whenever a new compressed cache entry 804 needs to be created, the non-paged memory may already be available. If the non-paged memory is not available, then the page may not be cached. In one embodiment, one attempt may be made to allocate non-paged memory real-time. If the attempt is not successful, then the page is not cached.

Preferably, the maximum amount of main memory that may be compressed is configurable. Non-paged memory may be allocated until the compressed cache size has reached a configured maximum limit, or until the operating system won't allow any more non-paged memory space to be allocated.

Preferably, the memory allocation manager attempts to allocate a configurable number of non-paged user-space pages (for example, 1024 pages) at a time for compressed cache use. The allocated pages are preferably divided up between cache tree 802, cache entry header 808, cache block pointer 810, and cache block 812 use. In one embodiment, the types of structures used within a single page are not mixed. Memory is preferably allocated based on statistics gathered on a per compressed cache partition basis.

Since memory allocation and deallocation may occur in the background (i.e. not specific to any one Device Object), memory is preferably allocated on behalf of all compressed cache partitions. In other words, the allocated memory is preferably available for use by all of the compressed caches.

Preferably, operating system-provided software routines are used to allocate non-paged physical memory. The routines may be used to lock down non-paged memory and address more than 4 GB of virtual memory. In one embodiment, if the operating system does not provide a software routine to allocate more than 2 GB of physical memory, a method may be provided to allow the CCM to access more than 2 GB of non-paged user-space. In one embodiment, a kernel-mode driver may create multiple processes where each process can allocate up to 2 GB of physical memory. The kernel-mode driver may be able to save references to each of these user-spaces for subsequent compressed cache use, thus providing more than 2 GB of memory for compressed cache use. In some embodiments, since the compressed cache may be broken up into independent partitions, a process may be created for allocating non-paged user-space for each compressed cache partition.

A configuration utility may save one or more compressed cache parameters, for example, in a file or the registry. For example, optimal amount of paged system-space, non-paged system-space, paged user-space, non-paged user-space, compressed cache space, etc may be saved in the registry. These parameters may be retrieved and used by the CCM, such as during Driver Entry. In one embodiment, operating system pools (e.g. paged system-space, non-paged system-space, paged user-space, and non-paged user-space) may be dynamically tuned so that additional memory can be allocated for compressed cache use.

Memory Deallocation

In one embodiment, once the cache writeback and deallocation background routines have made their pass over the compressed cache, a memory deallocation routine may examine statistics and look for unused pages of non-paged user-space to determine how much (if any) memory may be released. In order for a page to be deallocated back the system, the page preferably does not have any valid compressed cache structures like cache tree branches, cache entry headers 808, cache block pointers 810, or cache blocks 812 in it. The memory deallocation routine may be able to reorganize the compressed cache to free up pages that are only partially used.

Preferably, an orderly method of allocating and deallocating cache entries 804 is used to increase the likelihood that an allocated block of memory is returned to the system with little or no compressed cache re-organization. In one embodiment, cache entries 804 may be allocated and deallocated in a circular fashion. In other words, cache entries 804 may be allocated into the least recently used memory.

In one embodiment, the memory deallocation routine may choose to invalidate all cache entries 804 within a specific reserved block of memory before invalidating cache entries 804 within another reserved block of memory.

Cache Writebacks and Deallocation

A cache entry header 808 preferably includes state information. Types of state information may include, but are not limited to:

Clean, Dirty, or Stale flag
    If a cache entry 804 is Clean, then it is preferably not written back to disk. If it is Dirty, then preferably it is eventually written back to disk. If it is Stale, then preferably it is not reused. A background routine may eventually deallocate a Stale cache entry 804.

Creating, Reading, Writing, and Replacing flags
    If one or more of the Creating, Reading, Writing or Replacing flags are set, then the cache entry 804 may be referred to as Busy. When the Creating flag is set, then the cache entry 804 is in the process of being allocated. When the Reading flag is set, then the cache entry 804 is in the process of being reused. When the Writing flag is set, then the cache entry 804 is in the process of being written back to disk. When the Replacing flag is set, then the compressed page associated with the cache entry 804 is in the process of being replaced.

Green, Yellow or Red cache entries
    The background routine preferably does not deallocate cache entries 804 that are Green or Yellow. Preferably, the background routine only deallocates cache entries 804 that are Red, Clean and not Busy. A cache entry 804 may be marked as green, yellow or red by a flag in the state information, or alternatively by being placed in lists of green, yellow or red cache entries 804.

When a particular cache entry 804 is in the process of being written back to disk, it may continue to remain valid for a while. In one embodiment, a page may be decompressed for reuse at the same time that the page is being written back to disk. For this case, the state of the compressed cache entry 804 preferably indicates Reading and Writing.

Whenever a new cache entry 804 is allocated, it is preferably attached to the end of an LRU linked-list. The cache entry header 808 preferably includes pointers to facilitate this. In one embodiment, a background routine may update the state of each cache entry 804 and initiate the appropriate operations starting at the top of the LRU linked-list, thus ensuring that the least recently used cache entries 804 are deallocated first.

Supplemental statistics, state information, and linked-lists may be used by a background routine to help decide which cache entries 804 to deallocate. For example, a cache entry 804 that is the least recently used may also be the most frequently used, and thus it may be desirable to leave the page cached.

Once a writeback has been completed, Writing is preferably turned off. In one embodiment, Writing is turned off in the I/O request completion routine. A background routine preferably does not deallocate a Red cache entry 804 until it has finished Creating, Reading, Writing and/or Replacing.

In one embodiment, when a compressed cache is Busy Reading, the interrupt level may be higher than when the compressed cache is Busy Creating, Replacing or Writing. Thus, the Reading operation may preempt the Writing operation. The Reading operation preferably is not allowed to preempt a Creating or Replacing operation, and preferably is not allowed to proceed until Creating or Replacing operations are complete.

Whenever a dirty cache entry 804 is written back or deallocated from the compressed cache, the appropriate statistics are preferably updated. In one embodiment, when the background routine finds a dirty cache entry 804 that is ready to be written back to disk, the background routine may create and dispatch an asynchronous write I/O request to the appropriate device.

Writing back dirty cache entries 804 is preferably not a high priority task. The background routine preferably retains at least one private I/O request structure that it owns and reuses for conditions such as when the background routine fails to create an I/O request from the system. Even though this may not be a deadlock condition, the private I/O request may allow the background routine to make slow serialized progress. Once the private V/O request has been dispatched, the background routine may continue to traverse the compressed cache. For each subsequent dirty cache entry 804 that the background routine finds that is ready to be written back, the background routine may attempt to create an I/O request from the system, but if the I/O request creation fails, the background routine preferably continues. Eventually, the private I/O request may complete, and forward progress may be achieved. The background routine may not be able to writeback the next dirty cache entry 804 until the next custom timer interrupt.

The background routine preferably executes at the lowest interrupt priority possible. The background routine preferably traverses the compressed cache once before returning control to the custom timer.

In one embodiment, if the background routine has already dispatched a writeback request and a subsequent read request hits the cache entry 804 for reuse, then the pending writeback request for the cache entry 804 may be cancelled.

In embodiments where cache entries 804 are deallocated only by a background routine, the background routine is preferably free to traverse a compressed cache partition without acquiring a spin-lock. In embodiments where other routines, such as a completion routine, are allowed to deallocate cache entries 804, then preferably a compressed cache spin-lock is acquired by a routine prior to deallocating cache entries 804. A background routine preferably acquires a compressed cache spin-lock before updating one or more cache entries 804.

Request Decoding

An I/O request may be decoded by the CCM to determine whether the request is potentially cacheable, or to allow the request to pass through. If the I/O request is potentially cacheable, then a compressed cache lookup may be performed to determine the outcome of the request. In one embodiment, all write requests may be cached.

The following are examples of types of I/O request information that may be used when managing the various compressed cache partitions, such as when deciding whether the I/O request is cacheable or not:

Read versus write request

Swap versus file I/O request

File Objects associated with swap files may remain constant while the operating system is running. The operating system may provide a default swap file. Additional swap files may be specified, for example in the registry. The CCM may check during Driver Entry to determine if other swap files are specified. When an I/O request is received, the CCM may check the File Object to determine if the I/O request is accessing one of the swap files. When the CCM receives the first I/O request to a particular swap file, the CCM preferably saves the pointer to the File Object. Consequently, the CCM may perform File Object pointer compares instead of a file name string compare to determine if an I/O request is destined for one of the swap files. The destination of an I/O request may also be inferred from the origin of the I/O request, Virtual Memory Manager (VMM) versus Application Programming Interface (API). Preferably, swap requests are cached in a separate cache partition. In one embodiment, some file I/O operations may not be cached based on other flags and/or statistics.

Synchronizing request

In one embodiment, synchronization requests may not be cached since the VMM does not intend to evict the page anytime soon. The page is being synced to disk as requested by an application. The cache manager does not intend to evict the page any time in the near future. In one embodiment, if a compressed cache hit occurs on the synchronization request, then the compressed page may be evicted since it is redundant.

Synchronous versus asynchronous request

In some embodiments, this may be used to determine when to use writeback versus write-through mode. Preferably, asynchronous write requests are cached in writeback mode, and synchronous requests in write-through mode. However, some write requests may be written through to disk independent of whether the requests are synchronous or asynchronous.

Paged versus non-paged request

Preferably, paged requests are cached since they are probably destined for swap space. In one embodiment, requests originating from non-paged space may not be cached since it is unlikely that they will be reused.

Cached versus non-cached request

In this context, "cached" means that the write request originated from the cache manager. "Non-cached" means that the write request did not originate from the cache manager. In one embodiment, write requests that originate from the cache manager are cached by the CCM.

Reference count

The reference count may be used to provide hints on the likelihood of reuse. If a paged request's reference count is non-zero, then it may be likely to be reused. In one embodiment, a flag extracted from the Page File Number (PFN) database may be examined to determine whether the VMM should or should not evict the page when its reference count reaches zero.

State of pageable page

In one embodiment, the state of a pageable page may be kept in the PFN database. A page may be in the Active, Transition, Standby, Free, etc. state. If a page is in the Transition state, then it is attached to the Transition list. These lists are used by the VMM to help determine when to evict a page from main memory. In one embodiment, the current state, list, and location in the list for that page may be determined from the PFN. This information may be used to determine whether the VMM intends to evict the page soon. The information may be used to determine the state of the page and where the page resides in the associated state list (e.g. Transition, Standby, etc.). If the VMM intends to evict the page soon, then preferably the page will be cached. If the VMM does not intend to evict the page soon, then preferably the page will not be cached. Alternatively, if the VMM does not intend to evict the page soon, the page is cached. It may be important to minimize redundant pages in main memory.

IRQL level and thread priority

In one embodiment, the IRQL level and thread priority may be used in determining the origin of a request (i.e. API versus VMM initiated, user versus kernel initiated), which may be used in managing the cache (e.g. partitioning). An interrupt level of 0 may be associated with write requests. An interrupt level of 1 may be associated with read requests (e.g. paging).

In some embodiments, the identity of a process may be determined by sending one or more I/O requests to the driver and saving the results of a Get Current Process function call.

In some embodiments, some information may not be directly accessible from the CCM. The Request Monitor Filter (RMF), a software module that may be used to monitor requests, and CCM drivers may not be contiguous to each other within the I/O stack. If relevant information is accessible from the RMF, then a method may be used to pass the information from the RMF to the CCM. Any of several methods may be used. Examples of method to pass the information may include, but are not limited to:

Attaching an object to the I/O request.

Defining new unique flag values that can be combined with existing I/O request flags.

Creating and dispatching a separate I/O request.

Creating and attaching an associated I/O request to the original I/O request.

Using the Private Inter-Driver Communications (IDC) Status field.

Calling the CCM driver directly.

Using the I/O status block in the I/O request.

Registering a major function that will never be used, and use the reserved entry in the current I/O stack location of the I/O request.

Using the RMF I/O stack location, and having the CCM scroll through the I/O stack, or visa versa.

Using the Parameters Union field in the RMF or CCM I/O stack location.

In one embodiment, Inter-Driver Communications structures (IDCs) may be used to communicate between software drivers executing on the computer system. An IDC may be associated with one driver. An IDC is a structure containing a list of entry points to routines in the driver, such as dispatch routines, completion routines, etc. The entry points may be exported to other software modules such as drivers and application programs. An IDC may also include other information such as variables to hold pointers to memory locations. For example, if driver A needs to communicate with driver B, then driver B may provide an IDC to driver A containing exported entry points that driver A may use to communicate with driver B.

In one embodiment, the Flag field in the I/O request may be used in determining whether the I/O request is a read or write request. In one embodiment, indirection pointers may be used to locate a master I/O request, and then one or more operations may be performed with the master. In one embodiment, traversing Device Object pointed to by the current I/O stack location may be used to obtain physical sector information.

Control Requests

Preferably, applications, such as a Compressed Cache performance tuning and monitoring utility, may send special control requests to the CCM. Examples of special control requests may include, but are not limited to:

Create or delete cache

Start or stop cache

Synchronize or flush cache

Change cache parameters, such as Writeback or write-through mode, Minimum and maximum cache size, Allocation and deallocation strategy, and Page and sector sizes In addition, the applications may preferably send control requests to the CCM to change the memory allocation and deallocation strategy. The CCM preferably ignores any control requests that do not have the appropriate administrative privileges.

Static and Dynamic Initialization

During the driver loading process, the CCM is preferably able to attach itself above user-specified filter drivers and device drivers for each I/O stack. In one embodiment, the CCM is loaded after those drivers. Consequently, the CCM configuration utility preferably allows a user to attach the compressed cache to one or more specific device drivers. The CCM is preferably loaded and attached to the appropriate device objects in such a way that all requests (e.g. including raw requests) dispatched to those device objects may not bypass the attached compressed cache manager. Preferably, only one global driver object is instantiated when the CCM is loaded. A device object is preferably instantiated for each device to which the CCM is attached.

Initially, a small amount, for example, 1024 pages, of non-paged user-space is preferably pre-allocated for compressed cache use. In one embodiment, one or more I/O requests, User Memory Lists (UMLs) and buffers may be pre-allocated for compressed cache writeback use. These resources are preferably not deallocated after use. Instead, they are preferably reused by the background writeback routines whenever the system is unable to allocate the necessary resources.

A User Memory List (UML) is a structure that allows a kernel mode driver to access a user buffer. The UML may include pointers to user memory. Drivers may access private user memory using UMLs. The UMLs may be passed to the drivers attached to I/O requests. The driver may have to convert the memory addresses from user memory to system memory to use them. In one embodiment running the Microsoft Windows NT operating system, UMLs are called Memory Descriptor Lists (MDLs).

For debugging purposes, the CCM is preferably loaded after the debugger so that it can be debugged during the driver loading process. In one embodiment, this may be accomplished by loading the CCM after the debugger during the driver loading process. In another embodiment, this may be accomplished by dynamically loading the CCM. Dynamically loading and unloading the CCM may improve bug fix turnaround times. However, it is not a functional requirement.

A CCM-specific Device Object is preferably created for each device that the CCM is attached to. In one embodiment, when attaching a filter to a device, an I/O Get Attached Device function and an I/O Attach Device By Pointer function may be used to attach the filter to a specific location within the I/O stack. In another embodiment, an I/O Attach Device To Device Stack function may be used to attach the filter to a specific location within the I/O stack. The CCM is preferably not paged out of main memory. In one embodiment, a Memory Manager Reset Driver Paging function may be used to insure the CCM is not paged out. In one embodiment, calling an I/O Register (File System) Registration Change may be used to cause the reference count on the Device Object (the one registered) to be increased. A driver may not be unloaded as long as there is an outstanding reference on the driver. In one embodiment, the driver may be deregistered before unloading. Note that unloading the driver may not be desirable because there are intractable race conditions in almost any non-trivial storage stack driver.

Statistics

Since statistics may be a shared resource, statistics that are associated with a particular compressed cache partition are preferably managed as a single resource. If the statistics are managed as a single resource, then a compressed cache spin-lock is preferably acquired before updating the statistics.

Requests may be monitored. Examples of statistics that may be monitored include, but are not limited to:

Request type versus reuse

Cache address range versus reuse

Transient request rate and transient cache hit rate

Inter-arrival rate of requests versus reuse

Number of compressed cache lookups

Number of write requests that hit the compressed cache

Number of cache pages reused after they were written back to disk but before they were evicted.

Number of write-through and writeback requests

Knowing which request types are reused the most may be useful in deciding whether a request is to be cached. Knowing which cache address ranges get reused the most may be useful in deciding whether a request is to be cached. The transient request rate and transient cache hit rate may be useful in deciding when the compressed cache should grow or shrink. For example, as the transient request rate grows, the compressed cache may be allowed to grow as long as the transient cache hit rate remains high. Knowing when there is a strong correlation between some inter-arrival request rate and reuse may be useful in deciding whether a request is to be cached.

Configuration and Performance Utility

The configuration utility preferably includes a GUI interface that preferably allows a user to add a compressed cache to a specific device object. Examples of functions that the configuration utility may allow a user to perform include, but are not limited to:

Enable/disable deallocate on compressed cache read hit
Configure compressed cache writeback rate
Configure compressed cache entry 804 half-life
Configure size of uncompressed cache page
Configure size of compressed cache block 812
Create a compressed cache
Attach a compressed cache to one or more Device Objects
Specify cache address range qualifiers
Specify file system qualifiers
Specify file name qualifiers
Specify request type qualifiers
Specify process name qualifiers
Configure size of cache tree node arrays
Specify spin-lock granularity FIG. 18—Background Cache Entry State Transitions FIG. 18 is a table illustrating background cache entry state transitions. The first column contains the current state of a cache entry 804. The second column contains the next state of the cache entry 804 after a state transition. The third column contains comments on the state transition. In one embodiment, cache entries 804 may be ranked into categories based on usage. For example, the rankings may indicate most recently used/least recently used status. Alternatively, most frequently used/least frequently used status may be tracked, or a combination of recent/frequent usage may be used. As used herein, a "green" cache entry is a most recently used cache entry, a "yellow" cache entry is less recently used, and a "red" cache entry is a least frequently used cache entry. Alternatively, other schemes of ranking and/or more or fewer levels of gradation may be used. In one embodiment, the usage status may be kept in a flag in the cache entry header 808. Alternatively, cache entries may be tracked with green, yellow, and red lists of pointers to cache entries 804.

FIG. 19—Cacheable I/O Request Actions

FIG. 19 is a table illustrating cacheable I/O request actions. The first column lists the request type, the second column lists the cache lookup results, and the third column lists the action performed in response to the request type and cache lookup results. On a read-miss, the read is allowed to pass through. On a read-hit, the compressed data from the cache is decompressed. On a write-miss, the data is compressed and one or more new cache entries 804 are created (or retrieved from a free-list) for storing the compressed data in the compressed cache. On a write-hit, the data is compressed and the old data in the compressed cache is replaced with the new compressed data.

If a write request is cacheable, but there is not enough memory available to add an entry to the compressed cache, then the request is preferably allowed to pass through.

Some embodiments of the CCM may not attempt to allocate additional memory from the operating system on demand. Alternatively, the CCM may try to allocate memory once, and if that fails, then the request is allowed to pass through.

In one embodiment, if the page attached to the write request is not compressible, then the request is allowed to pass through and statistics are updated. Any cache tree branches, cache entry headers 808, cache block pointers 810, or cache blocks 812 that were pre-allocated are preferably released.

Figure 20A:
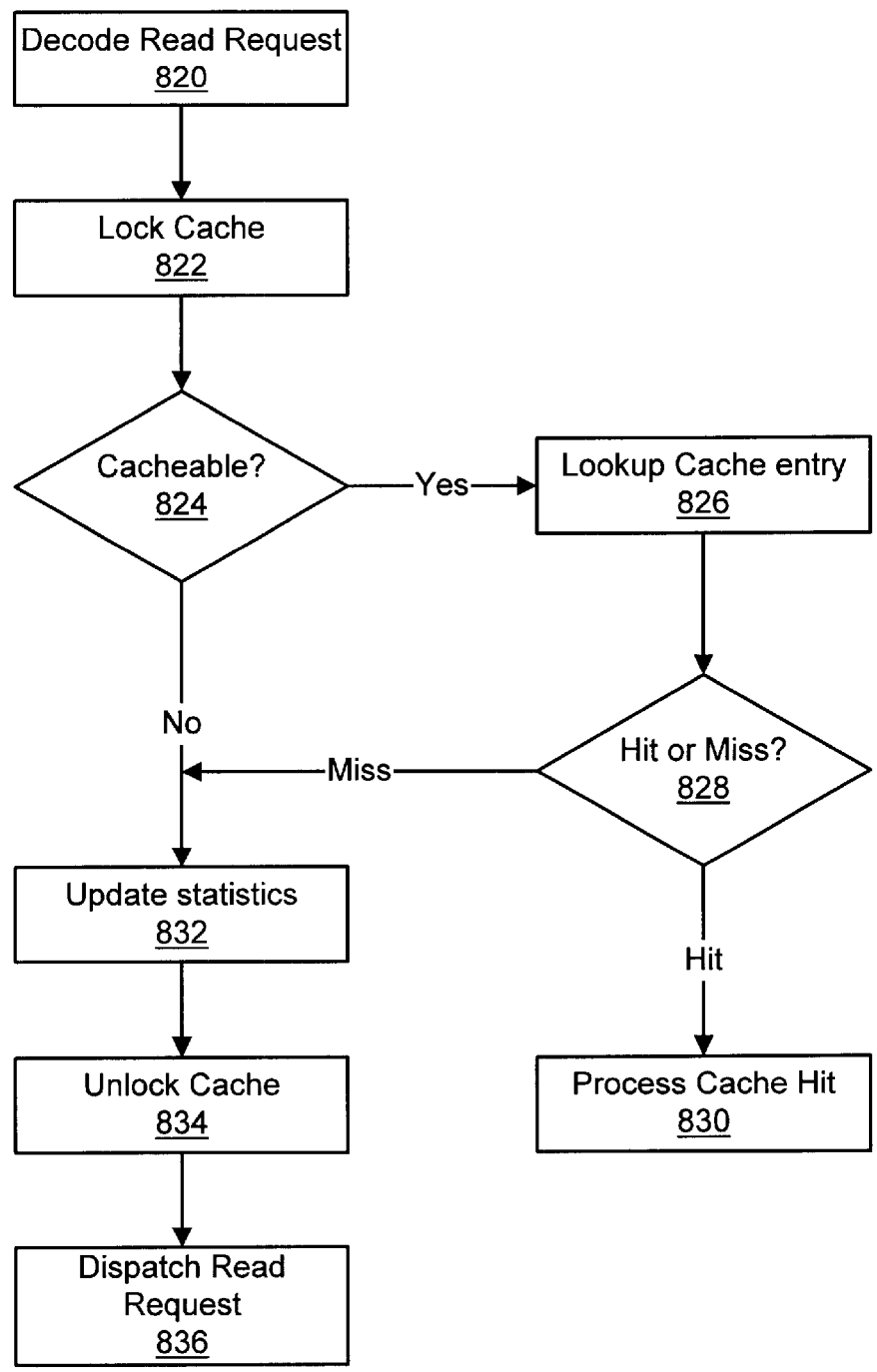
FIG. 20a is a flowchart illustrating the basic flow of an I/O request read dispatch routine according to one embodiment of the invention.
Figures 20B, 20C:
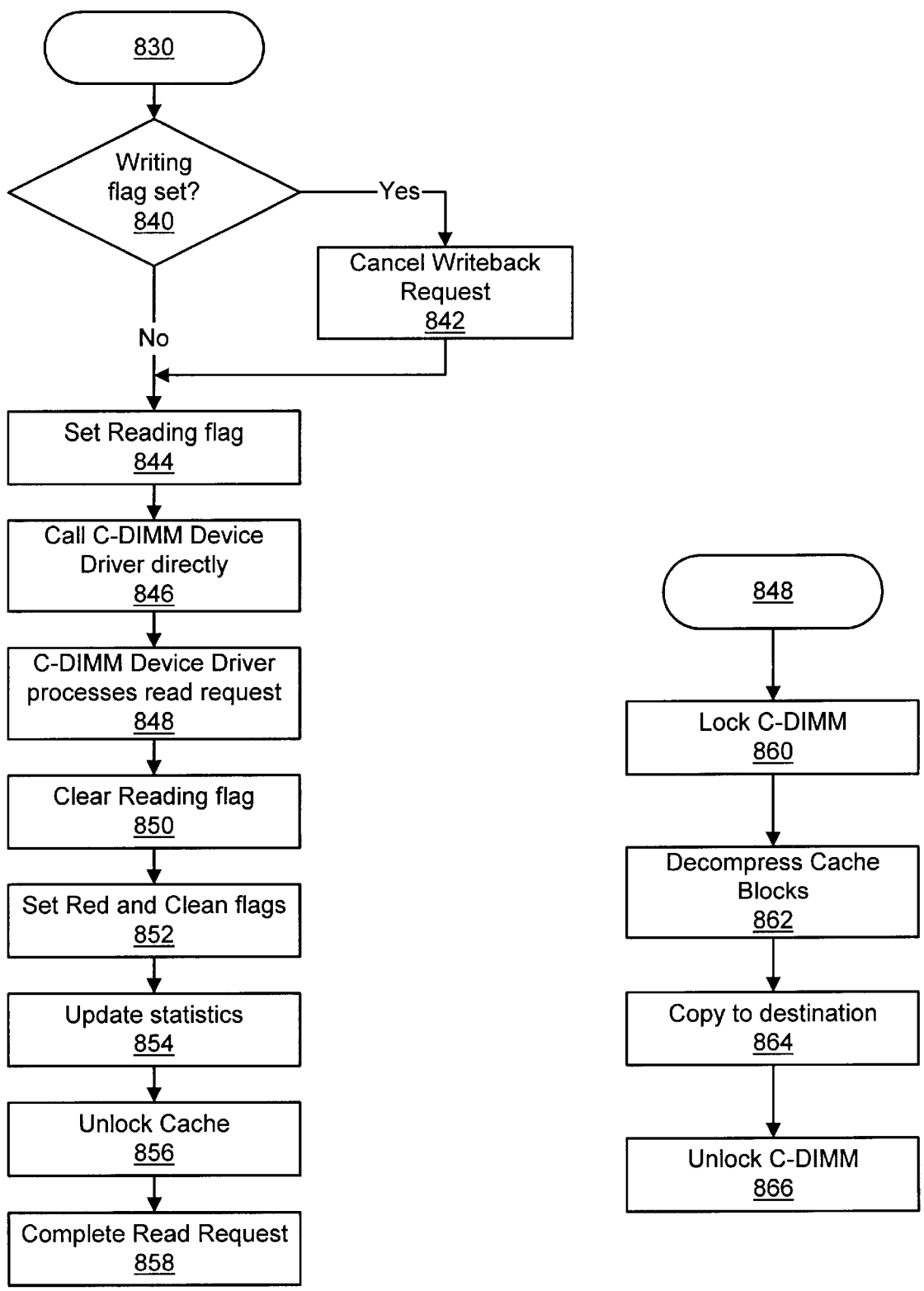
FIG. 20b is a flowchart expanding on step 830 of FIG. 20a and illustrating the processing of a cache hit according to one embodiment of the invention.
FIG. 20c is a flowchart expanding on step 848 of FIG. 20b and illustrating the C-DIMM device driver processing the read request according to one embodiment of the invention.

FIGS. 20a Through 20c—A CCM Data Read I/O Request Dispatch Routine

FIGS. 20a through 20c are flowcharts illustrating the processing of a data read I/O request by a compressed cache manager (CCM) read dispatch routine according to one embodiment of the invention. Steps in the flowcharts may occur concurrently or in different orders.

FIG. 20a—Basic Flow of a Read I/O Request Dispatch Routine

FIGS. 20a through 20c are flowcharts illustrating the basic flow of an I/O request read dispatch routine according to one embodiment of the invention. In one embodiment, the read dispatch routine is a software routine in the CCM. In FIG. 20a, the I/O request may be received and decoded in an I/O request read dispatch routine in step 820. The decoding of the I/O request may provide the necessary information determine which compressed cache the pages may reside in, and to locate the requested one or more pages in the compressed cache. In step 822, the compressed cache may be locked to prevent other requests from being processed while the current I/O request is being processed. Preferably, a spin-lock may be acquired to lock the cache. In step 824, the read dispatch routine may determine if the requested one or more pages are cacheable. If the pages are not cacheable, then they are not in the compressed cache, and processing is passed to step 832. If the pages are cacheable, then processing is passed to step 826. In step 826, the read dispatch routine may perform a cache lookup of the compressed cache to determine if the requested one or more pages are in the compressed cache. The result of a cache lookup is a hit if a cache entry 804 exists for the one or more pages and is not Stale. In step 828, if the result of the cache lookup is a hit (the one or more pages are in the compressed cache), then processing passes to step 830 to process the cache hit. Step 830 is further described in FIG. 20b. In step 828, if the result of the cache lookup is a miss, processing passes to step 832.

Steps 832 through 836 describe the processing of a cache miss. In step 832, statistics being maintained for the compressed cache may be updated. In this instance, a cache miss is recorded. In step 834, the compressed cache is unlocked. Any spin-locks acquired for the processing of the I/O request are released. In step 836, the I/O request received in step 820 may be passed to the next driver in the I/O stack for continued processing. Eventually, the appropriate driver for the device where the one or more pages are stored may receive and fulfill the I/O request.

FIG. 20b—Processing a Cache Hit for a Read Request

FIG. 20b is a flowchart expanding on step 830 of FIG. 20a and illustrating the processing of a cache hit according to one embodiment of the invention. In one embodiment, in step 840, the read dispatch routine may check the cache entry 804 to see if the Writing flag is set. In one embodiment, if the background routine has previously dispatched a writeback I/O request and a subsequent read request hits the cache entry 804 for reuse, then the pending writeback request may be cancelled in step 842. Alternatively, the pending writeback request is not cancelled. In step 844, the read dispatch routine may set the Reading flag for the cache entry 804 to indicate that a compressed cache read is being processed. The read dispatch routine may then call the C-DIMM device driver in step 846. When calling the C-DIMM device driver, the read dispatch routine preferably passes pointers to the I/O request and compressed cache entry 804. Preferably, a new UML does not have to be built, and the UML attached to the I/O request preferably does not have to be modified. In step 848, the C-DIMM device driver may decompress the cache entry 804 and copy the decompressed data to the destination. Preferably, the C-DIMM device driver has access to all of the information needed to carry out the decompression and copy operations.

After the C-DIMM completes the decompression and copying of the decompressed pages, the Reading flag for the cache entry 804 may be cleared in step 850. In step 852, once the cache blocks 812 have been decompressed and copied to their destination, the cache entry 804 is preferably updated to indicate that it is ready to be deallocated (e.g. Red and Clean). Preferably, the dispatch routine is not responsible for actually deallocating the cache entry 804. Preferably, the appropriate background routine is responsible for deallocating the cache entry 804. In step 854, statistics for the compressed cache may be updated, in this instance indicating a cache hit. Statistics may be a shared resource. The statistics associated with a particular compressed cache partition are preferably managed as if they are part of the compressed cache partition. Preferably, the appropriate compressed cache spin-lock is acquired before updating the statistics. In step 856, the cache, locked in step 820 of FIG. 20*a*, is unlocked, and any spin-locks acquired are released. In step 858, the read dispatch routine may complete the read I/O request received in step 820 of FIG. 20*a*. Completing the read I/O request may include notifying the requestor that the requested pages have been retrieved and stored in system memory.

FIG. 20*c*—C-DIMM Device Driver Processing of a Read Request

FIG. 20*c* is a flowchart expanding on step 848 of FIG. 20*b* and illustrating the C-DIMM device driver processing the read request according to one embodiment of the invention. In step 860, the C-DIMM device driver may lock the C-DIMM. Preferably, a spin-lock is acquired to prevent operation from proceeding until the decompression and copying of the requested one or more pages are complete. In step 862, the cache blocks 812 containing the compressed one or more pages may be decompressed on the Compactor Chip on the C-DIMM, and the decompressed one or more pages from the cache blocks are copied to the specified destination in step 864. In step 866, the C-DIMM is unlocked, and any acquired spin-locks are released.

FIGS. 21*a* Through 21*f*—A CCM Data Write I/O Request Dispatch Routine

FIGS. 21*a* through 21*f* are flowcharts illustrating the processing of a data write I/O request by a CCM write dispatch routine according to one embodiment of the invention. Steps in the flowcharts may occur concurrently or in different orders.

Figure 21A:
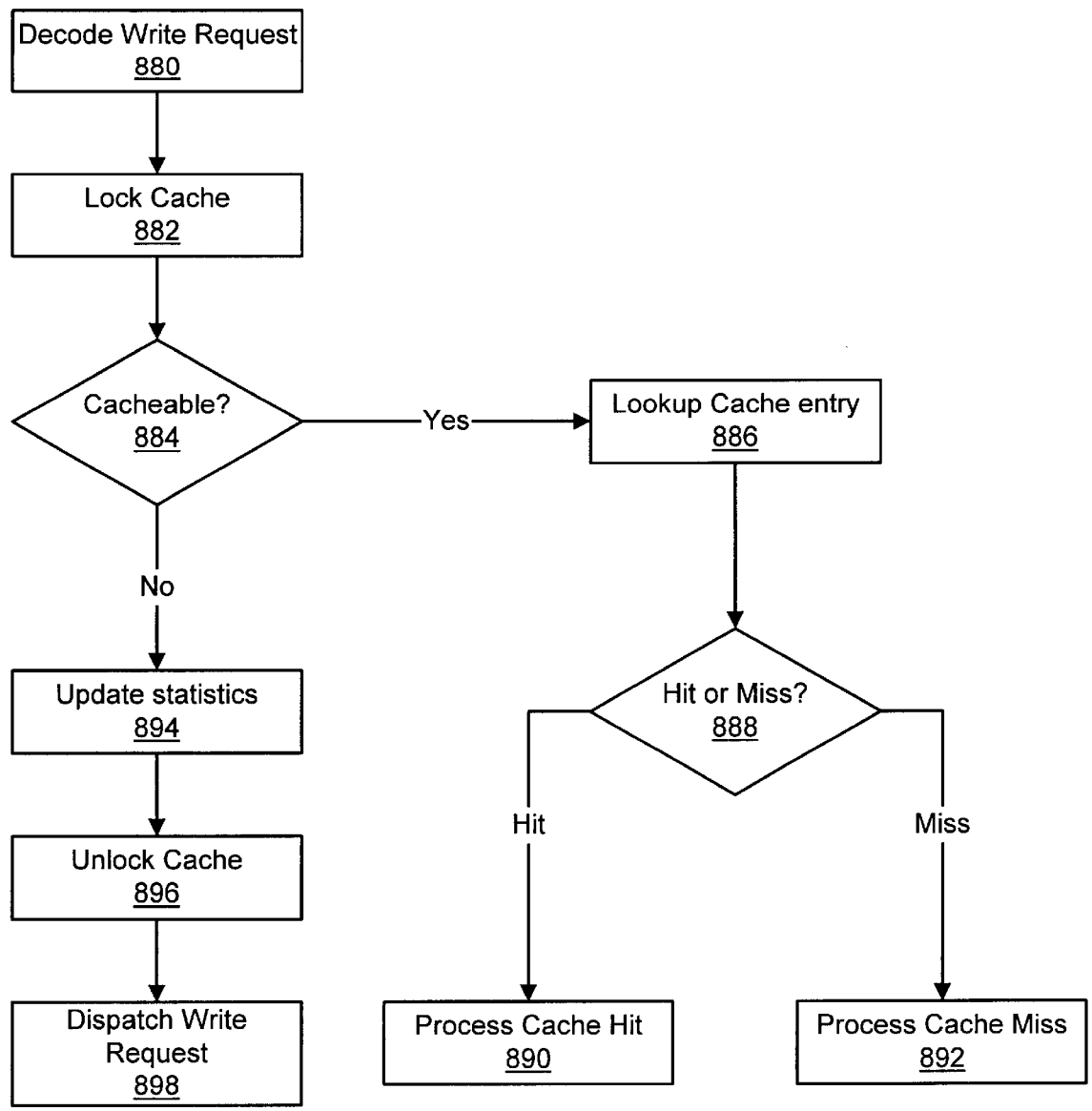
FIG. 21a is a flowchart illustrating the basic flow of an I/O request write dispatch routine according to one embodiment of the invention.

FIG. 21*a*—Basic Flow of a Write I/O Request Dispatch Routine

FIG. 21*a* is a flowchart illustrating the basic flow of an I/O request read dispatch routine according to one embodiment of the invention. In one embodiment, the write dispatch routine is a software routine in the CCM. The I/O request may be received and decoded in an I/O request write dispatch routine in step 880. The decoding of the I/O request may provide information to determine the location in memory of the one or more pages to be written. In step 892, the compressed cache may be locked to prevent other requests from being processed while the current I/O request is being processed. Preferably, a spin-lock may be acquired to lock the cache. In step 884, the write dispatch routine may determine if the one or more pages to be written are cacheable. If the pages are not cacheable, processing is passed to step 894. If the pages are cacheable, then processing is passed to step 886. In step 886, the write dispatch routine may perform a cache lookup of the compressed cache to determine if the requested one or more pages to be written are already in the compressed cache. The result of a cache lookup is a hit if a cache entry 804 exists for the one or more pages to be written. In step 888, if the result of the cache lookup is a hit (the one or more pages are in the compressed cache), then processing passes to step 890 to process the cache hit. Step 890 is further described in FIG. 21*b*. In step 888, if the result of the cache lookup is a miss, processing passes to step 892 to process the cache miss. Step 892 is further described in FIG. 21*e*.

When a write request results in a cache hit, the existing compressed one or more pages are preferably replaced. The old cache block pointers 810 are preferably deallocated instead of being reused to increase the likelihood that a whole page of memory will become unused (or nearly unused). This may minimize the overhead necessary to deallocate memory back to the system when the compressed cache shrinks.

Steps 894 through 898 describe the processing of write requests for non-cacheable pages. In step 894, statistics being maintained for the compressed cache may be updated. In step 896, the compressed cache is unlocked. Any spin-locks acquired for the processing of the I/O request are released. In step 898, the I/O request received in step 880 may be passed to the next driver in the I/O stack for continued processing. Eventually, the appropriate driver for the device where the one or more pages are stored may receive and fulfill the I/O request.

Figure 21B:
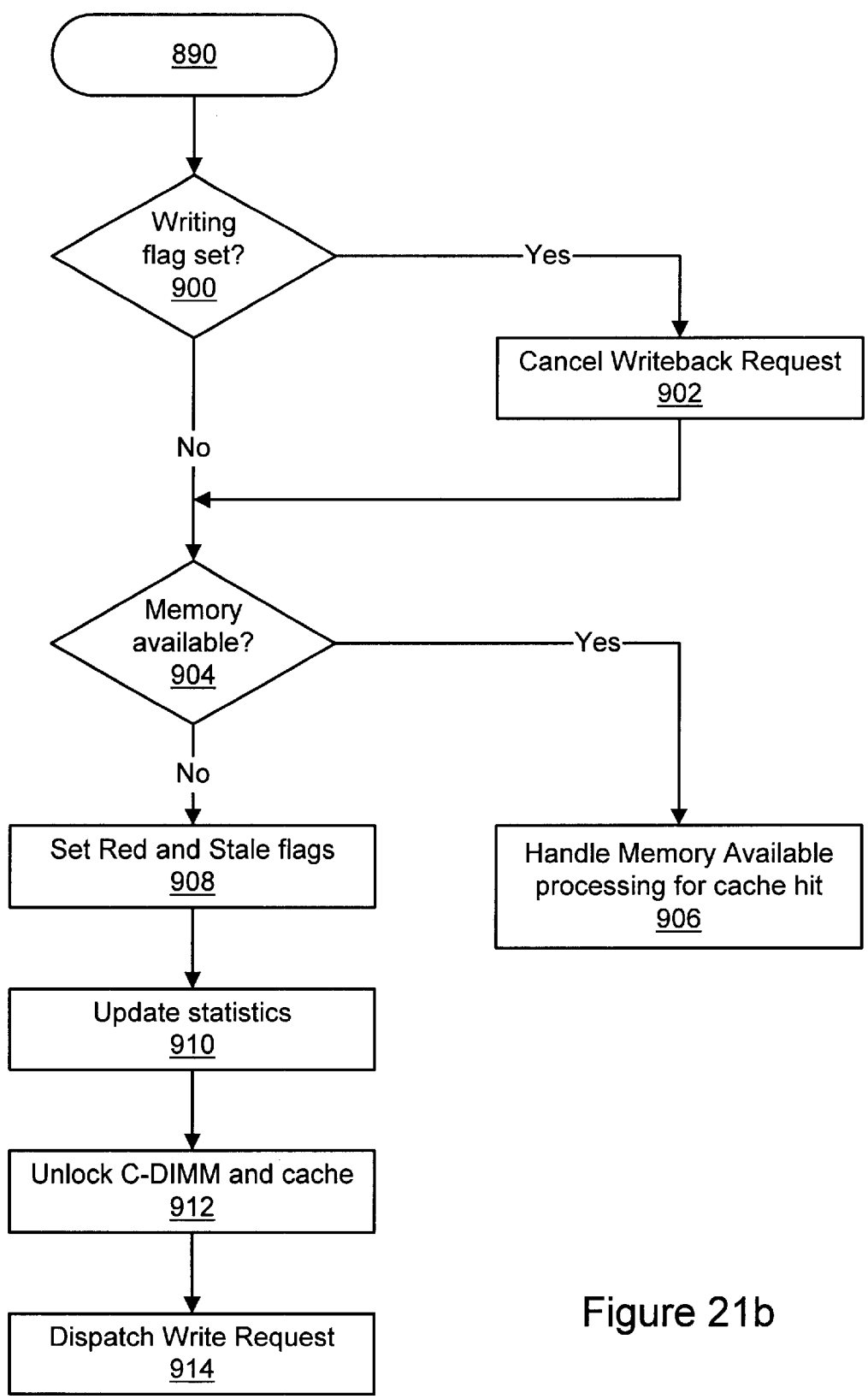
FIG. 21b is a flowchart expanding on step 890 of FIG. 21a and illustrating the processing of a cache hit according to one embodiment of the invention.

FIG. 21*b*—Processing a Cache Hit for a Write Request

FIG. 21*b* is a flowchart expanding on step 890 of FIG. 21*a* and illustrating the processing of a cache hit according to one embodiment of the invention. In one embodiment, in step 900, the write dispatch routine may check the cache entry 804 to see if the Writing flag is set. In one embodiment, if the background routine has previously dispatched a writeback I/O request and a subsequent write request hits the cache entry 804, then the pending writeback request may be cancelled in step 902. Alternatively, the pending writeback request is not cancelled. In step 904, the write dispatch routine may check to see if enough memory is available, for instance in the compressed cache, to compress and write the one or more pages to the compressed cache. If enough memory is available, then processing is passed to step 906 for continued processing of the cache hit. Step 906 is further illustrated in FIG. 21*c*. If enough memory is not available as determined in step 904, then processing is passed to step 908.

In step 908, the cache entry 804 is preferably updated to indicate that it is Red and Stale, and thus ready to be deallocated. The cache entry is Stale because the version of the one or more pages compressed in the cache entry are known to not be current with other versions. In step 910, statistics for the compressed cache may be updated. Statistics may be a shared resource. The statistics associated with a particular compressed cache partition are preferably managed as if they are part of the compressed cache partition. Preferably, the appropriate compressed cache spin-lock is acquired before updating the statistics. In step 912, if the cache and C-DIMM were previously locked, they are unlocked, and any spin-locks acquired are released. In step 914, the I/O request received in step 880 may be passed to the next driver in the I/O stack for continued processing. Eventually, the appropriate driver for the device where the one or more pages are stored may receive and fulfill the I/O request.

Figure 21C:
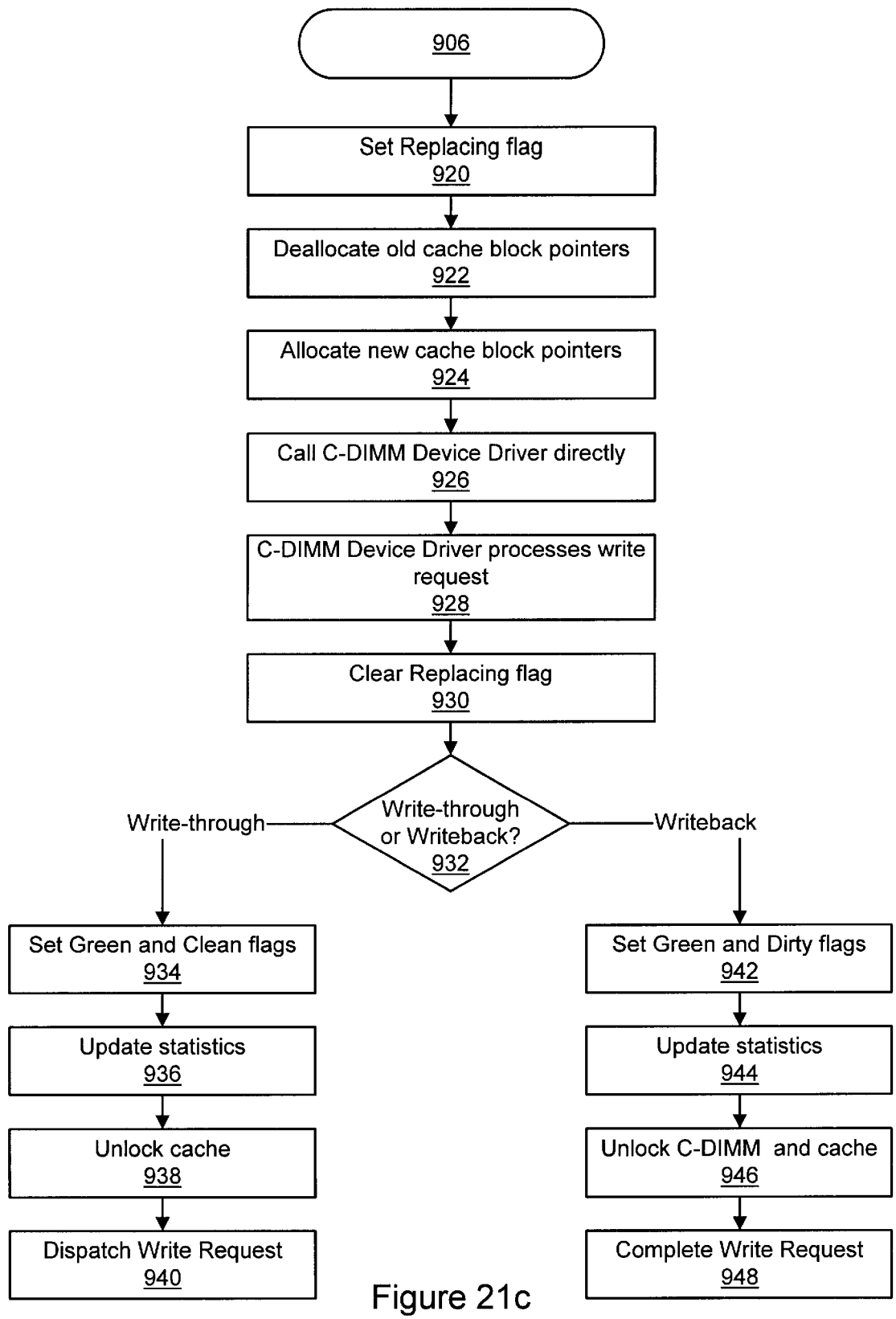
FIG. 21c is a flowchart expanding on step 906 of FIG. 21b and illustrating the processing of a cache hit when memory is available according to one embodiment of the invention.

FIG. 21*c*—Processing a Cache Hit for a Write Request

FIG. 21*c* is a flowchart expanding on step 906 of FIG. 21*b*, and illustrates the processing of a cache hit when memory is available according to one embodiment of the invention. In step 920, the Replacing flag may be set for the cache entry 804 to indicate that it is in the process of being replaced. In step 822, the old cache block pointers 810 for the cache entry 804 may be deallocated. Preferably, deallocating the cache block pointers 810 comprises placing the cache block pointers 810 in a cache block pointer free-list for reuse. In step 924, new cache block pointers 810 may be allocated. Preferably, allocating cache block pointers 810 comprises retrieving available cache block pointers 810 from the cache block pointer free-list. In step 926, the write dispatch routine may call the C-DIMM device driver to compress and store the one or more pages to the cache entry 804. When calling the C-DIMM device driver, the write dispatch routine preferably passes pointers to the I/O request and destination compressed cache entry 804. Preferably, the C-DIMM device driver has access to all of the information needed to carry out the compression and write operations. In step 928, the C-DIMM device driver processes the write request passed to it by the write dispatch routine in step 926. Step 926 is further illustrated in FIG. 21*d*. In step 930, after the C-DIMM has completed the compression and writing of the one or more pages, the Replacing flag for the cache entry 804 is cleared.

In step 932, if the write request is in write-through mode, then processing passes to step 934. If the write request is in writeback mode, then processing passed to step 942. In step 934, the Green and Clean flags are set for the cache entry 804. In step 936, the statistics for the compressed cache may be updated, in this case to indicate a cache hit on a write request. In step 938, the compressed cache is unlocked, and any acquired spin-locks are released. In step 940, a write-through I/O request for the one or more pages is dispatched to write the one or more pages to system memory.

When a cache entry 804 is created or replaced in write-through mode due to a write request, the source data is preferably compressed and copied into the cache entry 804 before the write-through I/O request is dispatched. Consequently, subsequent requests to the same page may result in a compressed cache hit, although the write-through request may still be pending. Alternatively, the source data may be compressed later in the dispatch routine after the write-through I/O request is dispatched, as long as the state of the compressed cache is updated prior to dispatching the write-through I/O request. The state of the compressed cache is updated to prevent stale data from being read from the compressed cache. Also, to miniize the number of times the compressed cache has to be locked, the source data is preferably compressed and copied into the cache entry 804 while the compressed cache is locked.

In step 942, the Green and Dirty flags are set for the cache entry 804. In step 944, the statistics for the compressed cache may be updated, in this case to indicate a cache hit on a write request. In step 946, the compressed cache is unlocked, the C-DIMM, if previously locked, is unlocked, and any acquired spin-locks are released. In step 948, the write I/O request received in step 880 of FIG. 21*a* is completed.

Figure 21D:
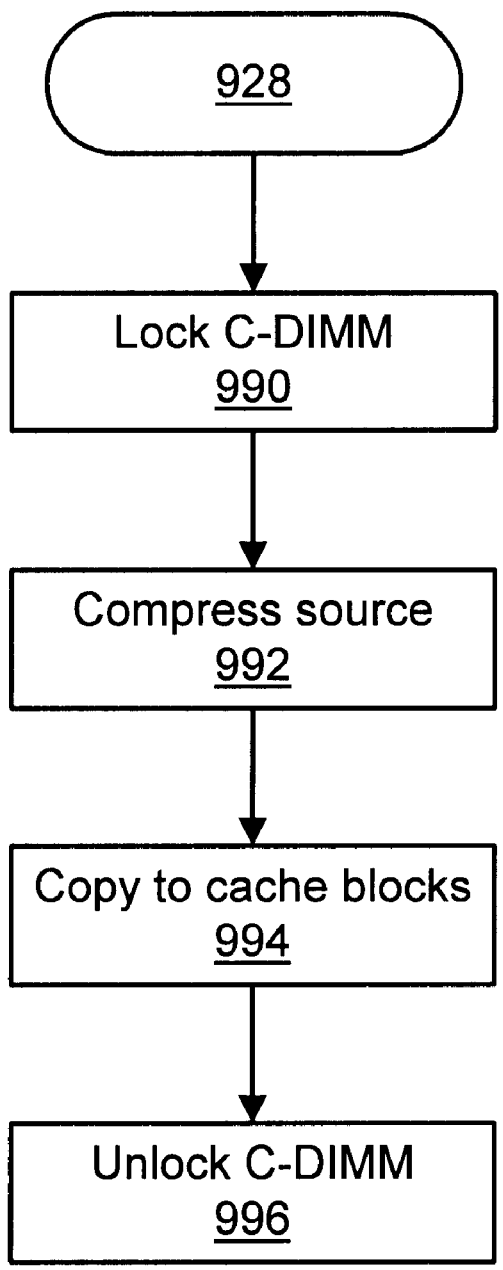
FIG. 21d is a flowchart expanding on step 928 of FIG. 21c and illustrating the C-DIMM device driver processing the write request according to one embodiment of the invention.

FIG. 21*d*—C-DIMM Device Driver Processing of a Write Request

FIG. 21*d* is a flowchart expanding on step 928 of FIG. 21*c* and illustrating the C-DIMM device driver processing the write request according to one embodiment of the invention. In step 990, the C-DIMM device driver may lock the C-DIMM. Preferably, a spin-lock is acquired to prevent operation from proceeding until the compression and writing of the one or more pages are complete. In step 892, the source data may be compressed on the Compactor Chip on the C-DIMM. The compressed data may be copied to the cache blocks 812 in the destination cache entry 804. In step 996, the C-DIMM is unlocked, and any acquired spin-locks are released.

Figure 21E:
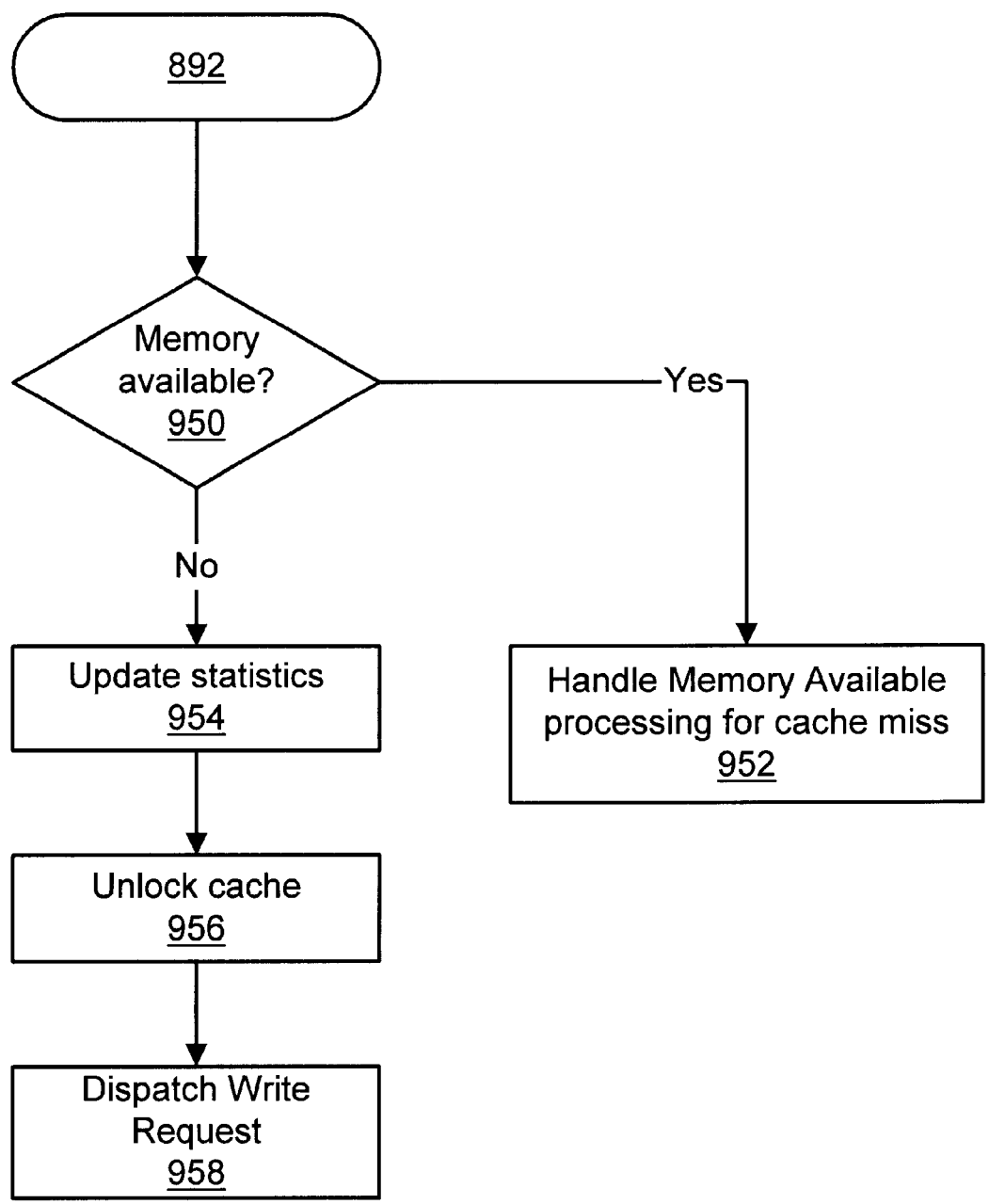
FIG. 21e is a flowchart expanding on step 892 of FIG. 21a and illustrating the processing of a cache miss according to one embodiment of the invention.

FIG. 21*e*—Processing a Cache Miss for a Write Request

FIG. 21*e* is a flowchart expanding on step 892 of FIG. 21*a,* and illustrates the processing of a cache miss for a write request according to one embodiment of the invention. In step 950, the write dispatch routine may check to see if enough memory is available, for instance in the compressed cache, to compress and write the one or more pages to the compressed cache. If enough memory is available, then processing is passed to step 952 for continued processing of the cache miss. Step 952 is further illustrated in FIG. 21*f*. If enough memory is not available as determined in step 950, then processing is passed to step 954.

In step 950, statistics for the compressed cache may be updated. In step 956, the compressed cache is unlocked, and any spin-locks acquired are released. In step 958, the I/O request received in step 880 may be passed to the next driver in the I/O stack for continued processing. Eventually, the appropriate driver for the device where the one or more pages are stored may receive and fulfill the I/O request.

Figure 21F:
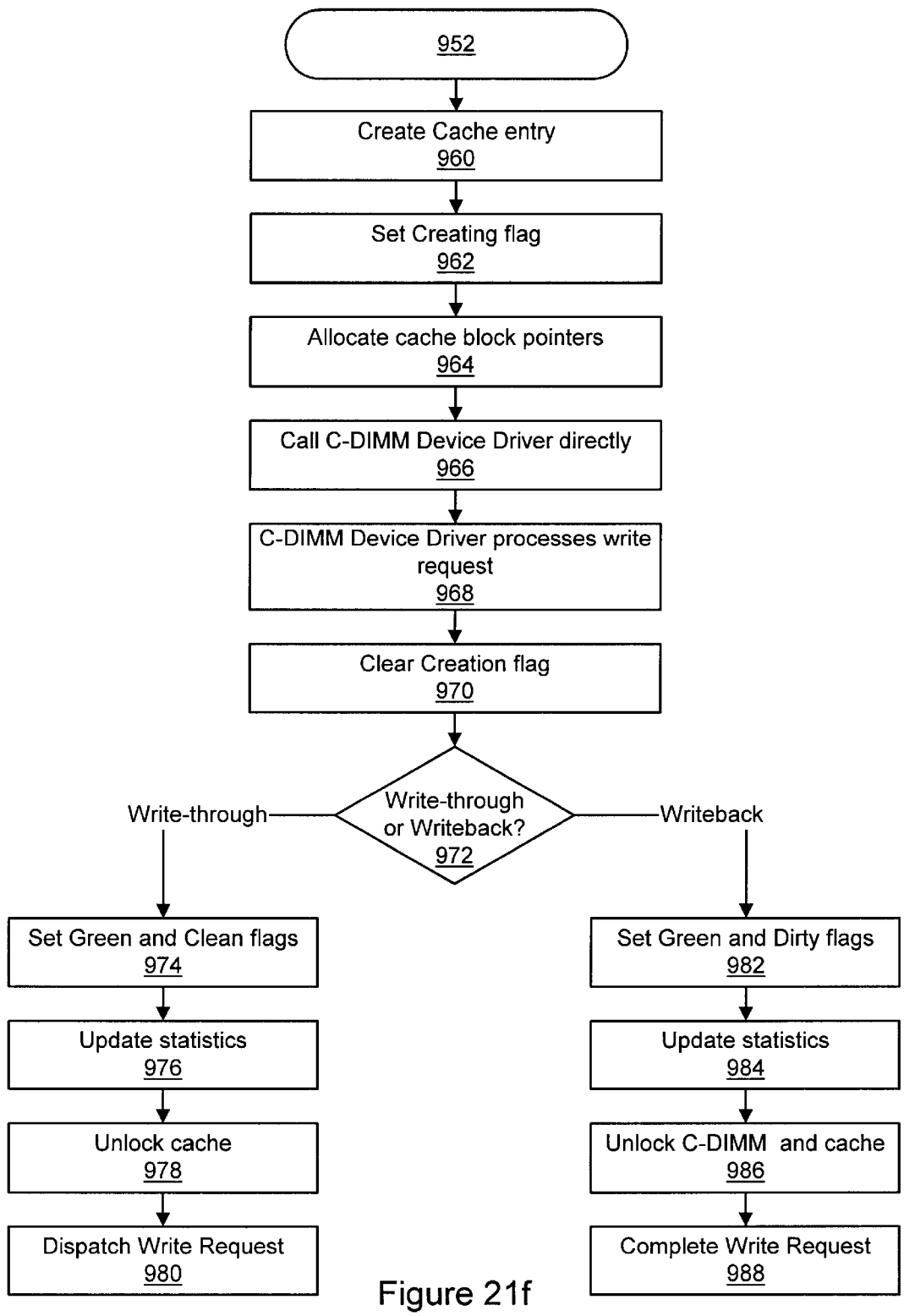
FIG. 21f is a flowchart expanding on step 952 of FIG. 21e and illustrating the processing of a cache miss when memory is available according to one embodiment of the invention.

FIG. 21*f*—Processing a Cache Miss for a Write Request

FIG. 21*f* is a flowchart expanding on step 952 of FIG. 21*e,* and illustrates the processing of a cache miss when memory is available according to one embodiment of the invention. In step 960, a new cache entry 804 may be created. Preferably, creating the new cache entry comprises retrieving a cache entry header 808 from a free-list of cache entry headers. In step 962, the Creating flag may be set for the cache entry 804 to indicate that it is in the process of being created. In step 964, cache block pointers 810 may be allocated. Preferably, allocating cache block pointers 810 comprises retrieving available cache block pointers 810 from the cache block pointer free-list. In step 966, the write dispatch routine to may call the C-DIMM device driver to compress and store the one or more pages to the cache entry 804. When calling the C-DIMM device driver, the write dispatch routine preferably passes pointers to the I/O request and destination compressed cache entry 804. Preferably, the C-DIMM device driver has access to all of the information needed to carry out the compression and write operations. In step 968, the C-DIMM device driver processes the write request passed to it by the write dispatch routine in step 966. Step 968 may be performed in a method similar to the method illustrated in FIG. 21*d*. In step 970, after the C-DIMM has completed the compression and writing of the one or more pages, the Creating flag for the cache entry 804 is cleared.

In step 972, if the write request is in write-through mode, then processing passes to step 974. If the write request is in writeback mode, then processing passed to step 982. In step 974, the Green and Clean flags are set for the cache entry 804. In step 976, the statistics for the compressed cache may be updated, in this case to indicate a cache hit on a write request. In step 978, the compressed cache is unlocked, and any acquired spin-locks are released. In step 980, a write-through I/O request for the one or more pages is dispatched to write the one or more pages to system memory.

When a cache entry 804 is created or replaced in write-through mode due to a write request, the source data is preferably compressed and copied into the cache entry 804 before the write-through I/O request is dispatched. Consequently, subsequent requests to the same page may result in a compressed cache hit, although the write-through request may still be pending. Alternatively, the source data may be compressed later in the dispatch routine after the write-through I/O request is dispatched, as long as the state of the compressed cache is updated prior to dispatching the write-through I/O request. The state of the compressed cache is updated to prevent stale data from being read from the compressed cache. Also, to minimize the number of times the compressed cache has to be locked, the source data is preferably compressed and copied into the cache entry 804 while the compressed cache is locked.

In step 982, the Green and Dirty flags are set for the cache entry 804. In step 984, the statistics for the compressed cache may be updated, in this case to indicate a cache hit on a write request. In step 986, the compressed cache is unlocked, the C-DIMM, if previously locked, is unlocked, and any acquired spin-locks are released. In step 988, the write I/O request received in step 880 of FIG. 21 a is completed.

Figure 22A:
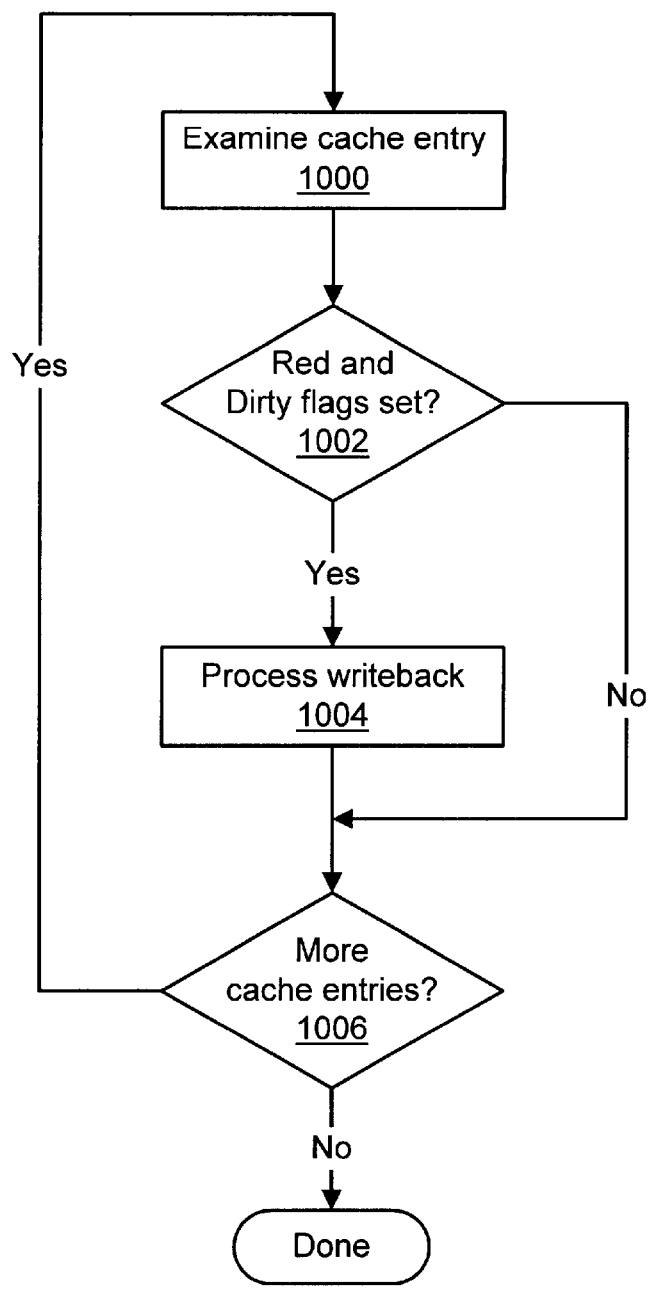
FIG. 22a is a flowchart illustrating the basic flow of a background routine when it finds a cache entry to writeback according to one embodiment of the invention.
Figures 22B, 22C:
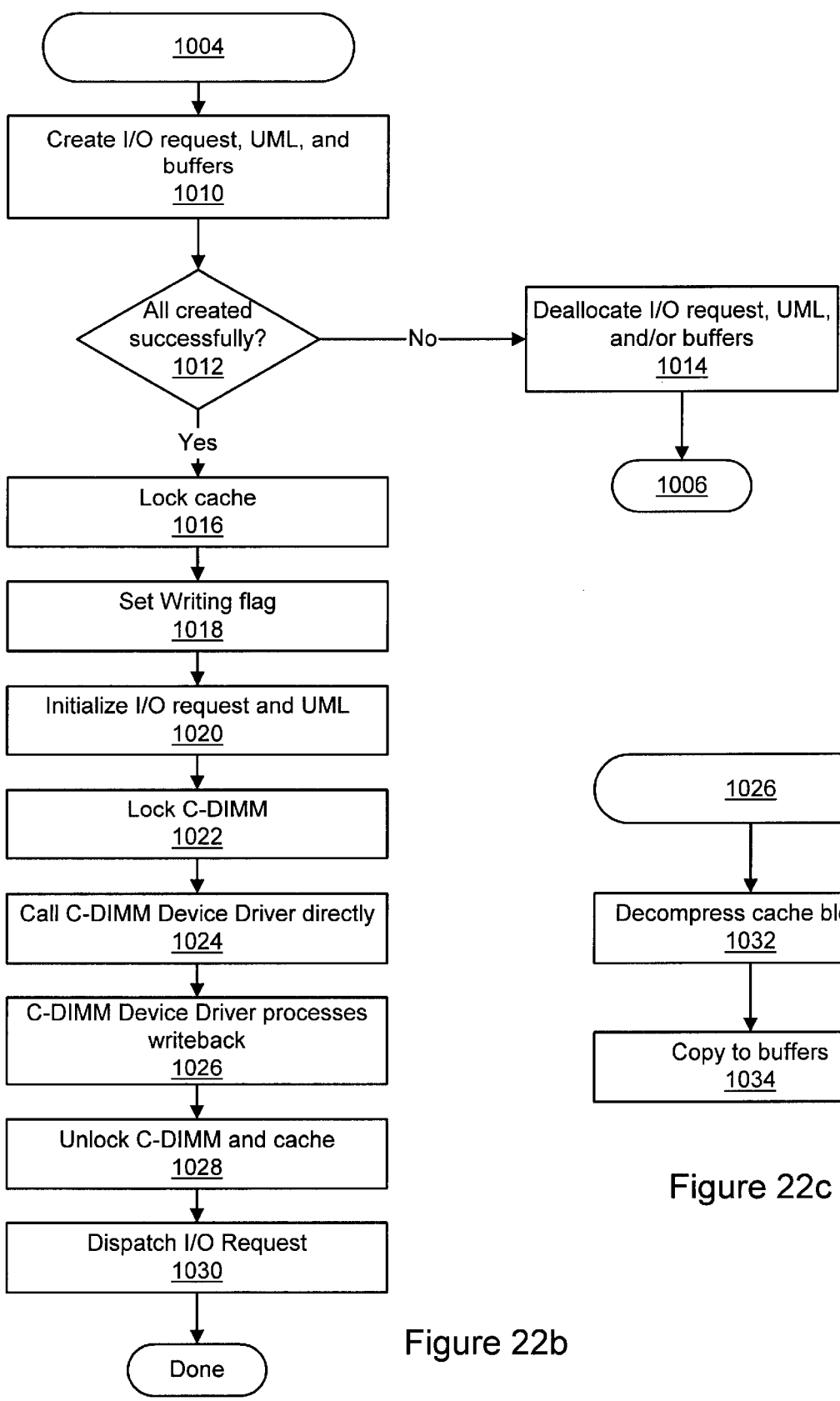
FIG. 22b is a flowchart expanding on step 1004 of FIG. 22a and illustrating the processing of a writeback according to one embodiment of the invention.
FIG. 22c is a flowchart expanding on step 1026 of FIG. 22b and illustrating the C-DIMM device driver processing the writeback according to one embodiment of the invention.

FIGS. 22*a* Through 22*c*—A Background Routine for Writing Back Cache Entries FIGS. 22*a* through 22*c* are flowcharts illustrating a background routine for finding and writing back cache entries according to one embodiment of the invention. Steps in the flowcharts may occur concurrently or in different orders.

FIG. 22*a*—Basic Flow of a Background Routine when it Finds a Cache Entry to Writeback FIG. 22*a* is a flowchart illustrating the basic flow of a background routine when it finds a cache entry to writeback according to one embodiment of the invention. The background routine may examine each cache entry 804 in each compressed cache in a loop, searching for cache entries 804 that are ready to be written back. In step 1000, the background routine may examine a first cache entry 804. In step 1002, if the cache entry's Red and Dirty flags are not set, then processing may jump to step 1006. In step 1002, if the cache entry's Red and Dirty flags are set, the cache entry 804 is ready to be written back, and processing may proceed to step 1004. In step 1004, the cache entry is written back. Step 1004 is further described in FIG. 22*b*. In FIG. 22*a,* after the cache entry 804 is written back, the method proceeds to step 1006. In step 1006, if there are more cache entries 804 to be examined, processing returns to step 1000. If there are no more cache entries 804 to be examined, then the checking for cache entries 804 ready to be written back is done.

In some embodiments, uncompressible data may be cached in the compressed cache under some conditions. Since the compressed cache may be competing with the operating system for main memory, the operating system may be deallocating pages that would normally remain cached.

FIG. 22*b*—Processing a Writeback

FIG. 22*b* is a flowchart expanding on step 1004 of FIG. 22*a* and illustrating the processing of a writeback according to one embodiment of the invention. In step 1010, structures and memory necessary for performing the writeback of the cache entry 804 are allocated. The structures and memory may include a structure for initiating an I/O request and a UML used to perform the writeback. Preferably, buffers are allocated for use in temporarily storing uncompressed data until the data can be written back to disk. In the event that an I/O request, UML or buffers cannot be created, one or more spare I/O requests, UMLs and buffers are preferably maintained for emergency use. If one of the spare resources can not be obtained by the background routine, then in step 1014 the background routine preferably returns any spare resources already obtained and, if there are more cache entries 804, proceeds to the next cache entry 804 (step 1006 of FIG. 22*a*). If the allocation of the structures and memory for performing the writeback was successful, then in step 1012 the method proceeds to step 1016. The background routine preferably does not attempt to create I/O requests, UMLs or buffers while either a compressed cache partition or a C-DIMM is locked.

In step 1016, the compressed cache may be locked to prevent any other processes from accessing the compressed cache while the writeback is being performed. In step 1018, the Writing flag for the cache entry 804 is set. In step 1020, the I/O request and UML allocated in step 1010 are initialized. Any fields, pointers, flags, etc. necessary to perform the writeback are initialized. In step 1022, the C-DIMM may be locked to prevent any other processes from accessing the C-DIMM during C-DIMM processing. The background routine may then call the C-DIMM device driver in step 1024 to decompress the cache entry 804. When calling the C-DIMM device driver, the background routine preferably passes pointers to the I/O request, buffers, UML, and compressed cache entry 804. Preferably, the C-DIMM device driver has access to all of the information needed to carry out the decompression operation. In step 1026, the C-DIMM device driver decompresses the cache entry 804. Step 1026 is further illustrated in FIG. 22*c*. In step 1028 of FIG. 22*b,* after the C-DIMM has completed the decompression, the background routine may unlock the C-DIMM and compressed cache. Any acquired spin-locks are released. In step 1030, the I/O request previously allocated and initialized is dispatched to complete the writeback operation by writing the uncompressed data in the buffers to disk. The I/O request includes the location of the buffers containing the data decompressed in step 1026.

FIG. 22*c*—C-DIMM Device Driver Processing of a Writeback

FIG. 22*c* is a flowchart expanding on step 1026 of FIG. 22*b* and illustrating the C-DIMM device driver processing the writeback according to one embodiment of the invention. In step 1032, the cache blocks 812 in the cache entry 804 containing the compressed pages to be written back are decompressed using the Compactor Chip on the C-DIMM. The C-DIMM device driver then copies the decompressed pages to the buffers allocated in step 1010 of FIG. 22*b.*

Figure 23:
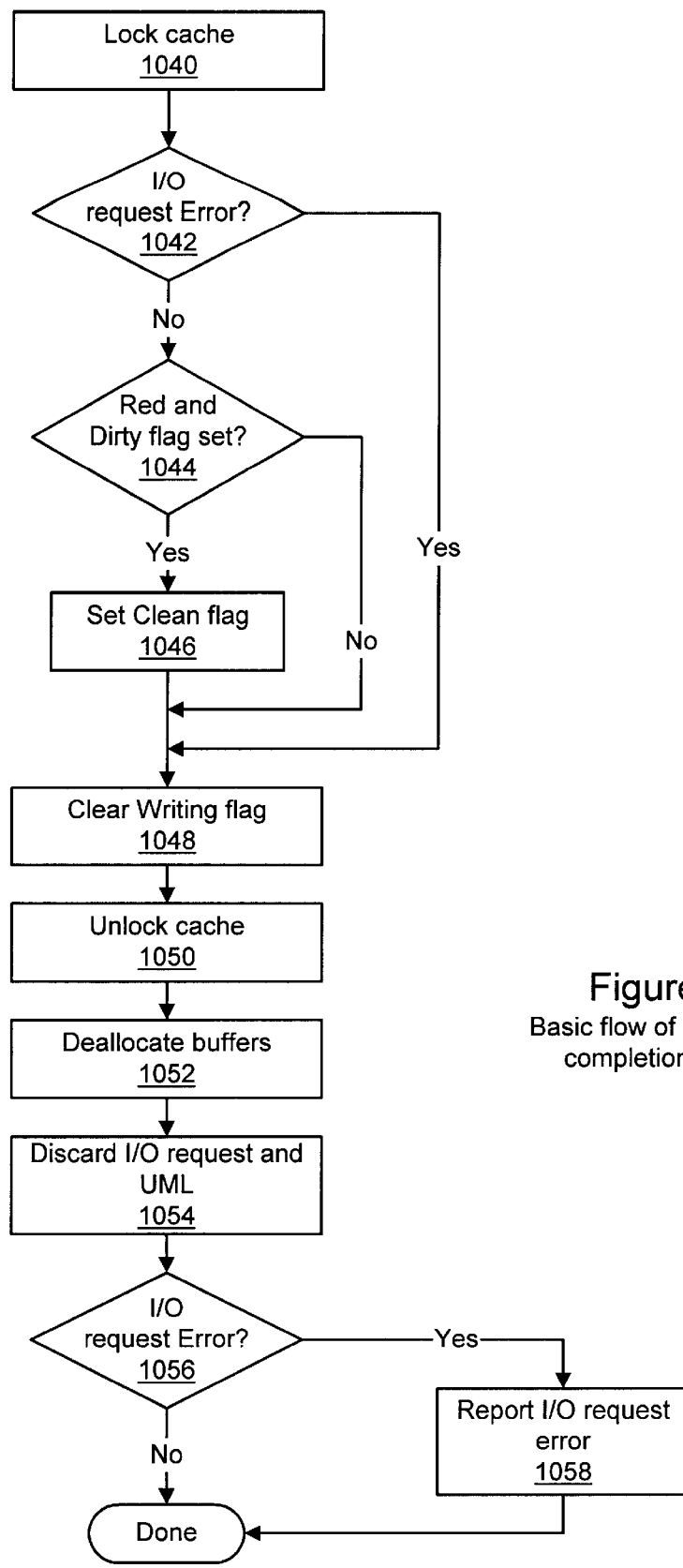
FIG. 23 is a flowchart illustrating the basic flow of an I/O request completion routine according to one embodiment of the invention.

FIG. 23—Basic Flow of Resulting I/O Request Completion Routine

FIG. 23 is a flowchart illustrating an I/O request completion routine resulting from a writeback operation as illustrated in FIGS. 22*a* through 22*c* according to one embodiment of the invention. Steps in the flowchart may occur concurrently or in different orders.

In step 1042, the completion routine may check to see if the I/O request dispatched in step 1030 of FIG. 22*b* generated any errors. If an error was generated, then the writeback may have failed, and processing jumps to step 1048, not marking the cache entry as Clean. If no errors were generated, then the method proceeds to step 1044. In one embodiment, if the I/O completion routine detects an I/O request error, the writeback operation of FIGS. 22*a* through 22*c* may be retried at least once.

In step 1044, the completion routine may check the cache entry 804 to see if the Red and Dirty flags are set. If the Red flag is not set when the completion routine is ready to update the compressed cache entry 804, then the completion routine preferably does not set the Clean flag, and jumps to step 1048. This condition may indicate that the compressed cache entry 804 was overwritten during the writeback and is therefore dirty. If the Red and Dirty flags are set, then the Clean flag may be set for the cache entry 804 in step 1046.

In step 1048, the Writing flag set in step 1018 of FIG. 22*b* is cleared. In step 1050, the compressed cache, locked in step 1040, is unlocked. Preferably, in steps 1052 and 1054, the completion routine deallocates I/O requests, UMLs and temporary buffers that the background routine created in step 1010 of FIG. 22*b*. Preferably, the spare I/O requests, UMLs and buffers that belong to background routine are not deallocated. Instead, they are preferably retained for future use.

In one embodiment, when an I/O request that the background routine created and dispatched returns a status error, the error is reported to the operating system in step 1058.

FIG. 24—Various Data Transfers that are Possible Through the CCM

FIG. 24 is a table illustrating examples of possible data transfers through the CCM according to one embodiment of the present invention. The first column contains the I/O request type (read or write). The second column contains the state of the requested data on the disk. The third column contains the state of the requested data in the compressed cache. The fourth column contains the state of the requested data in virtual memory. The fifth column contains the transfer sequence of the requested data to meet the request. The sixth column contains a brief description of the data transfer. All compression and decompression operations may be performed on a Compactor Chip located on a C-DIMM or elsewhere in the system.

The first row in the table illustrates a virtual memory (VM) read request that "hits" in the compressed cache (CC). The compressed data (one or more pages) are decompressed and copied into VM. The second row illustrates a VM read request for data that is not cacheable or that generates a CC "miss." The request is passed through by the CCM and the requested data are copied directly from disk to VM. The third row illustrates a CC prefetch operation on a read request. Pages that are probable to be accessed, based upon an examination of the read request by the CCM, may be read from disk, compressed, and copied into the CC. The fourth row illustrates a VM write operation in writeback mode. The data may be compressed and copied into the CC. The fifth row illustrates a VM write of non-cacheable data. The CCM allows the request to pass through, and the data is written directly from VM to disk. The sixth row illustrates a VM write in write-through mode, with a CC allocation or hit. The data are compressed and written into the CC, and are also written to disk directly from the VM in uncompressed form. The seventh row illustrates a CC writeback operation as illustrated in FIGS. 22*a* through 22*c*. The data in the CC is decompressed and copied to the disk.

FIG. 25—Examples of Ways the CCM Handles I/O Requests Based on the Type of Operation Being Performed FIG. 25 is a table illustrating the handling of I/O requests by the CCM according to one embodiment of the invention. In one embodiment, the CCM only supports IRP-based I/O requests. Alternatively, the CCM may also support "fast" I/O requests. As illustrated in FIG. 25, the CCM may handle I/O requests in various ways based on the type of operation being performed. An I/O request preferably does not have to be altered when it is simply passed through. An example of an action that may be performed when an I/O request is simply passed through is calling the next driver in the I/O stack. Preferably, an I/O completion routine is not set for I/O requests that are passed through.

The first column of FIG. 25 contains the basic I/O operation of the I/O request. Column two contains the I/O request handling performed by the CCM in response to the corresponding I/O operation.

Figure 26:
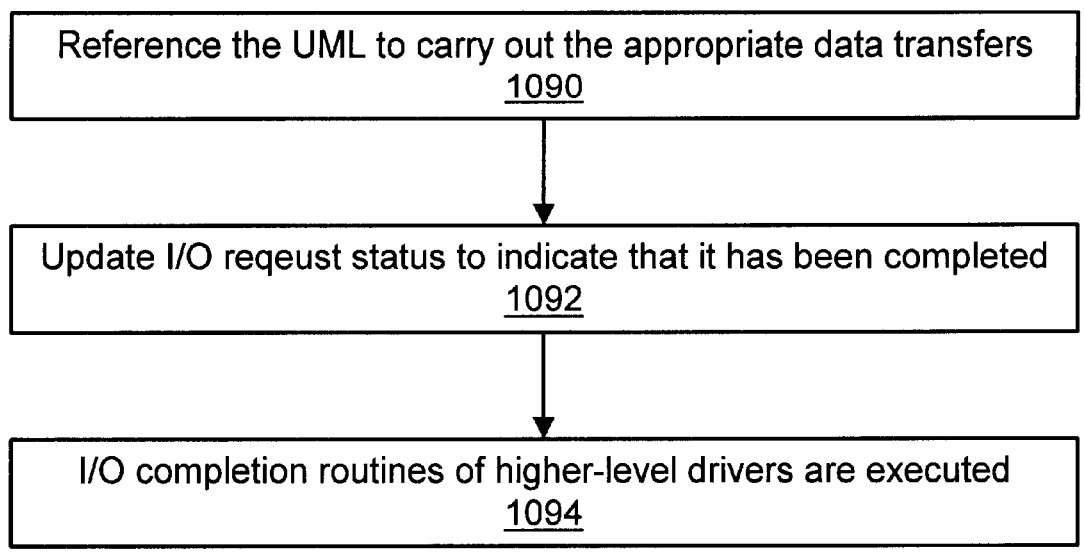
FIG. 26 is a flowchart illustrating actions that may be performed when an I/O request is completed according to one embodiment of the invention.

FIG. 26—Actions Performed when an I/O Request is Completed

FIG. 26 illustrates examples of actions that may be performed when an I/O request is completed according to one embodiment of the invention. Examples of actions that may be performed when an I/O request is completed include, but are not limited to:

Referencing the UML to carry out the appropriate data transfers (step 1090)

Updating the I/O request status to indicate that it has been completed (step 1092)

Calling an I/O Complete Request function to cause the I/O completion routines of higher-level drivers to be executed (step 1094)

Note that the actions may appear in any order, one or more of the actions may not be performed, and one or more actions may be performed concurrently.

If a Paging I/O bit is set in an I/O request's flags, then the I/O request's I/O status information is preferably set to nonzero when terminating the I/O request.

When a driver has finished processing an I/O request, the driver may call an I/O Complete Request function. The I/O Manager may check the I/O request to determine whether any higher-level drivers have set up an I/O completion routine for the I/O request. If so, each I/O completion routine may be called until every driver in the I/O stack has completed the I/O request.

Preferably, the CCM does not call the next higher-level driver's I/O completion routine directly.

Figure 27:
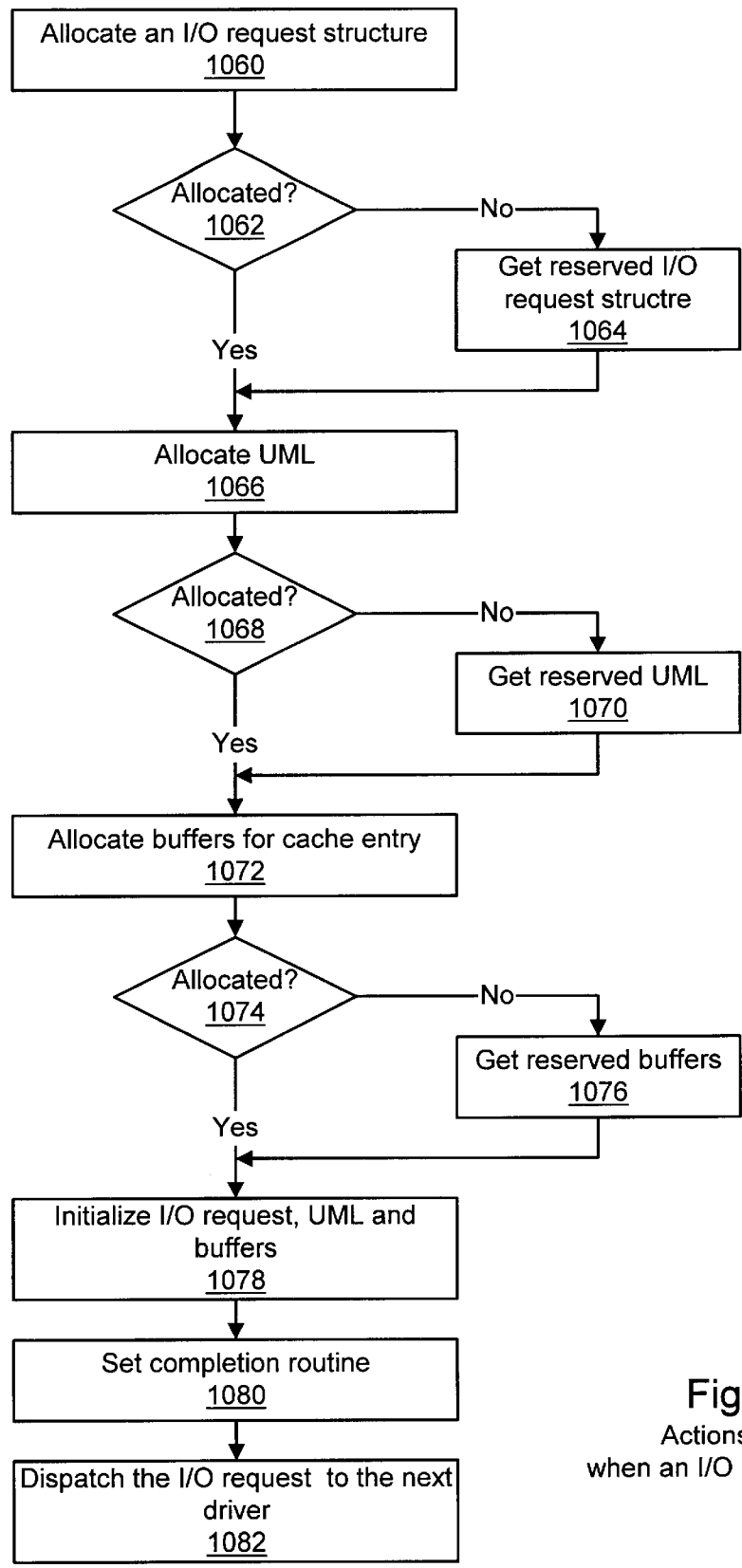
FIG. 27 is a flowchart illustrating actions that may be performed when an I/O request is created according to one embodiment of the invention.

FIG. 27—Actions Performed when an I/O Request is Created

FIG. 27 is a flowchart illustrating various actions that may be performed when an I/O request is created, according to one embodiment of the invention. Note that the actions may appear in any order, and two or more actions may be performed concurrently.

In step 1060, an I/O request may be allocated. In one embodiment, an Allocate I/O request function may be called to allocate the I/O request. If an I/O request is not successfully allocated, one of the I/O requests reserved by the CCM may be retrieved in step 1064. In step 1066, an UML may be allocated. If an UML is not successfully allocated, one of the UMLs reserved by the CCM may be retrieved in step 1070. In step 1072, buffers to store the uncompressed cache entry 804 may be allocated. If buffers are not successfully allocated, one or more of the buffers reserved by the CCM may be retrieved in step 1076. In step 1078, the I/O request, UML and buffers may be initialized. A completion routine used to update the compressed cache and free the I/O request, UML and buffers may be set in step 1080. In one embodiment, a Set Completion routine may be used. The I/O request may be dispatched to the next driver in the I/O stack in step 1082. In one embodiment, a Call Driver routine may be used.

In one embodiment, information may be stored in the cache entry 804 or in other local objects and used to allocate and initialize the I/O request, UML and buffers so that the I/O request may be dispatched to the next driver in the I/O stack and eventually reach the intended device driver.

The I/O request is preferably initialized as an asynchronous request. If the I/O request is asynchronous, the background routine preferably does not wait for the I/O request to be completed (i.e. does not "block" on the event). The completion routine for the I/O stack location may be bypassed. In one embodiment, a Skip Current I/O request Stack Location function may be used to bypass the completion routine.

The following is an example of code that may be used to scroll down an I/O request's associated I/O stack locations:

IRS->CurrentLocation++;
IRS->Tail.Overlay.CurrentStackLocation++;

A Get Current I/O request Stack Location function may be used to return to the current I/O stack location.

UML Handling

Some embodiments may only support UML-based (or Direct I/O) data transfers. Some embodiments may also support Buffered I/O. A third type of I/O called Neither I/O preferably does not have to be supported, since drivers for storage devices do not use Neither I/O because their dispatch routines are called in an arbitrary thread context.

When a read or write request results in a decompressed or compressed data transfer, the C-DIMM Device Driver (CDD) is preferably called directly along with a pointer to the I/O request and attached UML. Preferably, the CDD may directly access the buffers associated with the UML since the CDD routines are executing as part of the same thread context.

Preferably, the completion routine is called in an arbitrary thread context. This means that the buffers specified in the UML that are accessible in the dispatch routine may not be accessible in the completion routine. Therefore, data transfers are preferably performed in the dispatch routine whenever possible. Alternatively, the dispatch routine may create an additional UML, map the UML to the user addresses of the original UML, and then pass the new UML to the completion routine using the context parameter of the completion routine. In the completion routine, the new UML may be used to access the memory. When the data transfer is complete, the UML may be discarded.

A Memory Manager Probe and Lock Pages function is preferably used to lock the buffers described by the UML of the I/O request into memory. The I/O Manager preferably unlocks these buffers if the I/O completion routine calls an I/O Complete Request function. Alternatively, the I/O completion routine is responsible for unlocking these buffers.

The background routine preferably sets up a User Buffer and makes the appropriate calls to the I/O manager to create an UML for the User Buffer. In one embodiment, in the completion routine, the UML unlocks the User Buffer by calling a Memory Manager Unmap Locked Pages function and a Memory Manager Unlock Pages function before freeing the I/O request.

FIG. 28—Various Types of Data Transfers that are Supported

FIG. 28 illustrates various types of data transfers that may be supported when the CCM calls the C-DIMM Device Driver (CDD) directly according to one embodiment of the invention.

When the CCM calls the CDD directly, it preferably passes the CDD a pointer to the I/O request and a pointer to the cache entry 804. An additional parameter or function call may be provided to distinguish between the various types of data transfers that are supported as illustrated in FIG. 28.

Since the CDD may not have to deal with hardware interrupts and queues, the interface between the CCM and CDD is preferably simple. When the CCM calls the CDD directly, control is preferably not returned to the CCM until the compression or decompression and copy is complete.

The CDD may provide a method that allows the CCM to acquire a spin-lock from the CDD. Since the CDD may be managing more than one C-DIMM, it is preferably up to the CDD to decide which C-DIMM spin-lock to acquire.

FIGS. 29 Through 41—The Compressed Disk and the Compressed Disk Manager

FIGS. 29 through 41 illustrate the organization of a Compressed Disk, Compressed Page Allocation Table (CPAT) cache, and the I/O request processing performed by the Compressed Disk Manager (CDM) according to one embodiment of the invention.

Figure 29:
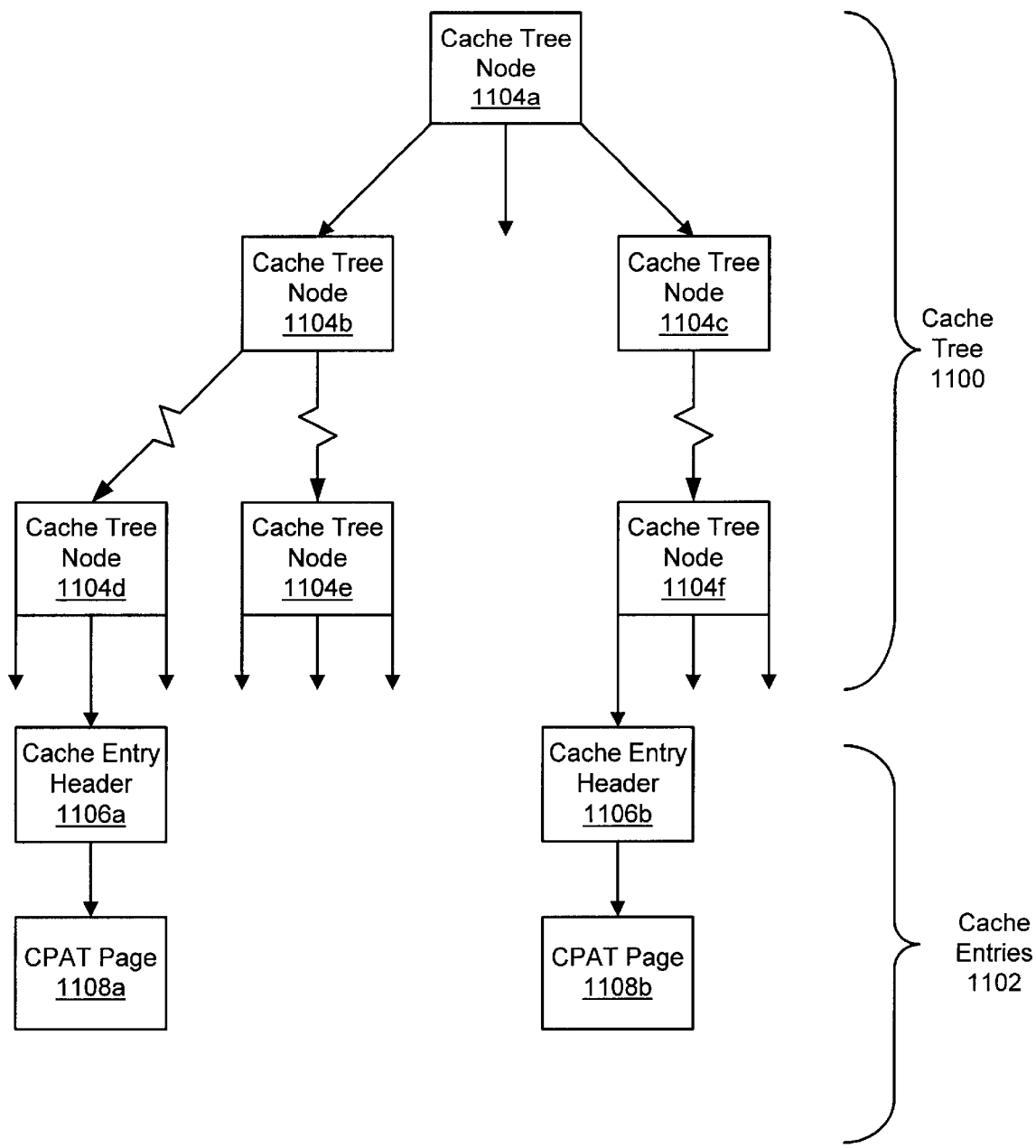
FIG. 29 illustrates a CPAT cache organization according to one embodiment of the invention.

FIG. 29—CPAT Cache Organization

FIG. 29 illustrates one embodiment of a structure for managing a compressed disk. Preferably, the Compressed Disk Manager (CDM) decreases the size of the data transfers across the I/O buses without changing disk capacity. In the preferred embodiment, compressed data are stored in regions of the disk that are the same size as the regions would be for the uncompressed data. In this embodiment, the performance advantages of compression can be achieved without having to deal with disks that vary in size due to compression. Overall I/O bandwidth is reduced because data transfers of the compressed data across the I/O buses are smaller than data transfers of the same data in uncompressed form would be. Furthermore, any data that is cached between main memory and the actual storage device benefits due to an improved cache hit rate. For example, it is common for storage adapters to include caches.

As an example, in a system where data is managed in 4 KB pages, and data is stored on disk in 512 B sectors, an uncompressed page would normally take up 8 sectors on disk. With compression, a page could be compressed into fewer sectors. The compressed page could be stored on disk starting at the first physical sector to which the uncompressed page would normally be written, leaving the remaining sectors associated with the page unused. Preferably, no attempt is made to use the unused sectors following the compressed data. In essence, the disk is being managed on a physical page basis.

Alternatively, the CDM may increase useable disk capacity by storing compressed data in regions of memory smaller than would be occupied by the same data in uncompressed form. Using the example above, if the uncompressed page compressed to two sectors, the compressed data may be stored in two sectors on the disk without leaving any unused sectors in a page.

Compressed Page Allocation Tables

To manage a disk in this way, a Compressed Page Allocation Table (CPAT) is maintained. One of the uses of the CPAT is to track the number of sectors that each page actually uses. For example, when the system requests a page that has been compressed, then the CPAT may be accessed to determine the actual number of sectors to read from disk. Once the compressed data has been transferred, the data may be decompressed and transferred to its normal uncompressed destination.

Assuming 3-bits per page to track a page stored as eight sectors as in the above example, a 4 GB disk would require a 384 KB CPAT. This is based on the following calculation:

$$(\text{power}(2, 32-12) * 3/8)$$

where:
(power(2, 32–12)) yields the number of 4096-byte pages that will fit on a 4 GB disk;
3 is the number of bits used to represent 8 512-byte sectors used to store a page; and
8 is the number of bits in a byte.

Thus, the CPAT uses a relatively small amount of disk space, and may be cached in main memory as needed. In one embodiment, a value of zero may be used to indicate that the page is not compressed.

Preferably, existing disks, partitions and file systems may be turned into compressed disk storage "on the fly." A CPAT file of all zeros may be added to a disk, partition or file system at any time. Subsequent accesses to the storage device may begin compressing pages and updating the CPAT as required.

Preferably, a CPAT may be managed and cached in main memory on a 4 KB-page basis. Each 4 KB CPAT page may represent approximately 48 MB of disk space. This may allow portions of CPATs from other storage devices to be cached as well.

CPAT Cache Organization

Each CPAT cache may include a cache tree 1100 and one or more cache entries 1102. The cache tree 1100 may be constructed of linked cache tree nodes 1104. A cache entry 1102 may include a cache entry header 1106 and a CPAT page block 1108. Each CPAT page 1108 may be stored and accessed from the CPAT cache based on a unique cache address. In one embodiment, a unique cache address may be extracted from a 64-bit starting offset and 64-bit length stored in the I/O request. The unique cache address is preferably extracted in a similar way that other device drivers (e.g. floppy device driver) extract cylinder, track and sector numbers.

Some number of lower address bits may be ignored based on the number of data pages represented by a CPAT page 1108 times the data page size. The data page, data sector and CPAT page sizes are preferably configurable. In one embodiment, the size of a data page and CPAT page 1108 may be 4 KB, and the size of a data sector may be 512 B. The CPAT cache tree 1100 is preferably architected to cache CPAT pages 1108 of arbitrary size representing data pages of arbitrary size.

In one embodiment, a CPAT may be associated with any Device Object as specified by a user based on input from a configuration utility. Each CPAT is preferably managed separately (i.e. it has its own cache).

The configuration utility preferably allows a user to create and associate a CPAT with smaller objects such as partitions, sub-partitions and file systems, as well as larger objects such as arrays of Device Objects. Sub-partitions may be based on sector ranges, types of I/O requests, etc.

In one embodiment, swap files and swap partitions may be isolated and managed as compressed disk storage. In one embodiment, CPAT pages 1108 associated with swap space may be cached separately from other, non-swap CPAT pages. In one embodiment, CPAT pages 1108 associated with swap space may be cached in writeback mode.

CPAT Cache Tree

In one embodiment, each CPAT cache is fully associative. A fully associative cache is one in which an address (block) may be located anywhere in the cache. In another embodiment, each CPAT cache is direct-mapped. A direct-mapped cache is one in which a block may be located in only one place in the cache. In yet another embodiment, each CPAT cache is set-associative. A set-associative cache is one in which a block may be in one of a few (usually 2 to 8) places in the cache. Other embodiments may include combinations of fully associative, direct-mapped, and set-associative CPAT caches.

The CPAT cache tree 1100 is preferably organized for quick searching. In one embodiment, the CPAT cache tree 1100 may be derived from a B-tree. Address bits may be grouped together and decoded at each level in the tree in cache tree nodes 1104. For a given level, the corresponding address bits may be used to index into an array of cache tree nodes 1104 at the next level. An optimal array size for each level in the cache tree 1100 is preferably used to minimize the directory search time and the overall memory space needed. For example, an optimal array size may be 16 based on decoding 4 address bits per level. The number of address bits evaluated at each level in the cache tree 1100 is preferably configurable.

Preferably, a CPAT cache may dynamically grow and shrink in size without having to reorganize the cache tree 1100 and cache entries 1102. Preferably, only sparse portions of the cache tree 1100 may exist at any given time. In one embodiment, although non-paged user-space is pre-allocated during driver initialization, the directory is initially empty, and no CPAT cache entries 1102 exist. The CPAT cache is preferably built dynamically based on disk access patterns.

If 4 address bits are grouped together per level, then an object associated with a particular branch and level in the CPAT cache tree 1100 may look like the following:

struct STreeNode {STreeNode* pNxtTreeNode} TreeNode[16].

If pNxtTreeNode is NULL, then it is not currently in use.

CPAT Cache Entries

In one embodiment, each CPAT cache entry header 1106 may point to one CPAT page block 1108. Each CPAT page 1108 may include one or more packed bit fields. Each field may indicate the number of data sectors used to compressed a page. Each CPAT page 1108 may describe a contiguous set of compressed pages. Each CPAT cache entry 1102 preferably includes pointers so that an LRU linked-list of CPAT cache entries 1102 may be maintained.

Each CPAT cache entry header 1106 preferably includes a flags (or state) field. Some read and write requests may require one or more requests to be performed. In addition, the CPAT cache may be a shared resource, and the flags may be used in managing the sharing of the resource.

CPAT Cache Free-Lists

One embodiment may include a CPAT cache entry header free-list, a linked-list of unused CPAT cache entry headers 1106. The LRU pointers may be used to build this linked-list. One embodiment may include a CPAT page free-list, a linked-list of unused CPAT page blocks 1108. Since there may be a CPAT cache entry header 1106 for every CPAT page block 1108, the CPAT cache entry header free-list may be used to keep track of unused CPAT page blocks 1108.

One embodiment may include a CPAT cache tree node free-list, a linked-list of unused CPAT tree pointers 1104. Any of the existing pointers may be used to build this linked-list. When new CPAT cache entry header 1106 is needed, the next unused cache entry header 1106 is preferably removed from the top of the free-list and attached to the appropriate cache tree node 1104. Preferably, an unused CPAT page block 1108 is already attached to the new cache entry header 1106. When a CPAT cache entry header 1106 is deallocated, the cache entry header 1106 is preferably detached from the cache tree node 1104 and attached to the end of the free-list.

Synchronizing CPAT Cache Accesses

CPAT caches may be shared resources. Preferably, accesses and updates to a CPAT cache are synchronized. A spin-lock is preferably used to synchronize these accesses. In one embodiment, since there is likely to be more than one CPAT cache, a separate spin-lock may be used for each CPAT cache.

In multiprocessor systems, when a particular thread can't gain access to a particular CPAT cache, the thread stalls until the spin-lock can be acquired. Once the spin-lock is acquired, the thread resumes execution at a higher priority level until the thread releases the spin-lock.

Preferably, spin-locks are only retained for a maximum time, for example, approximately 25 µs. If an operation needs to acquire the same spin-lock more than once within the time, for example, 25 µs, then the spin-lock is preferably acquired once and retained throughout the operation. If an operation needs to acquire more than one spin-lock over the duration of the operation, then preferably all spin-locks are acquired before proceeding and retained throughout the operation. The operation acquiring the spin locks before proceeding may be necessary to avoid deadlocks.

In one embodiment, the CPAT cache and C-DIMM device driver are shared resources. When a thread wants to use only one of these resources, it may acquire a spin-lock associated with the resource. If a thread may potentially use both resources, it preferably acquires both spin-locks before proceeding. To prevent deadlocks, the spin-locks are preferably acquired in the same order. Once finished, the spin-locks may be released in any order. Alternatively, an operation may acquire a CPAT cache spin-lock, use the CPAT cache, acquire a C-DIMM device driver spin-lock, use both resources, release the C-DIMM device driver spin-lock, use the CPAT cache, and finally release the CPAT cache spin-lock. All system objects, resources, memory, etc. that may be needed to perform an operation while one or more spin-locks are owned are preferably allocated prior to acquiring the spin-locks to minimize the duration of the operation owning the spin-locks.

Although spin-locks are preferred, alternatively the thread priority may be raised. A function such as:

KeSetPriorityThread(KeGetCurrentThread( ), . . . ) may be used to set the thread priority.

CPAT Cache Entry Lookups

Since the contents of a CPAT cache can change at any time, cache lookups are preferably synchronized with other accesses to the same CPAT cache. Therefore, a spin-lock is preferably acquired before performing a CPAT cache lookup.

The cache address may be extracted from the starting address in the I/O request. The cache address may be used to traverse the cache tree 1100. In one embodiment, if a NULL pointer is reached before reaching a cache entry 1102, then the result is a cache miss. If a cache entry 1102 is reached, then the result is a cache hit. Preferably, the appropriate statistics are updated each time a cache lookup is performed.

Allocating Cache Entries

Since the contents of a CPAT cache may change at any time, cache allocations are preferably synchronized with other accesses to the same CPAT cache. Therefore, a spin-lock is preferably acquired before allocating a cache entry 1102.

The following describes one embodiment of a process for allocating cache entries 1102. Preferably, a check is performed to verify that an unused cache entry header 1106 is available on the free-list before attempting to allocate a new cache entry 1102. The appropriate spin-lock is preferably acquired. The appropriate cache tree nodes 1104 are preferably added to the cache tree 1100 based on the cache address. An unused cache entry header 1106 is preferably attached to the last tree pointer 1104. The CPAT page is preferably copied into the unused CPAT page block 1108 pointed to by the new cache entry header 1106. The cache entry header 1106 is updated, and the spin-lock is released.

Cache entry headers 1106 and their associated CPAT page blocks 1108 are preferably allocated and deallocated using circular free-lists. Cache entry headers 1106 and CPAT page blocks 1108 are preferably allocated from one end of the circular free-lists, and deallocated from the other end. Consequently, cache entry headers 1106 and CPAT page blocks 1108 may be allocated using least recently used memory, thus minimizing the amount of memory fragmentation, making it easier to deallocate memory, such as when the CPAT cache needs to shrink.

Updating CPAT Cache Entries

Since the contents of a CPAT cache may change at any time, cache updates are preferably synchronized with other accesses to the same CPAT cache. Therefore, a spin-lock is preferably acquired before updating a cache entry 1102. Several circumstances may require a CPAT cache to be updated. For these circumstances, the CPAT cache tree 1100, associated cache entries 1102 including cache entry headers 1106 and CPAT page blocks 1108 may already exist. Examples of circumstances requiring compressed cache updating may include, but are not limited to:

When a CPAT page writeback is started and completed from the cache.

When a CPAT page write-through is started and completed from the cache.

When a CPAT page read is started and completed in the cache.

When a CPAT page needs to be updated in the cache.

When a background thread updates state information in a cache entry 1102.

Flushing the CPAT Cache

In one embodiment, a cache flush operation may be provided that causes the CPAT cache to writeback every CPAT page 1108 that is dirty. In one embodiment, a method may be provided to invalidate the entire CPAT cache. One or more software routines may be provided for use by the file system filter drivers to flush the cache manager. These software routines may perform tasks such as flushing the cache and purging a cache section. The software routines for flushing the cache manager may be called from an I/O completion routine.

Background Processing

A configurable custom timer is preferably used to schedule the execution of one or more background tasks or threads. In some embodiments, the granularity of the custom timer may be less than one second. For each CPAT cache, examples of operations that are the responsibility of the background task or thread may include, but are not limited to:

Determining whether additional memory needs to be pre-allocated for CPAT cache use.

Pre-allocating non-paged user-space for future CPAT cache use.

Initializing and updating the appropriate CPAT cache free-list structures based on new memory being allocated.

Determining whether any CPAT cache entries 1102 need to be written back to disk.

Determining whether any CPAT cache entries 1102 need to be invalidated.

Determining whether any memory previously allocated for CPAT cache use should be deallocated.

Deallocating unused CPAT cache space.

Updating the appropriate CPAT cache free-list structures based on memory being deallocated.

Background threads preferably base their decisions on statistics, CPAT cache state, LRU linked-lists, etc.

Memory Allocation

In one embodiment, non-paged user-space memory may be dynamically allocated in the background for CPAT cache use. A background thread may be responsible for allocating and deallocating non-paged memory since attempts to allocate non-paged memory may fail. Whenever a new CPAT cache entry 1102 needs to be created, the non-paged memory may already be available. If it is not available, then one of the CPAT pages 1108 in the cache may be replaced.

The maximum amount of main memory available for CPAT cache use is preferably configurable. Non-paged memory may be allocated until the CPAT cache size has reached its configured maximum limit, or until the operating system won't allow any more non-paged memory space to be allocated.

The memory allocation manager preferably attempts to allocate a configurable number of non-paged user-space pages (e.g. 1024 pages) at a time for CPAT cache use. These pages are preferably divided up into cache tree nodes 1104, cache entry headers 1106, and CPAT page blocks 1108. To make tracking easier, the various types of cache structures are preferably not mixed within a single page. Memory is preferably allocated based on statistics gathered on a per CPAT cache basis.

Since memory allocation and deallocation may occur in the background (i.e. not specific to any one Device Object), memory is preferably allocated on behalf of all CPAT caches. In other words, newly allocated memory is preferably available for use by any one of the CPAT caches.

Several user-mode routines may be available to allocate non-paged user-space. Preferably, kernel-mode drivers may also use these methods. Alternatively, kernel-mode drivers may allocate non-paged system-space. The non-paged system-space pool may be a limited resource. The CPAT caches preferably do not use a lot of memory.

In one embodiment, the configuration utility may save one or more CPAT cache parameters in a file, for example, in the registry. Examples of CPAT cache parameters that may be saved include, but are not limited to: desired amount of non-paged system-space, non-paged user-space, CPAT cache space, etc. The saved parameters may be retrieved and used by the CDM during Driver Entry.

In one embodiment, key operating system pools (e.g. non-paged system-space and non-paged user-space) may be tuned so that additional memory may be allocated for CPAT cache use.

Memory Deallocation

In one embodiment, in order for a page to be deallocated back the system, it preferably does not have any valid CPAT cache structures like cache tree nodes 1104, cache entry headers 1106, or CPAT page blocks 1108 in it. In one embodiment, once the cache writeback and deallocation background routines have made a pass over the CPAT cache, a memory deallocation routine may query statistics and look for unused pages of non-paged user-space to determine how much (if any) memory may be released.

In one embodiment, for pages that are only being used a little, the memory deallocation routine may be able to re-organize the CPAT cache to free up the pages. An orderly method of allocating and deallocating cache entries 1102 is preferably used to increase the likelihood that whole pages of memory can be released with little or no CPAT cache re-organization. In one embodiment, cache entries 1102 may be allocated and deallocated in a circular fashion. Cache entries 1102 are preferably allocated into the least recently used memory. In one embodiment, the memory deallocation routine may choose to invalidate all cache entries 1102 within a specific page before invalidating cache entries 1102 within another page.

Cache Writebacks and Deallocation

A CPAT cache entry 1102 may include, but is not limited to, the following types of state information:

Clean or Dirty flag
  Preferably, if the CPAT cache entry 1102 is Clean, then it is not be written back to disk. If the CPAT cache entry 1102 is Dirty, then it is preferably eventually written back to disk.

Creating, Writing, Updating, Using and Replacing flags
  If one or more of the Creating, Writing, Updating, Using and Replacing flags are set, then the CPAT cache entry 1102 may be referred to as Busy. When the Creating flag is set, then the CPAT cache entry 1102 may be in the process of being allocated. When the Writing flag is set, then the entry may be in the process of being written back to disk. When the Updating flag is set, then the CPAT page 1108 associated with the cache entry 1102 may be in the process of being updated due to a data page write request. When the Using flag is set, then the CPAT page 1108 associated with the cache entry 1102 may be in the process of being used in association with a data page read request. When the Replacing flag is set, then the dirty CPAT page 1108 associated with an old CPAT cache entry 1102 may be in the process of being written back to disk so that it can be replaced by the CPAT page 1108 for the new CPAT cache entry 1102.

Read sequence flags

Write sequence flags

Green, Yellow or Red flag
  The background routines preferably do not deallocate CPAT cache entries 1102 that are Green or Yellow. Preferably, the background routines only deallocate entries that are Red, Clean and not Busy.

When a particular CPAT cache entry 1102 is in the process of being written back to disk, it may continue to remain valid for a while. In one embodiment, the CPAT page 1108 may be updated at the same time that the page is being written back to disk. For this case, the state of the CPAT cache entry 1102 preferably indicates Updating and Writing.

Whenever a new CPAT cache entry 1102 is allocated, it is preferably attached to the end of the LRU linked-list. The cache entry header 1108 preferably includes pointers to facilitate this. Starting at the top of the LRU linked-list, a background routine may update the state of each cache entry 1102 and initiate the appropriate operations, thus ensuring that the least recently used cache entries 1102 are deallocated first.

Supplemental statistics, state information, and linked-lists may be used by the background routine to help decide which cache entries 1102 to deallocate. For example, a cache entry 1102 that is the least recently used may also be the most frequently used and thus it may be desirable to leave the page cached.

Once a writeback has been completed, the I/O completion routine preferably clears the Writing flag. In addition, if the cache entry 1102 is Red and Dirty, then the I/O completion routine preferably sets the Clean flag. The background thread preferably does not deallocate a Red cache entry 1102 until it has finished Creating, Writing and/or Updating.

In one embodiment, when the CPAT cache is Busy Creating, the IRQL level may be either 0 or 1. When the CPAT cache is Busy Using, the IRQL level may be 1. When the CPAT cache is Busy Writing or Updating, the IRQL level may be 0.

Preferably, the appropriate statistics are updated whenever a dirty CPAT cache entry 1102 is written back, or an entry 1102 is deallocated.

In one embodiment, when the background thread finds a dirty CPAT cache entry 1102 that is ready to be written back to disk, the background thread may create and dispatch an asynchronous write I/O request to the appropriate device.

Writing back dirty CPAT cache entries 1102 is preferably not a high priority task. The background routine preferably retains at least one I/O request that it owns and reuses for conditions such as when the background routine fails to create an I/O request from the system. Although this may not be a deadlock condition, the reserved I/O request may allow a background thread to make slow serialized progress. Once the reserved I/O request has been dispatched, the background thread may continue to traverse the CPAT cache. For each subsequent dirty CPAT cache entry 1102 that the background thread finds that is ready to be written back, the background thread preferably attempts to create an I/O request from the system, but if the creation fails, the background thread preferably continues. Eventually, the reserved I/O request may complete, and forward progress may be achieved. The next dirty CPAT cache entry 1102 may not be written back until the next custom timer interrupt.

The background thread preferably executes at the lowest IRQL priority possible. The background thread preferably traverses the CPAT cache once before returning control to the custom timer.

In one embodiment, if the background thread has already dispatched a CPAT page writeback request, and a subsequent data page write request causes the cached CPAT page 1108 to be updated, the pending CPAT page writeback request may be cancelled.

In one embodiment, a background thread may deallocate CPAT cache entries 1102. Occasionally, a CPAT cache entry 1102 may have to be replaced on demand. Consequently, background threads preferably acquire the appropriate spinlock before accessing a CPAT cache.

I/O Request Decoding

AN I/O request may be decoded by the CDM to determine if the request is accessing a Compressed disk storage space, or if the request may be allowed to pass through. Once it has been determined that the I/O request is accessing a Compressed disk store space, then several things may be determined from the I/O request. Examples of things that may be determined from an I/O request may include, but are not limited to:

Is this a read or write request?

How long should the associated CPAT page 1108 be cached?

Can the associated CPAT page 1108 be cached in writeback mode?

Once that it has been determined that the I/O request is accessing a Compressed disk storage space, then the appropriate CPAT cache lookup is preferably performed to determine the sequence of requests necessary to carry out the original I/O request.

Examples of I/O request information that may be used when managing the various CPAT caches include, but are not limited to:

Read versus write request

Swap versus file I/O request

This may be determined based on the origin of the I/O request, VMM versus API. CPAT pages 1108 associated with swap requests are preferably stored in separate CPAT cache.

Synchronous versus asynchronous request

In some embodiments, this may be used to determine when to use writeback versus write-through mode. Preferably, asynchronous write requests are cached in writeback mode, and synchronous requests in write-through mode. However, some write requests may be written through to disk independent of whether the requests are synchronous or asynchronous.

Paged versus non-paged request

In one embodiment, by the time an I/O request reaches the CCM, it may be non-paged because the associated data buffers are not paged out of the main memory. In one embodiment, CPAT pages 1108 associated with paged requests are cached since the pages are probably destined for swap space. In one embodiment, CPAT pages 1108 associated with certain types (or any type) of requests originating from non-paged space are not cached, since it is unlikely that the pages will be reused.

Reference count

The reference count may be used in determining the likelihood of reuse. If a paged request's reference count is non-zero, then it may be likely to be reused. In one embodiment, a flag may indicate whether the VMM should evict the page immediately when its reference count reaches zero. If a paged request is not likely to be accessed in the near future, the associated CPAT page 1108 may be deallocated.

State of pageable page

In one embodiment, the state of a pageable page may be kept in the PFN database. A page can be in the Active, Transition, Standby, Free, etc. state. If a page is in the Transition state, then it is attached to the Transition list. These lists are used by the VMM to help determine when to evict a page from main memory. In one embodiment, the current state, list, and location in the list for that page may be determined from the PFN. This information may be used to determine whether the VMM intends to evict the page soon. If a page is not likely to be accessed in the near future, the associated CPAT page 1108 may be deallocated.

IRQL level and thread priority

In one embodiment, the IRQL level and thread priority may be used in determining the origin of request (i.e. API versus VMM initiated, user versus kernel initiated), which may be used in managing a CPAT cache, or partitioning a CPAT cache into smaller caches. ). An interrupt level of 0 is usually associated with write requests. An interrupt level of 1 is usually associated with read requests (e.g. paging).

In one embodiment, the RMF and CDM drivers are not contiguous to each other within the I/O stack. If any relevant information is accessible from the RMF, then a method may be used to pass the information from the RMF to the CDM. Methods to pass the information may include, but are not limited to:

Attaching an object to the I/O request

Defining new unique flag values that may be combined with existing I/O request flags Creating and dispatching a separate I/O request Creating and attaching an associated I/O request to the original I/O request Using the Private IDC Status field Calling the CDM driver directly Using the I/O status block in the I/O request Registering a major function that will never be used, and using the reserved entry in the current I/O stack location of the I/O request.

Using the RMF I/O stack location, and having the CDM scroll through the I/O stack, or visa versa.

Using the Parameters Union field in the RMF or CDM I/O stack location

In one embodiment, Inter-Driver Communications structures (IDCs) may be used to communicate between software drivers executing on the computer system. An IDC may be associated with one driver. An IDC is a structure containing a list of entry points to routines in the driver, such as dispatch routines, completion routines, etc. The entry points may be exported to other software modules such as drivers and application programs. For example, if driver A needs to communicate with driver B, then driver B may provide an IDC to driver A containing exported entry points that driver A may use to communicate with driver B.

Once the I/O request decode and CPAT cache entry 1102 creation routines have been coded, then statistics may be gathered to determine: 1) which types of I/O requests occur the most, and 2) which are reused the most.

In one embodiment, the Flag field in the I/O request may be used in determining whether the I/O request is a read or write request. In one embodiment, traversing the Device Object pointed to by the current I/O stack location may be used to physical sector information.

Initialization

In one embodiment, a private fixed-size CPAT file may be created somewhere in the Compressed disk partition. The configuration utility may be responsible for this. The CDM preferably prevents other processes from writing to this file by filtering any incoming requests to access this file. Alternatively, a fixed number of sectors may be reserved within the partition, similar to the way a file system reserves sectors for file allocation table use. The CDM is preferably notified of the name of the file during Driver Entry.

During the driver loading process, the CDM preferably attaches itself above user-specified filter drivers and device drivers for each YO stack. In one embodiment, the CDM may be loaded after those drivers. In one embodiment, the CDM configuration utility preferably allows a user to attach the CPAT cache to one or more specific device drivers. When a CCM is loaded, the CDM is preferably loaded below the CCM.

The CDM is preferably loaded and attached to the appropriate device objects so that all requests (including raw requests) dispatched to those device objects can not bypass the CDM.

Preferably, only one Driver Object is instantiated when the CDM is loaded. However, a Device Object is preferably instantiated for each device to which the CDM is attached.

In one embodiment, a fixed amount of non-paged userspace is pre-allocated for CPAT cache use. The amount may be configured by the configuration and performance utility.

Some number of I/O requests, UMLs and buffers are preferably pre-allocated for CPAT cache writeback and CDM-initiated I/O request sequence use. These resources are preferably continually reused instead of being deallocated. It is preferably not necessary to allocate system resources on demand.

For debugging purposes, the CDM is preferably loaded after the debugger so that it can be debugged during the driver loading process. In one embodiment, this may be accomplished by loading the CDM later than the debugger during the driver loading process. In another embodiment, the CDM may be dynamically loaded. Note that dynamically loading and unloading the CDM may improve bug fix turnaround times.

In one embodiment, when attaching a filter to a device, functions such as IoGetAttachedDevice( ) and IoAttachDeviceByPointer( ) may be used to attach the filter to a specific location within the I/O stack. In another embodiment, a function such as IoAttachDeviceToDeviceStack( ) may be used to attach the filter to a specific location within the I/O stack.

In one embodiment, a function such as MmResetDriverPaging( ) may be used to make sure the CDM is not paged out of main memory.

All resources that are needed for managing spin-locks and events are preferably pre-allocated during Driver Entry.

Statistics

Since statistics are also a shared resource, any statistics that are associated with a particular CPAT cache may be managed as a single resource. If this is the case, then a CPAT cache spin-lock is preferably acquired before updating statistics.

Requests may be monitored. Examples of statistics that may be monitored include, but are not limited to:

Request type—versus-reuse

Request address range—versus-reuse

Transient request rate and transient CPAT cache hit rate

Inter-arrival rate of requests—versus-reuse

Knowing which request types are reused the most may be used to help decide whether to replace the associated CPAT cache entry 1102. Knowing which request address ranges are reused the most may be used to help decide whether to replace the associated CPAT cache entry 1102. The transient request rate and transient CPAT cache hit rate may be used to help decide when the CPAT cache should grow or shrink. For example, as the transient request rate grows, the CPAT cache is preferably allowed to grow as long as the transient CPAT cache hit rate remains high. Knowing when there is a strong correlation between some inter-arrival request rate and reuse may be used to help decide whether to replace a particular CPAT cache entry 1102.

Configuration and Performance Utility

The configuration utility preferably includes a GUI interface that may allow a user to perform various functions to configure, monitor, and modify CPAT caches and operational parameters of the CDM. For example, the GUI interface may allow the user to turn a specific file system into a Compressed Disk File System after the file system has been installed within a partition.

I/O Request Behavior

When the CDM is attempting to compress and store data in the compressed disk, it is possible that additional memory may need to be allocated to meet the request, for example, to make a cache entry 1102 in the CPAT. One embodiment of the CDM may not attempt to allocate additional memory from the operating system on demand, and may allow the request to pass through. One embodiment may try to allocate memory once, and if that fails, then the request may be allowed to pass through.

Direct and Buffered I/O Handling

Some embodiments of the CDM may only support UML-based (or Direct I/O) data transfers. Some embodiments may also support Buffered I/O. A third type of I/O called Neither I/O preferably is not supported, since drivers for storage devices do not use Neither I/O because their Dispatch routines are called in an arbitrary thread context.

When a read or write request results in a decompressed or compressed data transfer, the C-DIMM Device Driver (CDD) is preferably called directly along with a pointer to the I/O request and attached UML. The CDD is preferably able to directly access the buffers associated with the UML since the CDD routines are executing as part of the same thread context.

The completion routine may be called in an arbitrary thread context. This means that the buffers specified in the UML that are accessible in the dispatch routine may not be accessible in the completion routine. Therefore, data transfers are preferably performed in the dispatch routine whenever possible. In embodiments where it is not possible to perform data transfers in the dispatch routine, the appropriate context information is preferably saved in the current I/O stack location so that the information may be used during completion routine processing.

Alternatively, the dispatch routine may create an additional UML, map the UML to the user virtual addresses of the original UML, and then pass the new system virtual UML to the completion routine using the context parameter of the completion routine. In the completion routine, the new UML may be used to access the memory. When the data transfer is complete, the UML may be discarded.

In one embodiment, the buffers described by the UML of the I/O request may be locked into memory. The I/O Manager may unlock the buffers if the I/O completion routine calls an I/O Complete Request function. Otherwise, the I/O completion routine is responsible for unlocking the buffers.

The background routine preferably sets up a User Buffer and makes the appropriate calls to the I/O manager to create an UML for the User Buffer. In the completion routine, the UML preferably unlocks the User Buffer before freeing the I/O request.

FIG. 30—Background CPAT Cache Entry State Transitions

FIG. 30 is a table illustrating background CPAT cache entry 1102 state transactions. The first column shows the current state of the cache entry 1102. The second column shows the state of the cache entry 1102 after the state transition. The third column contains contents on the state transition.

The first row shows a cache entry 1102 transition from Green to Yellow. In one embodiment, the state of the cache entry 1102 is transitioned by a background thread. In the second row, the cache entry 1102 transitions from Yellow to Red. A background thread may also perform the state transition. In the third row, the cache entry 1102 is Red and Dirty, and transitions to Writing. A background thread may initiate the change in state. The background thread may also initiate the writeback of the dirty cache entry 1102. In the fourth row, the Red, Dirty and Writing cache entry 1102 is transitioned to Clean by the I/O completion routine of the I/O request that wrote back the dirty cache entry 1102. In the fifth row, the cache entry 1102, now Red, Clean and not Busy, may be deallocated by a background thread.

FIG. 31—Request Sequences

FIG. 31 is a table listing I/O request types in the first column. The second column lists the possible CPAT cache results for the I/O request types. The third column lists the request sequences for the CPAT cache results listed in the second column.

Request Sequences

The following list describes the request sequences shown in the third column of FIG. 31.

| | |
|---|---|
| VM read = | Disk-to-CDM buffer, CDM buffer-dec-VM |
| VM write = | VM-cmp-CDM buffer, CDM-to-disk |
| VM partial write = | Disk-to-CDM buffer1, CDM buffer1-dec-CDM buffer2, VM-to-CDM buffer2, CDM buffer2-cmp-CDM buffer1, CDM buffer1-to-disk |
| CPAT read = | Disk-to-CPAT cache |
| CPAT write = | CPAT cache-to-disk |

(CPAT write and VM write may be dispatched in any order)
cmp=compress
dec=decompress
VM Virtual Memory When write requests are performed and less than a page is transferred, the VM write may be replaced with a VM partial write. VM partial writes may be very time consuming. Thus, one embodiment may avoid compressing pages where partial writes are performed often.

FIGS. 32a Through 32f—A CDM Dispatch Routine for Handling Data Read I/O Requests FIGS. 32a through 32f are flowcharts illustrating the processing of a data read I/O request by a CDM read dispatch routine according to one embodiment of the invention. Steps in the flowcharts may occur concurrently or in different orders.

Figure 32A:
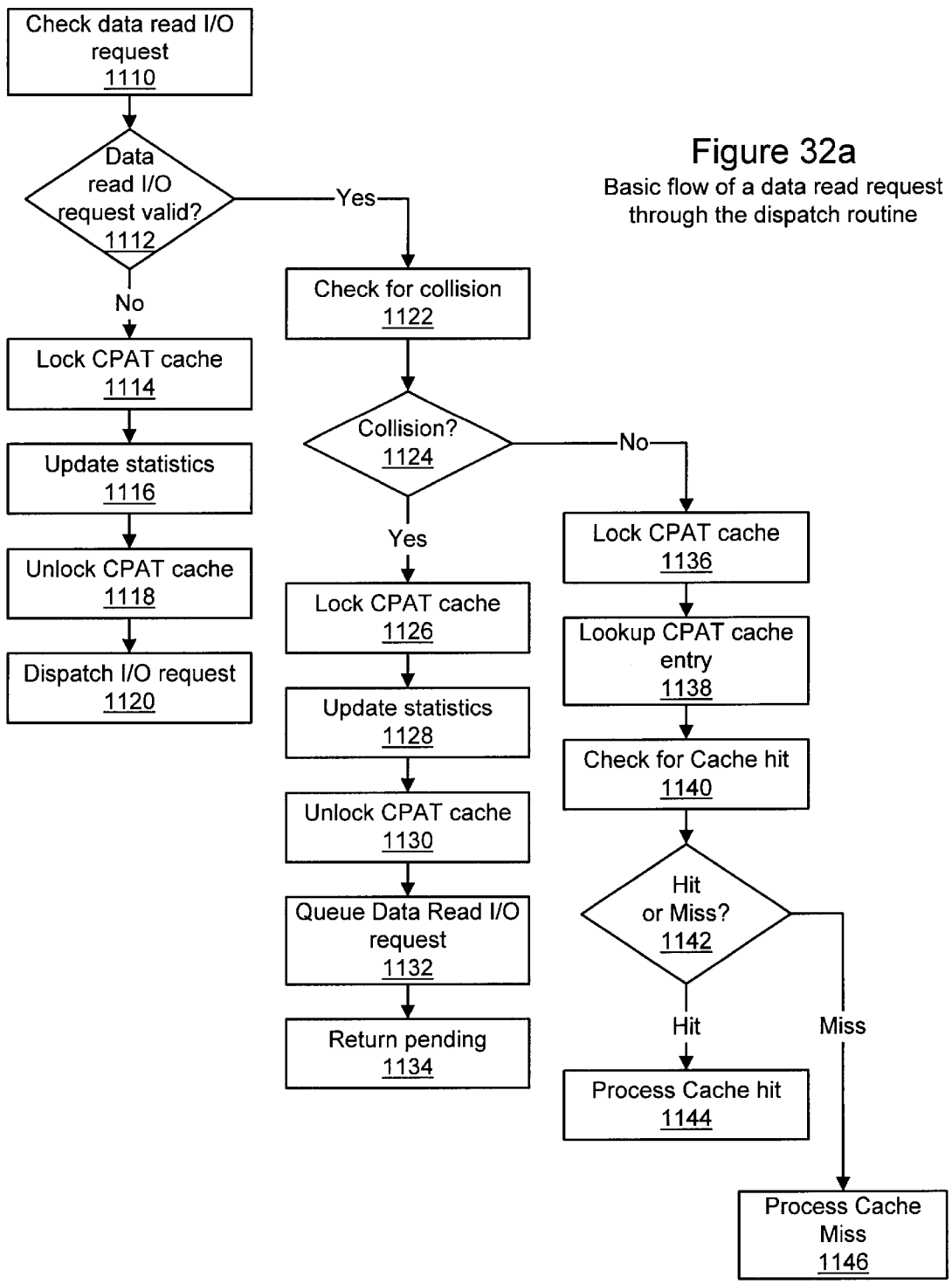
FIG. 32a is a flowchart illustrating the basic flow of a data read request through the dispatch routine according to one embodiment of the invention.

FIG. 32a—Basic Flow of a Data Read I/O Request Through the Dispatch Routine

FIG. 32a is a flowchart illustrating the basic flow of a data read I/O request through the CDM dispatch routine according to one embodiment of the invention. All data I/O request requests are preferably performed asynchronously by the CDM. The I/O Manager preferably ensures that synchronous requests behave synchronously. In step 1110, the dispatch routine may check an incoming data read I/O request. In step 1112, the dispatch routine may determine the validity of the I/O request. For instance, the I/O requests may include pointers to one or more locations in memory. If one or more of the pointers to memory are invalid (null, out of range, etc.), then the I/O request may be invalid. The I/O request may also include a length of the requested data. If the length is invalid, for example, less than or equal to 0, then the I/O request may be invalid. Other fields in the I/O request may also be checked for validity. The process of validating an I/O request is further illustrated in FIG. 43. If the I/O request is not valid, then the method may proceed to step 1114. In steps 1114–1118, the cache is locked, statistics may be updated, and the cache unlocked. Since statistics may be a shared resource, statistics that are associated with a particular CPAT cache may be managed as a single resource. If so, then a CPAT cache spin-lock is preferably acquired before updating the statistics. In step 1120, the I/O request may be dispatched to the next driver in the I/O driver stack.

If the I/O request is validated in step 1112, then the method proceeds to step 1122. In step 1122, the method may check for a collision. Collision detection may be necessary to maintain data consistency. To ensure that a compressed data page remains consistent with its associated CPAT page 1108, the compressed data page is preferably written back to disk, and its associated CPAT page 1108 is preferably updated in the cache before a subsequent access to the same data is allowed to proceed. A collision occurs if there is an I/O request being processed for the same CPAT entry 1102 and/or compressed page as the incoming I/O request. If an I/O request is already being processed for the data requested in this I/O request, then the method proceeds to step 1126. In steps 1126–1130, the cache is locked, statistics may be updated, and the cache unlocked. In step 1132, the received data read I/O request may be queued for later processing, after the current I/O request to the requested data has completed. In step 1134, a pending status may be returned to the process that generated the queued I/O request.

If no collision was detected, then the method proceeds to step 1136. In step 1136, the cache may be locked. In step 1138, the method may perform a lookup in the CPAT cache to determine if the requested data is in the CPAT cache (a cache hit) or not in the CPAT cache (a cache miss). If a hit is detected, then the method proceeds to step 1144 to process the cache hit. Step 1144 is further illustrated in FIG. 32*b*. If a miss is detected, then the method proceeds to step 1146 to process the cache miss. Step 1146 is further illustrated in FIG. 32*c*.

Figure 32B:
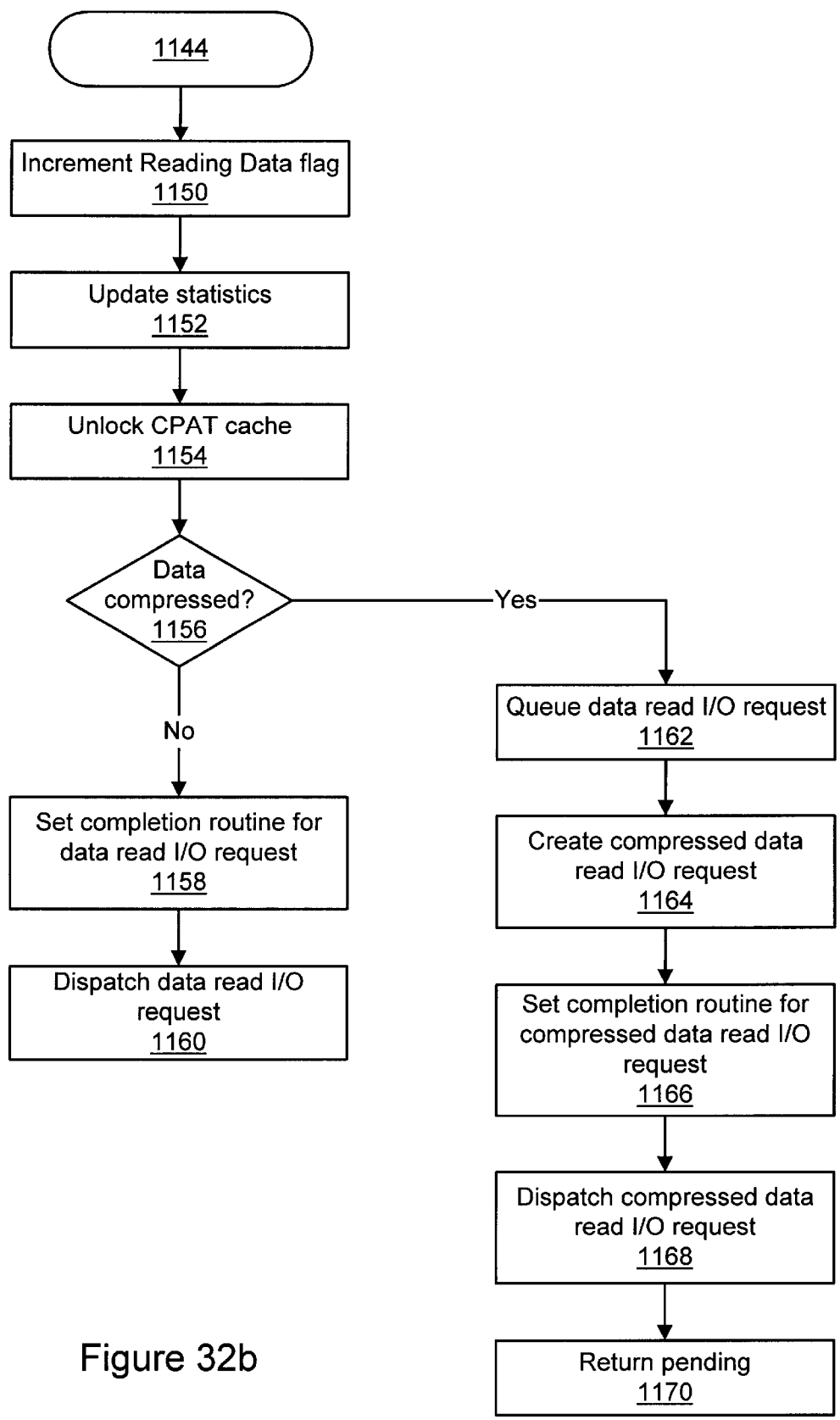
FIG. 32b is a flowchart expanding on step 1144 of FIG. 32a and illustrating the processing of a cache hit according to one embodiment of the invention.

FIG. 32*b*—Processing a Cache Hit

FIG. 32*b* is a flowchart expanding on step 1144 of FIG. 32*a* and illustrating the processing of a cache hit according to one embodiment of the invention. For a cache hit, the requested data may be transferred from the CPAT cache to system memory or, alternatively, directly to a Compactor Chip on the system, decompressed on the Compactor Chip, and written to system memory to fulfill the original request. In step 1150, a Reading Data flag may be incremented. In step 1152, statistics may be updated to register the cache hit. In step 1154, the CPAT cache may be unlocked. In step 1156, the requested data is checked. If the data is not compressed, then the method proceeds to step 1158. In steps 1158, the completion routine is set to process the data read I/O request. FIGS. 33*a*–33*f* illustrate the processing of completion routines. The data read I/O request is then dispatched to the next driver in the I/O driver stack in step 1160.

If step 1156 determined the requested data is compressed, then the method proceeds to step 1162. In step 1162, the data read I/O request may be queued. In step 1164, a compressed data read I/O request may be created. In step 1166, the completion routine for the I/O request created in step 1162 may be set to the completion routine for the compressed data read I/O request. Processing of the completion routine is illustrated in FIGS. 33*a*–33*f*. In step 1168, the I/O request created in step 1164 may be dispatched. In step 1170, a pending status may be returned to the process that generated the original data read I/O request.

Figure 32C:
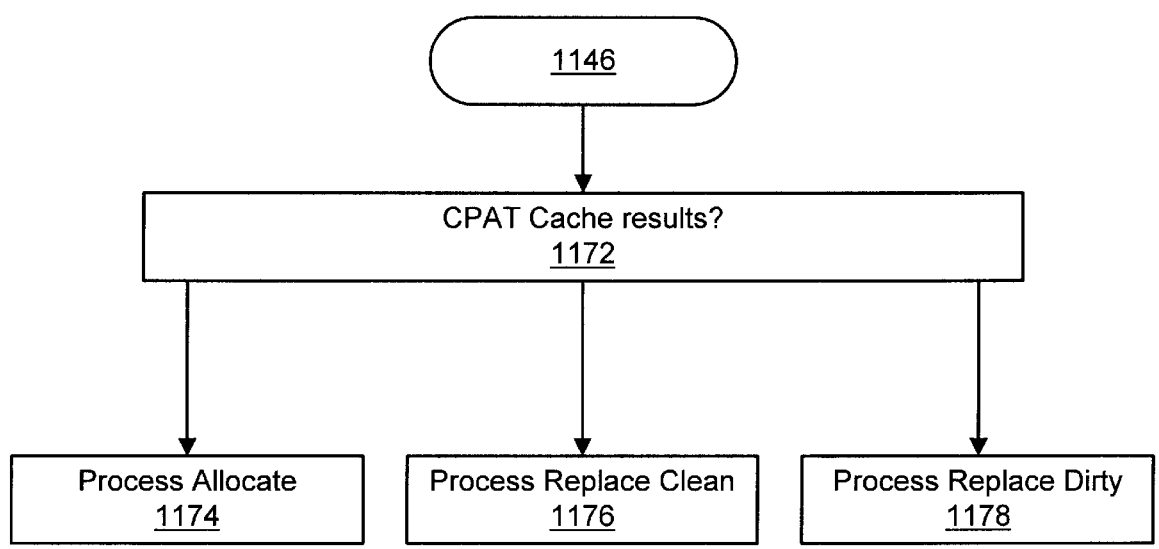
FIG. 32c is a flowchart expanding on step 1146 of FIG. 32a and illustrating the processing of a cache miss according to one embodiment of the invention.

FIG. 32*c*—Processing a Cache Miss

Figures 32D, 32E, 32F:
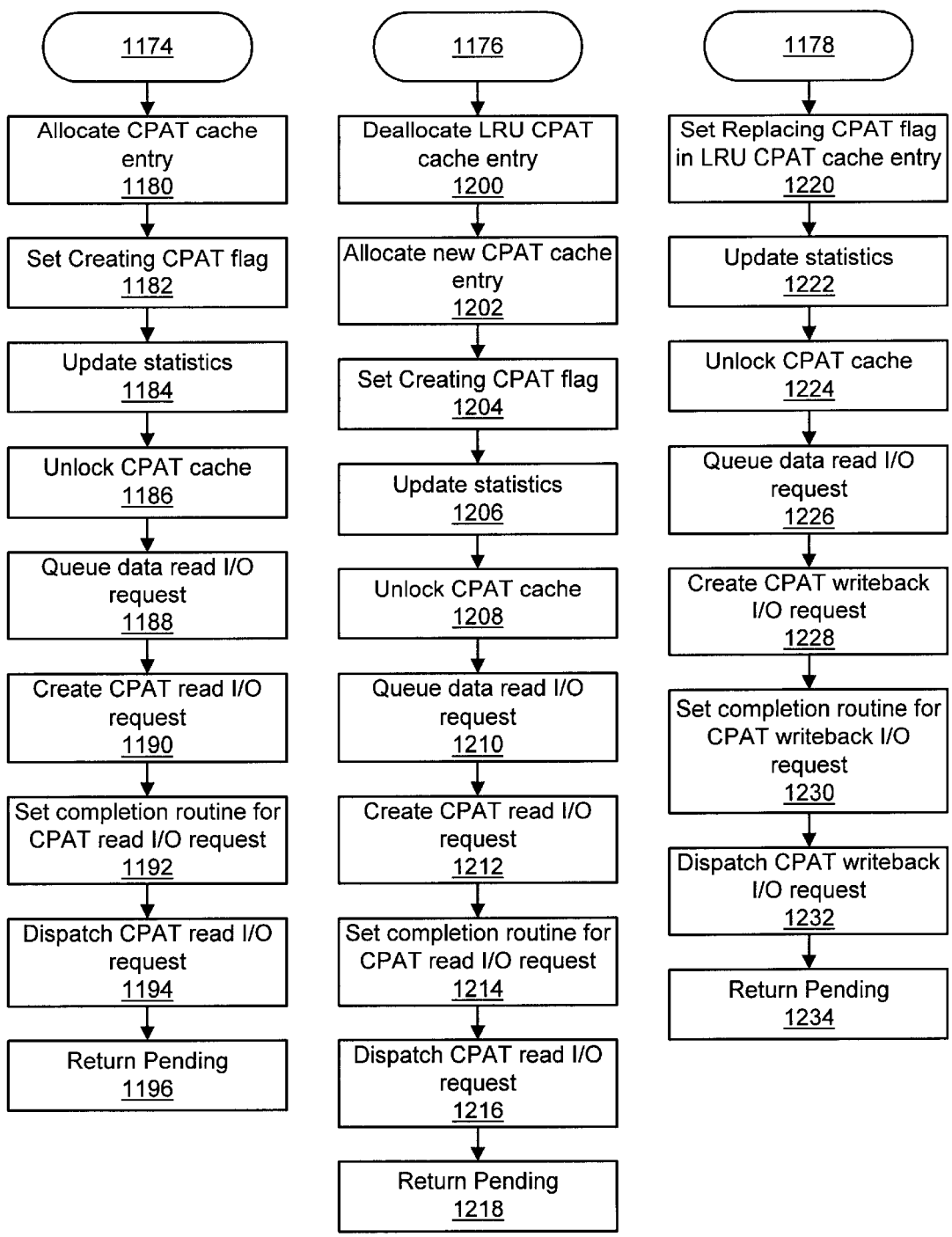
FIG. 32d is a flowchart expanding on step 1174 of FIG. 32c and illustrating the processing of a CPAT allocate according to one embodiment of the invention.
FIG. 32e is a flowchart expanding on step 1176 of FIG. 32c and illustrating the process of replacing clean data in a CPAT cache according to one embodiment of the invention.
FIG. 32f is a flowchart expanding on step 1178 of FIG. 32c and illustrating the process of replacing dirty data in a CPAT cache according to one embodiment of the invention.

FIG. 32*c* is a flowchart expanding on step 1146 of FIG. 32*a* and illustrating the processing of a CPAT cache miss according to one embodiment of the invention. For a cache miss, the requested data may be compressed and copied into the CPAT cache substantially concurrently with the requested data being written to system memory to fulfill the original I/O request. For a cache miss, space in the CPAT structure may be allocated or freed to make room for storing the requested data in the CPAT cache. The CPAT cache may be checked in step 1172. Based on the results of the check, one or more cache tree nodes 1104, cache entry headers 1106, and CPAT pages 1108 for storing the compressed requested data in the CPAT cache may be allocated in step 1174, one or more clean CPAT cache entries 1102 may be replaced by the new compressed data in step 1176, or one or more dirty CPAT cache entries 1102 may be replaced by the new compressed data in step 1178. FIG. 32*d* further illustrates step 1174, FIG. 32*e* further illustrates step 1176, and FIG. 32*f* further illustrates step 1178.

FIG. 32*d*—Processing a CPAT Allocate

FIG. 32*d* is a flowchart expanding on step 1174 of FIG. 32*c* and illustrating the processing of a CPAT allocate according to one embodiment of the invention. In step 1180, the new CPAT cache entry 1102 may be allocated. This may include allocating one or more cache tree nodes 1104, cache entry headers 1106, and CPAT pages 1108. In step 1182, a Creating CPAT flag may be set to indicate that a new CPAT cache entry 1102 is being created. In step 1184, statistics for the CPAT cache may be updated. In step 1186, the CPAT cache may be unlocked. In step 1188, a data read I/O request may be queued. In step 1190, a CPAT read I/O request may be created. The completion routine for the CPAT read I/O request may be set in step 1192. In step 1194, the CPAT read I/O request may be dispatched. In step 1196, a pending status may be returned from the dispatch routine.

FIG. 32*e*—Replacing Clean Data in a CPAT Cache

FIG. 32*e* is a flowchart expanding on step 1176 of FIG. 32*c* and illustrating the process of replacing clean data in a CPAT cache according to one embodiment of the invention. In step 1200, a clean, least recently used (LRU) CPAT cache entry 1102 may be deallocated. In step 1202, the new CPAT cache entry 1102 may be allocated. This may include allocating one or more cache tree nodes 1104, cache entry headers 1106, and CPAT pages 1108. In step 1204, a Creating CPAT flag may be set to indicate that a new CPAT cache entry 1102 is being created. In step 1206, statistics for the CPAT cache may be updated. In step 1208, the CPAT cache may be unlocked. In step 1210, a data read I/O request may be queued. In step 1212, a CPAT read I/O request may be created. The completion routine for the CPAT read I/O request may be set in step 1214. In step 1216, the CPAT read I/O request may be dispatched. In step 1218, a pending status may be returned from the dispatch routine.

FIG. 32*f*—Replacing Dirty Data in a CPAT Cache

FIG. 32*f* is a flowchart expanding on step 1178 of FIG. 32*c* and illustrating the process of replacing dirty data in a CPAT cache according to one embodiment of the invention. In step 1220, the Replacing CPAT cache entry flag may be set for the dirty LRU CPAT cache entry 1102 being replaced. In step 1222, statistics for the CPAT cache may be updated. In step 1224, the CPAT cache may be unlocked. In step 1226, a data read I/O request may be queued. In step 1228, a CPAT writeback I/O request may be created. The completion routine for the CPAT writeback I/O request may be set in step 1230. In step 1232, the CPAT writeback I/O request may be dispatched. In step 1234, a pending status may be returned from the dispatch routine.

FIGS. 33*a* Through 33*f*—A CDM Completion Routine for Processing Data Read I/O Requests FIGS. 33*a* through 33*f* are flowcharts illustrating a CDM completion routine for processing data read I/O requests according to one embodiment of the invention. Steps in the flowcharts may occur concurrently or in different orders.

Figure 33A:
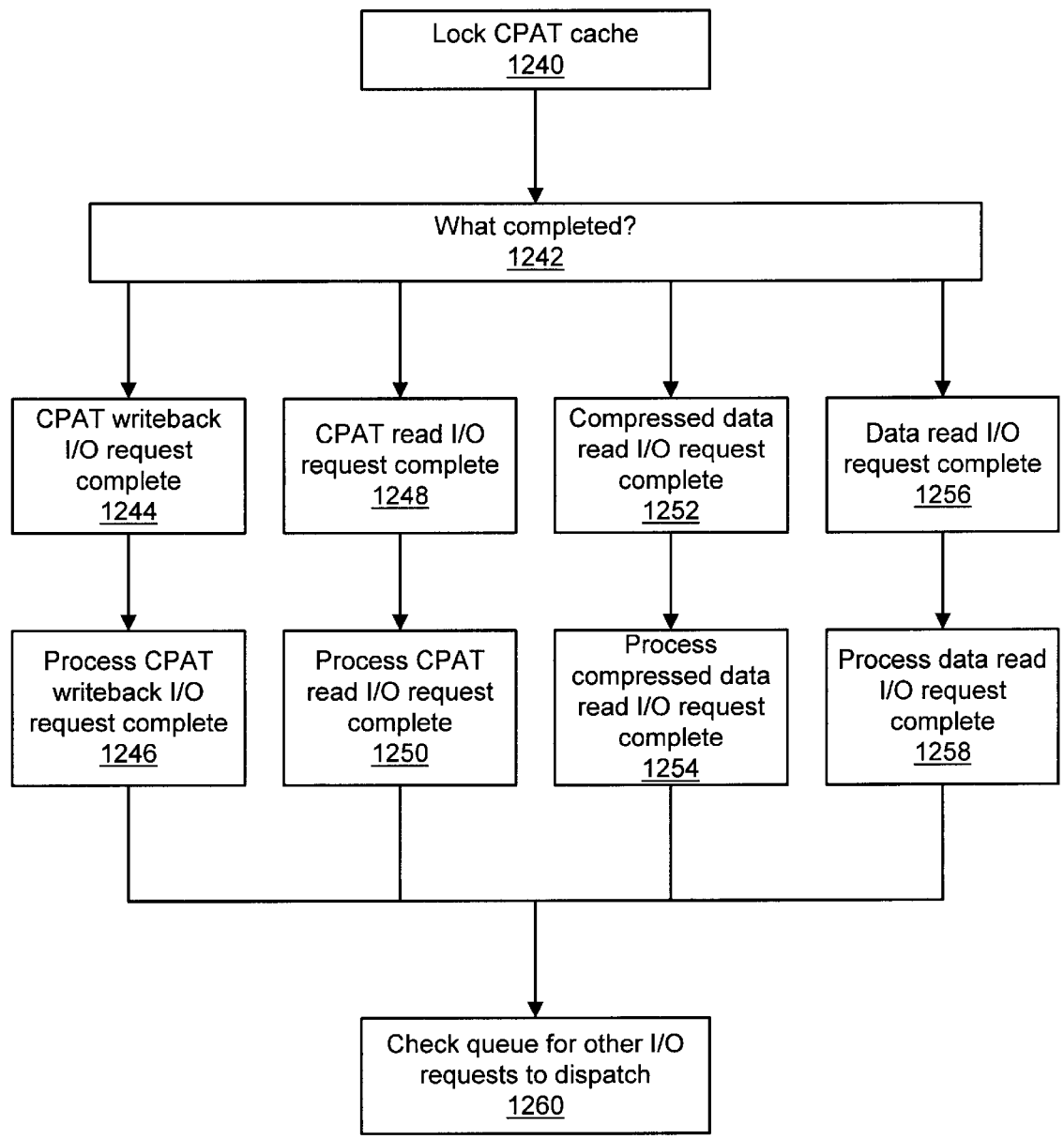
FIG. 33a is a flowchart illustrating the basic flow of a data read request through the completion routine according to one embodiment of the invention.

FIG. 33*a*—Basic Flow of a Data Read Request Through the Completion Routine

FIG. 33*a* is a flowchart illustrating the basic flow of a data read request through the completion routine according to one embodiment of the invention. In step 1240, the CPAT cache may be locked. In one embodiment, this may include acquiring one or more spin-locks. In step 1242, the completion routine may check to see what completed. Alternatively, a separate completion routine may be used for each of the completion routine types illustrated in FIG. 33*a*. In step 1244, a CPAT writeback I/O request, dispatched by the method illustrated in FIG. 32*f*, has completed. In step 1246, the CPAT writeback I/O request complete is processed. Step 1246 is further illustrated in FIG. 33b. In step 1248, a CPAT read I/O request has completed. In step 1250, the CPAT read I/O request complete is processed. Step 1250 is further illustrated in FIG. 33c. In step 1252, a compressed data read I/O request has completed, and is processed in step 1254. Step 1254 is further illustrated in FIG. 33d. In step 1256, a data read I/O request has completed, and is processed in step 1258. Step 1258 is further illustrated in FIG. 33f.

In step 1260, after processing the I/O request completion, the completion routine may check the queue of I/O requests to see if there are any I/O requests (such as I/O requests queued due to collision) to dispatch.

Figure 33B:
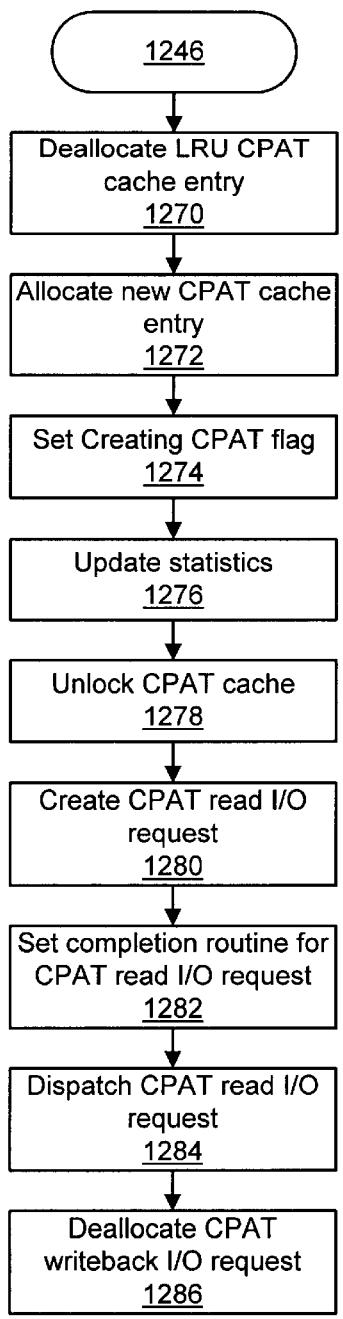
FIG. 33b is a flowchart expanding on step 1246 of FIG. 33a and illustrating the processing of a CPAT writeback I/O request complete according to one embodiment of the invention.

FIG. 33b—Processing a CPAT Writeback I/O Request Complete

FIG. 33b is a flowchart expanding on step 1246 of FIG. 33a and illustrating the processing of a CPAT writeback I/O request complete according to one embodiment of the invention. In step 1270, the LRU CPAT cache entry 1102 whose Replacing flag was set in step 1220 of FIG. 32f is deallocated. In step 1272, a new CPAT cache entry 1102 is allocated. In step 1274, a Creating CPAT flag may be set to indicate that a new CPAT cache entry 1102 is being created. In step 1276, statistics for the CPAT cache may be updated. In step 1278, the CPAT cache may be unlocked. In step 1280, a CPAT read I/O request may be created. The completion routine for the CPAT read I/O request may be set in step 1282. In step 1284, the CPAT read I/O request may be dispatched. In step 1286, the CPAT writeback I/O request may be deallocated.

Figure 33C:
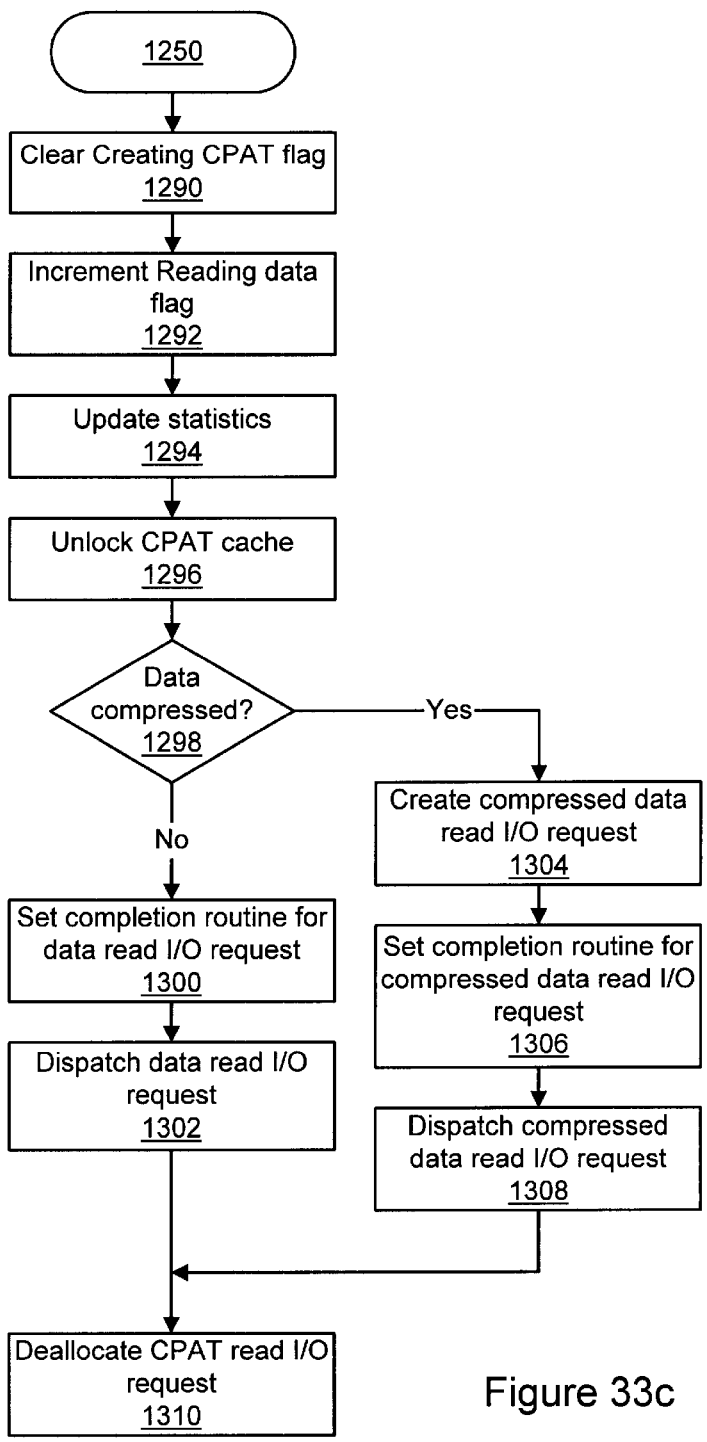
FIG. 33c is a flowchart expanding on step 1250 of FIG. 33a and illustrating the processing of a CPAT read I/O request complete according to one embodiment of the invention.

FIG. 33c—Processing a CPAT Read I/O Request Complete

FIG. 33c is a flowchart expanding on step 1250 of FIG. 33a and illustrating the processing of a CPAT read I/O request complete according to one embodiment of the invention. In step 1290, the Creating CPAT flag for the cache entry 1102 may be cleared. In step 1292, the Reading Data flag may be incremented. In step 1294, the statistics for the CPAT cache may be updated. In step 1296, the CPAT cache may be unlocked. If the requested data is not compressed, the method proceeds to step 1300. In step 1300, the completion routine for the data read I/O request (queued in FIG. 32) is set. In step 1302, the data read I/O request is dispatched.

If the requested data is compressed, then the method proceeds from step 1298 to step 1304. In step 1304, a compressed data read I/O request is created. In step 1306, the completion routine for the compressed data read I/O request is set. In step 1308, the compressed data read I/O request is dispatched.

The CPAT read I/O request is deallocated in step 1310.

Figure 33D:
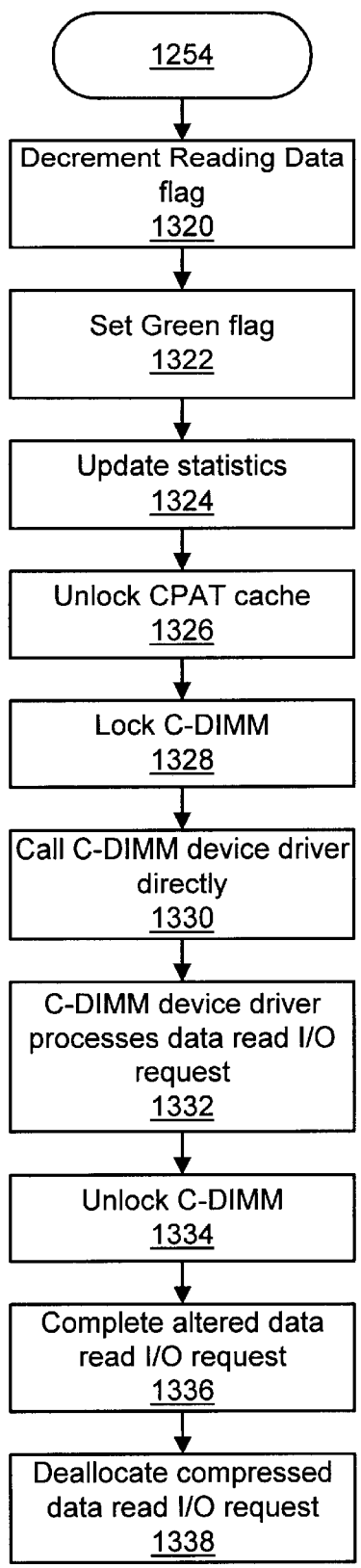
FIG. 33d is a flowchart expanding on step 1254 of FIG. 33a and illustrating the processing of a compressed data read I/O request complete according to one embodiment of the invention.

FIG. 33d—Processing a Compressed Data Read I/O Request Complete

FIG. 33d is a flowchart expanding on step 1254 of FIG. 33a and illustrating the processing of a compressed data read I/O request complete according to one embodiment of the invention. In step 1320, the Reading Data is decremented. In step 1322, the Green flag of the CPAT cache entry is set. Alternatively, a pointer to the CPAT cache entry may be placed in a "Green" list. In step 1324, CPAT cache statistics may be updated. The CPAT cache may be unlocked in step 1326. In step 1328, the C-DIMM may be locked. In step 1330, the C-DIMM device driver may be called to decompress the requested data from the CPAT cache. When calling the C-DIMM device driver, the completion routine preferably passes pointers to the original data read I/O request and the compressed data read I/O request. The C-DIMM device driver preferably has the information needed to carry out the decompression and copy operations. In step 1332, the C-DIMM device driver processes the data read I/O request.

Figure 33E:
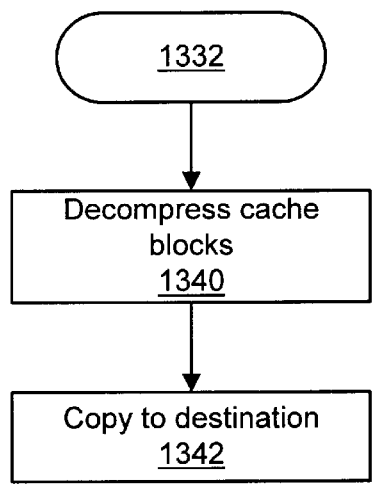
FIG. 33e is a flowchart expanding on step 1332 of FIG. 33d and illustrating the C-DIMM device driver processing the data read I/O request according to one embodiment of the invention.

Step 1332 is further illustrated in FIG. 33e. In step 1334, the C-DIMM is unlocked. In step 1336, the data read I/O request is completed. In step 1338, the compressed data read I/O request may be deallocated.

FIG. 33e—C-DIMM Device Driver Processing of a Data Read I/O Request

FIG. 33e is a flowchart expanding on step 1332 of FIG. 33d and illustrating the C-DIMM device driver (CDD) processing the data read I/O request according to one embodiment of the invention. When calling the CDD, the completion routine preferably passes pointers to the original data read I/O request and the compressed data read I/O request. Thus, the CDD preferably has the information needed to carry out the decompression and copy operations. In step 1340, the compressed CPAT cache blocks 1108 may be decompressed. In one embodiment, the cache blocks 1108 may be written into an input buffer of a Compactor Chip by the CDD. The Compactor Chip may then decompress the compressed data using a parallel data decompression method and may output the decompressed data to an output buffer. In step 1342, the decompressed data may then be copied from the output buffer to the destination for the data as specified in the original data read I/O request.

Figure 33F:
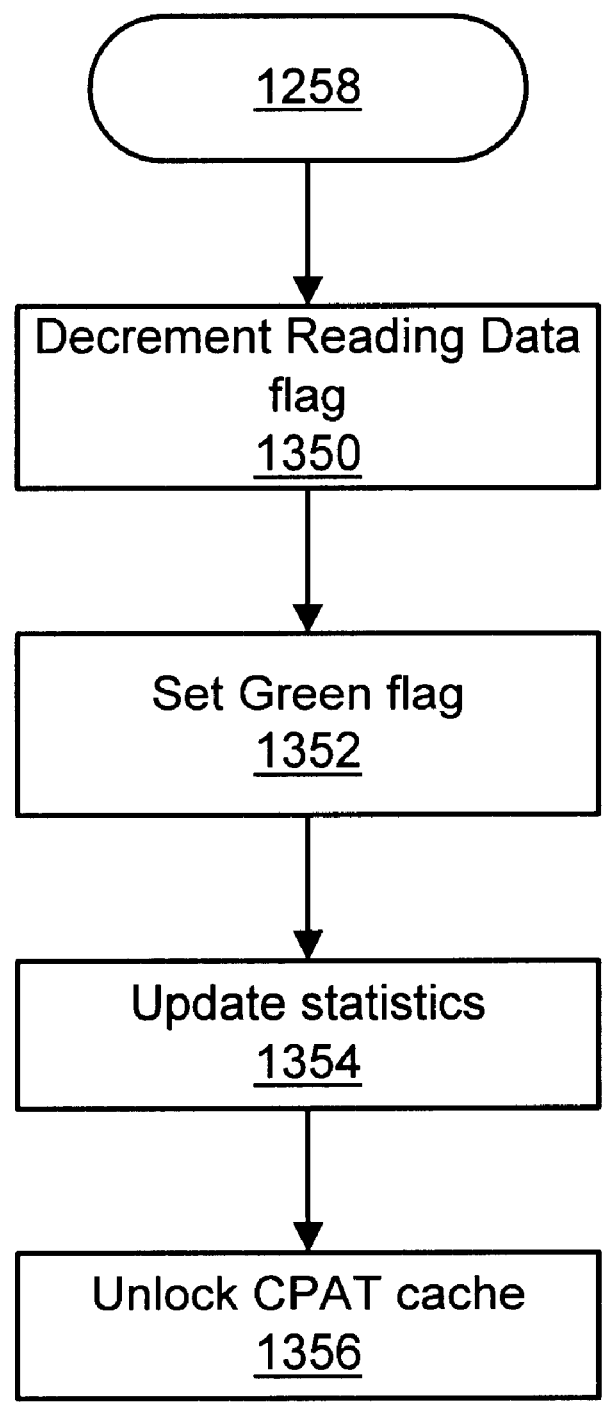
FIG. 33f is a flowchart expanding on step 1258 of FIG. 33a and illustrating the processing of a data read I/O request complete according to one embodiment of the invention.

FIG. 33f—Processing a Data Read I/O Request Complete

FIG. 33f is a flowchart expanding on step 1258 of FIG. 33a and illustrating the processing of a data read I/O request complete according to one embodiment of the invention. In step 1350, the Reading Data flag may be decremented. In step 1352, the Green flag for the CPAT cache entry may be set to indicate that the data has recently been accessed. Alternatively, a pointer to the CPAT cache entry may be placed in a "Green" list of CPAT cache entries. In step 1354, the CPAT statistics may be updated. In step 1356, the CPAT cache may be unlocked.

FIGS. 34a Through 34j—CDM Dispatch Routine for Processing Data Write Requests

FIGS. 34a through 34j are flowcharts illustrating a CDM dispatch routine for processing data write requests according to one embodiment of the invention. Steps in the flowcharts may occur concurrently or in different orders.

The dispatch and routine shows CPAT writeback I/O requests due to replacement being serialized with subsequent CPAT read I/O requests. These I/O requests are preferably dispatched concurrently whenever there are sufficient resources (e.g. I/O requests, UMLs, and buffers).

Preferably, during dispatch routine processing, whenever an intermediate I/O request, UML or buffer cannot be created, then the original I/O request is queued, and a pending status returned.

In one embodiment, if the resources needed to queue a new I/O request are not available (for example, if the queue is full), then the dispatch routine preferably waits until the resources are available. When an outstanding I/O request sequence completes and the original I/O request associated with that sequence has been deleted from the queue, the completion routine may signal the associated Dispatcher Object to awaken the waiting dispatch routine. While the queue is full, additional I/O request requests may be received by the dispatch routine. Preferably, these requests wait until the resources are available. In one embodiment, a Mutex Dispatcher Object may be used so that only one of the waiting threads awakens when resources become available (i.e. the Dispatcher Object is signaled).

In one embodiment, since the data request queue may include a linked-list of outstanding I/O requests, and pointers in the I/O request may be used to build the linked-list, an incoming data request may be queued and return a pending request. In this embodiment, it may not be necessary for the dispatch routine to wait for resources as described above.

Figure 34A:
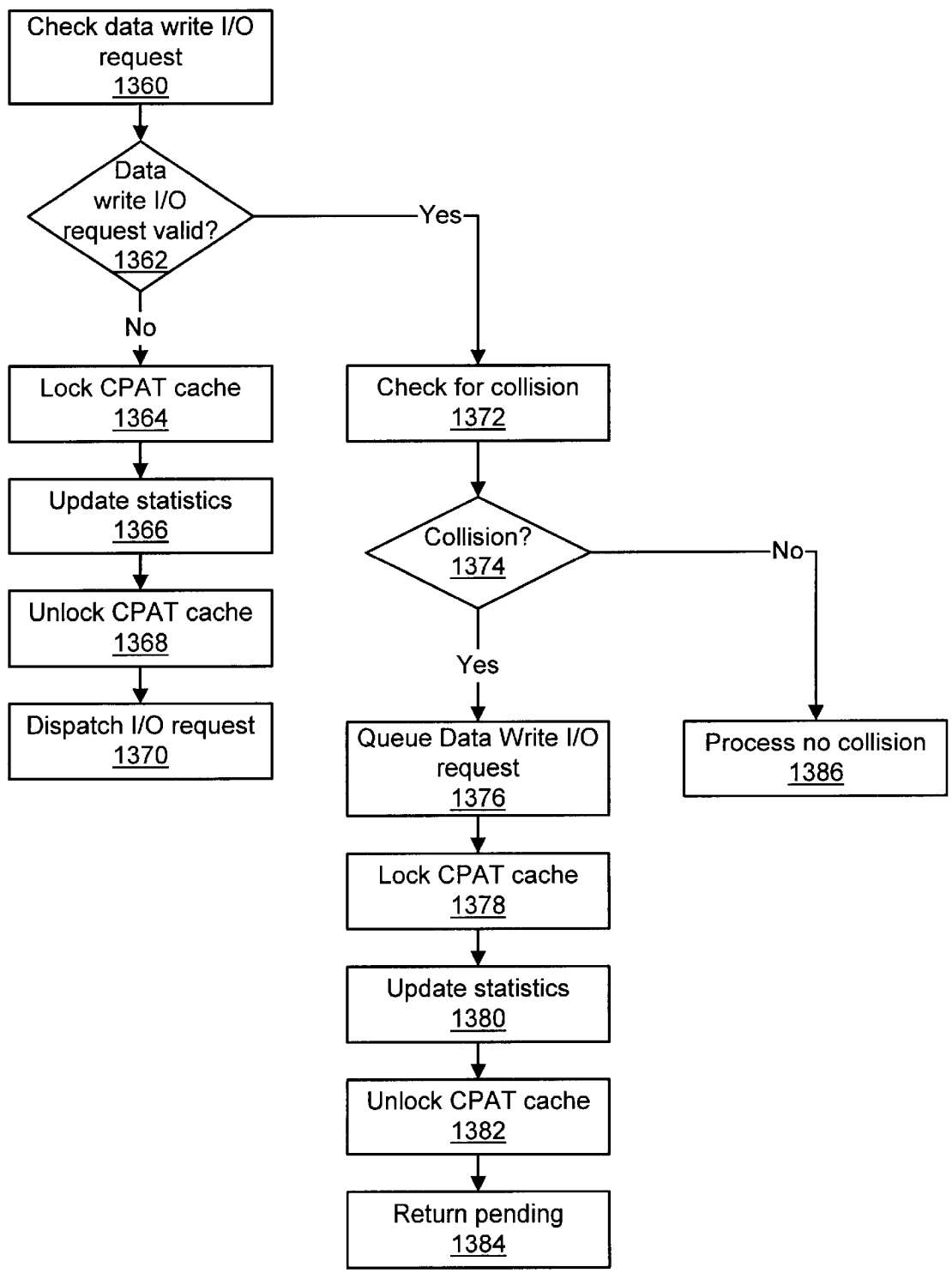
FIG. 34a is a flowchart illustrating the basic flow of a data write request through the dispatch routine according to one embodiment of the invention.

FIG. 34a—Basic Flow of a Data Write Request Through the Dispatch Routine

Figure 43:
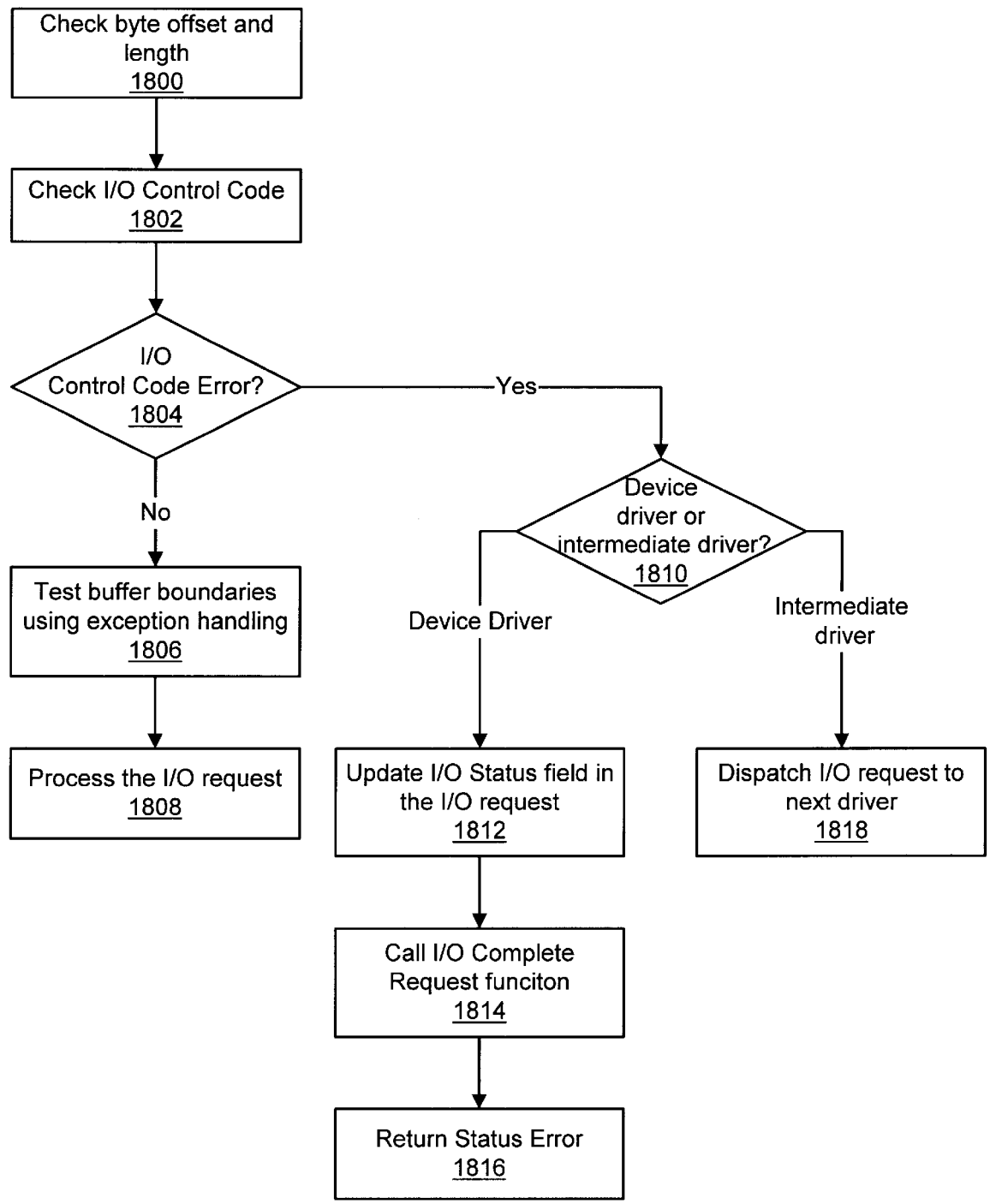
FIGS. 43 through 48 are flowcharts illustrating dispatch and completion routine basics.

FIG. 34a is a flowchart illustrating the basic flow of a data write request through the dispatch routine according to one embodiment of the invention. In step 1360, the routine may check the I/O request for validity. A method for validating an I/O request is illustrated in FIG. 43. If the I/O request is not valid then the method may proceed to step 1364. In steps 1366–1368, the cache is locked, statistics may be updated, and the cache unlocked. Since statistics may be a shared resource, statistics that are associated with a particular CPAT cache may be managed as a single resource. If so, then a CPAT cache spin-lock is preferably acquired before updating the statistics. In step 1370, the I/O request may be dispatched to the next driver in the I/O driver stack.

If the I/O request is validated in step 1362, then the method proceeds to step 1372. In step 1372, before a new I/O request sequence begins, the dispatch routine preferably checks for collisions with other IVO request sequences that may currently be in progress. In the event that a collision is detected in step 1374, then in step 1376 the original I/O request is preferably queued, statistics are updated in steps 1378–1382, and a pending status returned in step 1384. A new I/O request sequence preferably does not begin until the previous colliding I/O request sequence completes. When the obstructing I/O request sequence has been completed, the completion routine may check the queue, discover that all is clear, and may dispatch the first I/O request associated with the new I,O request sequence.

If no collision was detected in step 1374, then the method proceeds to step 1386 to begin processing the data write I/O request. Step 1386 is further illustrated in FIG. 34b.

Figures 34B, 34C:
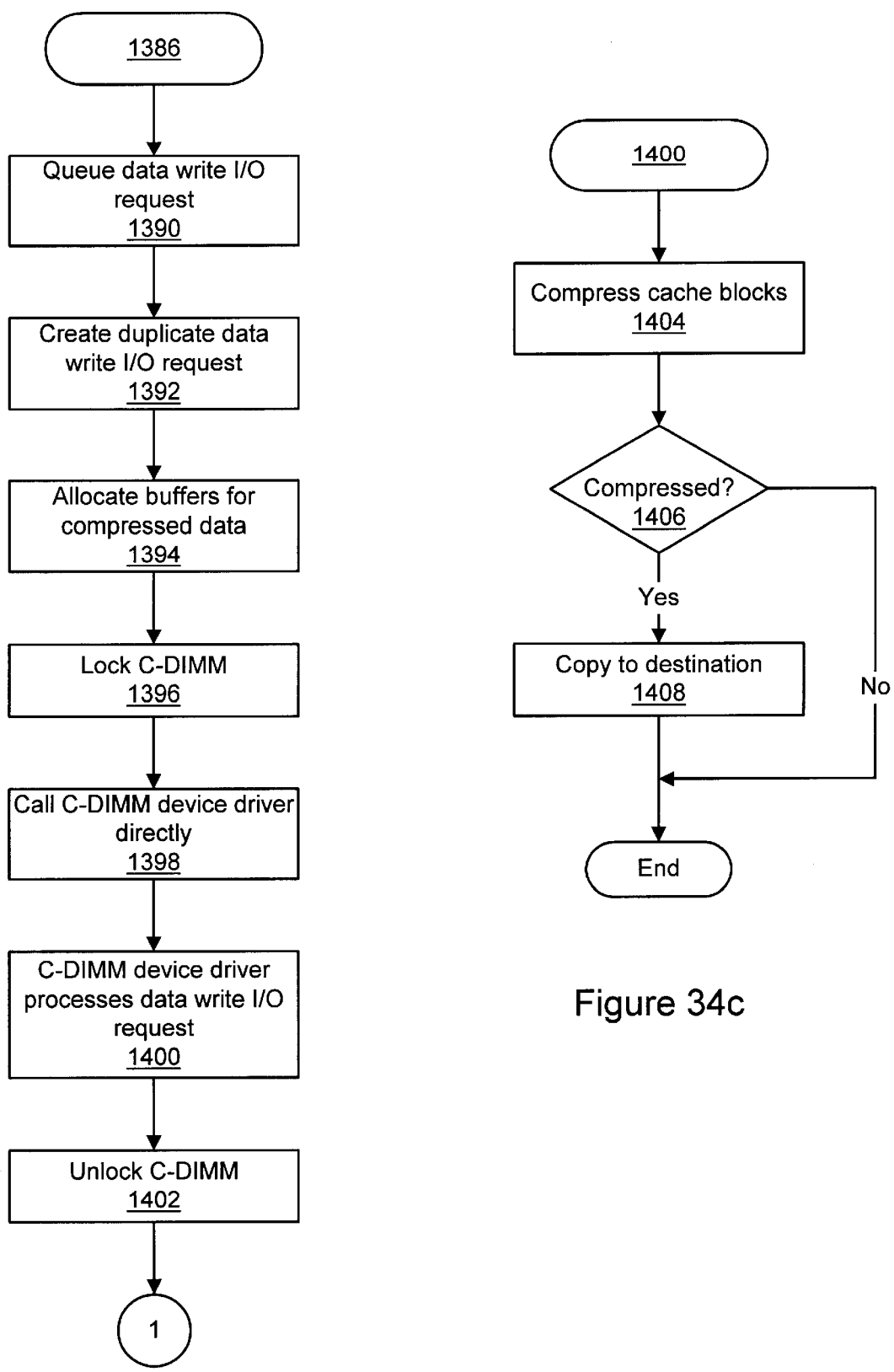
FIG. 34b is a flowchart expanding on step 1386 of FIG. 34a and illustrating the processing of a data write request when there is no collision according to one embodiment of the invention.
FIG. 34c is a flowchart expanding on step 1400 of FIG. 34b and illustrating the C-DIMM device driver processing a data write I/O request according to one embodiment of the invention.

FIG. 34b—Processing a Data Write Request

FIG. 34b is a flowchart expanding on step 1386 of FIG. 34a and illustrates the processing of a data write request by the dispatch routine according to one embodiment of the invention. This flow diagram shows an embodiment where the write data is compressed before the associated CPAT page 1108 is cached. Alternatively, the write data may be compressed after the CPAT page 1108 is cached.

In step 1390, the data write I/O request may be queued. In step 1392, a duplicate data write I/O request may be created. In step 1394, buffers to receive the compressed write data may be allocated. In step 1396, the C-DIMM may be locked. In step 1398, the C-DIMM device driver may be called to compress the write data. When calling the C-DIMM device driver, the dispatch routine preferably passes pointers to the original data write I/O request and the buffers allocated to receive the compressed data. The C-DIMM device driver preferably has all information needed to carry out the compression and copy operations. In step 1400, the C-DIMM device driver processes the data write I/O request. Step 1400 is further illustrated in FIG. 34c. In step 1402, the C-DIMM is unlocked. The flowchart of FIG. 34b is continued in FIG. 34d.

FIG. 34c—Processing a Data Write I/O Request

FIG. 34c is a flowchart expanding on step 1400 of FIG. 34b and illustrates the C-DIMM device driver processing a data write I/O request according to one embodiment of the invention. When calling the C-DIMM device driver, the dispatch routine preferably passes pointers to the original data write I/O request and the buffers allocated to receive the compressed data. The C-DIMM device driver preferably has all information needed to carry out the compression and copy operations. In step 1404, the uncompressed CPAT cache blocks 1108 may be compressed. In one embodiment, the cache blocks 1108 may be written into an input buffer of a Compactor Chip by the CDD. The Compactor Chip may then compress the compressed data using a parallel data compression method and may output the compressed data to an output buffer. In step 1406, if the data successfully compressed, the method proceeds to step 1408, where the compressed data in the output buffer may be copied to the destination buffers allocated in step 1394 of FIG. 34b. If the data did not compress, then step 1408 may be skipped.

Figure 34D:
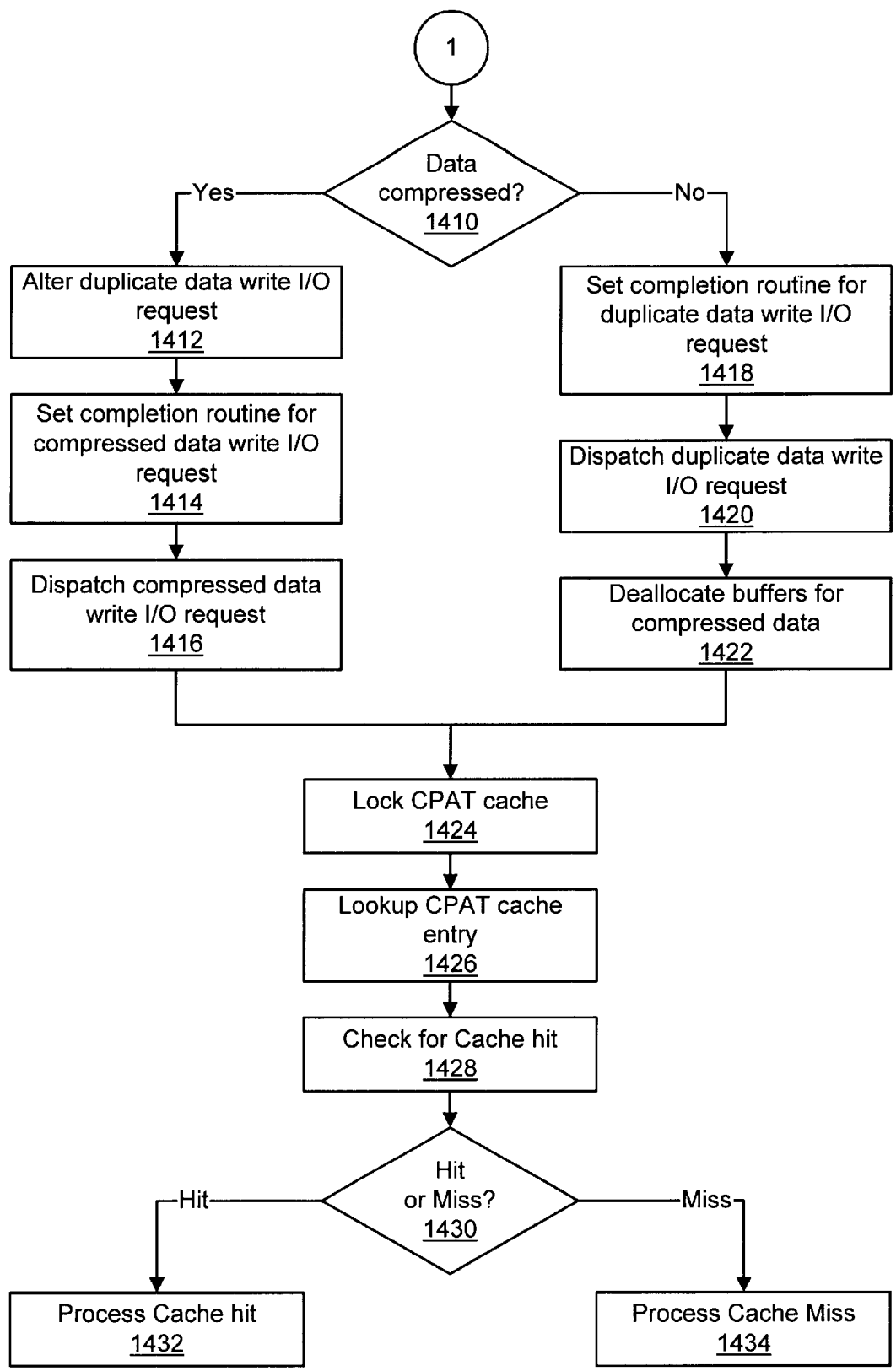
FIG. 34d is a continuation of the flowchart of FIG. 34b.

FIG. 34d—A Continuation of the Flowchart of FIG. 34b

FIG. 34d is a continuation of the flowchart of FIG. 34b and illustrates the dispatch routine processing a data write I/O request according to one embodiment of the invention. In step 1410, if the data was successfully compressed in FIG. 34c, then the method proceeds to step 1412. In step 1412, the duplicate data write I/O request created in step 1392 is altered for writing the compressed data. In step 1414, the completion routine for the duplicate data write I/O request is set to the completion routine for compressed data write I/O requests (see FIG. 35a). In step 1416, the compressed data write I/O request is dispatched. The method may then proceed to step 1424.

Steps 1418–1422 illustrate processing the I/O request when the data did not compress in FIG. 34c. In one embodiment, if the write data cannot be compressed, then the duplicate data write I/O request does not have to be altered, and the intermediate buffers can be released. In step 1418, the completion routine for the duplicate data write I/O request may be set. In step 1420, the I/O request may be dispatched. In step 1422, the buffers allocated in step 1394, not used for compressed data, may be deallocated. The method may then proceed to step 1424.

In step 1424, the CPAT cache may be locked. In step 1426, the method may perform a lookup in the CPAT cache to determine if the data being written is in the CPAT cache (a cache hit) or not in the CPAT cache (a cache miss). If a hit is detected, then the method proceeds to step 1432 to process the cache hit. Step 1432 is further illustrated in FIG. 34e. If a miss is detected, then the method proceeds to step 1434 to process the cache miss. Step 1434 is further illustrated in FIG. 34g.

Figure 34E:
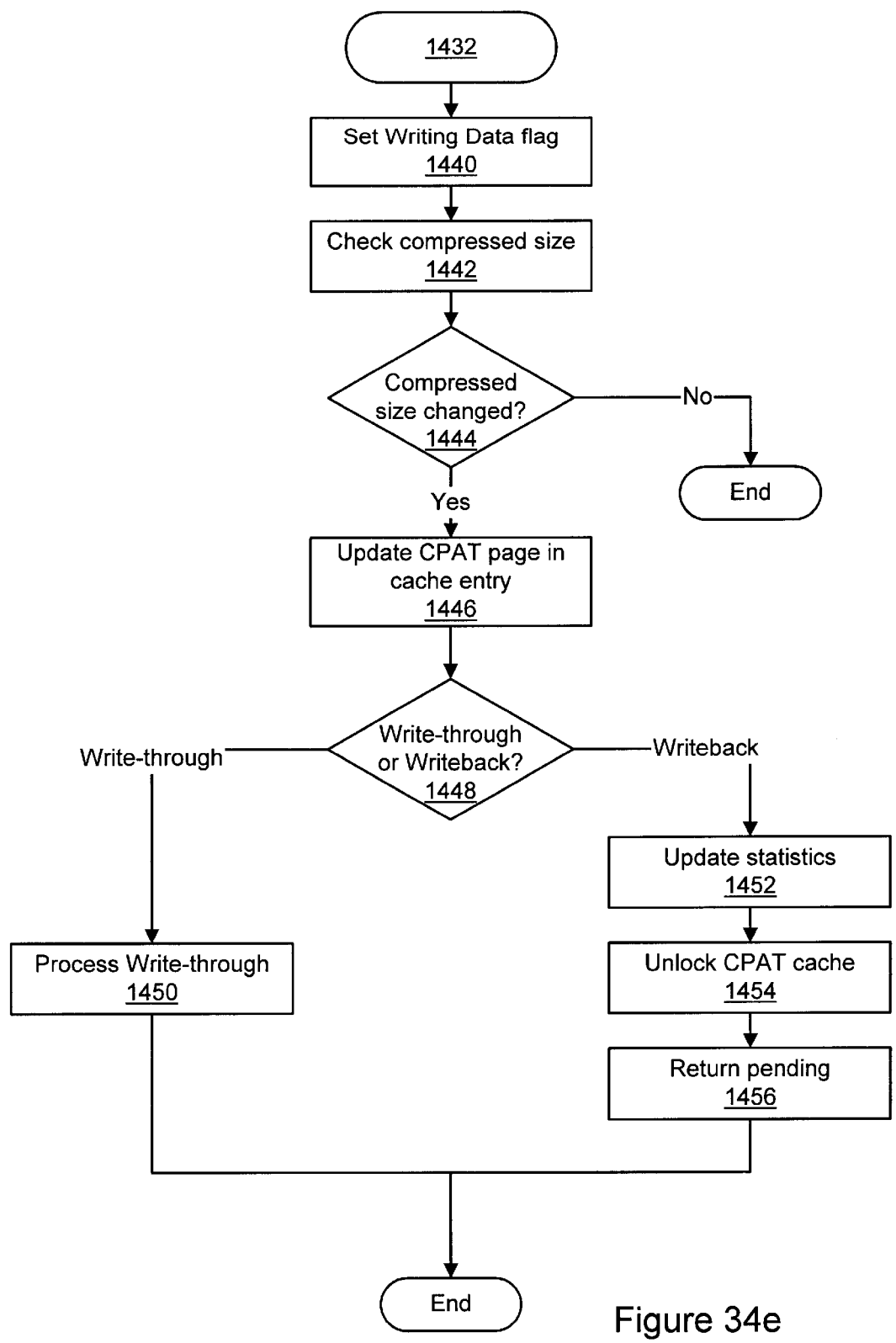
FIG. 34e is a flowchart expanding on step 1432 of FIG. 34d and illustrating the processing of a cache hit according to one embodiment of the invention.

FIG. 34e—Processing a Cache Hit

FIG. 34e is a flowchart expanding on step 1432 of FIG. 34d and illustrates the processing of a cache hit for a data write I/O request according to one embodiment of the invention. In step 1440, the Writing Data flag for the CPAT cache entry 1102 may be set. In step 1442, the compressed size of the data may be checked. If the compressed size did not change in step 1444, then the method may end. If the compressed size did change in step 1444, then the method may proceed to step 1446. In step 1446, the CPAT page 1108 stored in the cache entry 1102 may be updated with the new compressed data. Information in the cache entry 1102 may also be updated. In step 1448, if the data write I/O request is a write-through, then the method may proceed to step 1450 to process the write-through. Step 1450 is further illustrated in FIG. 34f. In step 1448, is this is a writeback, then processing may proceed to step 1452. In step 1452, the statistics for the CPAT cache may be updated. In step 1454, the CPAT cache may be unlocked. In step 1456, a pending status may be returned.

Figure 34F:
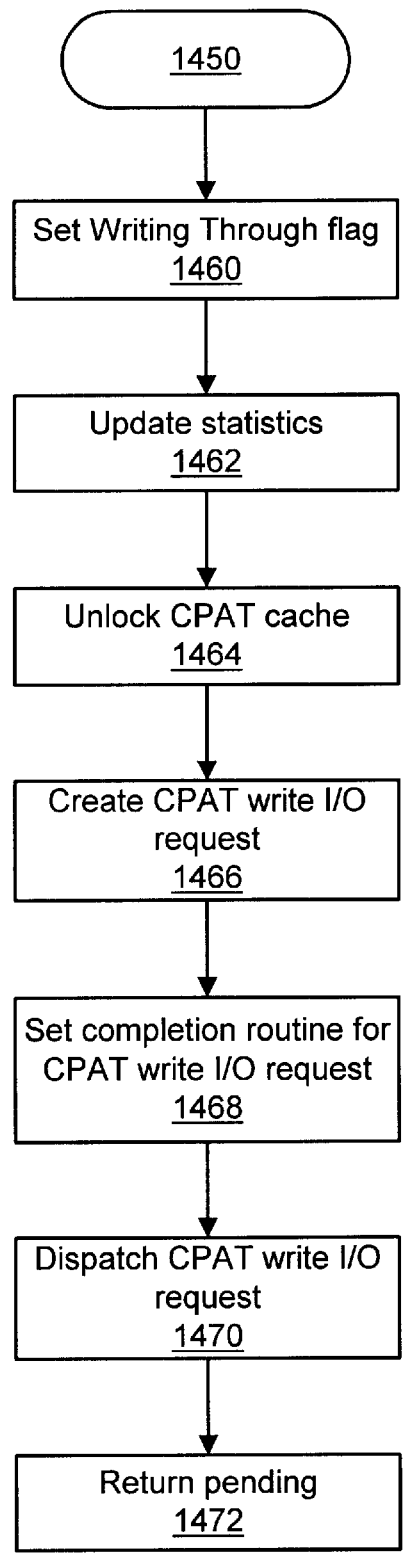
FIG. 34f is a flowchart expanding on step 1450 of FIG. 34e and illustrating the processing of a write-through for a cache hit according to one embodiment of the invention.

FIG. 34f—Processing a Write-through for a Cache Hit

FIG. 34f is a flowchart expanding on step 1450 of FIG. 34e and illustrates the processing of a write-through for a cache hit according to one embodiment of the invention. In step 1460, the Writing Through flag for the CPAT cache entry 1102 may be set. In step 1462, the statistics for the CPAT cache may be updated to register the Writing Through. In step 1464, the CPAT cache may be unlocked. In step 1466, a CPAT write I/O request may be created. In step 1468, the completion routine for the CPAT write I/O request may be set. In step 1470, the CPAT write I/O request may be dispatched. In step 1472, a status of Pending may be returned.

Figure 34G:
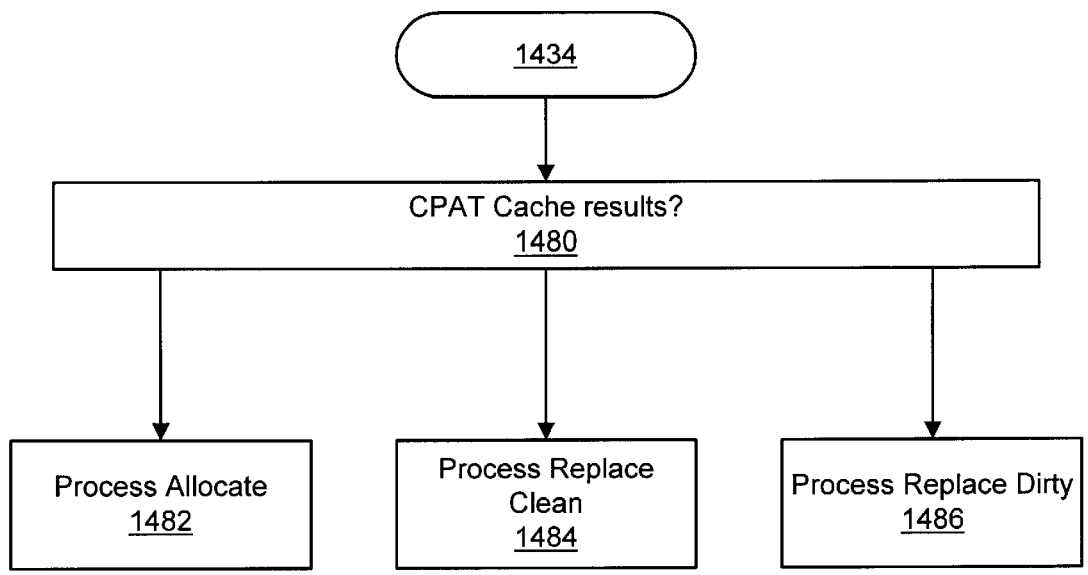
FIG. 34g is a flowchart expanding on step 1434 of FIG. 34d and illustrating the processing of a cache miss according to one embodiment of the invention.

FIG. 34*g*—Processing a Cache Miss

Figures 34H, 34I, 34J:
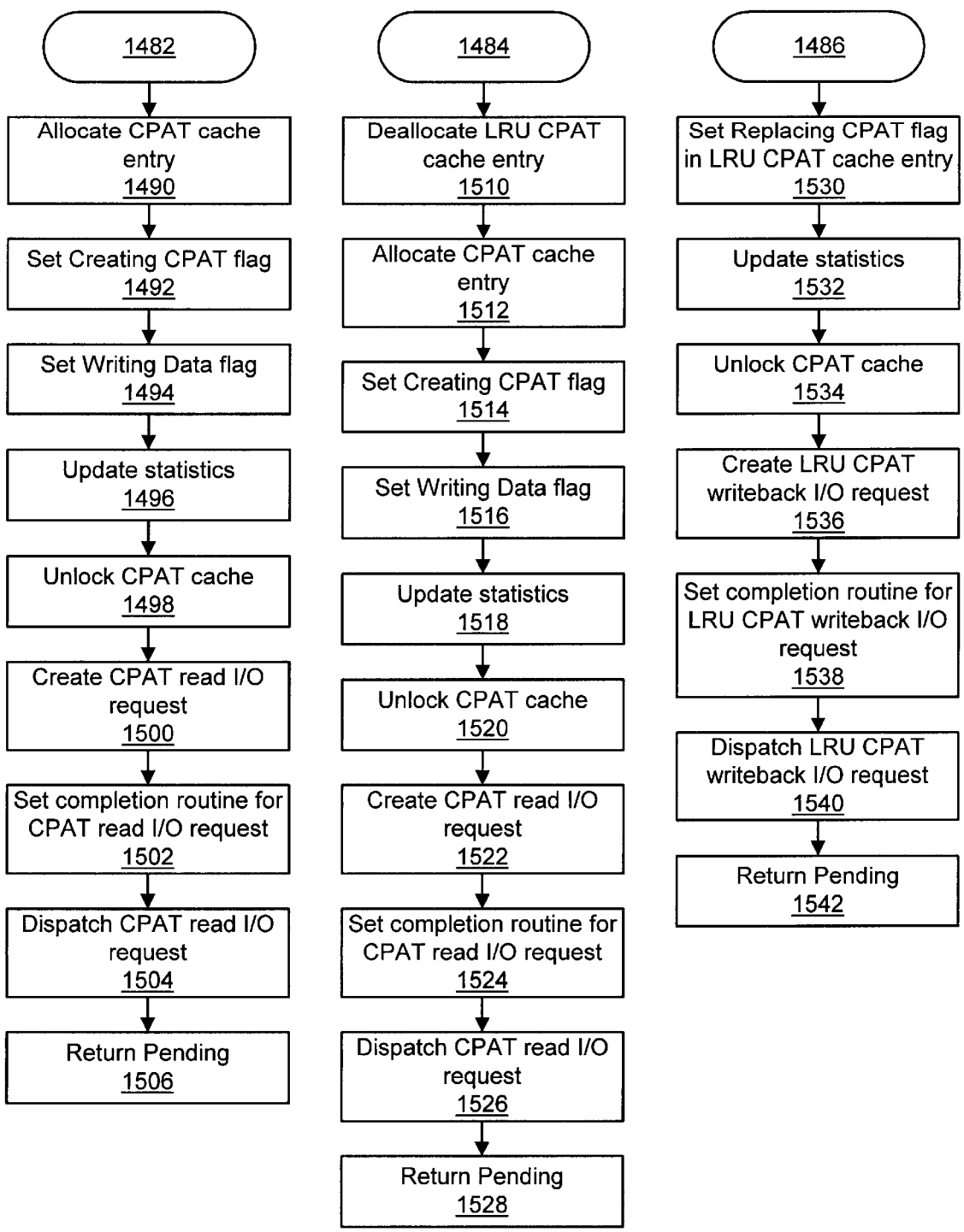
FIG. 34h is a flowchart expanding on step 1482 of FIG. 34g and illustrating the processing of a CPAT allocate according to one embodiment of the invention.
FIG. 34i is a flowchart expanding on step 1484 of FIG. 34g and illustrating the process of replacing clean data in a CPAT cache according to one embodiment of the invention.
FIG. 34j is a flowchart expanding on step 1486 of FIG. 34g and illustrating the process of replacing dirty data in a CPAT cache according to one embodiment of the invention.

FIG. 34*g* is a flowchart expanding on step 1434 of FIG. 34*d* and illustrates the processing of a cache miss according to one embodiment of the invention. For a cache miss, the compressed data may be copied into the CPAT cache. For a cache miss, space in the CPAT structure may be allocated or freed to make room for storing the data in the CPAT cache. The CPAT cache may be checked in step 1480. Based on the results of the check, one or more cache tree nodes 1104, cache entry headers 1106, and CPAT pages 1108 for storing the compressed requested data in the CPAT cache may be allocated in step 1482, one or more clean CPAT cache entries 1102 may be replaced by the new compressed data in step 1484, or one or more dirty CPAT cache entries 1102 may be replaced by the new compressed data in step 1486. FIG. 34*h* further illustrates step 1482, FIG. 34*i* further illustrates step 1484, and FIG. 34*j* further illustrates step 1486.

FIG. 34*h*—Processing a CPAT Allocate

FIG. 34*h* is a flowchart expanding on step 1482 of FIG. 34*g* and illustrates the processing of a CPAT allocate according to one embodiment of the invention. In step 1490, the new CPAT cache entry 1102 may be allocated. This may include allocating one or more cache tree nodes 1104, cache entry headers 1106, and CPAT pages 1108. In step 1492, a Creating CPAT flag may be set to indicate that a new CPAT cache entry 1102 is being created. In step 1494, a Writing Data flag may be set for the CPAT cache entry 1102. In step 1496, statistics for the CPAT cache may be updated. In step 1186, the CPAT cache may be unlocked. In step 1500, a CPAT read I/O request may be created. The completion routine for the CPAT read I/O request may be set in step 1502. In step 1504, the CPAT read I/O request may be dispatched. In step 1506, a pending status may be returned from the dispatch routine.

FIG. 34*i*—Replacing Clean Data in a CPAT Cache

FIG. 34*i* is a flowchart expanding on step 1484 of FIG. 34*g* and illustrates the process of replacing clean data in a CPAT cache according to one embodiment of the invention. In step 1510, a clean, least recently used (LRU) CPAT cache entry 1102 may be deallocated. In step 1512, the new CPAT cache entry 1102 may be allocated. This may include allocating one or more cache tree nodes 1104, cache entry headers 1106, and CPAT pages 1108. In step 1514, a Creating CPAT flag may be set to indicate that a new CPAT cache entry 1102 is being created. In step 1516, a Writing Data flag may be set for the CPAT cache entry 1102. In step 1518, statistics for the CPAT cache may be updated. In step 1520, the CPAT cache may be unlocked. In step 1522, a CPAT read I/O request may be created. The completion routine for the CPAT read IO request may be set in step 1524. In step 1526, the CPAT read I/O request may be dispatched. In step 1528, a pending status may be returned from the dispatch routine.

FIG. 34*j*—Replacing Dirty Data in a CPAT Cache

FIG. 34*j* is a flowchart expanding on step 1486 of FIG. 34*g* and illustrating the process of replacing dirty data in a CPAT cache according to one embodiment of the invention. In step 1530, the Replacing CPAT cache entry flag may be set for the dirty LRU CPAT cache entry 1102 being replaced. In step 1532, statistics for the CPAT cache may be updated. In step 1534, the CPAT cache may be unlocked. In step 1536, an LRU CPAT writeback I/O request may be created. The completion routine for the CPAT writeback I/O request may be set in step 1538. In step 1540, the CPAT writeback I/O request may be dispatched. In step 1542, a pending status may be returned from the dispatch routine.

FIGS. 35*a* Through 35*e*—CDM Completion Routine for Processing Data Write Requests FIGS. 35*a* through 35*e* are flowcharts illustrating a CDM completion routine for processing data write requests according to one embodiment of the invention. Steps in the flowcharts may occur concurrently or in different orders.

The completion routine shows CPAT writeback I/O requests due to replacement being serialized with subsequent CPAT read I/O requests. These I/O requests are preferably dispatched concurrently whenever there are sufficient resources (e.g. I/O requests, UMLs, and buffers).

Preferably, during completion routine (or background worker thread) processing, whenever an intermediate I/O request, UML or buffer cannot be created, then the completion routine suspends processing and waits until the next time the completion routine is called, at which time additional resources may become available.

Figure 37:
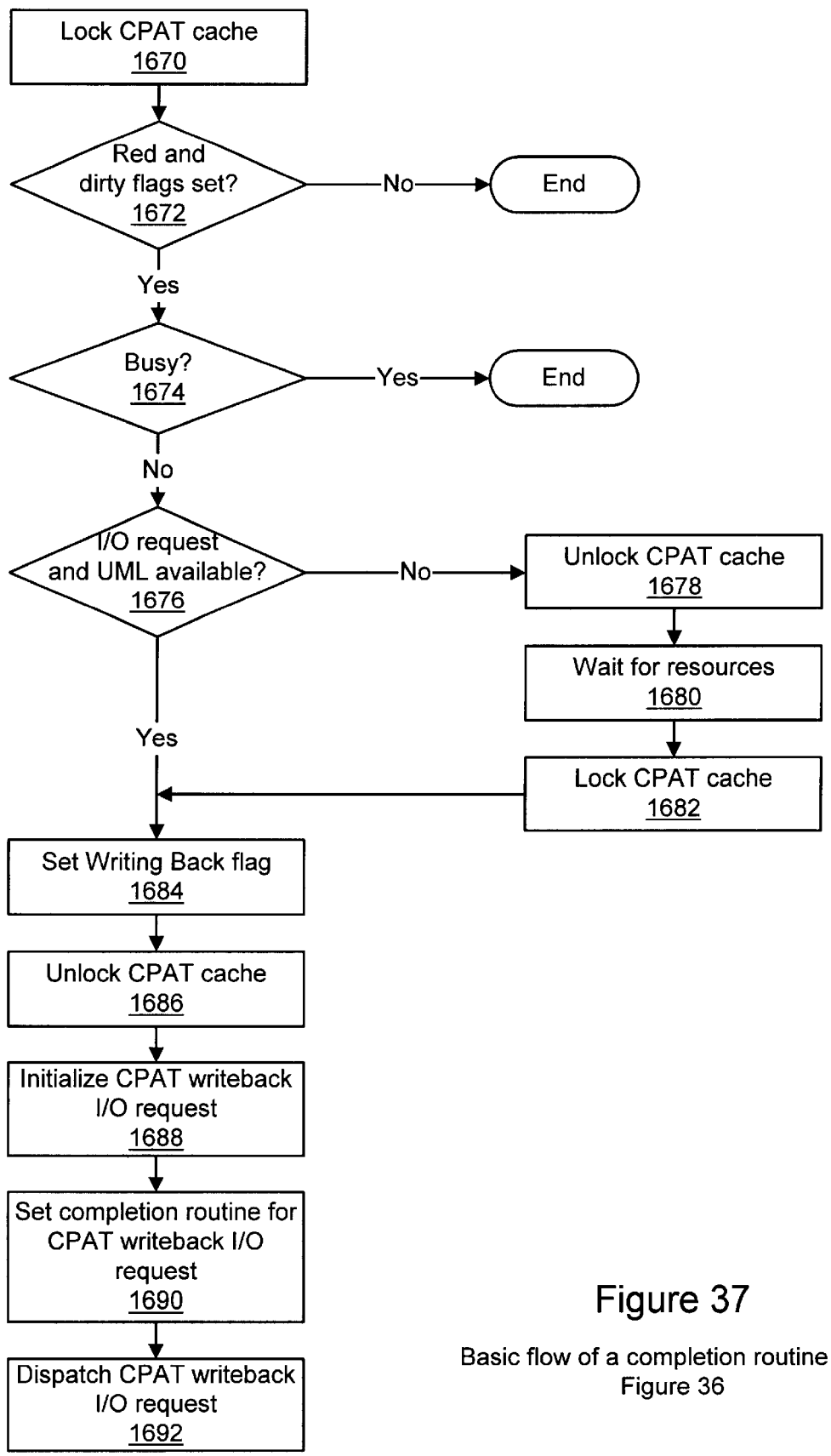
FIG. 37 is a flowchart illustrating the basic flow of a background thread when it finds a CPAT cache entry to writeback according to one embodiment of the invention.

In one embodiment, completion routines may call dispatch routines directly, and the background worker thread described in FIG. 37 may not be needed. In embodiments where a worker thread is needed, the worker thread may be created during Driver Entry for managing I/O request sequencing. In one embodiment, the completion routine is preferably not involved with managing I/O request sequencing. Instead, when the I/O Manager calls the completion routine, the completion routine preferably signals an event to wake up a worker thread. When the worker thread wakes up, it preferably checks the queue to determine what it should do next.

Figure 35A:
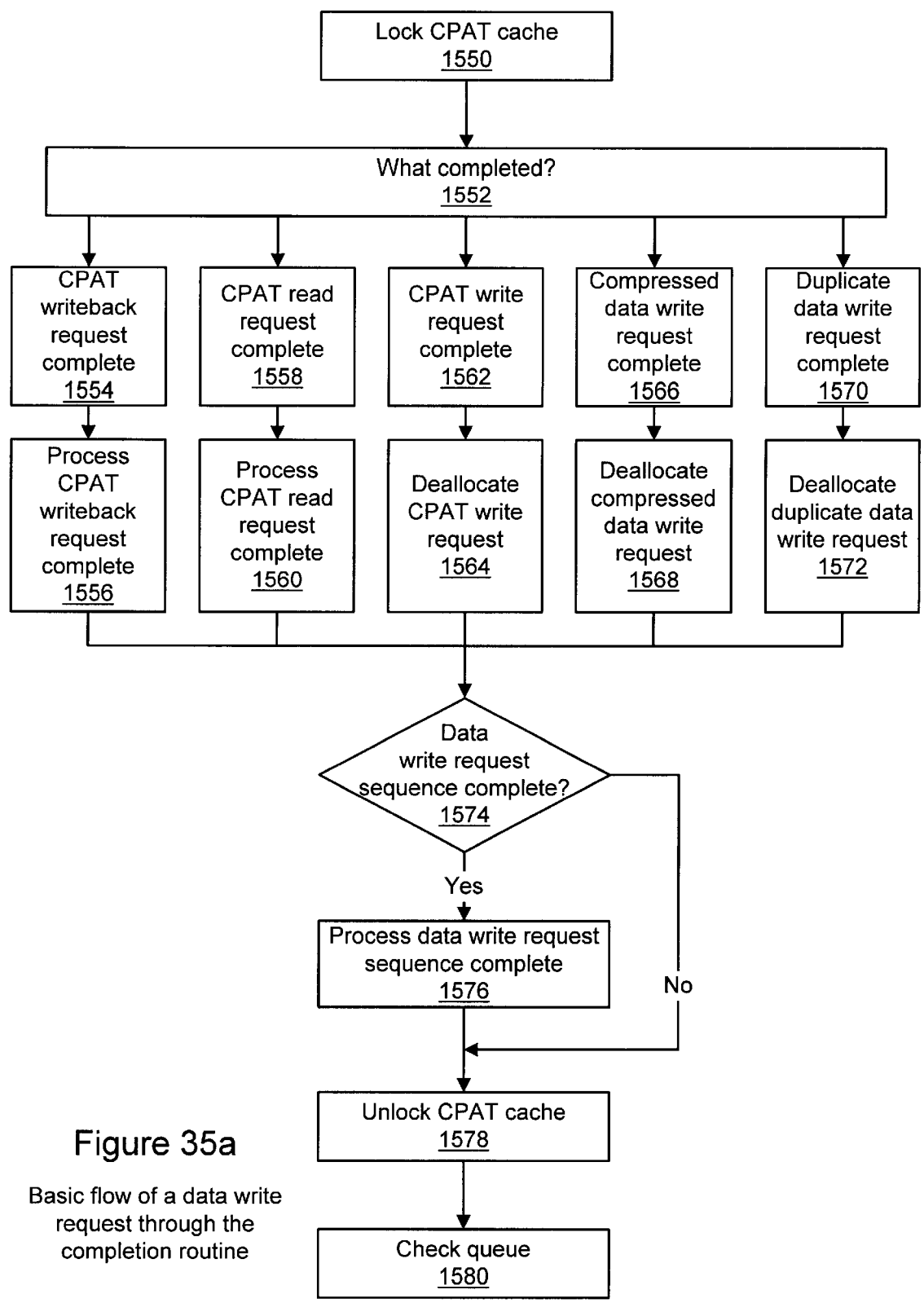
FIG. 35a is a flowchart illustrating the basic flow of a data write request through the completion routine according to one embodiment of the invention.

FIG. 35*a*—Basic Flow of a Data Write Request Through the Completion Routine FIG. 35*a* is a flowchart illustrating the basic flow of a data write request through the completion routine according to one embodiment of the invention. In one embodiment, one completion routine may include multiple branches to process different I/O request completions. Alternatively, a separate completion routine may be provided for one or more of the different I/O requests. In step 1550, the CPAT cache may be locked. In one embodiment, this may include acquiring one or more spin-locks. In step 1552, the completion routine may check to see what completed. In step 1554, a CPAT writeback I/O request has completed. In step 1556, the CPAT writeback I/O request complete is processed. Step 1556 is further illustrated in FIG. 35*b*. In step 1558, a CPAT read I/O request has completed. In step 1560, the CPAT read I/O request complete is processed. Step 1560 is further illustrated in FIG. 35*c*. In step 1562, a CPAT write request has completed. In step 1564, the CPAT write request may be deallocated. In step 1566, a compressed data write I/O request has completed. The compressed data write I/O request may be deallocated in step 1568. In step 1570, a duplicate data write I/O request has completed. In step 1572, the duplicate data write I/O request may be deallocated.

After the I/O request completion routine has completed for one of the completion types listed above, the completion routine proceeds to step 1574. In step 1574, the routine may check to see if the data write request sequence has completed. If it has not, then the method proceeds to step 1576. If the data write request sequence has completed, then the method proceeds to step 1578.

In step 1576, the data write request sequence complete is processed. Step 1576 is further illustrated in FIG. 35e. In step 1578, the CPAT cache is unlocked. In step 1580, the completion routine may check the queue of I/O requests to see if there are any I/O requests (such as I/O requests queued due to collision) to dispatch.

Figure 35B:
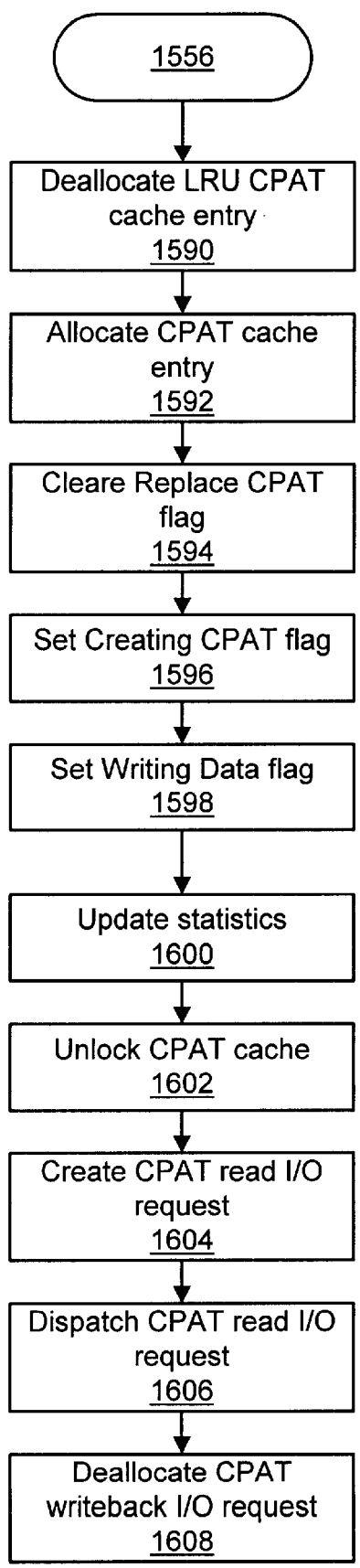
FIG. 35b is a flowchart expanding on step 1556 of FIG. 35a and illustrating the processing of a CPAT writeback I/O request complete according to one embodiment of the invention.

FIG. 35b—Processing a CPAT Writeback I/O Request Complete

FIG. 35b is a flowchart expanding on step 1556 of FIG. 35a and illustrating the processing of a CPAT writeback I/O request complete according to one embodiment of the invention. The CPAT writeback I/O request may have been dispatched in FIG. 34j. In step 1590, the LRU CPAT cache entry 1102 may be deallocated. In step 1592, a new CPAT cache entry 1102 is allocated. In step 1594, the Replace CPAT flag, set in step 1530 of FIG. 34j, is cleared for the CPAT cache entry 1102. In step 1596, the Creating CPAT flag for the cache entry 1102 may be set. In step 1598, the Writing Data flag for the cache entry 1102 may be set. In step 1600, statistics for the CPAT cache may be updated. The CPAT cache may be unlocked in step 1602. In step 1604, a CPAT read I/O request may be created, and dispatched in step 1606. The CPAT writeback I/O request may be deallocated in step 1608.

Figure 35C:
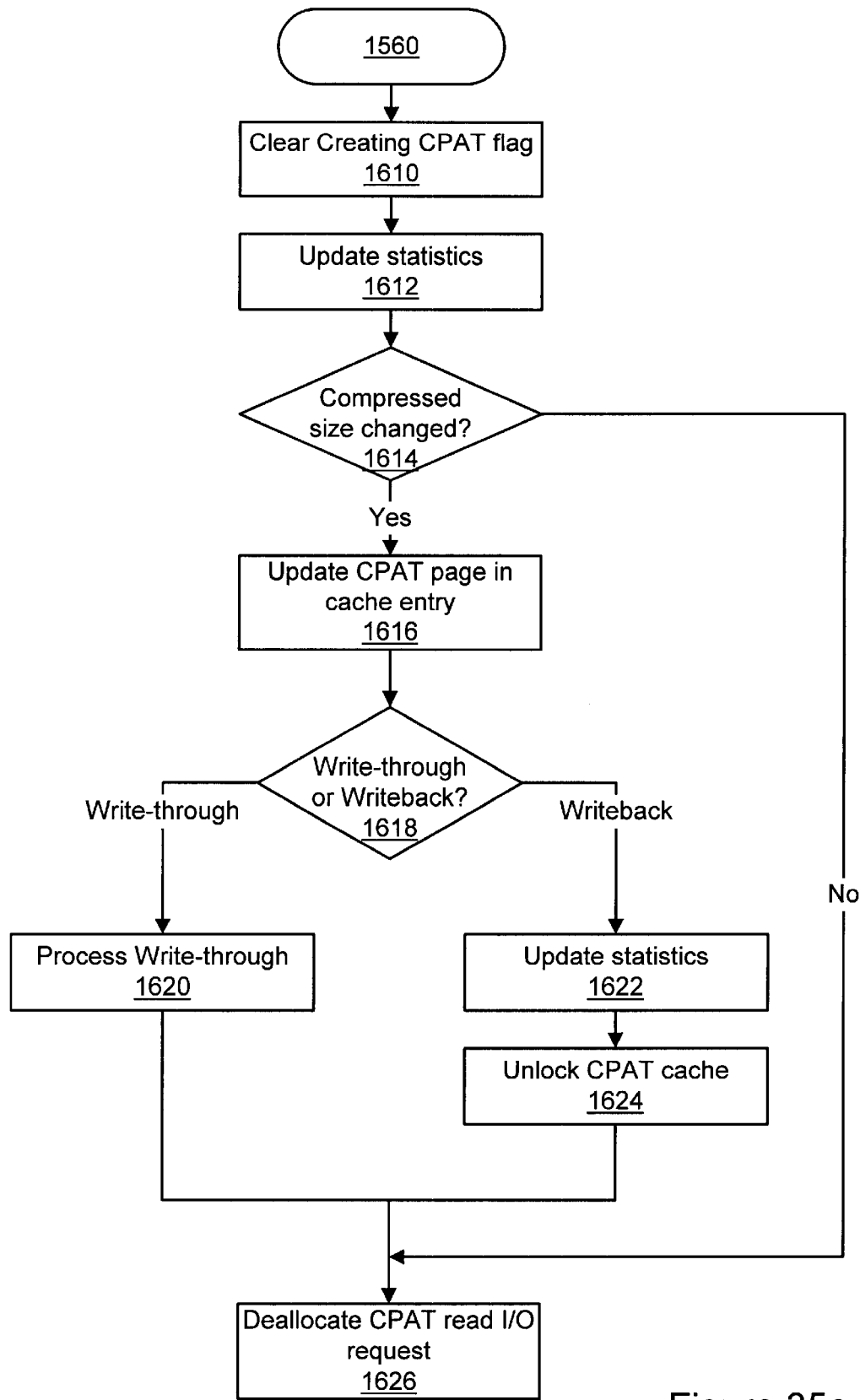
FIG. 35c is a flowchart expanding on step 1556 of FIG. 35a and illustrating the processing of a CPAT read I/O request complete according to one embodiment of the invention.

FIG. 35c—Processing a CPAT Read I/O Request Complete

FIG. 35c is a flowchart expanding on step 1556 of FIG. 35a and illustrating the processing of a CPAT read I/O request complete according to one embodiment of the invention. The CPAT read I/O request may have been dispatched in FIG. 34h or FIG. 34i. In step 1610, the Creating CPAT flag for the cache entry 1102 may be cleared. In step 1612, statistics for the CPAT cache may be updated. In step 1614, the routine may check to see if the new compressed data's size has changed. If it has not, then the method may proceed to step 1626. If the size has changed, then the method may proceed to step 1616.

In step 1616, the CPAT page 1108 in the cache entry 1102 may be updated with the new compressed data. In step 1618, if in write-through mode, then the routine proceeds to step 1620. In step 1620, the write-through request is processed. Step 1620 is illustrated in FIG. 35d. After processing the write-through is completed, the method proceeds to step 1626. In step 1618, if in writeback mode, then the routine proceeds to step 1622. In step 1622, statistics for the CPAT cache may be updated. In step 1624, the CPAT cache may be unlocked. After processing the writeback is completed, the method proceeds to step 1626.

In step 1626, the CPAT read I/O request may be deallocated.

FIG. 35d—Processing of a Write-through

FIG. 35d is a flowchart expanding on step 1620 of FIG. 35c and illustrating the processing of a write-through according to one embodiment of the invention. In step 1630, the write-through flag for the cache entry 1102 may be set. In step 1632, statistics for the CPAT cache may be updated. In step 1634, the CPAT cache may be unlocked. In step 1636, a CPAT write I/O request may be created. In step 1638, the completion routine for the CPAT write I/O request may be set. In step 1640, the CPAT write I/O request may be dispatched.

FIG. 35e—Processing a Data Write I/O Request Sequence Complete

Figure 45:
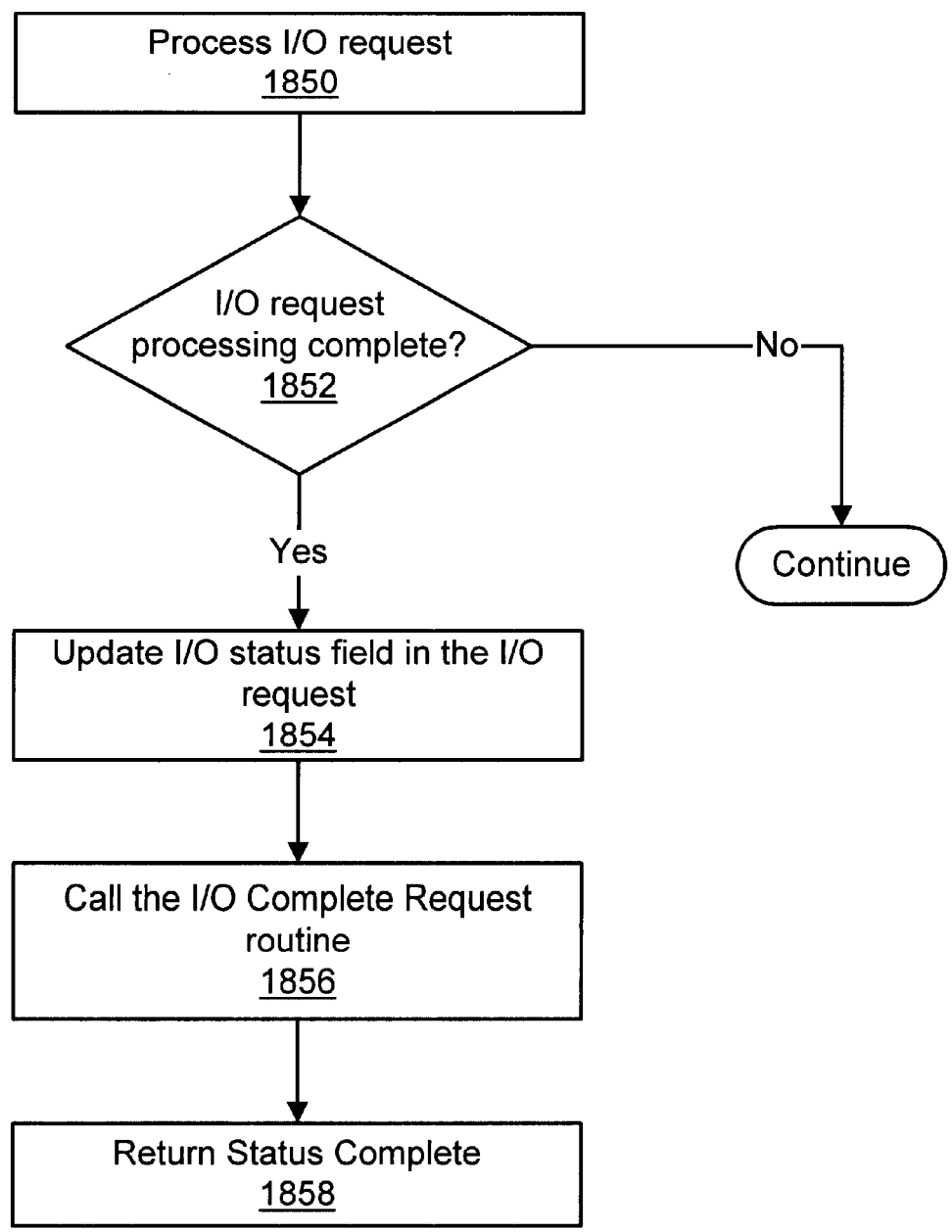

FIG. 35e is a flowchart expanding on step 1576 of FIG. 35a and illustrating the processing of a data write I/O request sequence complete according to one embodiment of the invention. In step 1650, the Writing Through flag for the CPAT cache entry 1102 may be cleared. In step 1652, the Writing Data flag for the CPAT cache entry 1102 may be cleared. In step 1654, the Green flag for the cache entry 1102 may be set to indicate the entry is recently used. In one embodiment, a pointer to the cache entry 1102 may be placed in a "Green" list of pointers to recently used cache entries 1102. In step 1656, statistics for the CPAT cache may be updated. In step 1658, the original data write I/O request may be completed. FIG. 45 illustrates one embodiment of a method of completing an I/O request.

FIG. 36—Conditions when Outstanding Data Requests to the Same Data Page or CPAT Page May be Serialized FIG. 36 is a table illustrating examples of conditions when outstanding data requests to the same data page or CPAT page may be serialized. The first column lists combinations of incoming requests. The second column lists the conditions of the incoming requests. The third column illustrates the possible serialization of the two requests in column 1.

In one embodiment, the completion routine is preferably not involved with managing I/O request sequencing. Instead, when the I/O Manager calls the completion routine, the completion routine preferably signals an event to wake up a worker thread. When the worker thread wakes up, it may check the queue to determine what it should do next. In one embodiment, completion routines may call dispatch routines directly, and the worker thread may not be needed. In embodiments where a worker thread is needed, the worker thread may be created during Driver Entry for managing I/O request sequencing.

In one embodiment, if there are a large number of outstanding data requests, then an indexing scheme may be used to organize and search the queue of outstanding data requests to check for accesses to the same data page and CPAT page 1108.

In one embodiment, whenever a new data request to the same data page as an outstanding data request is detected, and one of the data requests is a write, under certain conditions, the requests are preferably serialized. For example, if any of the data write requests result in a compressed size that is different from the current compressed size such that the associated CPAT page 1108 has to be updated, then all data requests to the same data page surrounding the write request are preferably serialized. A data write request that requires a CPAT page update preferably appears atomic to all data requests to the same data page that surround it. Data write requests are preferably compressed and copied into one of the pre-allocated buffers used to transfer compressed data to disk before they can be compared to other compressed sizes.

Whenever a data write request to the same CPAT page 1108 as an outstanding data write request is detected, and both need to update the CPAT page 1108, and the CPAT page 1108 is being cached in write-through mode causing two CPAT page write requests, then the requests are preferably serialized.

FIG. 37—Basic Flow of a Background Thread when it Finds a CPAT Cache Entry to Writeback FIG. 37 illustrates the basic flow of a background thread checking a CPAT cache entry 1102 to see if it needs to be written back. Steps in the flowchart may occur concurrently or in different orders.

In step 1670, the background thread may lock the CPAT cache. In step 1672, the thread may check the CPAT cache entry 1102 to see if the entry is Red (LRU) and dirty (has been "touched"). If the cache entry 1102 is not Red and dirty, the thread does not process it. In step 1674, the thread may check to see if the cache entry 1102 is busy. If the cache entry 1102 is busy, then the thread does not process it. In step

1676, the background thread may check to see if resources are available to write back the cache entry 1102. Resources necessary to write back the cache entry 1102 may include an I/O request and UML. If the necessary resources are not available, then the thread may unlock the CPAT cache in step 1678, wait until the resources are available in step 1680, lock the CPAT cache in step 1682 when resources are available, and continue to step 1684. One or more I/O requests and UMLs are preferably preallocated during Driver Entry for CPAT cache writeback use. The background thread preferably does not attempt to allocate new I/O requests and UMLs while the CPAT cache is locked.

When resources are available, the thread may set the Writing Back flag for the cache entry 1102 in step 1684. In step 1686, the CPAT cache may be unlocked. In step 1688, the thread may initialize a CPAT writeback I/O request. The completion routine may be set for the writeback I/O request in step 1690, and the I/O request may be dispatched in step 1692. Processing of the resulting CPAT writeback I/O request completion routine is illustrated in FIG. 38.

Figure 38:
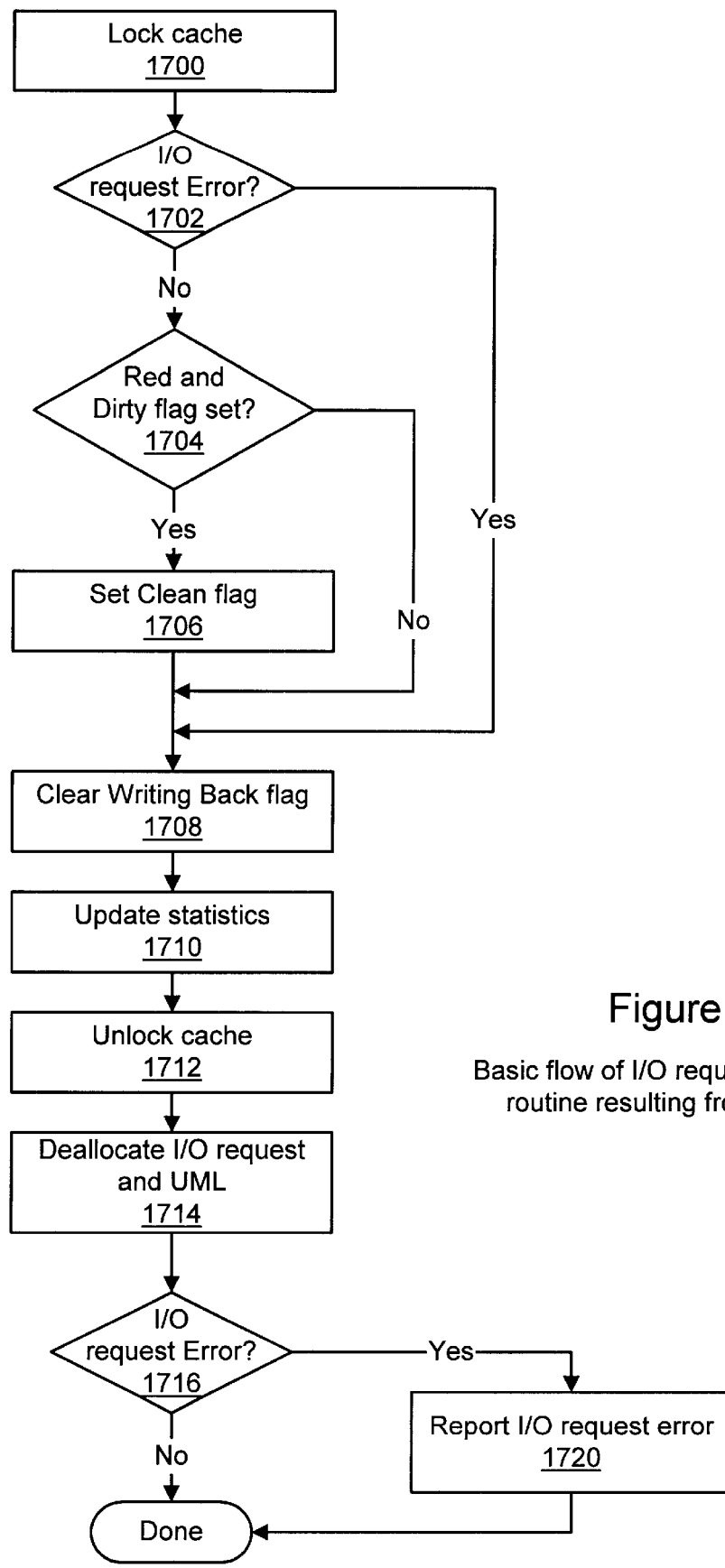
FIG. 38 is a flowchart illustrating the basic flow of the completion routine resulting from FIG. 37 according to one embodiment of the invention.

FIG. 38—Basic Flow of Completion Routine Resulting from FIG. 37

FIG. 38 is a flowchart illustrating the basic flow of the completion routine resulting from FIG. 37 according to one embodiment of the invention. Steps in the flowcharts may occur concurrently or in different orders.

In step 1700, the CPAT cache may be locked. In step 1702, if an I/O request error was generated, the method proceeds to step 1708. If no error was generated, the method proceeds to step 1704. In step 1704, if the Red and Dirty flags are not set for the cache entry 1102, then the method proceeds to step 1708. If the Red and Dirty flags are set, then the Clean flag is set for the cache entry 1102 in step 1706. If the Red flag is not set when the completion routine is ready to update the CPAT cache entry 1102, then the completion routine preferably does not set the Clean flag. This may indicate the CPAT cache entry 1102 was updated during the writeback, and is dirty again.

In step 1708, the Writing Back flag is cleared. In step 1710, statistics for the CPAT cache may be updated. In step 1712, the CPAT cache may be unlocked. In step 1714, resources allocated for the writeback in step 1676 of FIG. 37 may be deallocated. One or more I/O requests and UMLs are preferably preallocated during Driver Entry for CPAT cache writeback use. Instead of deallocating these resources, the completion routine preferably recycles them for later reuse. The background thread preferably does not attempt to allocate I/O requests and UMLs while the CPAT cache is locked. In step 1720, in one embodiment, an error is reported to the operating system when an I/O request that the background thread created returns an error status. In one embodiment, the operation may be retried at least once.

FIG. 39—Background Thread Processing

FIG. 39 is a table listing several CPAT cache management routines that may be included in background thread processing. In one embodiment, a background thread and a configurable timer-based Dispatch Object are created during Driver Entry. The timer periodically wakes up the background thread. The background thread includes several CPAT cache management routines that may perform several functions. The functions may include, but are not limited to: memory allocation, memory deallocation, CPAT cache deallocation, CPAT writeback, and CPAT cache state transitions (i.e. from Green to Yellow, from Yellow to Red).

When resources are not available to perform a CPAT page writeback, the background thread preferably waits until resources have been recycled. As soon as one of the pending writebacks completes, the background thread is preferably signaled and CPAT cache writeback processing continues.

FIG. 40—Various Ways the CDM Handles Incoming I/O Requests Based on the Type of Operation Being Performed FIG. 40 is a table illustrating various ways the CDM may handle incoming I/O requests based on the type of operation being performed. The first column lists the types of incoming I/O requests. The second column lists the actions the CDM may take for the various request types.

In one embodiment, the CDM may only receive IRS-based I/O requests. In another embodiment, the CDM may receive other types of I/O requests as well.

FIG. 41—C-DIMM Device Driver Interface

FIG. 41 is a table illustrating the CDM interface to the C-DIMM device driver (CDD). When the CDM calls the CDD directly, it may pass the CDD a pointer to the I/O request, and a pointer to the intermediate buffers.

Since the CDD does not have to deal with hardware interrupts and queues, the interface between the CDM and CDD is preferably very simple. When the CDM calls the CDD directly, control is preferably not returned to the CDM until the compression or decompression and copy is complete.

In one embodiment, the CDD may to provide a method that allows the CDM to acquire a spin-lock from the CDD. Since the CDD may be managing more than one C-DIMM, it is preferably up to the CDD to decide which C-DIMM spin-lock to acquire.

FIGS. 42a through 42d—CDM and CCM Interactions

FIGS. 42a through 42d are flowcharts illustrating CDM and CCM interactions according to one embodiment of the invention. Steps in the flowcharts may occur concurrently or in different orders.

When managing Compressed disk storage space, the CDM may transfer data between compressed storage space and uncompressed memory space. When a Compressed Cache Manager (CCM) is loaded, the CDM may transfer data between compressed storage space and compressed memory space, as well. Consequently, unnecessary compressions and decompressions between the CDM and CCM may occur. To minimize this, the CCM preferably notifies the CDM when a data read or write I/O request should not be decompressed or compressed. Similarly, the CDM preferably returns a status to the CCM that indicates whether the data is compressed.

The CDM and CCM preferably both include compressed disk storage I/O request decode routines. In one embodiment, a configuration and performance utility is responsible for configuring both the CDM and CCM so that they can recognize I/O requests targeted for compressed disk storage.

The following flowcharts describe a very high-level flow of how the CDM and CCM may handle data transfers when both the CDM and CCM are loaded.

Figure 42A:
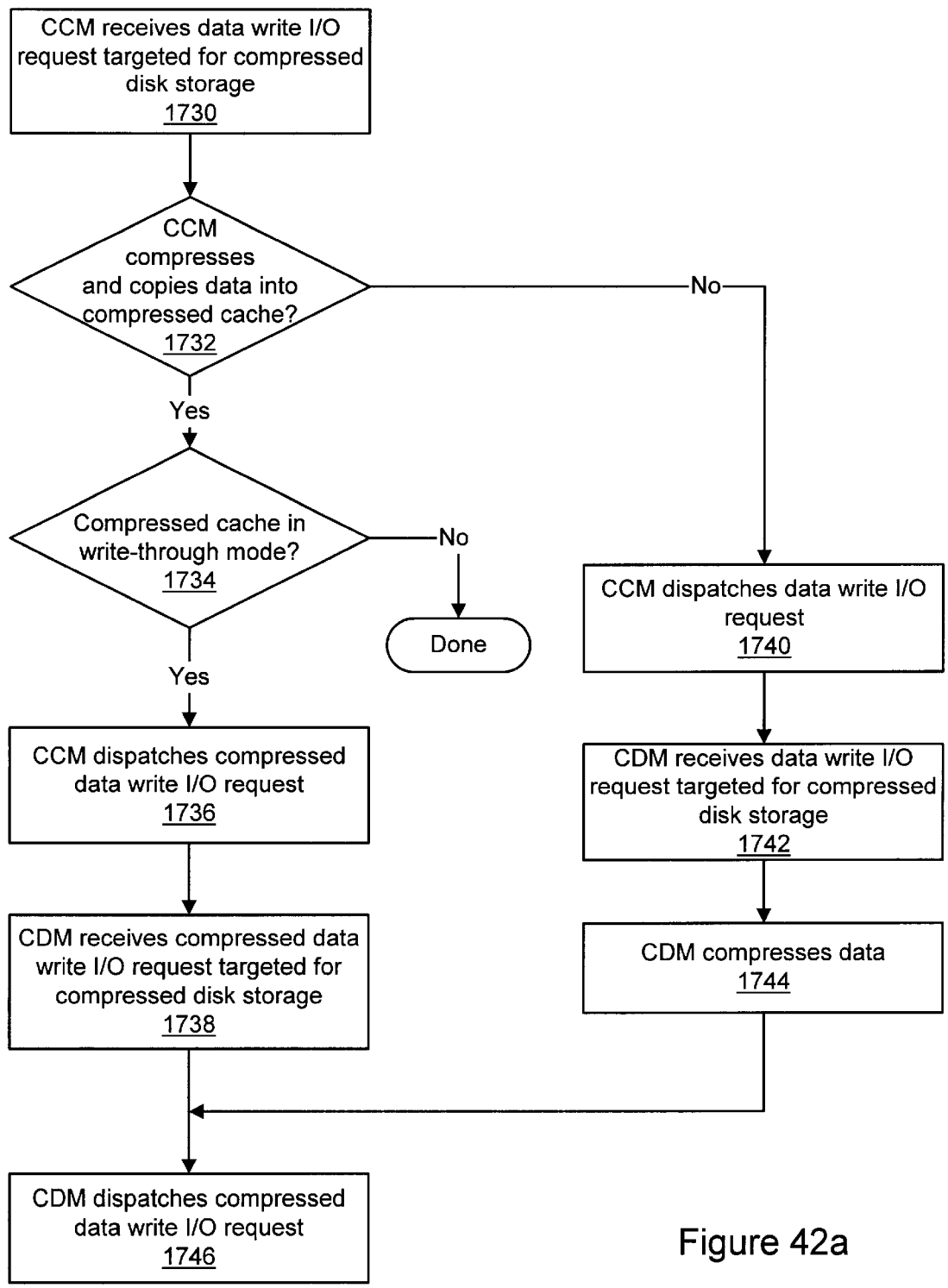

FIG. 42a—Data Write Requests with CCM and CDM Present

FIG. 42a is a flowchart illustrating the handling of data write requests when the CCM and CDM are both present according to one embodiment of the invention. Without this support, the CCM and CDM may both compress the write data. With this support, only the CCM compresses the write data.

In step 1730, the CCM may receive a data write I/O request targeted for compressed disk storage. In step 1732, if the CCM does not compress the data being written, then the method proceeds to step 1740. In step 1740, the CCM dispatches a data write I/O request. In step 1742, the CDM receives the data write I/O request. In step 1744, the CDM compresses the data, and the method proceeds to step 1746.

In step 1732, if the CCM compresses the data being written, then the method proceeds to step 1734. In step 1734, if the compressed cache is not in write-through mode, then processing is done. If the compressed cache is in write-through mode, then the method proceeds to step 1736. In step 1736, the CCM dispatches a compressed data write I/O request. In step 1738, the CDM receives the compressed data write I/O request. In step 1746, the CDM dispatches the compressed data write I/O request to complete the write of the compressed data to the CPAT cache.

FIG. 42*b*—Compressed Cache Writeback Requests with CCM and CDM Present

FIG. 42*b* is a flowchart illustrating the processing of a compressed cache writeback request when the CCM and CDM are both present according to one embodiment of the invention. Without this support, the CCM may decompress the write data, and the CDM may re-compress the write data. With this support, both CCM decompression and CDM compression can be eliminated.

In step 1750, the CCM may dispatch a compressed data writeback I/O request targeted for compressed disk storage. In step 1752, the CDM may receive the compressed data writeback I/O request dispatched in step 1750. In step 1754, the CDM dispatches the compressed data writeback I/O request.

FIG. 42*c*—Compressed Cache Prefetch Requests with CCM and CDM Present

FIG. 42*c* is a flowchart illustrating the processing of compressed cache prefetch requests when the CCM and CDM are both present according to one embodiment of the invention. Without this support, the CDM may decompress the read data, and the CCM may re-compress the write data. With this support, only the CCM decompresses the read data.

In step 1760, the CCM dispatches a data prefetch I/O request targeted for compressed disk storage. In step 1762, the CDM receives the data prefetch I/O request dispatched in step 1760. In step 1764, the nonvolatile memory device driver copies the read data directly to the compressed cache of the CCM. In step 1766, the CDM returns a status to the CCM indicating if the read data is compressed. The CCM may then compress the data if it is not compressed.

Figure 42D:
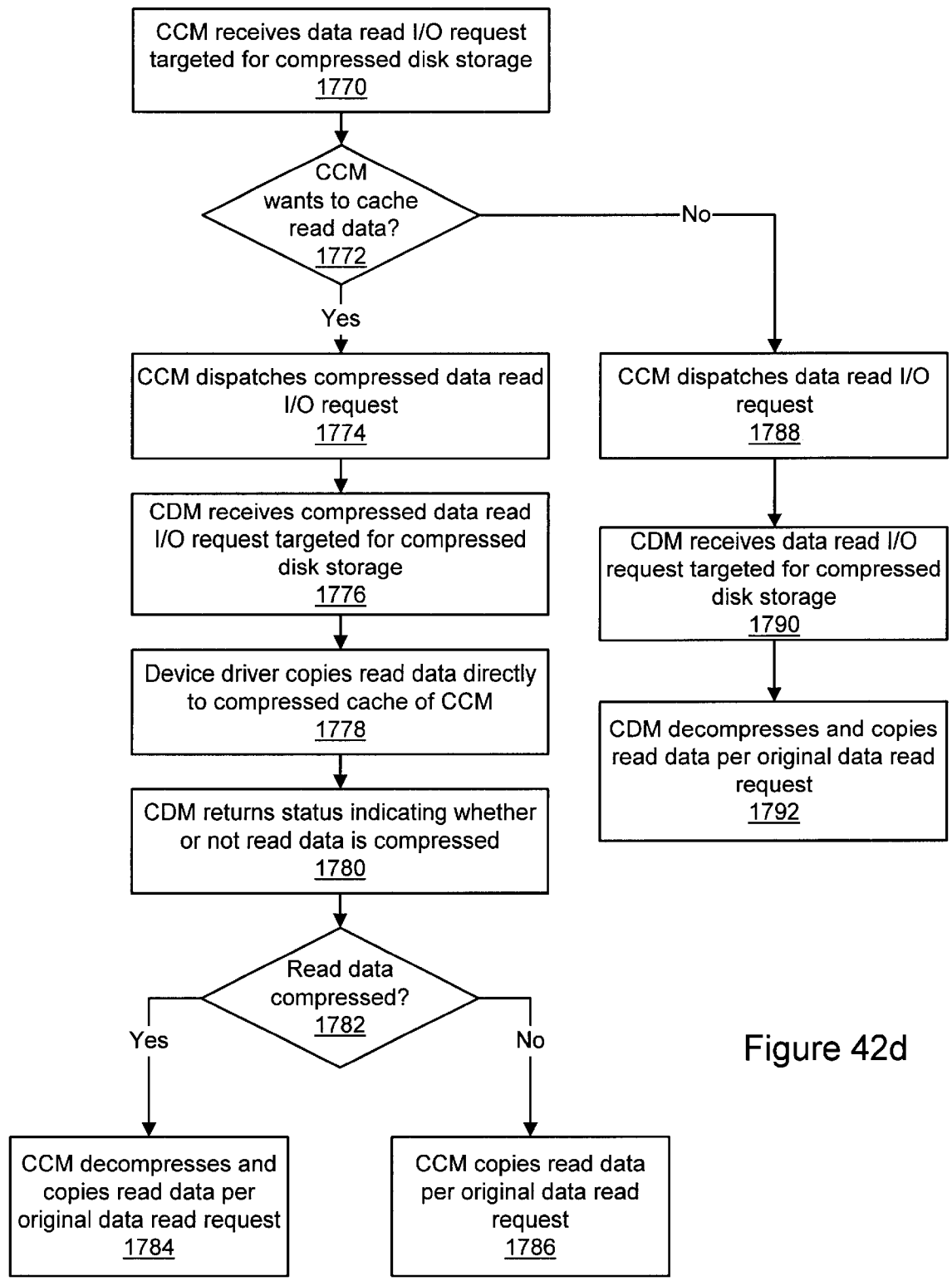

FIG. 42*d*—Data Read Requests with CCM and CDM Present

FIG. 42*d* is a flowchart illustrating the processing of data read I/O requests when the CCM and CDM are both present according to one embodiment of the invention. Without this support, the CDM may decompress the read data, and the CCM may recompress the write data. With this support, both CDM decompression and CCM compression can be eliminated.

In step 1770, the CCM receives a data read I/O request targeted for compressed disk storage. In step 1772, if the CCM does not want to cache the read data, then the method proceeds to step 1788. In step 1788, the CCM dispatches the data read I/O request. In step 1790, the CDM receives the data read I/O request dispatched in step 1788. In step 1792, the CDM decompresses and copies the read data to meet the original data read request received in step 1770.

In step 1772, if the CCM wants to cache the read data, then the method proceeds to step 1774. In step 1774, the CCM dispatches a compressed data read I/O request. In step 1776, the CDM receives the compressed data read I/O request dispatched in step 1774. In step 1778, the nonvolatile memory device driver copies the read data directly to the compressed cache of the CCM. In step 1780, the CDM returns a status of whether or not the read data is compressed. In step 1782, if the read data is compressed, then the CCM decompresses and copies the read data to the destination specified in the original data read request received in step 1770. In step 1782, if the read data is not compressed, the CCM copies the read data to the destination specified in the original data read request received in step 1770.

FIGS. 43 Through 48—Dispatch and Completion Routine Basics

FIGS. 43 through 48 are flowcharts illustrating some basic functions in dispatch and completion routine processing. Steps in the flowcharts may occur concurrently or in different orders.

In one embodiment, a pointer to the Device Object and the I/O request may be passed to a dispatch routine. In one embodiment running on a Windows NT operating system, dispatch routines may be called by higher-layer drivers using an I/O Call Driver function by setting an Interrupt Request Packet's MinorFunction field to IRP_MN_DPC.

FIG. 43—Validating an I/O Request

A dispatch routine for handling the various types of I/O requests as described above preferably validates the I/O request before proceeding. FIG. 43 illustrates one embodiment of a method to validate an I/O request.

Figure 44:
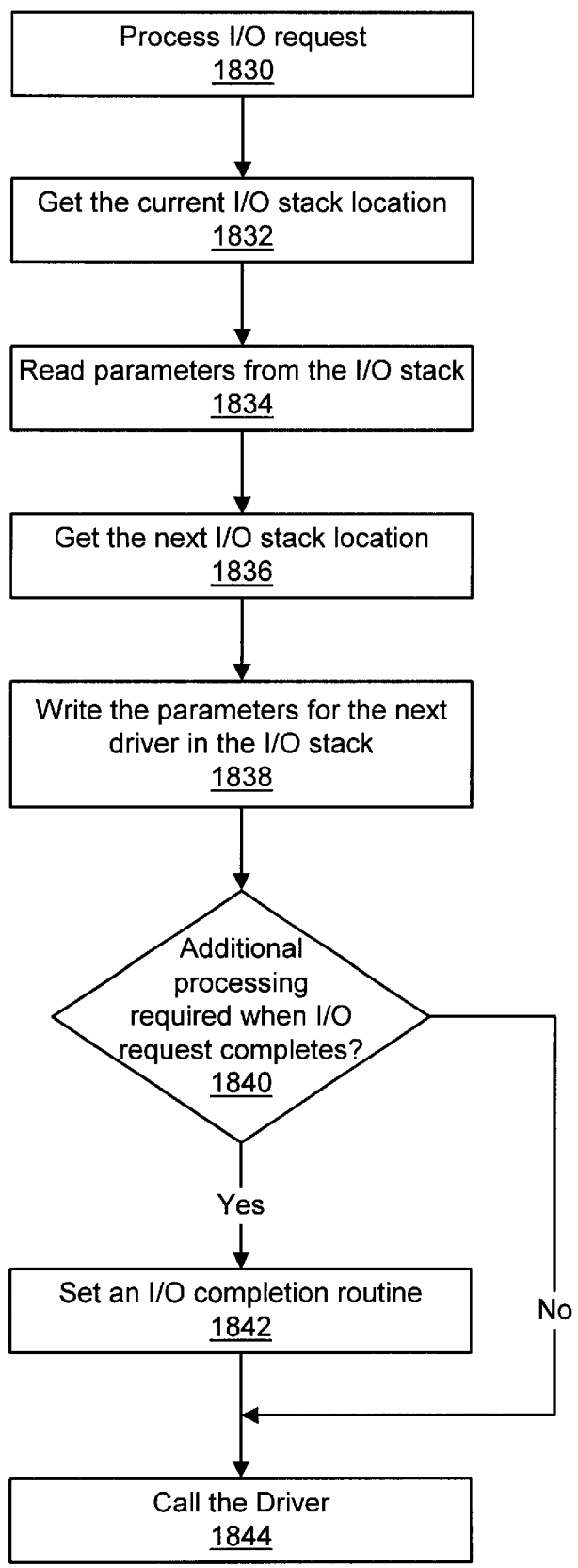

FIG. 44—Passing an I/O Request to the Next Driver in an I/O Stack

FIG. 44 illustrates one embodiment of a method to pass an I/O request to the next driver layer in the I/O stack. In one embodiment, a function such as IoGetCurrentIrpStackLocation( ) may be used to return to the current I/O stack location. An I/O completion routine is preferably not set for I/O requests that are simply passed through. In one embodiment, a function such as IoSkipCurrentIrpStackLocation( ) may be used to bypass the completion routine for the I/O stack location.

The following is an example of code that may be used in one embodiment to scroll down an I/O request's associated I/O stack locations:

IRS->CurrentLocation++;
IRS->Tail.Overlay.CurrentStackLocation++;

FIG. 45—Completing an I/O Request

FIG. 45 illustrates one embodiment of a method to complete an I/O request at any driver layer in the I/O stack.

In one embodiment, if the I/O request PAGING_IO bit is set in an I/O request Flags field, then the I/O request Status Information is preferably set to nonzero when terminating an I/O request.

In one embodiment, when a driver has finished processing an I/O request, it calls an I/O Complete Request function. The I/O Manager may check the I/O request to determine whether any higher-level drivers have set up an I/O completion routine for the I/O request. If so, each I/O completion routine may be called until every driver in the I/O stack has completed the I/O request.

Figure 46:
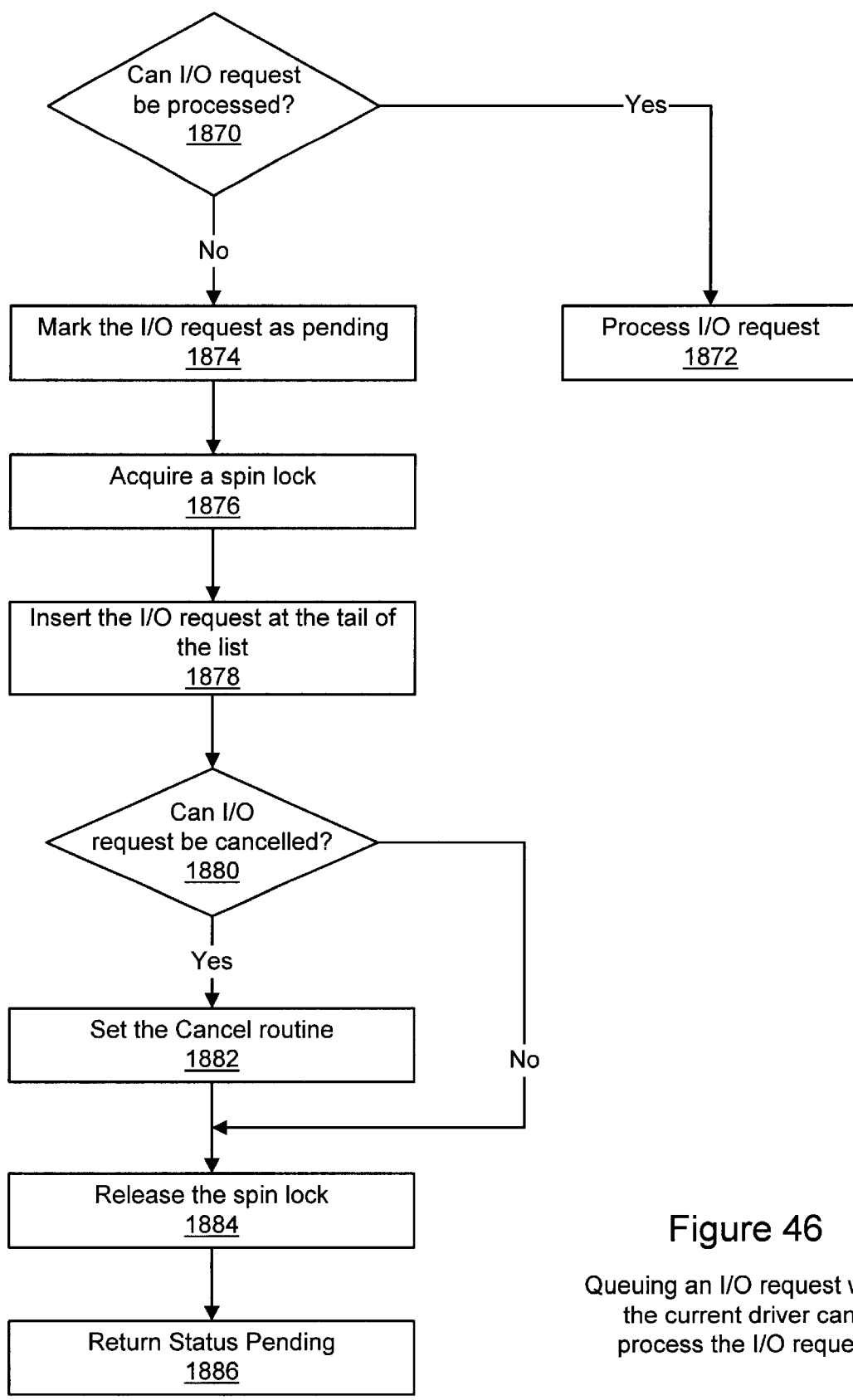

FIG. 46—Queuing an I/O Request when the Current Driver can't Process the I/O Request FIG. 46 is a flowchart illustrating a method of queuing an I/O request when a driver cannot currently process the I/O request according to one embodiment of the invention.

In one embodiment, the CDM preferably use driver-queuing methods since system queuing may only queue one I/O request at a time. In one embodiment, the queue head pointer may be located in the Device Extension of the CDM Device Object, and may point to the first I/O request in the queue. In one embodiment, additional I/O requests are queued using an I/O request List Entry pointer associated with the last I/O request in the queue. Each I/O request queue is preferably protected by a spin-lock. Incoming I/O requests are preferably treated asynchronously.

Figure 47:
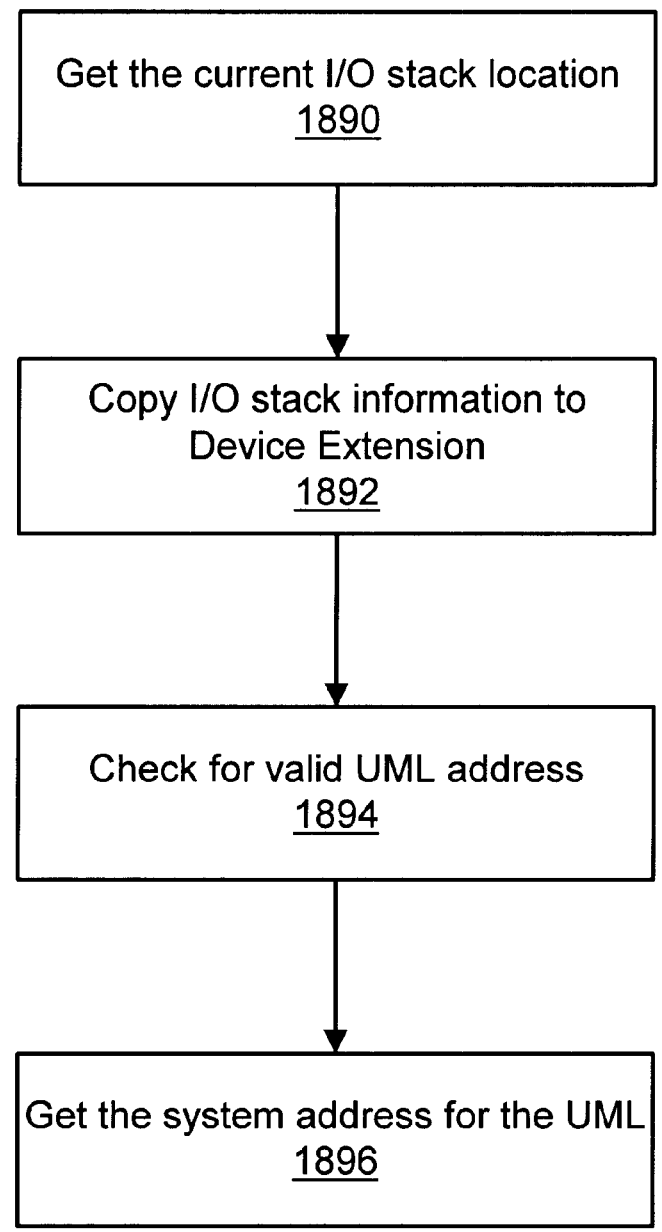

FIG. 47—Setting up Data Transfers

FIG. 47 illustrates one embodiment of a method of setting up data transfers before performing the actual data transfer.

The user virtual buffer addresses specified in the incoming I/O request are preferably translated into a kernel virtual address that the driver can use. In one embodiment, the Flags field in the Device Object may be examined to see what data transfer methods the device supports (e.g. Buffered or Direct I/O). In one embodiment, if an I/O request's System Buffer field is not NULL, then the I/O request is using buffered I/O. If the I/O request's User Memory Address is not null, then direct I/O is being used.

In embodiments where buffered I/O is used, the buffer address may already be a kernel virtual address that points to non-paged system-space. Consequently, the driver may not have to do anything before using the address. Non-paged system-space may be a limited resource, and buffered I/O transfers may be limited to small transfers. In addition, incoming Buffered I/O requests may arrive in an arbitrary thread context.

In embodiments where Direct I/O is used, the UML address is preferably already locked into physical memory. The physical memory may have to be mapped to a system virtual address before the driver can use it. In one embodiment, a function such as MmGetSystemAddressForUML( ) may be used to perform this operation, which may call a function such as MmMapLockedPages( ) only if the physical address is not already mapped into kernel virtual address space.

Figure 48:
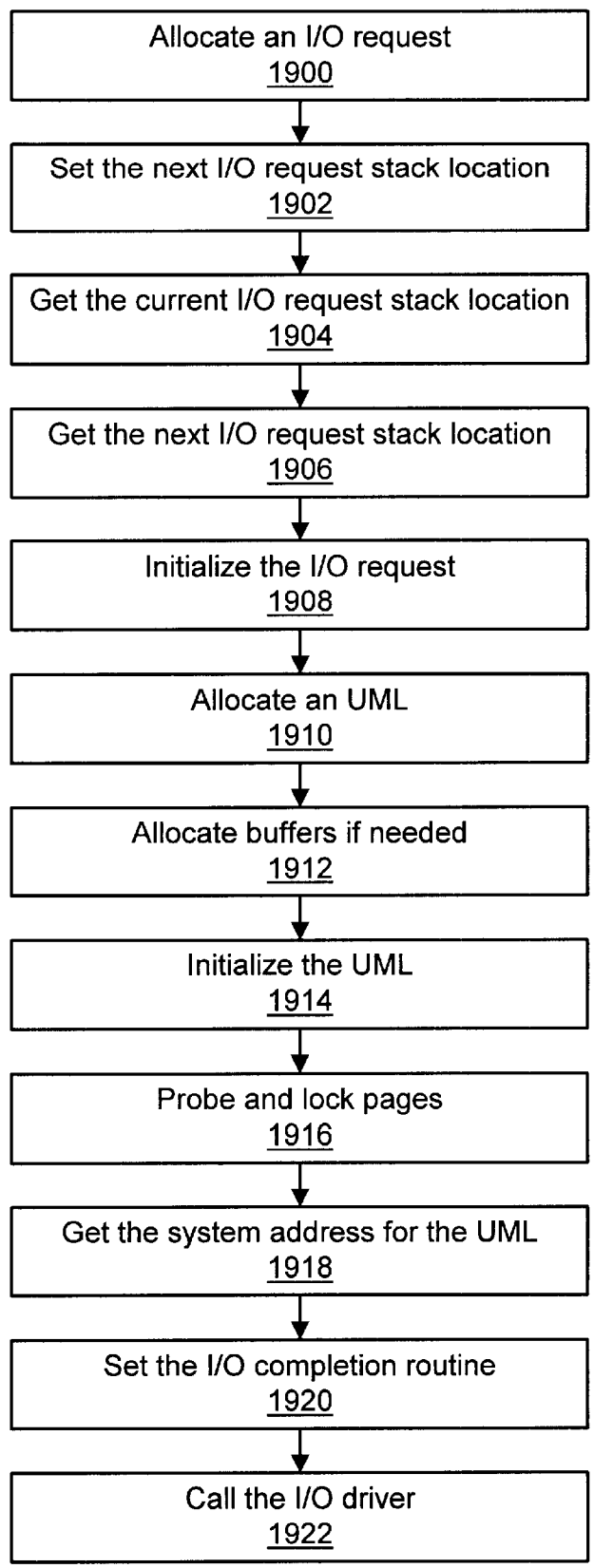

FIG. 48—Creating and Dispatching an I/O Request and UML

FIG. 48 illustrates an embodiment of a method to create and dispatch an I/O request and UML according to one embodiment of the invention.

The CDM preferably reuses I/O requests pre-allocated during Driver Entry. Also, the CDM preferably reuses pre-allocated UMLs and buffers.

In one embodiment, information may be saved in the Device Object's Device Extension that might be needed to initialize the I/O request, UML and buffers so that the I/O request may be dispatched to the next driver in the I/O stack and eventually reach the intended device driver.

When allocating an I/O request, an I/O stack location is preferably requested for this driver so that information may be passed to the completion routine. In one embodiment, when allocating an I/O request, pass an I/O request pointer so that the I/O Manager will update the IO reqeuest's UMLAddress and umnap, unlock and free the UML when the I/O request completes. In one embodiment, functions such as MmProbeAndLockPages( ) and MmGetSystemAddressForUML( ) may be used to lock and map the buffers associated with the UML into kernel virtual address space.

Parallel Compression/decompression Engine

The compactor chip may include parallel data compression and decompression engines, designed for the reduction of data bandwidth and storage requirements and for compressing/decompressing data at a high rate. The parallel compression/decompression engine may be included in any of various devices, including a memory controller; memory modules; a processor or CPU; peripheral devices, such as a network interface card, modem, IDSN terminal adapter, ATM adapter, etc.; and network devices, such as routers, hubs, switches, bridges, etc., among others. In the present embodiment, the parallel compression and decompression engine may be included on a Compactor Chip comprised on a memory module as described above. As noted above, in one embodiment, the Compactor Chip may be integrated on a DIMM, wherein a DIMM with integrated Compactor Chip may be referred to as a C-DIMM. A driver may be provided to enable programs, drivers, and other software executing on a system comprising a Compactor Chip to utilize the parallel compression and decompression engines on the Compactor Chip. In one embodiment, the driver may be referred to as the C-DIMM device driver (CDD).

When the Compactor Chip is included in a system, data transfers on the system may be in either two formats: compressed or normal (non-compressed). Compressed data from system I/O peripherals such as the nonvolatile memory, floppy drive, or local area network (LAN) may be decompressed on the Compactor Chip and stored into memory or compressed on the Compactor Chip and saved in memory (volatile or nonvolatile ) in compressed format. Data may be saved in either a normal or compressed format, retrieved from the memory for CPU usage in a normal or compressed format, or transmitted and stored on a medium in normal or compressed format.

The Compactor Chip preferably includes parallel compression and decompression engines designed to process stream data at more than a single byte or symbol (character) at one time. These parallel compression and decompression engines modify a single stream dictionary based (or history table based) data compression method, such as that described by Lempel and Ziv, to provide a scalable, high bandwidth compression and decompression operation. The parallel compression method examines a plurality of symbols in parallel, thus providing greatly increased compression performance.

Parallel Compression

The parallel data compression engine and method included on the Compactor Chip operate to perform parallel compression of data. In one embodiment, the parallel compression method first involves receiving uncompressed data, wherein the uncompressed data comprises a plurality of symbols. The method also may maintain a history table comprising entries, wherein each entry comprises at least one symbol. The method may operate to compare a plurality of symbols with entries in the history table in a parallel fashion, wherein this comparison produces compare results. The method may then determine match information for each of the plurality of symbols based on the compare results. The step of determining match information may involve determining zero or more matches of the plurality of symbols with each entry in the history table. The method then outputs compressed data in response to the match information.

In one embodiment, the method maintains a current count of prior matches which occurred when previous symbols were compared with entries in the history table. The method may also maintain a count flag for each entry in the history table. In this embodiment, the match information is determined for each of the plurality of symbols based on the current count, the count flags and the compare results.

The step of determining match information may involve determining a contiguous match based on the current count and the compare results, as well as determining if the contiguous match has stopped matching. If the contiguous match has stopped matching, then the method updates the current count according to the compare results, and compressed data is output corresponding to the contiguous match. The step of determining match information may also include resetting the count and count flags if the compare results indicate a contiguous match did not match one of the plurality of symbols. The count and count flags for all entries may be reset based on the number of the plurality of symbols that did not match in the contiguous match.

For a contiguous match, the output compressed data may comprise a count value and an entry pointer. The entry pointer points to the entry in the history table that produced the contiguous match, and the count value indicates a number of matching symbols in the contiguous match. The count value may be output as an encoded value, wherein more often occurring counts are encoded with fewer bits than less often occurring counts. For non-matching symbols that do not match any entry in the history table, the non-matching symbols may be output as the compressed data.

The above steps may be repeated one or more times until no more data is available. When no more data is available, compressed data may be output for any remaining match in the history table.

The Compactor Chip may be used to perform parallel compression, operating on a plurality of symbols at a time. In one embodiment, the parallel compression method accounts for symbol matches comprised entirely within a given plurality of symbols, referred to as the "special case". Here presume that the plurality of symbols includes a first symbol, a last symbol, and one or more middle symbols. The step of determining match information includes detecting if at least one contiguous match occurs with one or more respective contiguous middle symbols, and the one or more respective contiguous middle symbols are not involved in a match with either the symbol before or after the respective contiguous middle symbols. If this condition is detected, then the method selects the one or more largest non-overlapping contiguous matches involving the middle symbols. In this instance, compressed data is output for each of the selected matches involving the middle symbols.

The compression circuit on the Compactor Chip may include an input for receiving uncompressed data, a history table, a plurality of comparators, a memory, match information logic, and an output for outputting compressed data. The input receives uncompressed data that comprises a plurality of symbols. The history table comprises a plurality of entries, wherein each entry comprises at least one symbol. The plurality of comparators are coupled to the history table and operate to compare a plurality of symbols with each entry in the history table in a parallel fashion, wherein the plurality of comparators produce compare results. The memory maintains a current count of prior matches that occurred when previous symbols were compared with entries in the history table. The memory may also maintain a count flag or value for each entry in the history table. The match information logic is coupled to the plurality of comparators and the memory and operates to determine match information for each of the plurality of symbols based on the current count, count flags and the compare results. The output is coupled to the match information logic for outputting compressed data in response to the match information.

Parallel Decompression

The parallel decompression engine and method implemented on a Compactor Chip operate to decompress input compressed data in one or more decompression cycles, with a plurality of codes (tokens) typically being decompressed in each cycle in parallel. A parallel decompression engine may include an input for receiving compressed data, a history table (also referred to as a history window), and a plurality of decoders for examining and decoding a plurality of codes (tokens) from the compressed data in parallel in a series of decompression cycles. A code or token may represent one or more compressed symbols or one uncompressed symbol. The parallel decompression engine may also include preliminary select generation logic for generating a plurality of preliminary selects in parallel. A preliminary select may point to an uncompressed symbol in the history window, an uncompressed symbol from a token in the current decompression cycle, or a symbol being decompressed in the current decompression cycle. The parallel decompression engine may also include final select generation logic for resolving preliminary selects and generating a plurality of final selects in parallel. Each of the plurality of final selects points either to an uncompressed symbol in the history window or to an uncompressed symbol from a token in the current decompression cycle. The parallel decompression engine may also include uncompressed data output logic for generating the uncompressed data from the uncompressed symbols pointed to by the plurality of final selects, and for storing the symbols decompressed in this cycle in the history window. The decompression engine may also include an output for outputting the uncompressed data produced in the decompression cycles.

The decompression engine may be divided into a series of stages. The decoders may be included in a first stage. The preliminary select generation logic may be included in a second stage. The final select generation logic may be included in a third stage. The output logic may be included in a fourth stage.

Decompression of compressed data may begin in the decompression engine when the decompression engine receives a compressed input stream. The compressed input stream may then be decompressed in parallel in one or more decode (or decompression) cycles, resulting in a decompressed output stream.

In a decompression cycle, a plurality of tokens from the compressed data stream may be selected for the decompression cycle and loaded in the decompression engine, where N is the total number of decoders. The tokens may be selected continuously beginning with the first token in the input data stream. A section may be extracted from the compressed data stream to serve as input data for a decompression cycle, and the tokens may be extracted from the extracted section. For example, a section of four bytes (32 bits) may be extracted. A token may be selected from an input section of the input data stream for the decompression cycle if there is a decoder available, and if a complete token is included in the remaining bits of the input section. If any of the above conditions fails, then the decompression cycle continues, and the token that failed one of the conditions is the first token to be loaded in the next decompression cycle.

As the tokens for the decompression cycle are selected, the tokens are passed to the decoders for decoding. One decoder may process one token in a decompression cycle. The decoders may decode the input tokens into start counts, indexes, index valid flags, and data valid flags, with one copy of each from each decoder being passed to the next stage for each of the output bytes to be generated in the decompression cycle. The original input data bytes are passed from the decoders for later possible selection as output data. A data byte is valid only if the token being decoded on the decoder represents a byte that was stored in the token in uncompressed format by the compression engine that created the compressed data. In this case, the uncompressed byte is passed in the data byte for the decoder, the data byte valid bit for the decoder is set, and the index valid bit for the decoder is cleared.

Next, the information generated by the decoders is used to generate preliminary selects for the output bytes. Overflow bits are also generated for each preliminary select. The preliminary selects and overflow bits are passed to the next stage, where the overflow bits are inspected for each of the preliminary selects. If the overflow bit of a preliminary select is not set, then the contents of the preliminary select point to one of the entries in the history window if the index valid bit is set for the output byte, or to one of the data bytes if the data byte valid bit is set for the output byte. Preliminary selects whose overflow bits are not set are passed as final selects without modification. If the overflow bit is set, then the contents of the preliminary select are examined to determine which of the other preliminary selects is generating the data this preliminary select refers to. The contents of the correct preliminary select are then replicated on this preliminary select, and the modified preliminary select is passed as a final select.

The final selects are used to extract the uncompressed symbols. The final selects may point to either symbols in the history window or to data bytes passed from the decoders. The uncompressed symbols are extracted and added to the uncompressed output symbols. A data valid flag may be used for each of the output data symbols to signal if this output symbol is valid in this decompression cycle. The uncompressed output data may then be appended to the output data stream and written into the history window.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for managing memory in a system including a CPU and one or more memory modules comprising system memory, wherein at least one memory module includes a compression/decompression engine, the method comprising:
    reading a first data from the system memory;
    writing the first data to the at least one memory module;
    the compression/decompression engine included on the at least one memory module compressing the first data to form a first compressed data;
    reading the first compressed data from the at least one memory module; and
    writing the first compressed data to a first compressed portion of the system memory.

2. The method of claim 1, wherein the system further includes a nonvolatile memory, the method further comprising:
    writing the first data to the nonvolatile memory substantially concurrently with said writing the first data to the at least one memory module.

3. The method of claim 1, wherein the system further includes a nonvolatile memory, the method further comprising:
    writing the first compressed data to a compressed portion of the nonvolatile memory.

4. The method of claim 1,
    wherein the compression/decompression engine comprises an input buffer and an output buffer;
    wherein writing the first data to the at least one memory module comprises writing the first data to the input buffer;
    wherein the compression decompression engine stores the first compressed data in the output buffer; and
    wherein reading the first compressed data from the at least one memory module comprises reading the first compressed data from the output buffer.

5. The method of claim 1,
    wherein the first compressed portion of the system memory comprises an older first compressed data prior to said writing the first compressed data to the first compressed portion of the system memory; and
    wherein writing the first compressed data to the first compressed portion of the system memory comprises: replacing the older first compressed data with the first compressed data in the first compressed portion of the system memory.

6. The method of claim 1, wherein the system further includes a nonvolatile memory, the method further comprising:
    reading the first compressed data from the first compressed portion of the system memory;
    writing the first compressed data to the at least one memory module;
    the compression/decompression engine included on the at least one memory module decompressing the first compressed data to form the first data;
    reading the first data from the at least one memory module; and
    writing the first data to the nonvolatile memory.

7. The method of claim 6, further comprising:
    writing the first data to a temporary buffer in system memory after said reading the first data from the at least one memory module; and
    reading the first data from the temporary buffer prior to said writing the first data to the nonvolatile memory.

8. The method of claim 6, further comprising:
    removing the first compressed data from the first compressed portion of the system memory after said reading the first compressed data from the first compressed portion of the system memory.

9. The method of claim 8, further comprising:
    calculating a usage rate of the first compressed data; and
    comparing the usage rate of the first compressed data to a minimum usage rate;
    wherein said removing the first compressed data from the first compressed portion of the system memory is performed in response to the usage rate of the first compressed data being below the minimum usage rate.

10. The method of claim 1, wherein the system further includes a nonvolatile memory, the method further comprising:
    reading the first compressed data from the first compressed portion of the system memory; and
    writing the first compressed data to a compressed portion of the nonvolatile memory.

11. The method of claim 1, wherein the system further includes a virtual memory manager (VMM), wherein the method further comprises:
    the VMM selecting the first data for removal from the system memory;
    wherein said reading the first data from the system memory, said writing the first data to the at least one memory module, the compression/decompression engine compressing the first data to form the first compressed data, said reading the first compressed data from the at least one memory module, and said writing the first compressed data to the first compressed portion of the system memory are performed in response to the VMM selecting the first data for removal from the system memory.

12. The method of claim 11,
wherein said reading the first data from the system memory, said writing the first data to the at least one memory module, the compression/decompression engine compressing the first data to form the first compressed data, said reading the first compressed data from the at least one memory module, and said writing the first compressed data to the first compressed portion of the system memory occur invisibly to the VMM.

13. The method of claim 11, wherein the first data resides in a first section of system memory, the method further comprising:
the VMM releasing the first section of system memory for reuse after said reading the first data from the system memory.

14. The method of claim 11, wherein the first data in the system memory is clean, and wherein the VMM selecting the first data to be removed from the system memory includes:
the VMM invalidating the first data in the system memory.

15. The method of claim 11, wherein the system further includes a nonvolatile memory, wherein the first data in the system memory is dirty, and wherein the VMM selecting the first data to be removed from the system memory includes:
the VMM generating a writeback of the first data from the system memory to the nonvolatile memory.

16. The method of claim 1,
wherein the system further includes a driver for managing the compression/decompression engine; and
wherein said reading the first data from the system memory, said writing the first data to the at least one memory module, said reading the first compressed data from the at least one memory module, and said writing the first compressed data to the first compressed portion of the system memory are performed by the driver.

17. The method of claim 1,
wherein the system further includes a virtual memory manager (VMM), a compressed memory manager for managing the first compressed portion of the system memory, and a driver for managing the compression/ decompression engine;
wherein the method further comprises:
the VMM selecting the first data for removal from the system memory;
the compressed memory manager generating a write request to the driver in response to the VMM selecting the first data for removal from the system memory; and
the driver performing said reading the first data from the system memory, said writing the first data to the at least one memory module, said reading the first compressed data from the at least one memory module, and said writing the first compressed data to the first compressed portion of the system memory in response to said receiving the write request.

18. The method of claim 17,
wherein the write request includes a source location of the first data in the system memory and a destination location for the first compressed data in the first compressed portion of the system memory;
wherein the driver uses the source location during said reading the first data from the system memory; and wherein the driver uses the destination location during said writing the first compressed data to the first compressed portion of the system memory.

19. The method of claim 17,
wherein the driver includes a write routine for processing write requests; and
wherein the compressed memory manager generating the write request to the driver includes the compressed memory manager calling the write routine of the driver.

20. The method of claim 1, further comprising:
comparing a size of the first compressed data to a size of the first data; and
wherein said writing the first compressed data to the first compressed portion of the system memory is not performed in response to the size of the first compressed data being greater than or equal to the size of the first data.

21. The method of claim 20, further comprising:
writing the first data to the first compressed portion of the system memory in response to the size of the first compressed data being greater than or equal to the size of the first data.

22. The method of claim 21, further comprising:
reading the first data from the first compressed portion of the system memory; and
writing the first data to the system memory.

23. The method of claim 1,
wherein the compression/decompression engine analyzes and compresses a plurality of symbols in parallel;
wherein the first data comprises symbols;
wherein the compression/decompression engine compressing the first data includes:
the compression/decompression engine analyzing and compressing a plurality of symbols from the first data in parallel to form the first compressed data.

24. The method of claim 1, wherein the system memory comprises a plurality of compressed portions, the method further comprising:
reading a second data from the system memory;
writing the second data to the at least one memory module;
the compression/decompression engine included on the at least one memory module compressing the second data to form a second compressed data;
reading the second compressed data from the at least one memory module; and
writing the second compressed data to a second compressed portion of the system memory.

25. The method of claim 1, further comprising:
calculating a usage rate of the first compressed portion of the system memory;
increasing the size of the first compressed portion of the system memory in response to the usage rate of the first compressed portion of the system memory being below a low usage threshold; and
decreasing the size of the first compressed portion of the system memory in response to the usage rate of the first compressed portion of the system memory being above a high usage threshold.

26. The method of claim 1, further comprising:
reading the first compressed data from the first compressed portion of the system memory;
writing the first compressed data to the at least one memory module;

the compression/decompression engine included on the at least one memory module decompressing the first compressed data to form the first data;
reading the first data from the at least one memory module; and
writing the first data to the system memory.

27. The method of claim 26,
wherein the compression/decompression engine comprises an input buffer and an output buffer;
wherein writing the first compressed data to the at least one memory module comprises writing the first compressed data to the input buffer;
wherein the compression decompression engine stores the first data in the output buffer; and
wherein reading the first data from the at least one memory module comprises reading the first data from the output buffer.

28. The method of claim 26, wherein the system further includes a virtual memory manager (VMM), wherein the method further comprises:
the VMM requesting the first data to be copied to the system memory;
wherein said reading the first compressed data from the first compressed portion of the system memory, said writing the first compressed data to the at least one memory module, the compression/decompression engine decompressing the first compressed data to form the first data, said reading the first data from the at least one memory module, and said writing the first data to the system memory are performed in response to the VMM requesting the first data to be copied to the system memory.

29. The method of claim 28,
wherein said reading the first compressed data from the first compressed portion of the system memory, said writing the first compressed data to the at least one memory module, the compression/decompression engine decompressing the first compressed data to form the first data, said reading the first data from the at least one memory module, and said writing the first data to the system memory occur invisibly to the VMM.

30. The method of claim 26,
wherein the system further includes a driver for managing the compression/decompression engine; and
wherein said reading the first compressed data from the first compressed portion of the system memory, said writing the first compressed data to the at least one memory module, said reading the first data from the at least one memory module, and said writing the first data to the system memory are performed by the driver.

31. The method of claim 26,
wherein the system further includes a virtual memory manager (VMM), a compressed memory manager for managing the first compressed portion of the system memory, and a driver for managing the compression/decompression engine;
wherein the method further comprises:
the VMM requesting the first data to be copied to the system memory;
the compressed memory manager generating a read request to the driver in response to the VMM requesting the first data to be copied to the system memory; and
the driver performing said reading the first compressed data from the first compressed portion of the system memory, said writing the first compressed data to the at least one memory module, said reading the first data from the at least one memory module, and said writing the first data to the system memory in response to said receiving the read request.

32. The method of claim 31,
wherein the read request includes a source location of the first compressed data in the first compressed portion of the system memory and a destination location for the first data in the system memory;
wherein the driver uses the source location during said reading the first compressed data from the first compressed portion of the system memory; and
wherein the driver uses the destination location during said writing the first data to the system memory.

33. The method of claim 31,
wherein the driver includes a read routine for processing the read request; and
wherein the compressed memory manager generating the read request to the driver includes the compressed memory manager calling the read routine of the driver.

34. The method of claim 26, further comprising:
removing the first compressed data from the first compressed portion of the system memory after said reading the first compressed data from the first compressed portion of the system memory.

35. The method of claim 26,
wherein the compression/decompression engine analyzes and decompresses in parallel a plurality of tokens each describing one or more symbols;
wherein the first compressed data comprises tokens each describing one or more symbols in the first data;
wherein the compression/decompression engine decompressing the first compressed data to form the first data includes:
the compression/decompression engine analyzing and decompressing a plurality of tokens from the first compressed data in parallel to form the first data.

36. The method of claim 1, wherein the system further includes a nonvolatile memory and a virtual memory manager (VMM), the method further comprising:
the VMM generating a request for a second data to be loaded into system memory;
receiving said request for the second data;
examining the first compressed portion of the system memory for the second data;
requesting the second data from the nonvolatile memory in response to the second data not being found in the first compressed portion of the system memory;
receiving the second data from the nonvolatile memory; and
writing the second data to the system memory.

37. The method of claim 36, further comprising:
writing the second data to the at least one memory module;
the compression/decompression engine included on the at least one memory module compressing the second data to form a second compressed data;
reading the second compressed data from the at least one memory module; and
writing the second compressed data to the first compressed portion of the system memory.

38. The method of claim 36, further comprising:
requesting a third data from the nonvolatile memory in response to said request for the second data;

receiving the third data from the nonvolatile memory;

writing the third data to the at least one memory module;

the compression/decompression engine included on the at least one memory module compressing the third data to form a third compressed data;

reading the third compressed data from the at least one memory module; and writing the third compressed data to the first compressed portion of the system memory.

39. The method of claim 1, wherein the system further includes a nonvolatile memory and a virtual memory manager (VMM), the method further comprising:

the VMM generating a request for a second data to be loaded into system memory;

receiving said request for the second data;

examining the first compressed portion of the system memory for the second data;

requesting the second data from the nonvolatile memory in response to the second data not being found in the first compressed portion of the system memory;

receiving a second compressed data from a compressed portion of the nonvolatile memory in response to said requesting the second data;

writing the second compressed data to the at least one memory module;

the compression/decompression engine included on the at least one memory module decompressing the first data to form the second data;

reading the second data from the at least one memory module; and writing the second data to the system memory.

40. The method of claim 39, further comprising:

writing the second compressed data to the first compressed portion of the system memory.

41. The method of claim 39, further comprising:

requesting a third data from the nonvolatile memory in response to said request for the second data;

receiving a third compressed data from a compressed portion of the nonvolatile memory in response to said requesting the third data; and writing the third compressed data to the first compressed portion of the system memory.

42. The method of claim 1, wherein the system memory comprises a plurality of compressed portions, the method further comprising:

reading a second compressed data from a second compressed portion of the system memory;

writing the second compressed data to the at least one memory module;

the compression/decompression engine included on the at least one memory module decompressing the second compressed data to form a second data;

reading the second data from the at least one memory module; and writing the second data to the system memory.

43. A method for managing memory in a system including a CPU and one or more memory modules comprising system memory, wherein at least one memory module includes a compression/decompression engine, the method comprising:

reading a first compressed data from a first compressed portion of the system memory;

writing the first compressed data to the at least one memory module;

the compression/decompression engine included on the at least one memory module decompressing the first compressed data to form a first data;

reading the first data from the at least one memory module; and writing the first data to the system memory.

44. The method of claim 43, wherein the compression/decompression engine comprises an input buffer and an output buffer;

wherein writing the first compressed data to the at least one memory module comprises writing the first compressed data to the input buffer;

wherein the compression decompression engine stores the first data in the output buffer; and wherein reading the first data from the at least one memory module comprises reading the first data from the output buffer.

45. The method of claim 43, wherein the system further includes a virtual memory manager (VMM), wherein the method further comprises:

the VMM requesting the first data to be copied to the system memory;

wherein said reading the first compressed data from the first compressed portion of the system memory, said writing the first compressed data to the at least one memory module, the compression/decompression engine decompressing the first compressed data to form the first data, said reading the first data from the at least one memory module, and said writing the first data to the system memory are performed in response to the VMM requesting the first data to be copied to the system memory.

46. The method of claim 45, wherein said reading the first compressed data from the first compressed portion of the system memory, said writing the first compressed data to the at least one memory module, the compression/decompression engine decompressing the first compressed data to form the first data, said reading the first data from the at least one memory module, and said writing the first data to the system memory occur invisibly to the VMM.

47. The method of claim 43, wherein the system further includes a driver for managing the compression/decompression engine; and wherein said reading the first compressed data from the first compressed portion of the system memory, said writing the first compressed data to the at least one memory module, said reading the first data from the at least one memory module, and said writing the first data to the system memory are performed by the driver.

48. The method of claim 43, wherein the system further includes a virtual memory manager (VMM), a compressed memory manager for managing the first compressed portion of the system memory, and a driver for managing the compression/decompression engine;

wherein the method further comprises:

the VMM requesting the first data to be copied to the system memory;

the compressed memory manager generating a read request to the driver in response to the VMM requesting the first data to be copied to the system memory; and the driver performing said reading the first compressed data from the first compressed portion of the system memory, said writing the first compressed data to the at least one memory module, said reading the first data from the at least one memory module, and said writing the first data to the system memory in response to said receiving the read request.

49. The method of claim 48, wherein the read request includes a source location of the first compressed data in the first compressed portion of the system memory and a destination location for the first data in the system memory;

wherein the driver uses the source location during said reading the first compressed data from the first compressed portion of the system memory; and wherein the driver uses the destination location during said writing the first data to the system memory.

50. The method of claim 48, wherein the driver includes a read routine for processing the read request; and wherein the compressed memory manager generating the read request to the driver includes the compressed memory manager calling the read routine of the driver.

51. The method of claim 43, further comprising:

removing the first compressed data from the first compressed portion of the system memory after said reading the first compressed data from the first compressed portion of the system memory.

52. The method of claim 43, wherein the compression/decompression engine analyzes and decompresses in parallel a plurality of tokens each describing one or more symbols;

wherein the first compressed data comprises one or more tokens each describing symbols in the first data;

wherein the compression/decompression engine decompressing the first compressed data to form the first data includes:

the compression/decompression engine analyzing and decompressing a plurality of tokens from the first compressed data in parallel to form the first data.

53. The method of claim 43, wherein the system further includes a nonvolatile memory and a virtual memory manager (VMM), the method further comprising:

the VMM generating a request for a second data to be loaded into system memory;

receiving said request for the second data;

examining the first compressed portion of the system memory for the second data;

requesting the second data from the nonvolatile memory in response to the second data not being found in the first compressed portion of the system memory;

receiving the second data from the nonvolatile memory; and writing the second data to the system memory.

54. The method of claim 53, further comprising:

writing the second data to the at least one memory module;

the compression/decompression engine included on the at least one memory module compressing the second data to form a second compressed data;

reading the second compressed data from the at least one memory module; and writing the second compressed data to the first compressed portion of the system memory.

55. The method of claim 53, further comprising:

requesting a third data from the nonvolatile memory in response to said request for the second data;

receiving the third data from the nonvolatile memory;

writing the third data to the at least one memory module;

the compression/decompression engine included on the at least one memory module compressing the third data to form a third compressed data;

reading the third compressed data from the at least one memory module; and writing the third compressed data to the first compressed portion of the system memory.

56. The method of claim 43, wherein the system memory comprises a plurality of compressed portions, the method further comprising:

reading a second compressed data from a second compressed portion of the system memory;

writing the second compressed data to the at least one memory module;

the compression/decompression engine included on the at least one memory module decompressing the second compressed data to form a second data;

reading the second data from the at least one memory module; and writing the second data to the system memory.

57. A method for managing memory in a system including a CPU and a plurality of memory modules comprising system memory, wherein each of the plurality of memory modules includes a compression/decompression engine, the method comprising:

reading a first data from the system memory;

writing the first data to a first memory module;

the compression/decompression engine included on the first memory module compressing the first data to form a first compressed data;

reading the first compressed data from the first memory module; and writing the first compressed data to a first compressed portion of the system memory.

58. The method of claim 57, wherein the system further includes a nonvolatile memory, the method further comprising:

writing the first data to the nonvolatile memory substantially concurrently with said writing the first data to the first memory module.

59. The method of claim 57, wherein the first compressed portion of the system memory comprises an older first compressed data prior to said writing the first compressed data to the first compressed portion of the system memory; and wherein writing the first compressed data to the first compressed portion of the system memory comprises:

replacing the older first compressed data with the first compressed data in the first compressed portion of the system memory.

60. The method of claim 57, wherein the system further includes a nonvolatile memory, the method further comprising:

reading the first compressed data from the first compressed portion of the system memory;

writing the first compressed data to the first memory module;

the compression/decompression engine included on the first memory module decompressing the first compressed data to form the first data;

reading the first data from the first memory module; and writing the first data to the nonvolatile memory.

61. The method of claim 57, wherein the compression/decompression engine analyzes and compresses a plurality of symbols in parallel;

wherein the first data comprises symbols;

wherein the compression/decompression engine compressing the first data includes:

the compression/decompression engine analyzing and compressing a plurality of symbols from the first data in parallel to form the first compressed data.

62. The method of claim 57, further comprising:

reading the first compressed data from the first compressed portion of the system memory;

writing the first compressed data to the first memory module;

the compression/decompression engine included on the first memory module decompressing the first compressed data to form the first data;

reading the first data from the first memory module; and writing the first data to the system memory.

63. The method of claim 57, wherein the system further includes a nonvolatile memory and a virtual memory manager (VMM), the method further comprising:

the VMM generating a request for a second data to be loaded into system memory;

receiving said request for the second data;

examining the first compressed portion of the system memory for the second data;

requesting the second data from the nonvolatile memory in response to the second data not being found in the first compressed portion of the system memory;

receiving the second data from the nonvolatile memory; and writing the second data to the system memory.

64. The method of claim 63, further comprising:

writing the second data to a second memory module;

the compression/decompression engine included on the second memory module compressing the second data to form a second compressed data;

reading the second compressed data from the second memory module; and writing the second compressed data to the first compressed portion of the system memory.

65. The method of claim 62, wherein the compression/decompression engine analyzes and decompresses in parallel a plurality of tokens each describing one or more symbols;

wherein the first compressed data comprises tokens each describing one or more symbols in the first data;

wherein the compression/decompression engine decompressing the first compressed data to form the first data includes:

the compression/decompression engine analyzing and decompressing a plurality of tokens from the first compressed data in parallel to form the first data.

66. A method for managing memory in a system including a CPU, one or more memory modules comprising system memory, and a memory controller including a compression/decompression engine, the method comprising:

reading a first data from the system memory;

writing the first data to the compression/decompression engine;

the compression/decompression engine compressing the first data to form a first compressed data;

reading the first compressed data from the compression/decompression engine; and writing the first compressed data to a first compressed portion of the system memory.

67. The method of claim 66, wherein the system further includes a nonvolatile memory, the method further comprising:

writing the first data to the nonvolatile memory substantially concurrently with said writing the first data to the compression/decompression engine.

68. The method of claim 66, wherein the first compressed portion of the system memory comprises an older first compressed data prior to said writing the first compressed data to the first compressed portion of the system memory; and wherein writing the first compressed data to the first compressed portion of the system memory comprises:

replacing the older first compressed data with the first compressed data in the first compressed portion of the system memory.

69. The method of claim 66, wherein the system further includes a nonvolatile memory, the method further comprising:

reading the first compressed data from the first compressed portion of the system memory;

writing the first compressed data to the compression/decompression engine;

the compression/decompression engine decompressing the first compressed data to form the first data;

reading the first data from the compression/decompression engine; and writing the first data to the nonvolatile memory.

70. The method of claim 66, wherein the compression/decompression engine analyzes and compresses a plurality of symbols in parallel;

wherein the first data comprises symbols;

wherein the compression/decompression engine compressing the first data includes:

the compression/decompression engine analyzing and compressing a plurality of symbols from the first data in parallel to form the first compressed data.

71. The method of claim 66, further comprising:

reading the first compressed data from the first compressed portion of the system memory;

writing the first compressed data to the compression/decompression engine;

the compression/decompression engine decompressing the first compressed data to form the first data;

reading the first data from compression/decompression engine; and writing the first data to the system memory.

72. The method of claim 66, wherein the system further includes a nonvolatile memory and a virtual memory manager (VMM), the method further comprising:

the VMM generating a request for a second data to be loaded into system memory;

receiving said request for the second data;

examining the first compressed portion of the system memory for the second data;

requesting the second data from the nonvolatile memory in response to the second data not being found in the first compressed portion of the system memory;

receiving the second data from the nonvolatile memory; and writing the second data to the system memory.

73. The method of claim 72, further comprising:

writing the second data to the compression/decompression engine;

the compression/decompression engine compressing the second data to form a second compressed data;

reading the second compressed data from the compression/decompression engine; and writing the second compressed data to the first compressed portion of the system memory.

74. The method of claim 71, wherein the compression/decompression engine analyzes and decompresses in parallel a plurality of tokens each describing one or more symbols;

wherein the first compressed data comprises tokens each describing one or more symbols in the first data;

wherein the compression/decompression engine decompressing the first compressed data to form the first data includes:

the compression/decompression engine analyzing and decompressing a plurality of tokens from the first compressed data in parallel to form the first data.

75. A method for managing memory in a system including a CPU and one or more memory modules comprising system memory, wherein at least one memory module includes a compression/decompression engine, the method comprising:

a) reading a first data from the system memory;

b) writing the first data to the at least one memory module;

c) the compression/decompression engine included on the at least one memory module compressing the first data to form a first compressed data;

d) reading the first compressed data from the at least one memory module;

e) comparing a size of the first compressed data to a size of the first data;

f) writing the first data to the first compressed portion of the system memory in response to the size of the first compressed data being greater than or equal to the size of the first data; and g) writing the first compressed data to a first compressed portion of the system memory in response to the size of the first compressed data being smaller than the size of the first data.

76. The method of claim 75, wherein the system further includes a driver for managing the compression/decompression engine; and wherein a) through g) are performed by the driver.

77. The method of claim 75, wherein the system further includes a virtual memory manager (VMM), a compressed memory manager for managing the first compressed portion of the system memory, and a driver for managing the compression/decompression engine;

wherein the method further comprises:

the VMM selecting the first data for removal from the system memory;

the compressed memory manager generating a write request to the driver in response to the VMM selecting the first data for removal from the system memory; and the driver performing a) through g) in response to said receiving the write request.

78. The method of claim 75, further comprising:

reading the first compressed data from the first compressed portion of the system memory;

writing the first compressed data to the at least one memory module;

the compression/decompression engine included on the at least one memory module decompressing the first compressed data to form the first data;

reading the first data from the at least one memory module; and writing the first data to the system memory.

79. The method of claim 75, further comprising:

reading the first data from the first compressed portion of the system memory; and writing the first data to the system memory.

80. The method of claim 75, wherein the system further includes a nonvolatile memory and a virtual memory manager (VMM), the method further comprising:

the VMM generating a request for a second data to be loaded into system memory;

receiving said request for the second data;

examining the first compressed portion of the system memory for the second data;

requesting the second data from the nonvolatile memory in response to the second data not being found in the first compressed portion of the system memory;

receiving the second data from the nonvolatile memory; and writing the second data to the system memory.

81. The method of claim 80, further comprising:

writing the second data to the at least one memory module;

the compression/decompression engine included on the at least one memory module compressing the second data to form a second compressed data;

reading the second compressed data from the at least one memory module; and writing the second compressed data to the first compressed portion of the system memory.

82. A method for managing memory in a system including a CPU, a nonvolatile memory, and one or more memory modules comprising system memory, wherein at least one memory module includes a compression/decompression engine, the method comprising:

reading a first data from the system memory;

writing the first data to the at least one memory module;

the compression/decompression engine included on the at least one memory module compressing the first data to form a first compressed data;

reading the first compressed data from the at least one memory module; and writing the first compressed data to a compressed portion of the nonvolatile memory.

83. The method of claim 82, further comprising:

writing the first data to the nonvolatile memory substantially concurrently with said writing the first data to the at least one memory module.

84. The method of claim 82, further comprising:

writing the first compressed data to a compressed portion of the system memory.

85. The method of claim 82, wherein the compression/decompression engine comprises an input buffer and an output buffer;

wherein writing the first data to the at least one memory module comprises writing the first data to the input buffer;

wherein the compression decompression engine stores the first compressed data in the output buffer; and wherein reading the first compressed data from the at least one memory module comprises reading the first compressed data from the output buffer.

86. The method of claim 82, wherein the compressed portion of the nonvolatile memory comprises an older first compressed data prior to said writing the first compressed data to the compressed portion of the nonvolatile memory; and wherein writing the first compressed data to the compressed portion of the nonvolatile memory comprises: replacing the older first compressed data with the first compressed data in the compressed portion of the nonvolatile memory.

87. The method of claim 82, further comprising:

reading the first compressed data from the compressed portion of the nonvolatile memory;

writing the first compressed data to the at least one memory module;

the compression/decompression engine included on the at least one memory module decompressing the first compressed data to form the first data;

reading the first data from the at least one memory module; and writing the first data to the nonvolatile memory.

88. The method of claim 82, wherein the first data is a page of memory;

wherein the first compressed data is less than a page of memory; and wherein the first compressed data written to the compressed portion of the nonvolatile memory occupies a page in the compressed portion of the nonvolatile memory.

89. The method of claim 82, wherein the first data is a page of memory;

wherein the first compressed data is less than a page of memory; and wherein the first compressed data written to the nonvolatile memory occupies less than a page in the compressed portion of the nonvolatile memory.

90. The method of claim 82, wherein the system further includes a virtual memory manager (VMW, wherein the method further comprises:

the VMM selecting the first data for removal from the system memory;

wherein said reading the first data from the system memory, said writing the first data to the at least one memory module, the compression/decompression engine compressing the first data to form the first compressed data, said reading the first compressed data from the at least one memory module, and said writing the first compressed data to the compressed portion of the nonvolatile memory are performed in response to the VMM selecting the first data for removal from the system memory.

91. The method of claim 90, wherein said reading the first data from the system memory, said writing the first data to the at least one memory module, the compression/decompression engine compressing the first data to form the first compressed data, said reading the first compressed data from the at least one memory module, and said writing the first compressed data to the compressed portion of the nonvolatile memory occur invisibly to the VMM.

92. The method of claim 90, wherein the first data resides in a first section of system memory, the method further comprising:

the VMM releasing the first section of system memory for reuse after said reading the first data from the system memory.

93. The method of claim 90, wherein the VMM selecting the first data to be removed from the system memory includes:

the VMM invalidating the first data in the system memory.

94. The method of claim 90, wherein the first data in the system memory is dirty, and wherein the VMM selecting the first data to be removed from the system memory includes:

the VMM generating a writeback of the first data from the system memory to the nonvolatile memory.

95. The method of claim 82, wherein the system further includes a driver for managing the compression/decompression engine; and wherein said reading the first data from the system memory, said writing the first data to the at least one memory module, said reading the first compressed data from the at least one memory module, and said writing the first compressed data to the compressed portion of the nonvolatile memory are performed by the driver.

96. The method of claim 82, wherein the system further includes a virtual memory manager (VMM), a compressed nonvolatile memory manager for managing the compressed portion of the nonvolatile memory, and a driver for managing the compression/decompression engine;

wherein the method further comprises:

the VMM selecting the first data for removal from the system memory;

the compressed nonvolatile memory manager generating a write request to the driver in response to the VMM selecting the first data for removal from the system memory; and the driver performing said reading the first data from the system memory, said writing the first data to the at least one memory module, said reading the first compressed data from the at least one memory module, and said writing the first compressed data to the compressed portion of the nonvolatile memory in response to said receiving the write request.

97. The method of claim 96, wherein the write request includes a source location of the first data in the system memory and a destination location for the first compressed data in the compressed portion of the nonvolatile memory;

wherein the driver uses the source location during said reading the first data from the system memory; and wherein the driver uses the destination location during said writing the first compressed data to the compressed portion of the nonvolatile memory.

98. The method of claim 96, wherein the driver includes a write routine for processing write requests; and wherein the compressed nonvolatile memory manager generating the write request to the driver includes the compressed nonvolatile memory manager calling the write routine of the driver.

99. The method of claim 82,
wherein the compression/decompression engine analyzes and compresses a plurality of symbols in parallel;
wherein the first data comprises symbols;
wherein the compression/decompression engine compressing the first data includes:
the compression/decompression engine analyzing and compressing a plurality of symbols from the first data in parallel to form the first compressed data.

100. The method of claim 82, further comprising:
reading the first compressed data from the compressed portion of the nonvolatile memory;
writing the first compressed data to the at least one memory module;
the compression/decompression engine included on the at least one memory module decompressing the first compressed data to form the first data;
reading the first data from the at least one memory module; and
writing the first data to the system memory.

101. The method of claim 100, further comprising:
writing the first compressed data to a compressed portion of the system memory substantially concurrently with said writing the first compressed data to the at least one memory module.

102. The method of claim 100,
wherein the compression/decompression engine comprises an input buffer and an output buffer;
wherein writing the first compressed data to the at least one memory module comprises writing the first compressed data to the input buffer;
wherein the compression decompression engine stores the first data in the output buffer; and
wherein reading the first data from the at least one memory module comprises reading the first data from the output buffer.

103. The method of claim 100, wherein the system further includes a virtual memory manager (VMM), wherein the method further comprises:
the VMM requesting the first data to be copied to the system memory;
wherein said reading the first compressed data from the compressed portion of the nonvolatile memory, said writing the first compressed data to the at least one memory module, the compression/decompression engine decompressing the first compressed data to form the first data, said reading the first data from the at least one memory module, and said writing the first data to the system memory are performed in response to the VMM requesting the first data to be copied to the system memory.

104. The method of claim 103,
wherein said reading the first compressed data from the compressed portion of the nonvolatile memory, said writing the first compressed data to the at least one memory module, the compression/decompression engine decompressing the first compressed data to form the first data, said reading the first data from the at least one memory module, and said writing the first data to the system memory occur invisibly to the VMM.

105. The method of claim 100,
wherein the system further includes a driver for managing the compression/decompression engine; and
wherein said reading the first compressed data from the compressed portion of the nonvolatile memory, said writing the first compressed data to the at least one memory module, said reading the first data from the at least one memory module, and said writing the first data to the system memory are performed by the driver.

106. The method of claim 100,
wherein the system further includes a virtual memory manager (VMM), a compressed nonvolatile memory manager for managing the compressed portion of the nonvolatile memory, and a driver for managing the compression/decompression engine;
wherein the method further comprises:
the VMM requesting the first data to be copied to the system memory;
the compressed nonvolatile memory manager generating a read request to the driver in response to the VMM requesting the first data to be copied to the system memory; and
the driver performing said reading the first compressed data from the compressed portion of the nonvolatile memory, said writing the first compressed data to the at least one memory module, said reading the first data from the at least one memory module, and said writing the first data to the system memory in response to said receiving the read request.

107. The method of claim 106,
wherein the read request includes a source location of the first compressed data in the compressed portion of the nonvolatile memory and a destination location for the first data in the system memory;
wherein the driver uses the source location during said reading the first compressed data from the compressed portion of the nonvolatile memory; and
wherein the driver uses the destination location during said writing the first data to the system memory.

108. The method of claim 106,
wherein the driver includes a read routine for processing the read request; and
wherein the compressed nonvolatile memory manager generating the read request to the driver includes the compressed nonvolatile memory manager calling the read routine of the driver.

109. The method of claim 100,
wherein the compression/decompression engine analyzes and decompresses in parallel a plurality of tokens each describing one or more symbols;
wherein the first compressed data comprises tokens each describing one or more symbols in the first data;
wherein the compression/decompression engine decompressing the first compressed data to form the first data includes:
the compression/decompression engine analyzing and decompressing a plurality of tokens from the first compressed data in parallel to form the first data.

110. The method of claim 82, wherein the system further includes a virtual memory manager (VMM), the method further comprising:
the VMM generating a request for a second data to be loaded into system memory;
receiving said request for the second data;
examining the compressed portion of the nonvolatile memory for the second data;
requesting the second data from the nonvolatile memory in response to the second data not being found in the compressed portion of the nonvolatile memory;

receiving the second data from the nonvolatile memory; and writing the second data to the system memory.

111. The method of claim 110, further comprising:
  writing the second data to the at least one memory module;
  the compression/decompression engine included on the at least one memory module compressing the second data to form a second compressed data;
  reading the second compressed data from the at least one memory module; and
  writing the second compressed data to the compressed portion of the nonvolatile memory.

112. The method of claim 110, further comprising:
  writing the second compressed data to a compressed portion of the at least one memory module.

113. A method for managing memory in a system including a CPU, a nonvolatile memory, and one or more memory modules comprising system memory, wherein at least one memory module includes a compression/decompression engine, the method comprising:
  reading a first compressed data from a compressed portion of the nonvolatile memory;
  writing the first compressed data to the at least one memory module;
  the compression/decompression engine included on the at least one memory module decompressing the first compressed data to form a first data;
  reading the first data from the at least one memory module; and
  writing the first data to the system memory.

114. The method of claim 113,
  wherein the compression/decompression engine comprises an input buffer and an output buffer;
  wherein writing the first compressed data to the at least one memory module comprises writing the first compressed data to the input buffer;
  wherein the compression decompression engine stores the first data in the output buffer; and
  wherein reading the first data from the at least one memory module comprises reading the first data from the output buffer.

115. The method of claim 113,
  wherein the first data is a page of memory;
  wherein the first compressed data is less than a page of memory; and
  wherein the first compressed data read from the compressed portion of the nonvolatile memory occupies a page in the compressed portion of the nonvolatile memory.

116. The method of claim 113,
  wherein the first data is a page of memory;
  wherein the first compressed data is less than a page of memory; and
  wherein the first compressed data read from the nonvolatile memory occupies less than a page in the compressed portion of the nonvolatile memory.

117. The method of claim 113, wherein the system further includes a virtual memory manager (VMM), wherein the method further comprises:
  the VMM requesting the first data to be copied to the system memory;
  wherein said reading the first compressed data from the compressed portion of the nonvolatile memory, said writing the first compressed data to the at least one memory module, the compression/decompression engine decompressing the first compressed data to form the first data, said reading the first data from the at least one memory module, and said writing the first data to the system memory are performed in response to the VMM requesting the first data to be copied to the system memory.

118. The method of claim 117,
  wherein said reading the first compressed data from the compressed portion of the nonvolatile memory, said writing the first compressed data to the at least one memory module, the compression/decompression engine decompressing the first compressed data to form the first data, said reading the first data from the at least one memory module, and said writing the first data to the system memory occur invisibly to the VMM.

119. The method of claim 113,
  wherein the system further includes a driver for managing the compression/decompression engine; and
  wherein said reading the first compressed data from the compressed portion of the nonvolatile memory, said writing the first compressed data to the at least one memory module, said reading the first data from the at least one memory module, and said writing the first data to the system memory are performed by the driver.

120. The method of claim 113,
  wherein the system further includes a virtual memory manager (VMM), a compressed nonvolatile memory manager for managing the compressed portion of the nonvolatile memory, and a driver for managing the compression/decompression engine;
  wherein the method further comprises:
    the VMM requesting the first data to be copied to the system memory;
    the compressed nonvolatile memory manager generating a read request to the driver in response to the VMM requesting the first data to be copied to the system memory; and
    the driver performing said reading the first compressed data from the compressed portion of the nonvolatile memory, said writing the first compressed data to the at least one memory module, said reading the first data from the at least one memory module, and said writing the first data to the system memory in response to said receiving the read request.

121. The method of claim 120,
  wherein the read request includes a source location of the first compressed data in the compressed portion of the nonvolatile memory and a destination location for the first data in the system memory;
  wherein the driver uses the source location during said reading the first compressed data from the compressed portion of the nonvolatile memory; and
  wherein the driver uses the destination location during said writing the first data to the system memory.

122. The method of claim 120,
  wherein the driver includes a read routine for processing the read request; and
  wherein the compressed nonvolatile memory manager generating the read request to the driver includes the compressed nonvolatile memory manager calling the read routine of the driver.

123. The method of claim 113,
  wherein the compression/decompression engine analyzes and decompresses in parallel a plurality of tokens each describing one or more symbols;

wherein the first compressed data comprises tokens each describing one or more symbols in the first data;

wherein the compression/decompression engine decompressing the first compressed data to form the first data includes:

the compression/decompression engine analyzing and decompressing a plurality of tokens from the first compressed data in parallel to form the first data.

124. The method of claim 113, wherein the system further includes a virtual memory manager (VMM), the method further comprising:

the VMM generating a request for a second data to be loaded into system memory;

receiving said request for the second data;

examining the compressed portion of the nonvolatile memory for the second data;

requesting the second data from the nonvolatile memory in response to the second data not being found in the compressed portion of the nonvolatile memory;

receiving the second data from the nonvolatile memory; and writing the second data to the system memory.

125. The method of claim 124, further comprising:

writing the second data to the at least one memory module;

the compression/decompression engine included on the at least one memory module compressing the second data to form a second compressed data;

reading the second compressed data from the at least one memory module; and writing the second compressed data to the compressed portion of the nonvolatile memory.

126. A method for managing memory in a system including a CPU, a nonvolatile memory, and a plurality of memory modules comprising system memory, wherein each of the plurality of memory modules includes a compression/decompression engine, the method comprising:

reading a first data from the system memory;

writing the first data to a first memory module;

the compression/decompression engine included on the first memory module compressing the first data to form a first compressed data;

reading the first compressed data from the first memory module; and writing the first compressed data to a compressed portion of the nonvolatile memory.

127. The method of claim 126, further comprising:

writing the first data to the nonvolatile memory substantially concurrently with said writing the first data to the first memory module.

128. The method of claim 126, wherein the compressed portion of the nonvolatile memory comprises an older first compressed data prior to said writing the first compressed data to the compressed portion of the nonvolatile memory; and wherein writing the first compressed data to the compressed portion of the nonvolatile memory comprises:

replacing the older first compressed data with the first compressed data in the compressed portion of the nonvolatile memory.

129. The method of claim 126, further comprising:

reading the first compressed data from the compressed portion of the nonvolatile memory;

writing the first compressed data to the first memory module;

the compression/decompression engine included on the first memory module decompressing the first compressed data to form the first data;

reading the first data from the first memory module; and writing the first data to the nonvolatile memory.

130. The method of claim 126, wherein the compression/decompression engine analyzes and compresses a plurality of symbols in parallel;

wherein the first data comprises symbols;

wherein the compression/decompression engine compressing the first data includes:

the compression/decompression engine analyzing and compressing a plurality of symbols from the first data in parallel to form the first compressed data.

131. The method of claim 126, further comprising:

reading the first compressed data from the compressed portion of the nonvolatile memory;

writing the first compressed data to the first memory module;

the compression/decompression engine included on the first memory module decompressing the first compressed data to form the first data;

reading the first data from the first memory module; and writing the first data to the system memory.

132. The method of claim 126, wherein the system further includes a virtual memory manager (VMM), the method further comprising:

the VMM generating a request for a second data to be loaded into system memory;

receiving said request for the second data;

examining the compressed portion of the nonvolatile memory for the second data;

requesting the second data from the nonvolatile memory in response to the second data not being found in the compressed portion of the nonvolatile memory;

receiving the second data from the nonvolatile memory; and writing the second data to the system memory.

133. The method of claim 132, further comprising:

writing the second data to a second memory module;

the compression/decompression engine included on the second memory module compressing the second data to form a second compressed data;

reading the second compressed data from the second memory module; and writing the second compressed data to the compressed portion of the nonvolatile memory.

134. The method of claim 126, wherein the compression/decompression engine analyzes and decompresses in parallel a plurality of tokens each describing one or more symbols;

wherein the first compressed data comprises tokens each describing one or more symbols in the first data;

wherein the compression/decompression engine decompressing the first compressed data to form the first data includes:

the compression/decompression engine analyzing and decompressing a plurality of tokens from the first compressed data in parallel to form the first data.

135. A method for managing memory in a system including a CPU, a nonvolatile memory, one or more memory modules comprising system memory, and a memory controller including a compression/decompression engine, the method comprising:

reading a first data from the system memory;

writing the first data to the compression/decompression engine;

the compression/decompression engine compressing the first data to form a first compressed data;

reading the first compressed data from the compression/decompression engine; and writing the first compressed data to a compressed portion of the nonvolatile memory.

136. The method of claim 135, further comprising:

writing the first data to the nonvolatile memory substantially concurrently with said writing the first data to the compression/decompression engine.

137. The method of claim 135, wherein the compressed portion of the nonvolatile memory comprises an older first compressed data prior to said writing the first compressed data to the compressed portion of the nonvolatile memory; and wherein writing the first compressed data to the compressed portion of the nonvolatile memory comprises: replacing the older first compressed data with the first compressed data in the compressed portion of the nonvolatile memory.

138. The method of claim 135, further comprising:

reading the first compressed data from the compressed portion of the nonvolatile memory;

writing the first compressed data to the compression/decompression engine;

the compression/decompression engine decompressing the first compressed data to form the first data;

reading the first data from the compression/decompression engine; and writing the first data to the nonvolatile memory.

139. The method of claim 135, wherein the compression/decompression engine analyzes and compresses a plurality of symbols in parallel;

wherein the first data comprises symbols;

wherein the compression/decompression engine compressing the first data includes:
  the compression/decompression engine analyzing and compressing a plurality of symbols from the first data in parallel to form the first compressed data.

140. The method of claim 135, further comprising:

reading the first compressed data from the compressed portion of the nonvolatile memory;

writing the first compressed data to the compression/decompression engine;

the compression/decompression engine decompressing the first compressed data to form the first data;

reading the first data from compression/decompression engine; and writing the first data to the system memory.

141. The method of claim 135, wherein the system further includes a nonvolatile memory and a virtual memory manager (VMM), the method further comprising:

the VMM generating a request for a second data to be loaded into system memory;

receiving said request for the second data;

examining the compressed portion of the nonvolatile memory for the second data;

requesting the second data from the nonvolatile memory in response to the second data not being found in the compressed portion of the nonvolatile memory;

receiving the second data from the nonvolatile memory; and writing the second data to the system memory.

142. The method of claim 141, further comprising:

writing the second data to the compression/decompression engine;

the compression/decompression engine compressing the second data to form a second compressed data;

reading the second compressed data from the compression/decompression engine; and writing the second compressed data to the compressed portion of the nonvolatile memory.

143. The method of claim 140, wherein the compression/decompression engine analyzes and decompresses in parallel a plurality of tokens each describing one or more symbols;

wherein the first compressed data comprises tokens each describing one or more symbols in the first data;

wherein the compression/decompression engine decompressing the first compressed data to form the first data includes:
  the compression/decompression engine analyzing and decompressing a plurality of tokens from the first compressed data in parallel to form the first data.

* * * * *